US007941438B2

(12) United States Patent
Molina-Moreno et al.

(10) Patent No.: US 7,941,438 B2
(45) Date of Patent: May 10, 2011

(54) METHOD AND APPARATUS FOR AUTOMATIC GENERATION OF INFORMATION SYSTEM USER INTERFACES

(75) Inventors: Pedro Juan Molina-Moreno, Albacete (ES); Oscar Pastor-Lopez, Valencia (ES); Juan Carlos Molina-Udaeta, Valencia (ES); Jose Miguel Barbera-Alonso, Valencia (ES)

(73) Assignee: Sosy, Inc., San Francisco, CA (US)

( * ) Notice: Subject to any disclaimer, the term of this patent is extended or adjusted under 35 U.S.C. 154(b) by 265 days.

(21) Appl. No.: 11/977,218

(22) Filed: Oct. 23, 2007

(65) Prior Publication Data

US 2008/0275910 A1 Nov. 6, 2008

Related U.S. Application Data

(60) Division of application No. 10/356,250, filed on Jan. 31, 2003, now Pat. No. 7,334,216, which is a continuation-in-part of application No. 09/872,413, filed on Jun. 1, 2001, now Pat. No. 7,278,130, which is a continuation-in-part of application No. 09/543,085, filed on Apr. 4, 2000, now Pat. No. 6,681,383, and a continuation-in-part of application No. 09/872,087, filed on Jun. 1, 2001, now abandoned, and a continuation-in-part of application No. 09/872,333, filed on Jun. 1, 2001, now Pat. No. 7,137,100.

(51) Int. Cl.
*G06F 7/00* (2006.01)
*G06F 17/30* (2006.01)

(52) U.S. Cl. ........ 707/756; 707/760; 707/805; 717/109; 717/105; 717/136

(58) Field of Classification Search .................. 707/1–6, 707/10, 201–202, 755–756, 805, 741, 746, 707/760; 717/105, 109, 108, 136
See application file for complete search history.

(56) References Cited

U.S. PATENT DOCUMENTS 4,734,854 A * 3/1988 Afshar .......................... 717/107
4,841,441 A * 6/1989 Nixon et al. .......... 707/E17.001
(Continued)

OTHER PUBLICATIONS

"The Just-UI Approach: conceptual modelling of device independent user interface"—Computer-Aided Design of user Interface, Computer-Aided Design of User iInterfaces CADUI' 2002, Valenciennes, France (pp. 1-28).*

(Continued)

*Primary Examiner* — John Breene
*Assistant Examiner* — Anh Ly
(74) *Attorney, Agent, or Firm* — Ronald Craig Fish

(57) ABSTRACT

A system for automatic software production including specification and automatic generation of user interfaces is disclosed. A graphical editor presents diagrams and textual interactive dialogs which are used to enter requirements data defining the desired structure and behaviour of an application program being designed. The requirements data is automatically converted to formal counterparts in a formal language to create a Formal Specification. The Formal Specification is stored in translation structures which are object in memory taking the form of classes which have methods to use the requirements data to articulate source code templates which become source code components in the final output code. A Presentation Model based in a pattern language is used to specify a Presentation Model) using elements of the pattern language as meta-model building blocks which are articulated with requirements data that defines the specifics of the desired user interface.

30 Claims, 46 Drawing Sheets

U.S. PATENT DOCUMENTS

| | | | | |
|---|---|---|---|---|
| 5,027,305 | A | * | 6/1991 | Tanaka et al. ........... 706/48 |
| 5,159,687 | A | * | 10/1992 | Richburg ........... 717/106 |
| 5,185,867 | A | * | 2/1993 | Ito ........... 717/143 |
| 5,204,939 | A | * | 4/1993 | Yamazaki et al. ........... 706/50 |
| 5,325,533 | A | * | 6/1994 | McInerney et al. ........... 717/107 |
| 5,371,895 | A | * | 12/1994 | Bristol ........... 717/136 |
| 5,459,866 | A | * | 10/1995 | Akiba et al. ........... 717/144 |
| 5,481,718 | A | * | 1/1996 | Ryu et al. ........... 719/316 |
| 5,495,567 | A | * | 2/1996 | Iizawa et al. ........... 715/762 |
| 5,675,753 | A | * | 10/1997 | Hansen et al. ........... 715/744 |
| 5,875,331 | A | * | 2/1999 | Lindsey ........... 717/108 |
| 5,960,200 | A | * | 9/1999 | Eager et al. ........... 717/147 |
| 6,029,002 | A | * | 2/2000 | Afifi et al. ........... 717/131 |
| 6,199,195 | B1 | * | 3/2001 | Goodwin et al. ........... 717/104 |
| 6,275,976 | B1 | * | 8/2001 | Scandura ........... 717/120 |
| 6,330,007 | B1 | * | 12/2001 | Isreal et al. ........... 715/762 |
| 6,370,681 | B1 | * | 4/2002 | Dellarocas et al. ........... 717/110 |
| 6,467,079 | B1 | * | 10/2002 | Ettritch et al. ........... 717/108 |
| 6,618,852 | B1 | * | 9/2003 | van Eikeren et al. ........... 717/108 |
| 6,654,949 | B1 | * | 11/2003 | Fraenkel et al. ........... 717/130 |
| 6,658,646 | B1 | * | 12/2003 | Hernandez, III ........... 717/115 |
| 6,681,383 | B1 | * | 1/2004 | Pastor et al. ........... 717/126 |
| 7,047,488 | B2 | * | 5/2006 | Ingersoll et al. ........... 715/235 |
| 7,137,100 | B2 | * | 11/2006 | Iborra et al. ........... 717/106 |
| 7,278,130 | B2 | * | 10/2007 | Iborra et al. ........... 717/101 |
| 7,334,216 | B2 | * | 2/2008 | Molina-Moreno et al. ........... 717/109 |
| 7,404,177 | B1 | * | 7/2008 | Greenfield et al. ........... 717/106 |
| 7,584,451 | B2 | * | 9/2009 | Iborra et al. ........... 717/101 |
| 2002/0091990 | A1 | * | 7/2002 | Little et al. ........... 717/105 |
| 2002/0100014 | A1 | * | 7/2002 | Iborra et al. ........... 717/104 |
| 2003/0167455 | A1 | * | 9/2003 | Iborra et al. ........... 717/105 |
| 2004/0198386 | A1 | * | 10/2004 | Dupray ........... 455/456.1 |
| 2004/0216147 | A1 | * | 10/2004 | Yanosy et al. ........... 719/328 |
| 2004/0233232 | A1 | * | 11/2004 | Iborra et al. ........... 345/700 |

OTHER PUBLICATIONS

Michael R. Lowry—"Software Engineering in the Twenty-First century" AI Magazine vol. 13, No. 3 Fall 1992 (AAAI) (pp. 71-87).*

J. P/ Jacquot & D. Quesnot—"Early specification of user Interfaces: Toward a Formal Approach"—JCSE'97 (pp. 150-160).*

John C. Knight and Susan S. Brilliant—"Preliminary Evaluation of a Formal Approach to User Interface Specification"—Zum '97: The Z Formal Specification Notation, lecture Notes in Computer Science, 1997, vol. 1212/1997, (pp. 329-346).*

Hideo Watanabe—"A model of a bi-directional transfer mechanism using rule combinations"—Machine translation, vol. 10, No. 4 1995, (pp. 269-291).*

David A. Carr—"Specification of Interface Interaction Objects"—Human Factors in Computing System—CHI' 1994 "CVelebrating Independence" (pp. 372-378).*

Pastor,O., et al., "From Object Oriented Conceptual Modeling to Automated Programming in Java", Conceptual Modeling—ER'98. Lecture Notes in Comptuer Science (1507), pp. 183-197, Springer-Verlag, 1998.

Molina, P., "Especificación, de Interfaz de Usuario en OO-Method" (In Spanish) Master Thesis, Sep. 1998, DSIC/UPV, Valencia, Spain.

Molina, P., et al., "Specifying Conceptual Interface Patterns in an Object-Oriented Method with Code Generation", In Proceedings of User Interfaces for Data Intensive Systems, UIDIS'2001, Zurich, Switzerland.

Insfran, E., et al.,"Ingeniería de Requisitos aplicada al modelado conceptual de interfax de usuario" (In Spanish), In Procs. Of Ideas'2001, Santo Domingo. Heredia. Costa Rica. CIT. pp. 181-192. Apr. 2001.

Nunes, "Object Modelling for User-Centered Development and User Interface Design: the Wisdom Approach", PhD Thesis, Apr. 2001.

Anonymous, "Features of VDMTools", IFAD VDMTools Product Description, Publisher Unknown (Sep. 23, 1998), pp. 1-8, XP002200823 and VDMTools VDM++ Toolbox User Manual.

Hsia, "Your Guide to Rational Rose Add Ins" Rose Architect Magazine—Summer Edition [online] Jun. 1999, pp. 1-9, XP002200824 Retrieved from the Internet.

Bruegge, "Rose Tutorial", School of Computer Science, Carnegie Mellon University, Pittsburgh, Pa (Sep. 22, 1997).

Anonymous, "Rational Rose 98i: Using Rose J", http://www.se.fh-heilbronn.de/usefulstuff/
Rational%20Rose%2098i%20Documentation/Rational%20Rose/Documentation/Rose98i_java_pdf_Copyright_1998.

Griffith, et al., "Teallach: A Model-Based User Interface Development Environment For Object Databases", Department of Computer Science, University of Manchester Manchester U K CiteSeer 1999.

Da Silva, et al., "Generating User Interface Code From Declarative Models: The Teallach Approach", Department of Computer Science, University of Manchester, U.K. Aug. 13, 1999.

Da Silva, et al., "Generating User Interface Code in a Model Based User Interface Development Environment", Department of Computer Science University of Manchester U K Copyright 2000 ACM.

Koob, F. et al., "The VSE development method—A way to engineer high-assurance software systems" Paper Presented at the 5 GI/ITG—Fachgesprach Formale Bescreibungstechniken For.

Koob et al., "Industrial Usage of Formal Development Methods—the VSE Tool Applied in Pilot Projects" Bundesant fur Sicherheit in der Informationstechnik. Copyright 1996 IEEE.

Jaquot et al., "Early Specification of User-Interfaces: Toward a Formal Approach", Proceedings of the 1997 International Conference on Software Engineering. Boston, May 17-23.

Oscar P. et al., "Specifying Interface Properties in Object Oriented Conceptual Models" In Working Conference on Advanced Visual Interfaces AVI 2000 Palermo Italy ACM Press pp. 302-304, ISBN.

Molina et al., "Just-UI: A User Interface Specification Model" In omputer-Aided Design of User Interfaces III, Proceedings of the 4th International Conference on Computer-Aided Design of User Interfaces.

Molina et al., "User Interface Conceptual Patterns", In Proceedings of the 4th International Workshop on Design Specification & Verification of Information Systems DSV-IS'2002. Rostock. Germany, pp. 201-214.

Romero, J., "Diseño de un Entorno de Producción de Software basado en el Lenguaje de Especificación OASIS y en la utilización de PowerBuilder como Herramienta de Desarrollo Gráfica y C/S" (In Spanish).

Romero, J., et al., "Una Herramienta de Generación Automática de Software" (In Spanish) In Procs of IDEAS-98—I Workshop Iberoamericano en Ingeniería de Requisitos y Ambientes Software Porto Alegre Brasil.

Torres I., "Disseny i Implementació d'un Diccionari de Dades per a un Model Conceptual" (In Valenciano), Master Thesis, Jun. 2000.

Molina, P., et al., "Prototipado rápido de interfaces de usuario", (In Spanish), In Procs. Of IDEAS'2002, La Habana, Cuba, pp. 78-90, Apr. 23, 2002 Title translation: "Rapid prototyping of user interfaces".

Letelier, P., et al., "OASIS Version 3.0: Un Enfoque Formal Para el Modelado Conceptual Orientado a Objectos" ISBN: 84-7721-663-0, Legal Diposit: V-3484-1998, Servicio de Publicaciones de la UPV, SP-UPV.

Pelechano, V., "OO-Method: Implementación de un Entorno Gráfico para el Análisis y Diseño de Sistemas De Información OO", Master Thesis, 1994.

Pelechano, V., et al., "Case OO-Method: Un Entorno de Producción Automática de Software" Actas de la Convenció Informática Latina CIL-95, Barcelona, Jun. 1995.

Pastor, O., et al., "An Object Oriented Methodological Approach for Making Automated Prototyping Feasible", Database and Expert Systems Applications. Lecture Notes in Computer Science (1134) pp. 29-39.

Pelechano, V., et al., "Implementación y comprobación de restricciones de integridad dinámicas en entornos de programación orientados a objectos" II Jornadas Nacionales de Ingeniería de Software.

Pastor, O., et al., "Linking Object-Oriented Conceptual Modeling with Object-Oriented Implementation in Java", VIII Conference on Database and Expert Systems Applications. (DEXA'1997), ISGN: 3-540-63478-9.

Pastor, O., et al., "OO-METHOD: An OO Software Production Environment Combining Conventional and Formal Methods", 9th International Conference on Advanced Information Systems Engineering.

Pastor, O., et al., "Object Oriented Conceptual Modeling Techniques to Design and Implement a Sound and Robust Oracle Environment" Actas de Oracle OpenWorld 97 Viena (Austria) 7-11 Abstract publicado en Oracle.

Gomez, J., et al., "The Execution Model: A Component-Based Arquitecture to Generate Software Components from Conceptual Models" In Procs of International Workshop on Component-based Information.

Pastor, O., et al., "Mapping Aggregation from Object-Oriented Conceptual Modeling to Object-Oriented Programming", In Procs of Third International Cnnference on Object-Oriented Technology WOON-98 pgs.

Romero, J., et al., "Automatic Object-Oriented Visual Programming with OO-Method", Software and Hardware Engineering for the 21th Century, pp. 345-354, World Scientific and Engineering Society Press.

Gomez, J., et al., "From Object-Oriented Conceptual Modeling to Component-Based Development" Database and Expert Systems Applications. Trevor Bench-Capon. Giovanni Soda. A. Min Toa Editors.

Pelechano, V., et al., "An Automatic Code Generation Process for Dynamic Specialization Based on Design Patterns and Formal Techniques". Actas de la IFIP International Conference on Software.

Pastor, O., "The OO Method Approach for Information Systems Modeling: From Object Oriented Conceptual Modeling to Automatic Programming". Information Systems Journal Elsevier Science. November.

Molina, P., et al., "Just-UI: A User Interface Specification Model" In Computer-Aided Design of User Interfaces III, Proceedings of the 4th International Conference on Computer-Aided Design of User Interfaces.

PCT counterparts of IPER dated Jul. 3, 2003, an International Search Report dated Jun. 13, 2002, foreign office action from Australia dated Jun. 1, 2004.

Office actions dated: Oct. 7, 2004; Jun. 7, 2005; Feb. 26, 2004; and Feb. 2, 2005.

Office actions dated: Apr. 25, 2005; Aug. 16, 2004; Apr. 22, 2004.

Office actions dated: Jul. 9, 2004; Jan. 26, 2005 and Jul. 14, 2005.

Patent application dated.

Pelechano V, et al., "OO-Method: Una apuesta por la integración de técnicas formales y semi-formales en la ingeniería de requisitos." I Jornadas Nacionales de Ingeniería de Software Universidad de Sevilla.

Pastor O. et al., "Generacion Automatica de Prototipos en Entornos Internet/Intranet a partir de Modelos Conceptuales" Computacion y Sistemas No. 1 vol. 3 ISSN 1405-5546 pp. 38-49 1999.

Sofia Marti "Diseño e Implementación en Visual Basic de Relaciones de Herencia Especificadas en OO-Method", Master Thesis, 1999.

Eva Campos "El Patrón Conceptual de Agregación en OASIS 3.0/OO-Method: Análisis e Identificación de Patrones para Generación Automática de Código" (In Spanish) Master Thesis Sep. 1999 File.

Manoli Albert "El Patrón Conceptual de Herencia en OASIS 3.0/OO-Method: Análisis y Generación de Código en Java utilizando Patrones de Diseño"(In Spanish), Master Thesis, Sep. 1999.

Felip Miguel, "Catàleg de Patrons d'Agregació per a OO-Method: Especificació i Implementació." (In Valenciano). Master Thesis, 2000.

Roberto Mencia, "Catálogo de Patrones de Herencia para OO-Method: Especificación e Implementación" (In Spanish) Masther Thesis, Valencia 2000.

Vincent Pelechano, "Tratamiento de las relaciones taxonomicas en entornos de producción automática de software: Una aproximación basada en patrones" (In Spanish), Valencia, Dec. 2001.

Rebeca Morales "Generación Automática de Modelos Conceptuales a partir de Especificaciones de Requisitos" (In Spanish). Master Thesis.Valencia 2000.

Emilio Infran, et al., "Ingeniería de Requisitos aplicada al modelado conceptual de interfaz de usuario" (In Spanish), In Procs. of IDEAS'2001, Santo Domingo. Heredia. Costa Rica. CIT. pp. 181-192. Apr. 2001.

J. Sanchez, et al., "From User Requirements to User Interfaces: A Methodological Approach" K.R.Dittrich, A.Geppert, M.C.Norrie (Eds.): Advanced Information Systems Engineering. CAISE 2001. LNCS 2068. pp.

Jordi Juan "Modelos Organizacionales e Ingeniería de Requisitos" (In Spanish). Master Thesis.Valencia 2001.

E. Insfran, et al.,"Requirements Engineering-Based Conceptual Modeling" To be published in Requirements Engineering Journal. , No. 1 , vol. 7 ISSN, 0947-3602 (printed version) 1433-010X (electronic version).

E. Insfran, et al.,"Conceptual Modeling in the Extreme" To be published in Requirements Engineering Journal. , No. 1, vol. 7. ISSN, 0947-3602 (printed version): 1433-010X (electronic version), 2002.

Emilio Insfran, et al., "Modelado de Requisitos para la Obtención de Esquemas Conceptuales" In Procs. Of IDEAS'2002. La Habana, Cuba.

* cited by examiner

FIG. 5

Customer

Customer

Customer: 1074    ~701

| Code: | 1074 |
|---|---|
| Name: | Pablo |
| Surname: | Molina |
| Address: | Gran Via, 16. |
| Phone: | 967267777 |
| Fax: | 967267778 |
| Province: | Albacete |
| Country: | Spain |
| Comments: | VIP customer. Special fare. |

--> Curency    --> Payments    --> Orders    --> Invoices

Close

Expen e Accounts    11:34a  (ok)    ~702
Look for Expense Account

Expense Account: 11

| Field | Value |
|---|---|
| Creation date | 12/04/2002 |
| Description | Description 1 |
| Project title | Title 1 |
| Employee first name | José |
| Employee surname | Ruíz Villambrosa |
| Approved | No |
| Approval date | 15/04/2002 |
| Advance payment | 0 |
| Balance | 0 |
| Total | 0 |
| Paid | Yes |

O Ready

Action

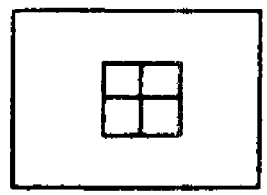 DISPLAY SET ~2000
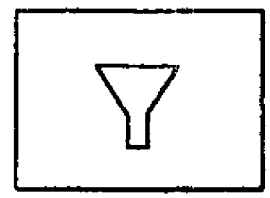 FILTER ~2001
 ORDER CRITERION ~2002
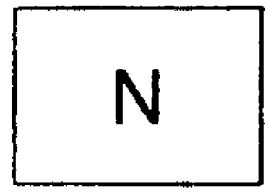 NAVIGATION ~2003
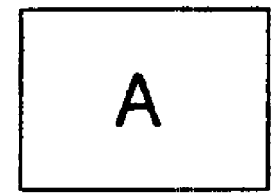 ACTIONS ~2004
FIG. 20

DIALOG BOX TO ADD OR EDIT ANY IU

THIS DIALOG APPEARS WHEN BUTTON 2402 SELECTED & IS CONTEXT SENSITIVE

THESE ARE THE PATTERNS THAT CAN BE APPLIED TO DEFINE VARIOUS TYPES OF USER INTERFACES FOR A CLASS

DIALOG TO GIVE A PATTERN A NAME & ALIAS & OTHER INFO

DIALOG TO ARTICULATE A POPULATION IU

DEFINITION TAB FOR FILTERS

DIALOG THAT APPEARS WHEN A DEPENDENCY PATTERN IS SELECTED

STATE TRANSITION DIAGRAM

FIG. 34

FLOWCHART OF THE FUNCTIONS THAT ALL SPECIES IN THE DATABASE
GENERATOR TRANSLATOR SUBGENUS WILL PERFORM

CLASS CREATION DIALOG

ALL CLASSES NEEDED AND CREATED IN EXPENSE MANAGEMENT SYSTEM

DIALOG TO CREATE AND MODIFY RELATIONSHIPS BETWEEN CLASSES

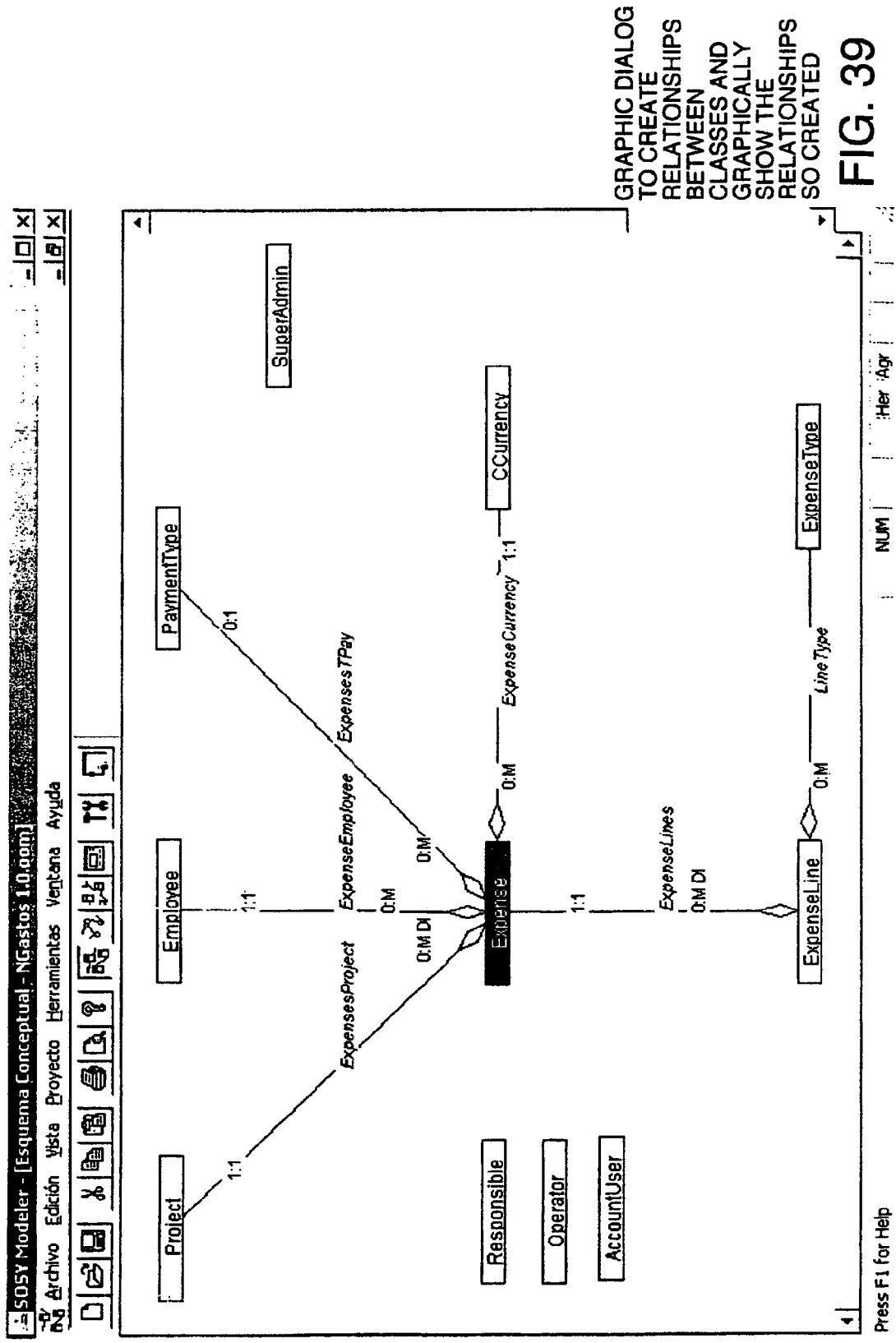
FIG. 39 GRAPHIC DIALOG TO CREATE RELATIONSHIPS BETWEEN CLASSES AND GRAPHICALLY SHOW THE RELATIONSHIPS SO CREATED

FIG. 40A

Clase

Atributos | Servicios | Derivaciones | Restricciones | Agentes | Transacciones | Relaciones | Generalidades Atributo:
[Balance ▼]

Fórmulas de Derivación

| Condición | Fórmula |
|---|---|
| | TotExpenses - Advances |

Añadir
Modificar
Borrar

Condición:

Fórmula:

Observaciones

Clase: [Expense ▼]

[Aceptar]  [Cancelar]

FIG. 40B

FIG. 41 SERVICES OF CLASS "EXPENSE"

FIG. 42

DIALOG TO DEFINE FORMULA FOR "DELETEALL" TRANSACTION

INTEGRITY CONSTRAINTS OF EXPENSE CLASS

FIG. 44

DIALOG BOX TO CREATE EVALUATION OF "CAUSE" ATTRIBUTE WITH THE "MODIFY" EVENT TO FORM PART OF FUNCTIONAL MODEL

AGENT RELATIONSHIP DIALOG THAT CAN BE USED TO SET WHICH SERVICES "ACCOUNT USE" CAN ACCESS AND VISIBILITY OF CLASS ATTRIBUTES FOR THIS USER

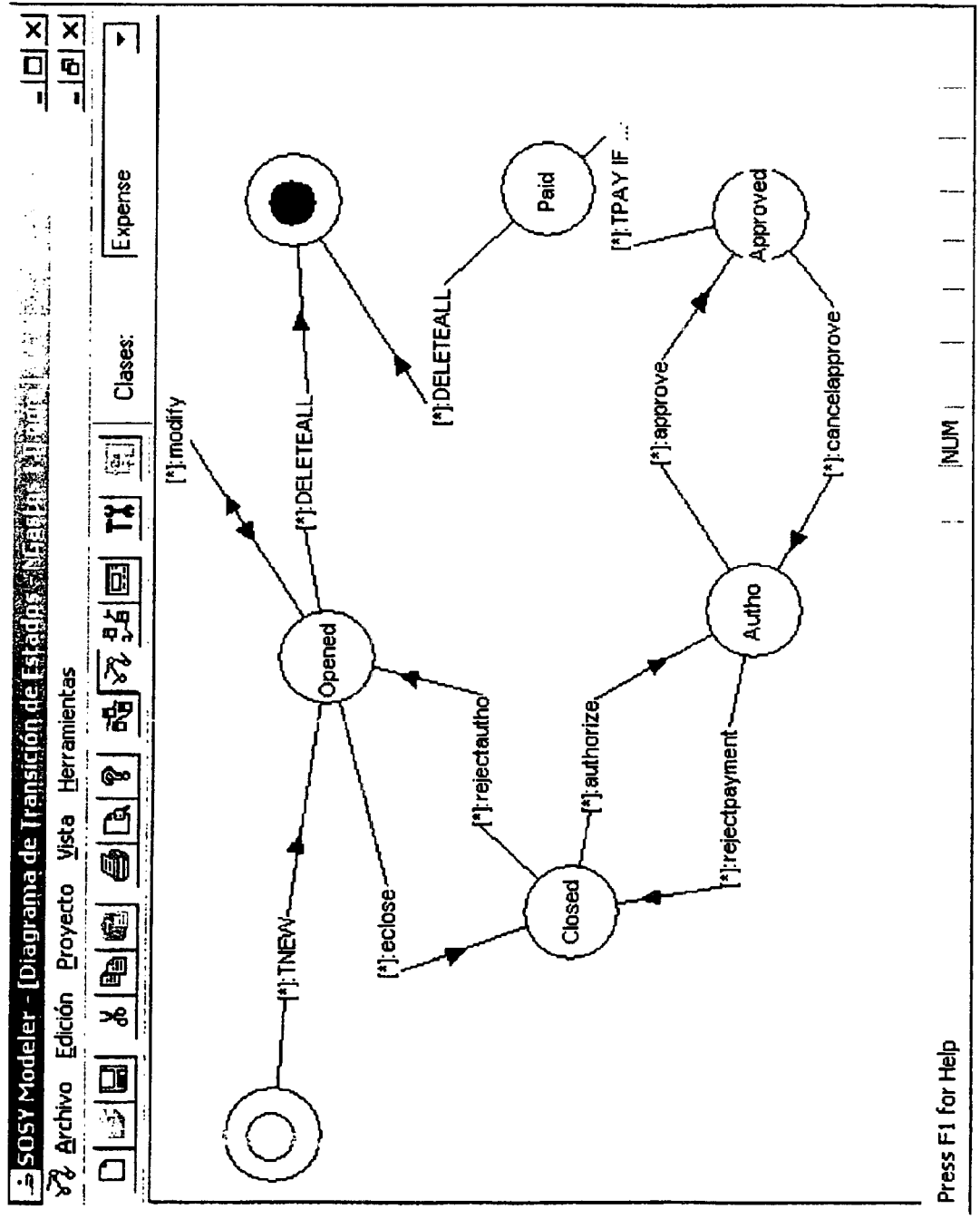
FIG. 46 STATE TRANSITION DIAGRAM FOR CLASS "EXPENSE"

FIG. 47 DIALOG BOX TO MODEL PRECONDITION

DIALOG BOX USED BY SOSY MODELER TO ESTABLISH A SET OF ATTRIBUTES TO BE DISPLAYED FOR THE "EXPENSE" CLASS

FIG. 49

DIALOG BOX USED BY SOSY MODELER TO ESTABLISH THE SEARCHING CRITERIA FOR THE EXPENSE CLASS AND TO ESTABLISH THE FILTER FORMULA TO USE AND THE VARIABLES TO REQUEST THE USER TO ENTER

METHOD AND APPARATUS FOR AUTOMATIC GENERATION OF INFORMATION SYSTEM USER INTERFACES

CROSS REFERENCE TO RELATED APPLICATIONS

This is a divisional of prior U.S. patent application Ser. No. 10/356,250, filed Jan. 31, 2003, (now U.S. Pat. No. 7,334,216) which was a continuation-in-part of a prior U.S. patent application entitled Automatic Software Production System, Ser. No. 09/872,413, filed Jun. 1, 2001, (now U.S. Pat. No. 7,278,130) which was a continuation-in-part of prior U.S. patent application of the same title, Ser. No. 09/543,085, filed Apr. 4, 2000 (now U.S. Pat. No. 6,681,383) which are hereby incorporated by reference. Two other CIPS of Ser. No. 09/543,085, filed Apr. 4, 2000 exist having Ser. Nos. 09/872,087 (now abandoned) and 09/872,333, both filed Jun. 1, 2001 (now U.S. Pat. No. 7,137,100).

REFERENCES

Pedro J. Molina, Oscar Pastor, Sofia Marti, Juan J. Fons and, Emilio Insfran. "Specifying Conceptual Interface Patterns in an Object-Oriented Method with Code Generation" In Proceedings of 2nd IEEE Workshop on User Interfaces for Data Intensive Systems UIDIS'01. IEEE Computer Society, IEEE Press, ISBN 0-7695-0834-0, pages 72-79, May 2001.

Pedro J. Molina, Santiago Meliá and Oscar Pastor, "Just-UI: A User Interface Specification Model", Computer-Aided Design of User Interfaces III, In Proceedings of the 4th International Conference on Computer-Aided Design of User Interfaces CADUI'2002, Valenciennes, France, Kluwer Academics Publisher, Dordrecht, chapter 5, pages 63-74, ISBN 1-4020-0643-8, 2002.

Pedro J. Molina, Santiago Meli Meliá and Oscar Pastor, "User Interface Conceptual Patterns", Design, Specification, and Verification of Interactive Systems, In Proceedings of the 4th International Workshop on Design Specification & Verification of Information Systems, DSV-IS'2002, Louvain-La-Neuve, Belgium and Germany, pages 201-214, 2002. Also in Lecture Notes in Computer Sciences, Springer Verlag, Vol. 2545.

OTHER REFERENCES

Angel R. Puerta and David Maulsby, "Management of interface design knowledge with MOBI-D" In Proceedings of the 2nd international conference on Intelligent user interfaces, IUI'1997 (Orlando, Fla., EE.UU.), pages 249-252, New York, USA, ACM Press, ISBN 0-89791-839-8, 1997.

François Bodart and Jean Vanderdonckt, "Towards a Systematic Building of Software Architectures: the TRIDENT Methodological Guide", In Proceedings of Design, Specification and Verification of Interactive Systems, DSV-IS'95, pages 262-278, Springer-Verlag, 1995.

Object Management Group, "UML Notation. Version 1.1, document OMG ad/97-08-05", 1997.

James Rumbaugh, Michael Blaha, William Premerlani, Frederick Eddy, William Lorenson, "Object-Oriented Modeling and Design". Prentice Hall, ISBN 0136298419, 1990.

Genera, "Genova 7.0", Available at http://www.genera.no/2052/tilkunde/09.04/default.asp Paulo Pinheiro da Silva and Norman W. Paton, "A UML-Based Design Environment for Interactive Applications", In Proceedings of 2nd IEEE Workshop on User Interfaces for Data Intensive Systems UIDIS'01, pages 60-71, IEEE Computer Society, 2001.

Nuno Jardim Nunes, "Object Modeling for User-Centered Development and User-Interface Design", PhD Thesis, Universidad de Madeira, Madeira, Portugal, 2001.

Fabio Paternò, "Model-Based Design and Evaluation of Interactive Applications", Springer-Verlag, 2000.

Dave Roberts, D. Berry, S. Isensee and J. Mullaly, "Designing for the User with OVID: Bridging User Interface Design and Software Engineering", New Riders Publishing, 1998.

Jean Vanderdonckt and François Bodart, "Encapsulating Knowledge for Intelligent Automatic Interaction Objects Selection", ACM Proc. of the Conf. on Human Factors in Computing Systems INTERCHI'93, Amsterdam, Holland, ACM Press, pages 424-429, 1993.

P. J. Barclay, T. Griffiths, J. McKirdy, N. W. Paton, R. Cooper, and J. Kennedy (1999). "The Teallach Tool: Using Models for Flexible User Interface Design" In Proceedings of CADUI'99. pp 139-158, Kluwer Academic Publishers, 1999.

OMG. UML Notation. Version 1.1, OMG document ad/97-08-September 1997.

OMG. UML Semantics. Version 1.1, OMG document ad/97-08-04, September 1997.

Tim Bray, Jean Paoli, C. M. Sperberg-McQueen, Eve Maler. Extensible Markup Language (XML) 1.0 (Second Edition) W3C Recommendation, World Wide Web Consortium 6 Oct. 2000. http://www.w3.org/TR/REC-xml

Computer Program Listing Appendix

A pair of identical CD-R compact discs, each containing an assembly code listing in Microsoft Word format having the file name ASM.TXT.DOC and a size of 40.1 MB is appended hereto and incorporated by reference. This file was created on Jan. 31, 2003 and is submitted in duplicate. The disc is compatible with IBM PC/AT, Windows and Macintosh operating systems.

BACKGROUND OF THE INVENTION

The invention pertains to the user interface and software engineering fields. More specifically, it is an apparatus and a method for building user interface for business applications and information systems. To simplify and speed up the process of writing computer code which implements user interfaces for business and other application programs, what is needed is a specific set of primitives that implements a set of patterns which can be used to fully define types of user interfaces for at least business applications. What is needed is a set of primitives and an editor tool by which the user interface can be specified using a model, validated with the user, verified for completeness and non ambiguity, and automatically transformed into source code in a third generation programming language so as to output working computer code implementing such a user interface being able to communicate with a business logic component, responsible of implementing the functionality of the application for which the user interface is the "front end".

The problems with prior art User Interface (UI) models and code generation tools are the following: UI specification methods do not consider enough the domain model (the functionality of the application). Examples of such deficient UI model and code generation tools are: MOBI-D, TRIDENT, CTT. In other words, these prior art UI modeling tools assume that the business logic will be fully specified apart from the user interface and coded manually. Coding the business logic separately may lead to bugs in integration with the UI and bugs in the business logic code itself. This lengthens the delay from conception to first sales in the market (time to market) because of possibly long delays in debugging the business logic code. Furthermore, these prior art UI specification tools do not have: a precise, unambiguous semantics which can be validated to eliminate bugs in the UI code; translators that can generate UI code automatically from the validated specification of the user interface and able to connect with a generated business logic component; and a persistence layer also generated to conform an entirely automatic generated application.

On the other hand, methods and notations for the specification of functional requirements of computer programs (tools to define models of the business logic of a program) such as OMT or UML do not consider user interface requirements as well. This situation leads to a state in which two models are needed to fully specify the business logic and user interface of a computer program (one for the functionality and the other one for the user interface). This produces synchronization problems whenever one of the specification changes. In other words, when one of the specifications changes, the other specification "breaks" and code written implementing this other specification will no longer work with the code written implementing the first specification. This requires expensive and time consuming reworking of the second specification.

UI generation tools like Genova, TRIDENT, SEGUIA, MOBI-D produce partial code where the UI code generated is not complete. Such code cannot be compiled directly and needs hand coding before a program which can run as a final application exists.

Previous UI modeling tools do not present a set of primitives that can be invoked to specify the elements of a user interface for business applications. Teallach, iUML and CTT present a good set of primitives that can be used for user interfaces for programs that address academic problems and theorization. However, these prior art tools propose very low level primitives that can not be used in medium-sized industrial projects without suffering scalability problems. Academic research about UI modeling tools such as iUML, Wisdom or CTT has resulted in tools which have not been tested in industrial projects and has not been fine-tuned for such scalability requirements.

Some notations like OVID and UML lack precise semantic meaning in the concepts used. As a result, this makes it impossible to generate validated specifications of the User Interface Model (Presentation Model) and bug-free code from an imprecise specification.

BRIEF DESCRIPTION OF THE SEVERAL VIEWS OF THE DRAWING

FIG. 5 contains three implementation examples of running Service Interaction Unit.

FIG. 7 contains two implementation examples of running Instance Interaction Unit.

FIG. 9 contains three implementation examples of running Population Interaction Unit.

FIG. 20 shows the primitives for graphical notation of level 3.

FIG. 34 illustrates an exemplary dialog for receiving input for the functional model.

FIG. 39 is a dialog box to create the relationships between specified classes and which graphically shows the relationships so created and all the properties of those relationships.

FIG. 40A shows the dialog box used to define the attributes for the Expense class with their properties. This dialog box is used to define whether each attribute is constant, variable or derived, the type of data it contains and other things.

FIG. 40B is the dialog box used to fill in the formulas used for derivation of the values of attributes of classes from the values of other attributes.

FIG. 41 shows a dialog box which a SOSY modeler uses to define the services of the Expense class with their arguments.

FIG. 42 is a screenshot of the dialog box used to create one formula in a local transaction carried out by a composed service (single services are called events, and composed services are called local transactions).

FIG. 44 is a dialog box to enter the functional model formulas that define evaluation of the attribute "cause" with the "modify" event (an event is a single service). The functional model relates services mathematically through well-formed formulas to the values of attributes these services act upon.

FIG. 46 is one of the two graphical user interface diagrams of the dynamic model on which the SOSY modeler has drawn a graphic illustrating the state transitions for the "expense" class.

FIG. 47 is a dialog box used by the SOSY modeler to establish this precondition.

FIG. 49 shows the dialog box used by the SOSY modeler to establish the searching criteria for the expense class, and indicate the filter formula to use and which variables to request from the user.

DETAILED DESCRIPTION OF THE INVENTION

Figure 1:
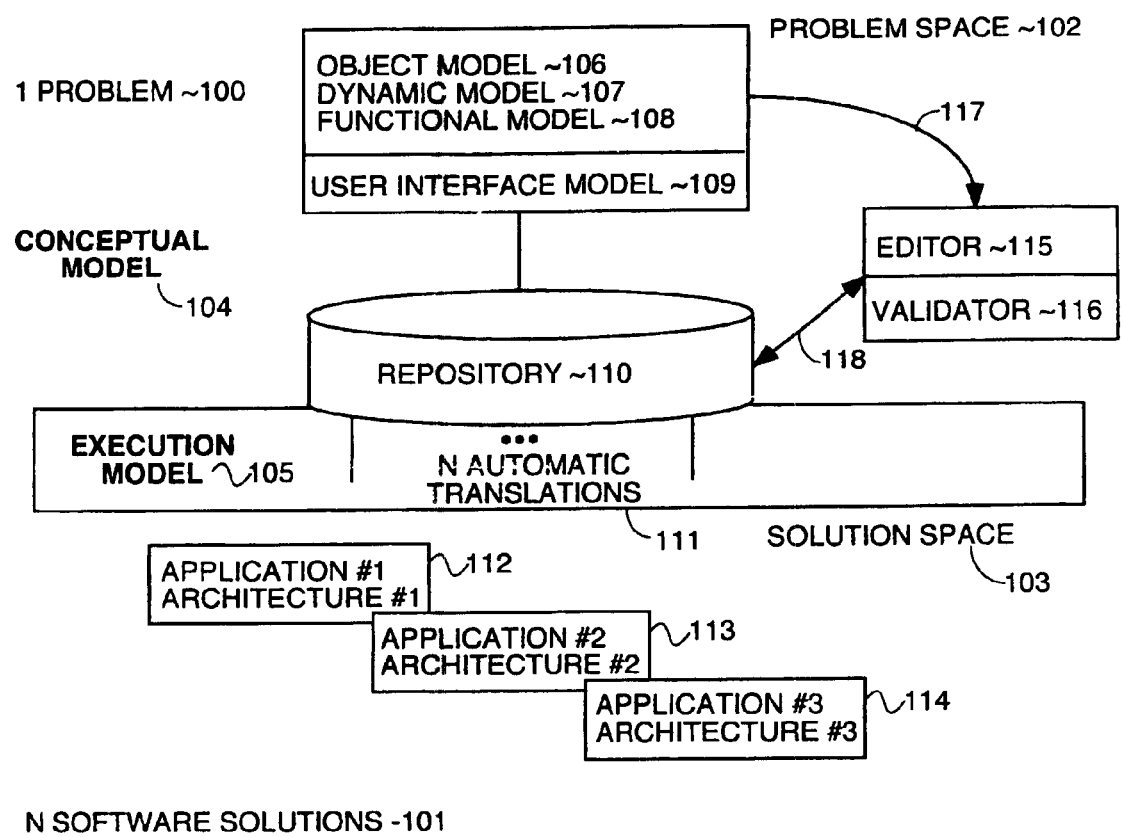
FIG. 1 is a general overview of the process followed. Requirements are expressed in a Conceptual Model, validated and stored in a repository, and later used as input for code generators.

The system described herein provides a method and apparatus for producing fully functional user interface program code for computer programs being developed using the software production system and other information systems with modeling tools and time savings from concept to working code heretofore unknown.

The software production system has the following characteristics:

(1) The software production system contains tools to define a unique specification model to facilitate modeling both functional aspects of the computer program being defined using the software production system and its user interface thereby enabling the production of a single model which fully specifies both the business logic and the user interface (as well as other things) thereby eliminating the synchronization problem between functional and user interfaces requirements that existed in the prior art.

(2) The software production system is supported by a meta-model having among other things, a set of specific primitives called Interaction Units to specify user interfaces for information systems and business applications in a robust and scalable way. Patterns are the templates or building blocks from the meta-model that are used to define a user interface in a shorthand sort of way. The building blocks in the meta-model are patterns of user interfaces that have been identified as common user interface patterns in the prior art. The allowable patterns for specifying a user interface were defined at pattern definition time when the meta-model building blocks to build user interfaces were first defined. In other words, to define means to say what is allowable as a pattern for a user interface type or behavior. To "apply" means to actually select a pattern from the meta-model and articulate it to define some aspect of a user interface. To articulate a pattern means to fill in required data to define its behavior or the content of what will be displayed in the user interface that results. Some of these patterns are called Interaction Units (hereafter IU), each of which defines a particular type of desired user interface. Some of these patterns are called elemental patterns and they can be "applied" to a particular Interaction Unit. This allows the analyst building the User Interface Model (Presentation Model) from these primitives to enter data to control how the end user can interact with the user interface, how the user interface will look and how entry of arguments by the end user will be constrained and to control what attribute data from the classes will be displayed. Interaction Units like Population IU are patterns, but they too have other mandatory or optional elemental patterns applied to them like filter conditions and the other patterns in FIG. 3 at the most detailed level of the HAT tree. These elemental patterns are primitives in the meta-model and define patterns which can be used to elicit data from an analyst to specify data that controls how the user interface looks, behaves and the content of the displays created by the user interface. In other words an IU can be applied using an editor program to specify a user interface and more elemental patterns can be applied to the IU and data entered to articulate the IU behavior and content.

(3) The software production system contains an editor which displays ways to invoke the various primitives in the meta-model and add defining characteristics, attributes, values, and relationships to other objects in a model of the desired software program which fully specifies the user interface as part of the overall model of the program to be generated and which provides a user the capability to edit such a model so as to easily change the model thereby easily changing the resulting code which ultimately will be generated from the model. More specifically, with regard to the building of a user interface in the end result code, the editor provide shortcuts to the analyst. These shortcuts allow an analyst to select a class and then, simply by selecting an icon or menu choice for a particular type of IU, specify the type of user interface for display of data from the class and for interaction with the user. Then, the computer running the editor responds by opening one or more dialog boxes or forms that invite the analyst to enter data to articulate the IU. Articulation of an IU means that the analyst enters data that controls how the user interface created by selection of the IU will behave in terms of: constraints on entering of arguments by the end user; showing of labels or aliases that provide nicknames for selected or displayed items to provide feedback to the user to verify she picked the right item; dependencies or event-condition-action rules that control the dynamic behavior of the user interface such as when a user enters a certain argument in a service, that will be an event that, if a certain condition exists, will cause an action to be carried out to change the value of another argument; status recovery to recover the current state of an object and display it to a user who wants to execute a service to change the value of one or more attributes of an object; filter conditions that control which instances of a class are displayed in a user interface specified by a Population IU; order criterion that control the order of displayed instances of a class in ascending or descending order, etc.; the display set that defines the set of attributes of instances of a class that will be displayed in Population and Instance IU; data that defines actions that, when invoked in the final user interface code by the end user, vector the execution to other user interface code that was created by a target IU specified when the action elemental pattern was applied which causes a change in the displayed data; and navigation pattern data, which causes display in the final user interface of navigation buttons or links that can be invoked by the final user to cause vectoring of processing to code that was generated from a target IU that was specified when the navigation pattern was articulated in the modelling stage. This causes the data displayed on the user interface to be controlled by the code generated by the target IU specified in the navigation pattern.

(4) The software production system contains a validator capable of checking the integrity of such a model built using the editor and including validation of the formal language specification of the user interface against predetermined rules which, if all are complied with, cause the formal language specification to be complete and correct and not ambiguous. In other words, the validator works on the specification of the model built by the editor and verifies that it is complete, correct and unambiguous.

(5) The software production system contains a set of automatic code generator programs capable of translating the validated formal language specification into source code. Such source code is 100% complete and bug-free code which is ready to run.

Interaction Units (IUs) are of various types and represent templates that define particular styles of user interface display and operation. Each Interaction Unit is a template of an object in the object oriented programming sense (hereafter just referred to as objects). Each object will have a data structure which contains data which defines the state of the object and methods or function calls or algorithms that control a computer to operate on the data structure to change the state of the object. Every object has a messaging mechanism to communicate with other objects. The editor contains executable code which implement objects with services or functions to create, edit and destroy the patterns in the meta-model such as IU to allow an analyst to build a User Interface Model (Presentation Model) which completely defines the desired user interface. The patterns such as IU specified in the User Interface Model (Presentation Model) are converted by the editor into a data structure defined in Section C hereof which embodies a specification in a formal language of the desired user interface. This formal specification is then validated against the predetermined validation rules based upon the semantics and syntax of the formal language being used. This process points out any fatal errors and gives warning messages regarding non fatal errors. Corrections can then be made with the editor. After validation, the formal language specification is then automatically translated into working, bug-free code. This process happens much faster than hand writing of code to implement a user interface because of the elimination of large amounts of debugging time.

The IU templates and the other patterns for user interface specification in the meta-model are distilled from the prior art of user interfaces, and each Interaction Unit represents a particular type of user interface. For example, it is common to have a user interface which displays a list of items and data about each item. For example, in a golf tournament management program, one such user interface might be a display of just those players that have entered the tournament who are professional golfers with a handicap below some particular value. With respect to each such golfer, it is desired to have displayed the player's name, his address, phone number and handicap. What is new here is not the user interface comprised of a list of items with data about each item, but the fact that: 1) such a user interface display can be easily specified using a Population IU by having the analyst invoke a population IU icon or menu selection; 2) the computer under the control of the modeler program will then display dialog boxes which the analyst can interact with and fill in data defining filter conditions, e.g., to filter which players to display in the list, order criterion, e.g., to determine the order in which the players are displayed, specify a display set which defines which attributes (e.g., name, address, phone number) of each instance (e.g., player selected per the specified filter condition) of the selected class (e.g., players that have registered in the tournament), the actions (redirections to other IUs), and navigations, e.g., in an invoice population IU, the user selects one invoice and navigates to a lines population IU. As a result, only the lines belonging to such a selected invoice are presented.

Such a user interface can be easily implemented using a Population IU using the methods, data structures and apparatus described herein. Basically, what happens, for example, is the analyst selects a population IU to display a filtered list of items and fills in the displayed dialog box to specify all the elemental pattern data needed for a population IU such as filter condition, order criterion, display set, actions and navigations. This population IU then creates a template in the form of a data structure and statements in the formal specification that define the desired user interface. After the formal specification is validated, the translator will convert it into compilable code which, when compiled, loaded and executed will control the computer to implement the desired interface. For example, the compiled code at run time will go to the class players, select instances of that class according to the specified filter condition, i.e., players which are professionals, and select the desired attributes for each player according to the specified display set (name, address and phone number). Suppose an action was defined to specify that the user should be able to select a displayed player and jump to a population IU that displays all the scorecards the player filed after playing a round on a particular course. If so, an action button or menu item will be displayed by the computer which, when invoked by the end user of the program, will cause the computer to jump to the code which implements the population IU that displays all the designated scorecards. Suppose a navigation was defined which allows a player to be selected and when a navigation icon named "sponsors" is selected, the user is supposed to be taken to a list of all the player's sponsors like Wilson, Ping, etc. That portion of the population IU specification will cause code to be generated which displays a "sponsors" navigation button, monitors for the selection of the button, and, when selected, vectors processing to the code which implements a population IU which displays all the sponsors of the player.

The primitives and concepts of the specification model (the model built with the editor tool which is specific to solving the problem the software program is supposed to solve) are described in terms of a meta-model. In the preferred embodiment XML is used to store the specification. However, others technologies like textual formal languages, binary files, relational databases, repositories or program language structures are other technological forms to implement the meta-model.

The user of the editor (henceforward referred as analyst) builds models instantiating the meta-model in order to create specifications. Once the specification is built, it is validated to check for completeness (all information needed is present) and non-ambiguity (non-contradictory requirements). When the specification passes the validation process, it can be used as input for code generators to automatically produce source code for user interfaces.

The generators load, the specification in memory, apply an inference process to complete the missing information in the specification and automatically produces source code for a given platform and language.

The method described and implemented by the apparatus allows the analyst to develop business software faster that third party tools and methods.

Referring to FIG. 1, there is shown a block diagram describing an overview of the software development process. A given problem 100 can be implemented in many ways in N software solutions 101 taking different analysis, design and implementation decisions. The abstraction separation between the analysis and the implementation is called Problem Space 102 and Solution Space 103, respectively. In this scenario, the Conceptual Model 104 is a set of graphical objects defining the desired behavior of various aspects of the code such as an Object Model 106, a Dynamic Model 107, a Functional Model 108 and a User Interface Model (Presentation Model) 109, which, taken together, specify the requirements of the program or system to be written. A specification in a formal language is built using the Conceptual Model 104 and can, after validation, be translated to an implementation (working code) following the rules described in an Execution Model 105. The Object Model 106, Dynamic Model 107 and Functional Model 108 are used to describe the structural and functional requirements of the program or system to be written. The User Interface Model (Presentation Model) 109 is introduced to complement the specification with user interface requirements which define the mechanism by which the user will receive information from the program to be built and will provide information to it. The models in the Conceptual Model 104 are built by users (henceforward called analysts) using an Editor 115 (also called Modeler) specifically built to allow construction of (represented by path 117) the models 106, 107, 108 and 109 in the conceptual Model. In other words, editor 115 has tools, icons, menu choices, dialog boxes, etc. by which the various building blocks in a meta-model from which all conceptual Models are built can be selected and put into the Conceptual Model. The Editor also allows the attributes of the objects in the Conceptual Model to be defined and the relationships between objects in the Conceptual Model to be defined. Objects as that term, is used herein means objects in the object oriented computer programming sense. Each object has a data structure, procedures or programs that work on the data structure and a mechanism for translating messages.

Once the Conceptual Model is built, it is translated into a specification in a formal language (hereafter referred to as formal specification or just a specification) such as OASIS, but any formal language can be used. Use of a formal language is important because it eliminates ambiguity since there are rules of grammar (syntax plus semantics) which can be used to validate the specification to make sure it is complete and correct.

The formal specifications can be stored 118 in a Repository 110 (computer memory or hard disk) that can be a relational database, a binary file, or any other binary representation of the information. The preferred embodiment is an XML form that will be described later.

The formal specification is validated by a validator 116 in order to check completeness, correctness and non-ambiguity, and this validation process is what causes the code to be bug free when it is automatically created by a translator. This would not be possible if the specification were not written in a formal language with strict, non-variable rules of syntax and semantics. It is through use of these rules of grammar of the formal language that the declaration in the formal specification can be checked to make sure every statement is complete, correct and non-ambiguous. Once, it is clear that every statement in the formal specification is complete, correct and non-ambiguous, the resulting code will be bug free. In other words, if the specification is valid, it can be used as input for code generators or automatic translators 111 that implement the Execution Model 105 in order to produce applications for any of several languages and/or platforms 112, 113 and 114 like Visual Basic/Windows, Java Swing/Java MV, ColdFusion MX/Web apps, JSP/Web apps.

Figure 2:
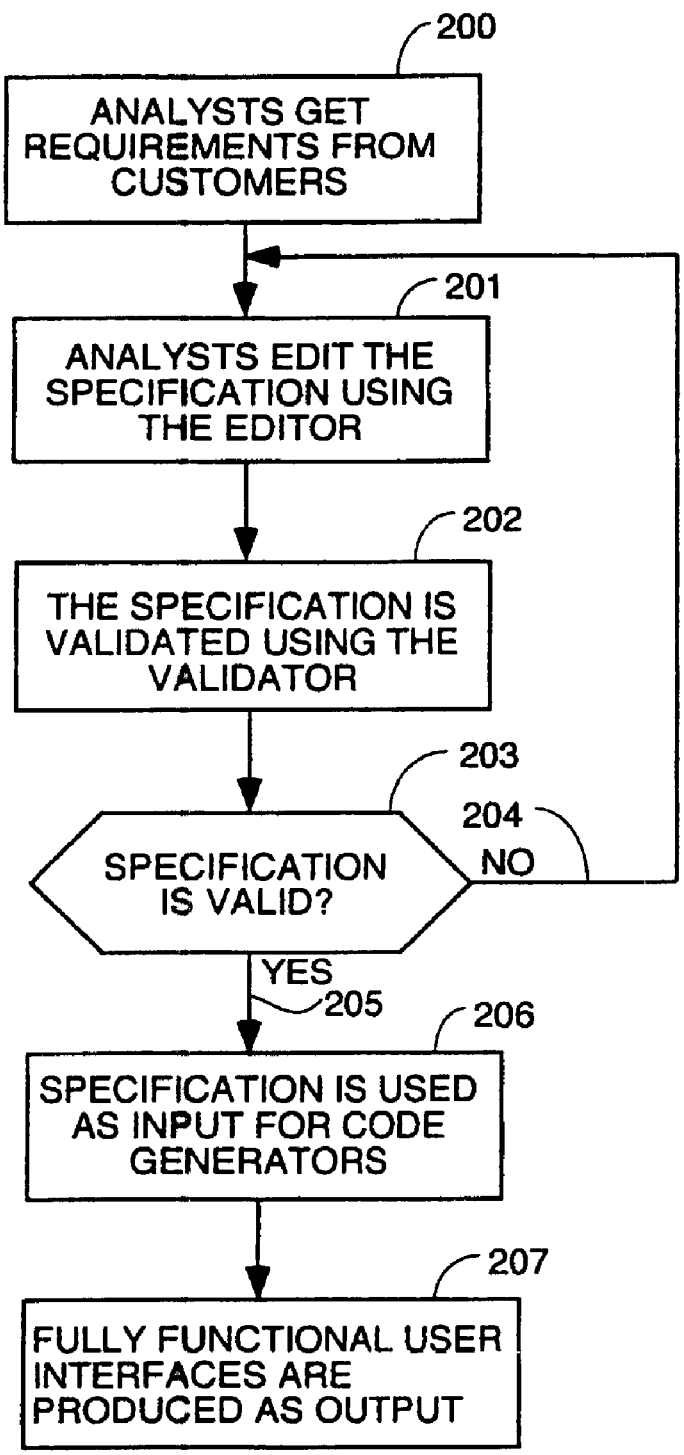
FIG. 2 is a flow chart showing the steps in the production of applications using the editor, validator, and code generators.

The general software production process is shown in the FIG. 2. Analysts talk with customers to gather the requirements 200. Next, analysts use the Editor to build a specification 201. The formal specification is actually built graphically through the use of editor tools such that the analyst essentially draws a picture of the software to be built, and that picture is translated by the editor into declarations in a formal language in the formal specification. The specification is validated 202 using the Validator and the rules of grammar of the formal language. Depending of the result of the validation process 203 different actions must be taken. If the specification is not valid 204, analyst must change the specification returning to 201. When the specification is valid 205, it can be used as input for code generators 206. As output, the code generators produce the final source code 207 which includes a user interface. This patent application deals mainly with the Interaction Units (IU) of the meta-model that are used to define the User Interface Model (Presentation Model) which defines the desired User Interface. It has been found by the applicants that a high percent of user interfaces of prior art business applications can be built from a set of IU building blocks which are the patterns into which user interfaces for business applications can be broken down. These patterns or IU building blocks are part of the meta-model and are identified and described herein along with a graphical notation to use to express them, rules to validate them, and processes to generate code from the formal specification of the user interface including an inference process.

A detailed description is depicted in the following subsections:

A. The Pattern Language.
B. ON-IU meta-model.
C. XML DTD persistence model.

D. Specification Editor.
E. Graphical Notation.
F. Validation Rules.
G. Generation Process.
G.1 Mappings
H. Inference Process.
A. The Pattern Language.

The User Interface Model (Presentation Model) (FIG. 1. 109) is composed by a set of basic concepts and patterns. These patterns are used as building blocks by analysts to create the specification. A detailed description of the components in the Model will be presented next.

Figure 3:
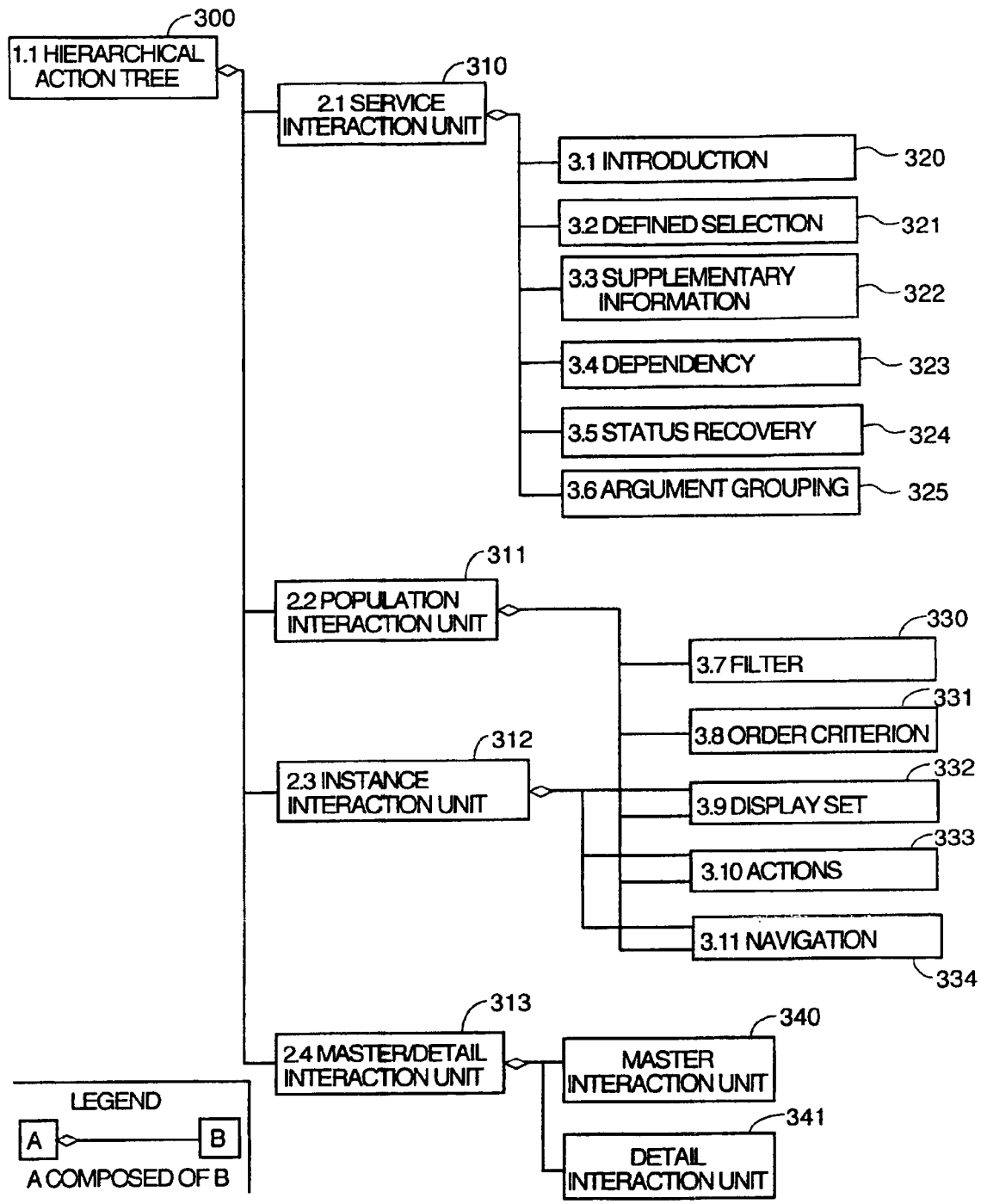
FIG. 3 is a block diagram showing the pattern language and the relationships between patterns.

FIG. 3 shows a block diagram showing the patterns of the pattern language used in the User Interface Model (Presentation Model). The patterns are organized in three levels of a hierarchy. Level 1 comprises one pattern: the Hierarchical Action Tree Pattern 300. Level 2 is composed by Interaction Units patterns: Service IU 310, Population IU 311, Instance IU 312 and Master/Detail IU 313. Level 3 comprises auxiliary patterns: Introduction 320, Defined Selection 321, Supplementary Information 322, Dependency 323, Status Recovery 324, Argument Grouping 325, Filter 330, Order Criterion 331, Display Set 332, Actions 333 and Navigation 334. Master IU 340 and Detailed IU 341 are simpler Interaction Units used to compound a Master/Detail.

Each pattern will be described grouped by levels.

Level 1. Access.

1. Hierarchical Action Tree

A Hierarchical Action Tree (henceforward the acronym HAT will be used) is a tree structure to specify the user access to the exposed system functionality. A HAT contains labels as intermediate nodes in the tree and links to interaction units in the leaf nodes of the tree. This structure can be translated later to an application menu, popup menus, buttons, choice lists, links web pages or any other form of capable user interfaces mechanism to allow a user to select next action in an application.

Level 2. Interaction Units.

Interaction Units are based in Presentation Units defined by Vanderdonckt & Bodart (1993) as an abstraction of physical implementation of windows, web pages or user interface scenarios including any display on a computer screen or voice based interaction. The term "scenario" in this patent application means any displayed dialog box, voice based system, or other mechanism which provides information to the user and which may or may not be able to accept user input entered by any means such as voice, keyboard, pointing device of any type of such as mouse, touchpad, touchscreen, light pen, etc. However, Interaction Units have been improved with respect to Presentation Units containing a common abstract behavior independent from the device considered (Molina et al. 2002).

Interaction Units are abstractions used to describe and specify user interfaces in a platform independent way. This technology-neutral approach will allow code generation to several different platforms like Desktop UIs, Web UI, Mobile UI or Voice UI.

A set of four examples of Interaction Units are presented (Service, Instance, Population and Master/Detail interaction units). Each of them has a specific behavior depending on its type.

2.1 Service Interaction Unit

A Service Interaction Unit is used to describe the interaction of the user when launching a service in a system. Services (or methods in object-oriented jargon) are a mechanism of changing the state of the system. The state of the system is defined by the data in the data structures of its objects. Traditionally, services contain parameters that must be filled by the user (or the application using default values).

Figure 4:
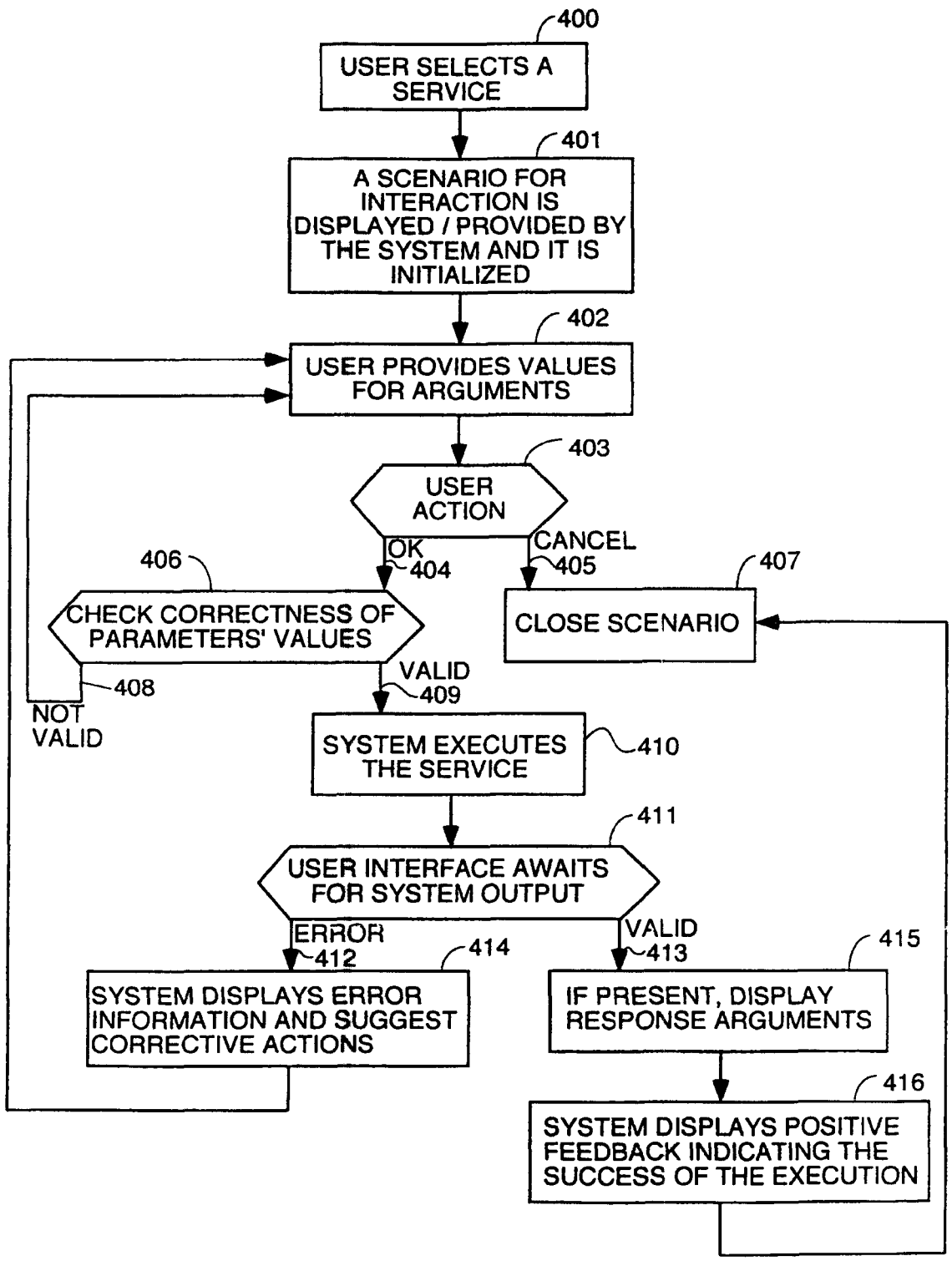
FIG. 4 is a flow chart of the tasks involved in the user interaction in Service Interaction Units in run-time.

The tasks involved in the execution (run time) of a Service Interaction Unit are shown in FIG. 4. The user selects (for example using a (1) HAT or an (3.10) Action item or any other selection mechanism) a service 400. In response, the system displays (or provides, in natural speech supported systems) a scenario implementing the Service IU 401 (typically a dialog box with fields that can be filled in by the analyst to supply arguments or parameters) and initializes parameters using system defaults, user preferences or context information. In such a scenario, the user can fill in fields of the dialog box (or use the voice to fill in the fields in a voice based system) to provide values for each parameter of the service 402. Once the user has finished introducing the data, he can launch the service 404 or cancel it 403. If canceled 405 the interaction scenario is closed. If the user select to launch the service (OK action) 404, the system checks the correctness of the values introduced by the user. The run-time check process 406 includes null checking, domain checking, value range checking, format and mask checking and object existence (for object references). As a result, if the values are not correct 408, an error message is output to the user and the user is encouraged to correct the error coming back to step 402. If the values are correct 409, the system launches the service in the system 410 and the UI awaits completion for purposes of providing feedback to the user. Once the service has been executed, if an error is produced 412, the system provides feedback explaining the error to the user and suggests possible actions to correct it 414 before returning to step 402. On the contrary, if the service is successfully executed 413, the system displays positive feedback indicating the successful execution 415. Finally, if the service contains output parameters (response parameters), they are shown to the user 416 before closing the scenario 407.

Service Interaction Units can have patterns applied to provide a more precise behavior. The patterns that can be applied are: Introduction 320, Defined Selection 321, Supplementary Information 322, Dependency 323, Status Recovery 324, and Argument Grouping 325. These others patterns will be described in the following sections.

Figure 5:
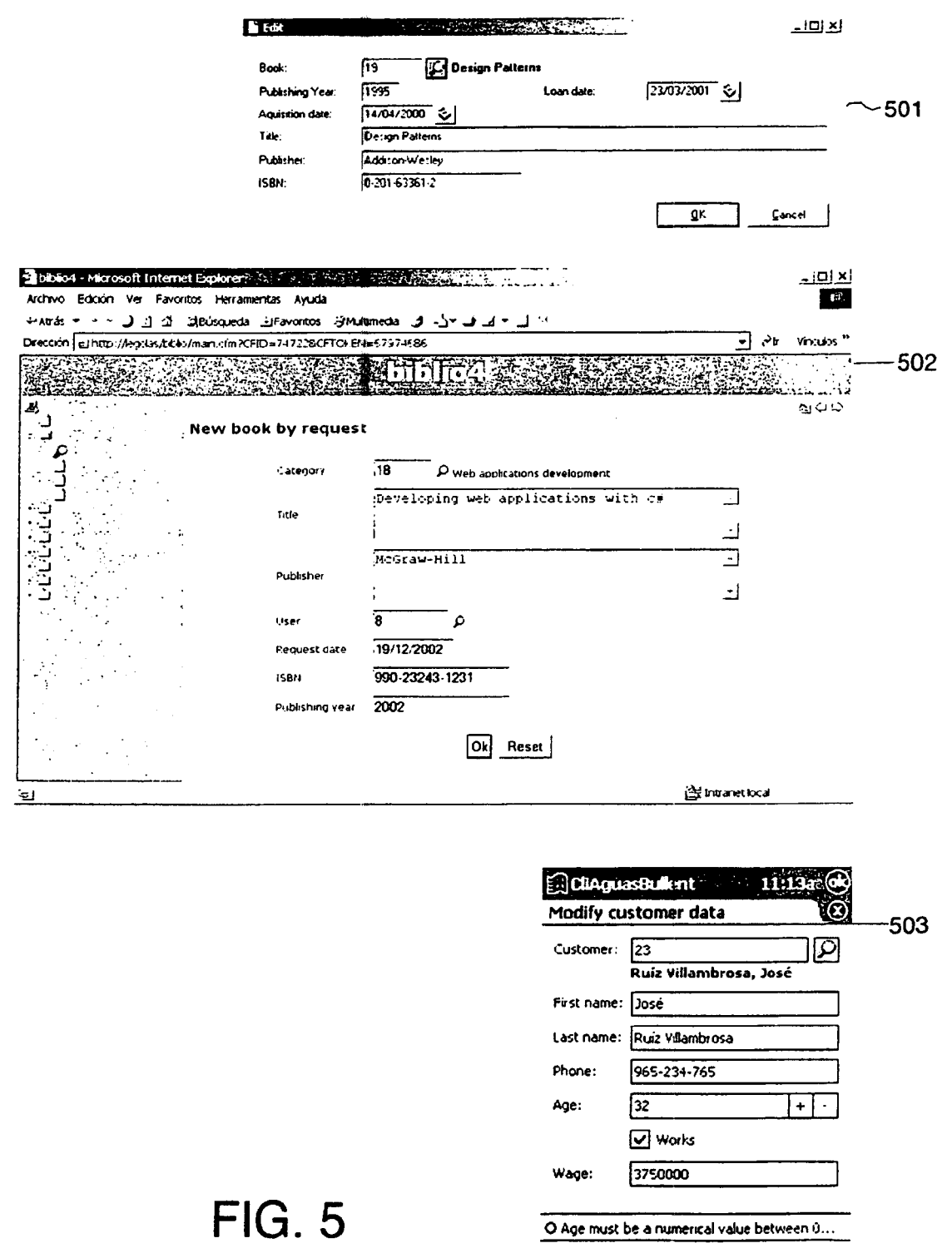

FIG. 5 shows examples of implementation of Service Interactions Units. Box 501 is an example for a user interface for a Desktop computer application program written in Visual Basic 6.0 high level programming language for the Windows operating system. Box 502 is an implementation example in the Cold Fusion MX high level programming language for a Web application. Similarly, box 503 is an implementation example of a dialog box for a mobile device, Pocket PC using the Windows CE operating system.

2.2 Instance Interaction Unit

Instance IUs are used for providing detailed information about one particular object. The goal is that the user can work with one object in order to view the state of the object (the values of the data in its data structure), alter its state (change the values in its data structure) or navigate to other related information.

Figure 6:
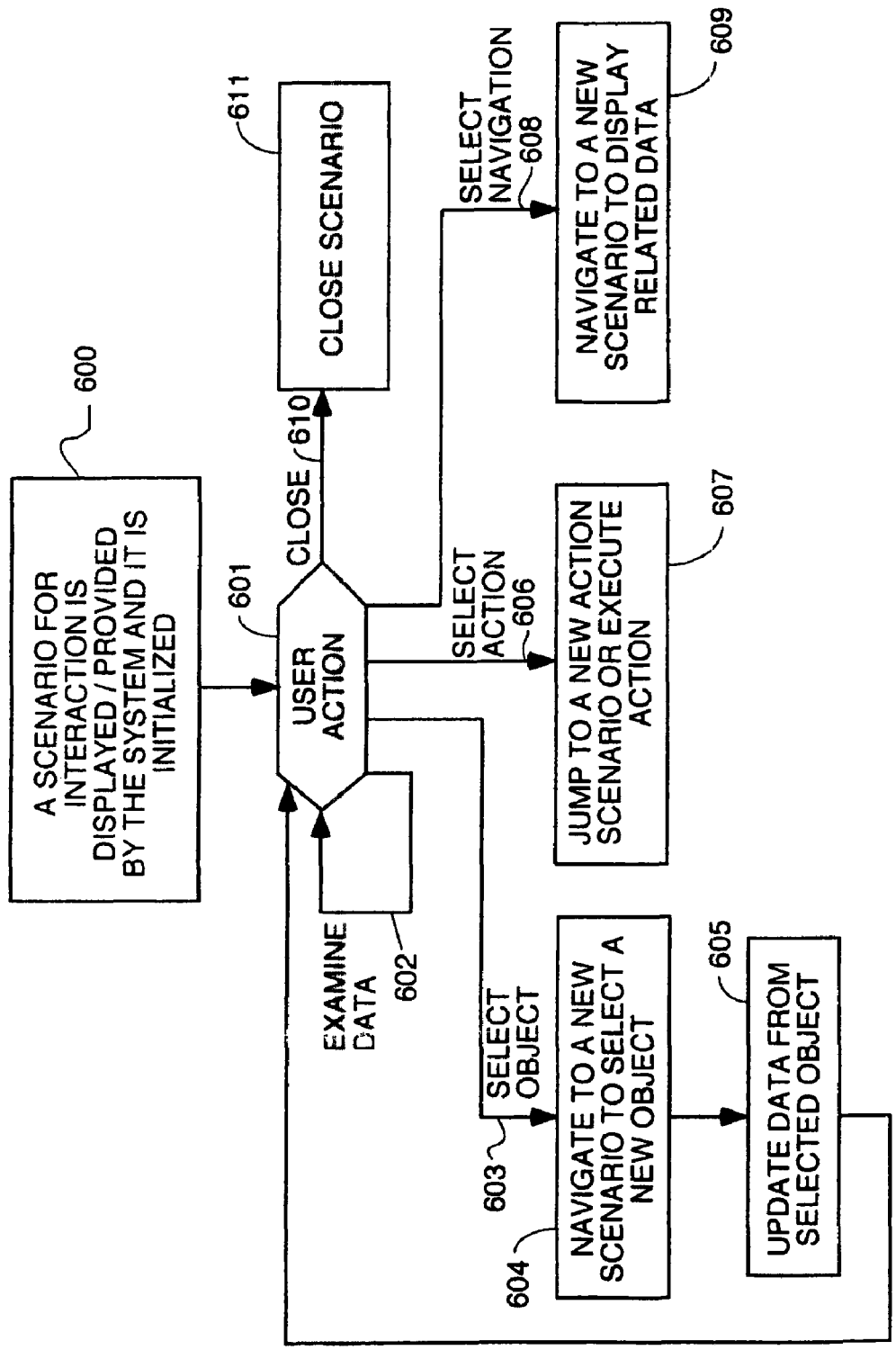
FIG. 6 is a flow chart of the tasks involved in the user interaction in Instance Interaction Units in run-time.

FIG. 6 is a flow-chart showing how the user interacts with the system in run-time during the interaction with an Instance Interaction Unit. First of all, the system provides a new scenario for interaction 600 and initializes it with default values in the various fields which represents the current state of the object or default values to save user time. The user can perform several actions 601: examine data 602, select a different object 603, select an action 606, select a navigation item or, close the scenario 610. The user can examine the data presented, as represented by path 602. If the user decides to change the object being reviewed 603, a new Population IU will be prompted to allow the user the selection of a new object 604, in which case, the computer will display a new scenario or dialog box which shows the current state of the newly selected object. In other words, when a new object has been selected, the data in the scenario is updated to reflect the state of the newly selected objects 605 and processing returns to step 601. If an action item has been selected 606, a new scenario can be provided to deal with the action if needed or the action can be executed immediately 607. If a navigation item has been selected 608 a new scenario is provided to show information related to the original object 609. Eventually, the scenario can be closed 611 whenever the user gives the close command 610.

FIG. 7 shows examples of implementation of Instance Interactions Units. Box 701 is an example for Desktop UN in Visual Basic 6.0/Windows. Box 702 is an implementation example in a mobile device, Pocket PC/Windows CE.

2.3 Population Interaction Unit

The Population IU is a pattern which is used in the User Interface Model (Presentation Model) to specify a user interface behavior that provides information of a set or population of objects related to a given class. Users can search for objects in the population satisfying a certain criteria using filters.

Figure 8:
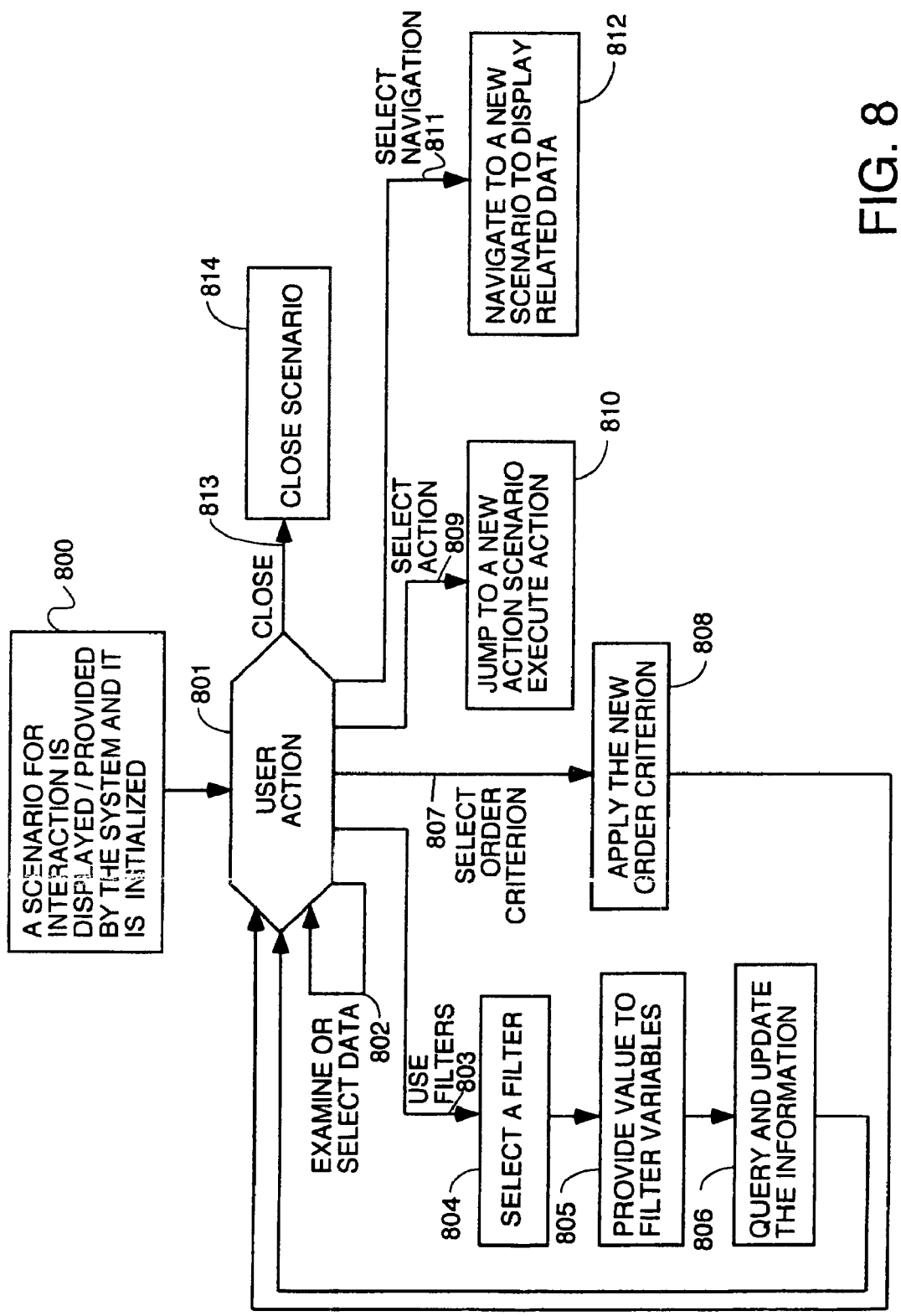
FIG. 8 is a flow chart of the tasks involved in the user interaction in Population Interaction Units in run-time.

The run-time tasks involved in the Population Interaction Unit are depicted in FIG. 8. First the scenario is provided 800, then, the user can choose from a set of tasks 801: examine or select data 802, use filters 803 to change the displayed population objects, select an order criterion 807 to change the order of the display of the displayed population of objects, select an action 809, select a navigation item 811 or, close the scenario 813. The user can examine the data (the objects shown) and optionally can select one or more objects 802. If the user decides to use a filter to constrain the population shown 803, he must first select a filter 804, and, later, the filter variables must be filled in 805 and, finally, the user launches the query 806. As a result, the system will execute the query and update the information accordingly. If a sort criterion is selected 807, the system applies such a sort criterion and updates the displayed information 808. If an action item has been selected 809, a new scenario can be provided to deal with the action if needed or the action can be executed immediately 810. If a navigation item has been selected 811a new scenario is provided to show related information to the original object 812. Eventually, the scenario can be closed 814.

Figure 9:
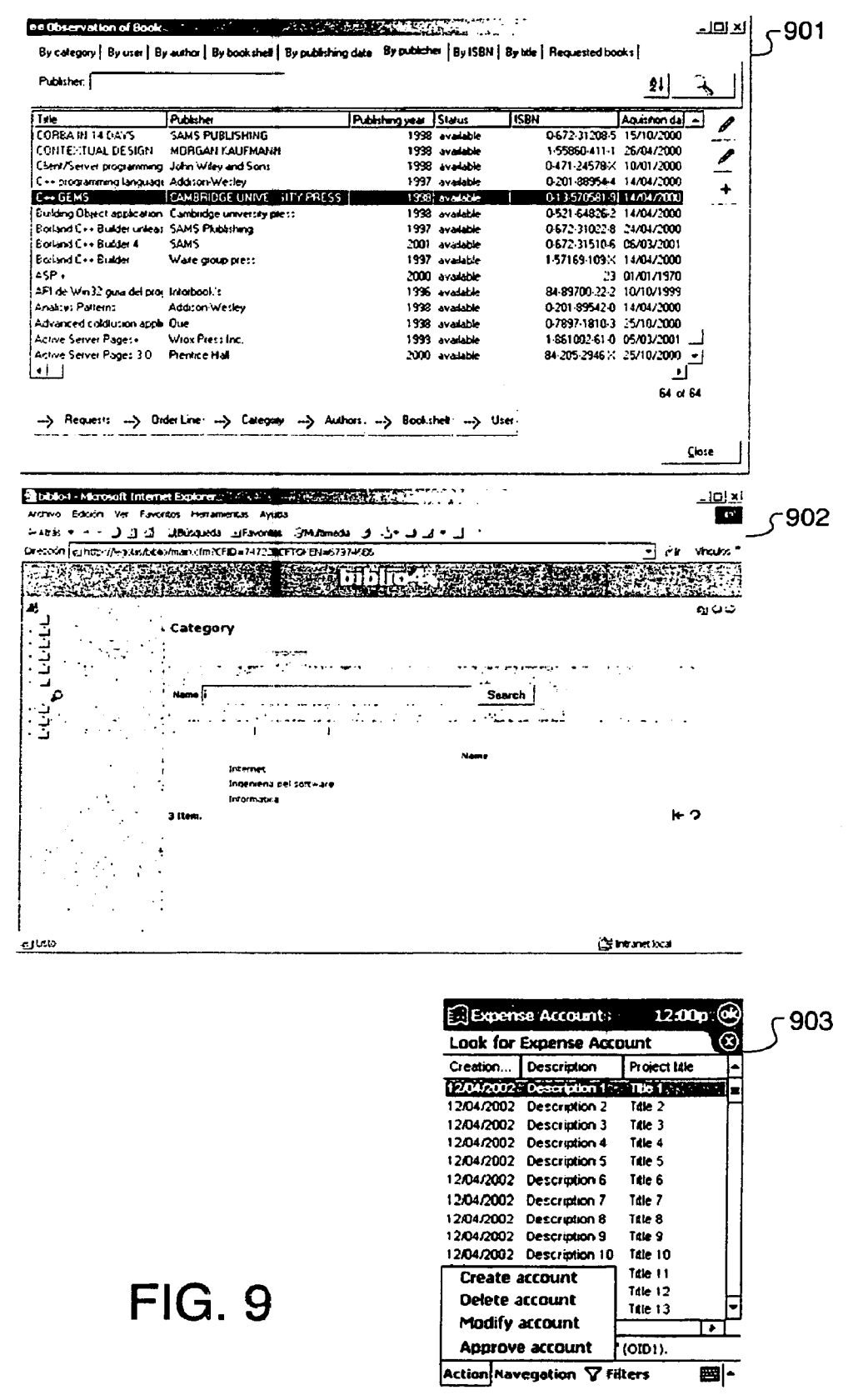

FIG. 9 shows running examples of implementation of Population Interactions Units. Box 901 is an example for Desktop UN in Visual Basic 6.0/Windows. Box 902 is an implementation example in a Cold Fusion MX/Web application. Box 903 is an implementation example in a mobile device, Pocket PC/Windows CE.

2.4 Master/Detail Interaction Unit

A Master/Detail Interaction Unit captures how to present a certain object of a class including other related objects that may complete the full detail of the object. It is a composed IU. In Master/Detail IUs two or more simpler IUs are synchronized to provide information for related objects. There are two main components in the Master/Detail Interaction Unit: master IU and details IU.

The master IU is an IU capable of showing objects and selecting one of them for purposes of viewing more detail in the detail IU about the selected object. For example, one scenario involves an invoice header selected in the master IU followed by a set of invoice lines related to the selected invoice displayed in the detail IU. Possible master IUs are Instance and Population IUs.

A detail IU is an IU capable of showing related information with respect to a given master IU. Possible details IUs are Instance, Population and, recursively, Master/Detail IUs.

In a Master/Detail IU there is a validation rule that there can only be one master IU. Another validation rule is that there must be at least one detail IU. However, several details IUs can be used and linked to a single master IU. A detail component is specified indicating the following tuple: (Target IU, Alias, and Navigation Path). The navigation path is a well formed formula expressed in the OASIS language describing the link between the master class and the detail class. Usually, this kind of relationship is based on aggregation relationships and the Navigation path is specified indicating the roles crossed starting from the master class until reaching the target class. The meta-model allows class definitions and definition of relationships between classes. Relationship between classes can be of two types: aggregation and inheritance.

Figure 10:
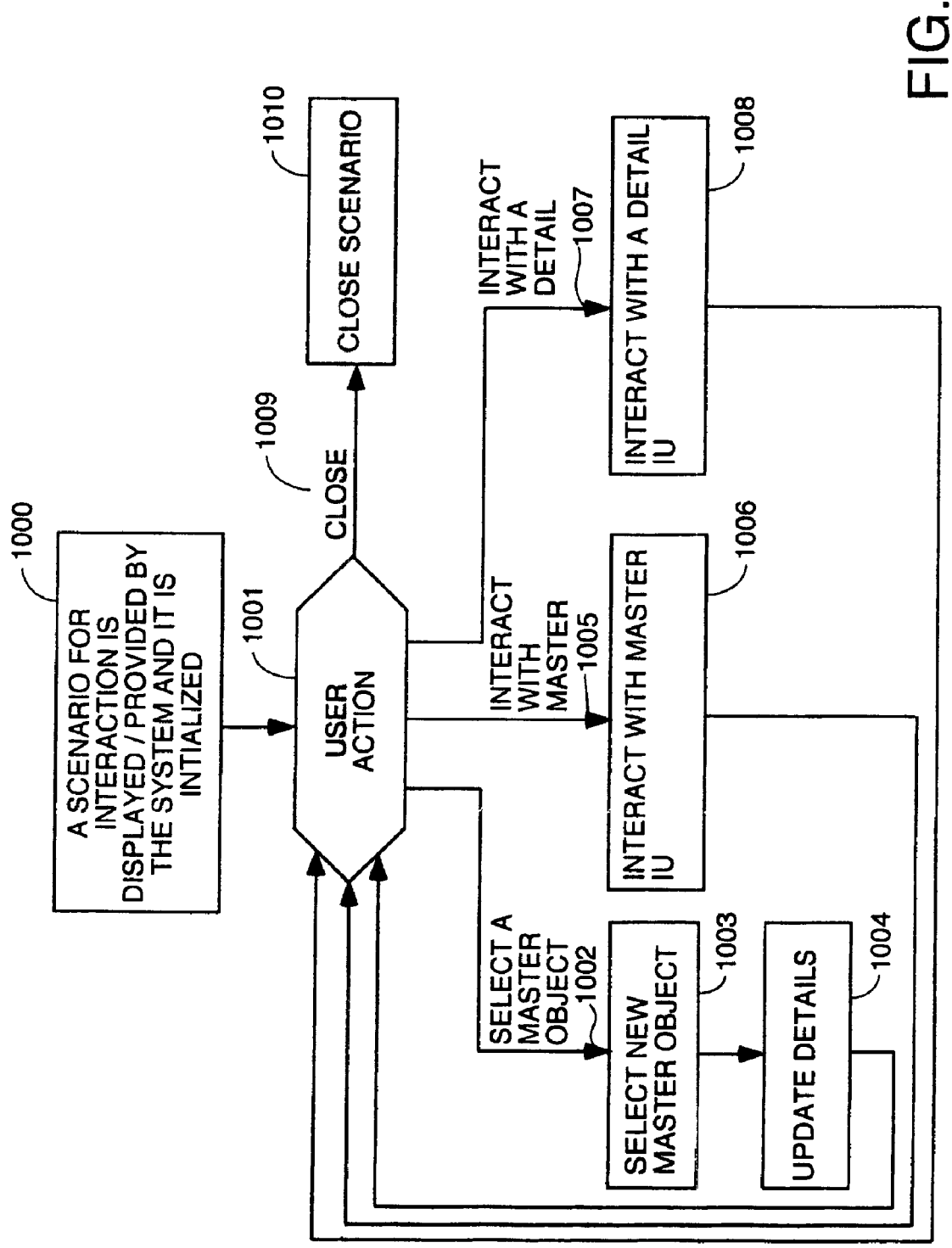
FIG. 10 is a flow chart of the tasks involved in the user interaction in Master/Details Interaction Units in run-time.

The user tasks involved in a Master/Detail IU are described in FIG. 10. On the user Master/Detail IU is displayed 1000, the user can take some actions as symbolized by step 1001. First the user selects a new master object 1002. Then, the selection is confirmed 1003 and all the details are updated accordingly 1004 depending on the Navigation Path expressed. If the user interacts with the master IU 1005, the behaviour is the defined behaviour or the IU considered (see Instance and Population IUs) 1006. If the user interacts with a detail IU 1007, the behaviour is the defined behaviour for the IU considered (see Instance, Population, and Master/Detail IUs) 1008. Finally, the user can close the scenario 1009 to conclude the interaction 1010.

Figure 11:
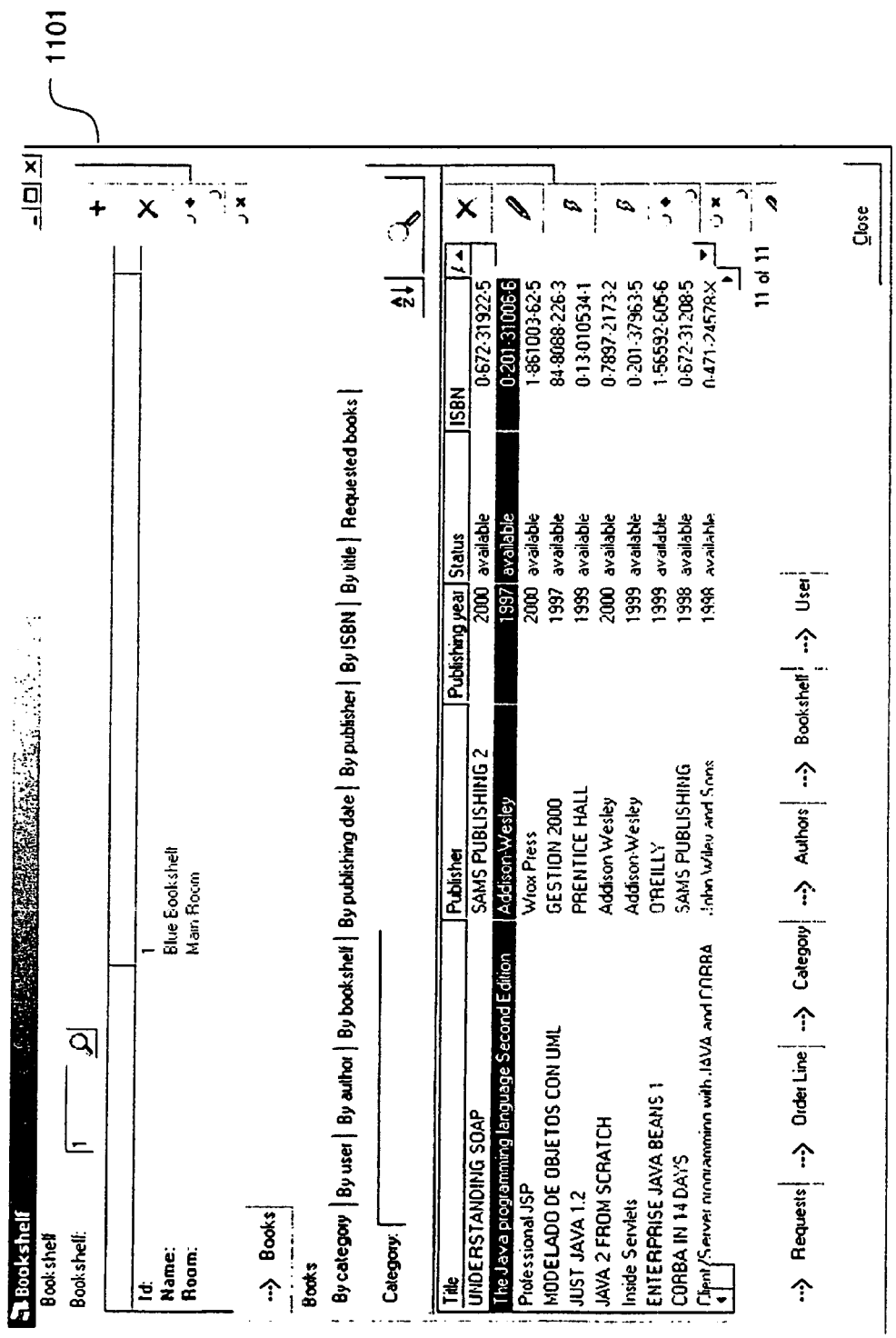
FIG. 11 contains an implementation example of running Master/Detail Interaction Unit.

FIG. 11 shows an example of implementation of Master/Detail Interactions Units. 1001 is an example for Desktop UIs in Visual Basic 6.0/Windows.

Level 3. Elemental Patterns.

3.1 Introduction

The Introduction Pattern is used to constrain the values that a user can provide for an argument. An Introduction pattern contains a name, an introduction mask, a range (lower and upper bound) and a help message.

3.2 Defined Selection

Defined Selection is used to declare a list of all possible values that can be taken by an argument. An enumeration list of pairs (code, label), a default value and a help message are the key properties for its definition.

3.3 Supplementary Information This elemental pattern is used to provide feedback for OIDs (Object Identifiers). It is a reference to a Display Set. In other words, when an analyst types in an OID to make a selection in a dialog box, the supplementary information elemental pattern displays a nickname, the formal name or some more humanly recognizable information that tells the analyst what he just selected so he or she can verify that what was selected is what was intended to be selected.

3.4 Dependency

This elemental pattern is a list of ECA rules (Event-Condition-Action rules) to model the dynamic behaviour of the user interface in Service Interaction Units. Whenever a user changes a value in a field, the rules are checked. If the event matches with the event of some rule, the rule condition is checked and if fulfilled, the actions of the ECA rule are executed. Such actions can modify the state of others arguments in the Service IU.

3.5 Status Recovery

This elemental pattern is an implicit set of Dependency rules detected by the system for change services. Whenever Service has valuations (in the Functional Model) of the following form <attribute>=<parameter> for each parameter, generators can detect such a situation and produce default dependency rules to recover the current state of an object before modifying it. In other words, the existing state of an object is recovered and displayed when the service is invoked to give the end user a point of reference when invoking a service to change the state of an object.

For example: the class Customer contains the following attributes: name as string, address as string, phone as string and fax as string. A service is defined in the Customer class with the following name change_address. The arguments for the service are: p_cust as Customer, p_name as string, p_address as string, p_phone as string and p_fax as string.

In the Functional Model, the valuations (formulas that set values of attributes that change the state of an instance of the selected class to implement the service) for the class Customer and service change_address are:

```
name = p_name           (1)
address = p_address     (2)
phone = p_phone         (3)
fax = p_fax             (4)
```

The dependency rule automatically derived is:

```
[*]SetValue(p_Cust) : true : p_name = SetValue(v.name);
            p_address = SetValue(v.address);
            p_phone = SetValue(v.phone);
            p_fax = SetValue(v.fax);
```

In this context, when the user selects a customer and wants to change the data related to such a customer, he uses the service change_address. The service IU specification for the desired service in the user interface causes code to be generated which implements dependency rules that recover the data showing the state of the selected customer, i.e. once p_cust takes a value (a change event is produced), the dependency rules automatically derived cause the current values for name, address, phone and fax to be recovered and shown to the user as initial value of the arguments. The user can change some, none or all of these displayed argument values so as to change the state of the customer object and finally save the changes.

3.6 Argument Grouping

This elemental pattern can be invoked to put into the User Interface Model (Presentation Model) specification of a tree structure of arguments (especially where there are many arguments) to arrange the arguments in a logical and structured way. This will have implications in the layout of the code generated for arguments in the Service IU. It is useful when the number of arguments is high (more than 10).

3.7 Filter

A filter is an elemental pattern in Population IUs used for constraining object populations. Expressed as a well formed formula in the OASIS language, it can be evaluated to a boolean value for each object belonging to a given class in which the filter is defined. When the analyst invokes a population IU, a dialog box will be displayed by the editor which allows the analyst to specify a filter conditions such as for the class players, select only player objects which have attribute professional/amateur equal to professional. This filter pattern causes formal language statements to be made in a specification of the Presentation Model in the formal specification of the User Interface Model (Presentation Model) which causes the translator to generate code which examines all player instance objects in the class player and examines the professional/amateur attribute of each such instance and selects for display only those player objects having attribute professional/amateur equal to professional.

A filter can contain variables. Such variables are parameters that will be filled by the user in run time to define the filter conditions to make a precise query over the object population so as to select objects in accordance with the filter conditions for display a population IU.

Filter variables can have applied introduction, defined selection and supplementary information patterns.

3.8 Order Criterion

An order criterion is an elemental pattern in Population IUs which are ordered list of pairs (attribute, way). Where attribute is an attribute defined in the class or an expression visible from a given class and way indicates a sort mode: ascending way or descending way.

Its semantic is to apply a sort criterion based on the properties specified in the Order criterion.

3.9 Display Set

A Display Set is an elemental pattern in both Population IUs and Instance IUs which comprises an ordered list of expressions describing attributes or visible attributes from a given class. All classes have attributes. The display set defines some subset of those attributes or the entire set in some cases which will be displayed in the user interface for the selected instance specified by an Instance IU or the selected population specified by a Population IU.

The Display Set controls the information that will be visible by the user in the user interface of the final code generated from the User Interface Model (Presentation Model) specification.

3.10 Actions

This elemental pattern is a list of action items which can be defined in Population IUs and Instance IUs. Each action item contains an alias (a label for the user) and a target interaction unit. When the action elemental pattern is invoked in the editor to define some portion of a user interface in the User Interface, i.e., Presentation Model of the user interface of a program being modelled, there will result in the final code developed from the User Interface Model (Presentation Model) one or more action items.

Whenever the user selects an action item (for example, clicks on a button or press a link), he is redirected to the target interaction unit. In other words, a new interaction unit will appear in the user interfaces which replaces the previous one.

3.11 Navigation

This elemental pattern for interface definitions is a list of navigation items. Each navigation item contains an alias (a label for the user) and a target interaction unit and an expression in the OASIS language indicating the relationship crossed from the origin IU to the target IU. In this way, the information displayed in the target is related to the origin selected object. Inheritance and Aggregation relationships in the Conceptual Model are the types of relationships that make navigation to target IUs displaying information related to the origin IU information possible.

For example: in an invoice population IU, the user selects one invoice and navigates to a lines population IU. As a result, only the lines belonging to such a selected invoice are presented.

B. ON-IU Meta-Model.

The ON-IU meta-model is a meta-model based in class diagrams to describe the structure and semantics of the pattern language presented for user interfaces. The meta-model and the pattern language including the IU patterns supply the building blocks the analyst uses when using the SOSY modeller program to build a Presentation Model that specifies the desired user interface in the finished program.

Figure 12:
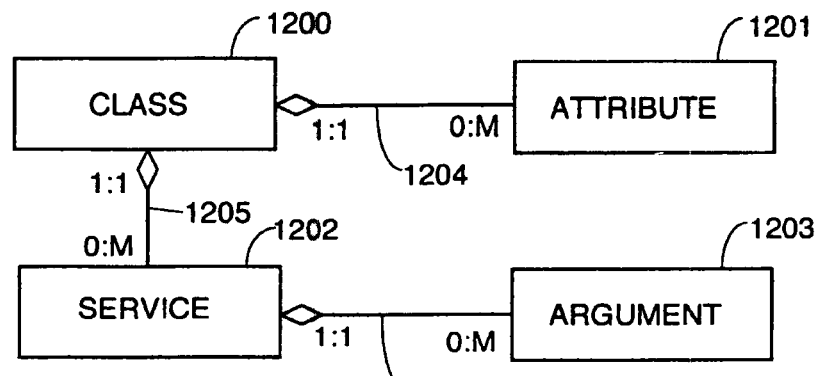
FIG. 12 is a class diagram describing the basic kernel meta-model for applying the ON-IU extension meta-model.

The ON-UI Meta-model extends a classical object-oriented meta-model as the OO-Method meta-model or the UML meta-model. As shown in FIG. 12, the only prerequisites needed for applying ON-UI are the concepts: Class 1200, Attribute 1201, Service (or method) 1202 and Argument 1203; and their usual relationships: class has attributes 1204, class has services 1205 and, service has arguments 1206.

As shown, the kernel of the meta-model is based on a minimal common object-oriented meta-model present in almost all object-oriented methodologies. However, the surrounding classes constitute the added value for user interface specification. In this way, the user interface specification model is not limited to the presented object-oriented methodology OO-Method. On the contrary, it can be used to extend other object-oriented methods like UML, OMT or, OPEN.

Figure 13:
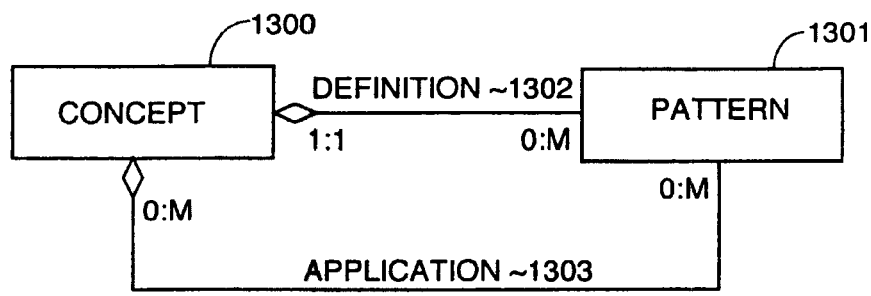
FIG. 13 is a class diagram showing the extension mechanism used in the meta-model for introducing the patterns extension.

The extension mechanism is based on introducing news elements: the patterns and each pattern's supporting classes and relationships. The link between patterns and traditional concepts is achieved using two kinds of relationships as shown in FIG. 13:

A. —Definition 1302. A pattern 1301 is always defined for a unique concept 1300. However, a concept can define different patterns at the same time which is why the line between the concept and pattern blocks has the notation 0:M meaning the concept can have from 0 to M patterns that implement it. The kind of relationship is established at pattern creation time. For example, Filters, Display Sets, and Navigation elemental patterns are defined for a Class. Service Interaction Unit is an IU pattern defined for a Service.

B. —Application 1303. A pattern 1301 can be applied to concepts 1300. In this sense, patterns can be reused in the model (applied in different scenarios). For example, Population IU patterns can be used to display a list of all golfers that have entered a tournament or a list of all lines of a selected invoice. Application relationships are established by the analyst when building the model by filling in or selecting data from list in dialog boxes which appear when icon for a particular IU is selected for inclusion in a User Interface Model (Presentation Model). For example: an analyst fills in data in dialog boxes to define Filter, Display Set, and Navigation so that these elemental patterns are applied (or used) when defining, i.e., articulating, a Population Interaction Unit during building of a User Interface Model (Presentation Model) specification. These same elemental patterns can be used when defining a Population Interaction Unit used elsewhere in the Presentation Model of the user interface.

Using the relationships just described, the meta-model for interaction units will be described:

B.1 Meta-Model for Service Interaction Unit

Figure 14:
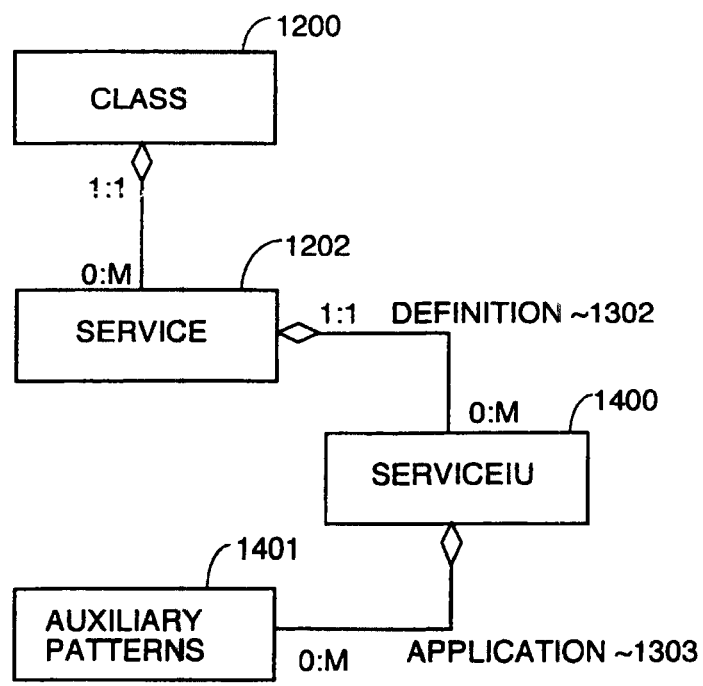
FIG. 14 is a class diagram describing the meta-model for Service Interaction Unit.

FIG. 14 shows the meta-model for Service IU. A class 1200 represents the Service IU 1400 and its relationships with the rest of the model. Service IU 1400 is defined 1302 for each Service 1202 of class 1200. Other auxiliary patterns 1401 can be applied 1303 to each Service IU 1400. Specifically, the auxiliary patterns 1401 that can be applied to a Service IU are: Introduction, Defined Selection, Dependency, Status Recovery and Argument Grouping.

B.2 Meta-Model for Instance Interaction Unit

Figure 15:
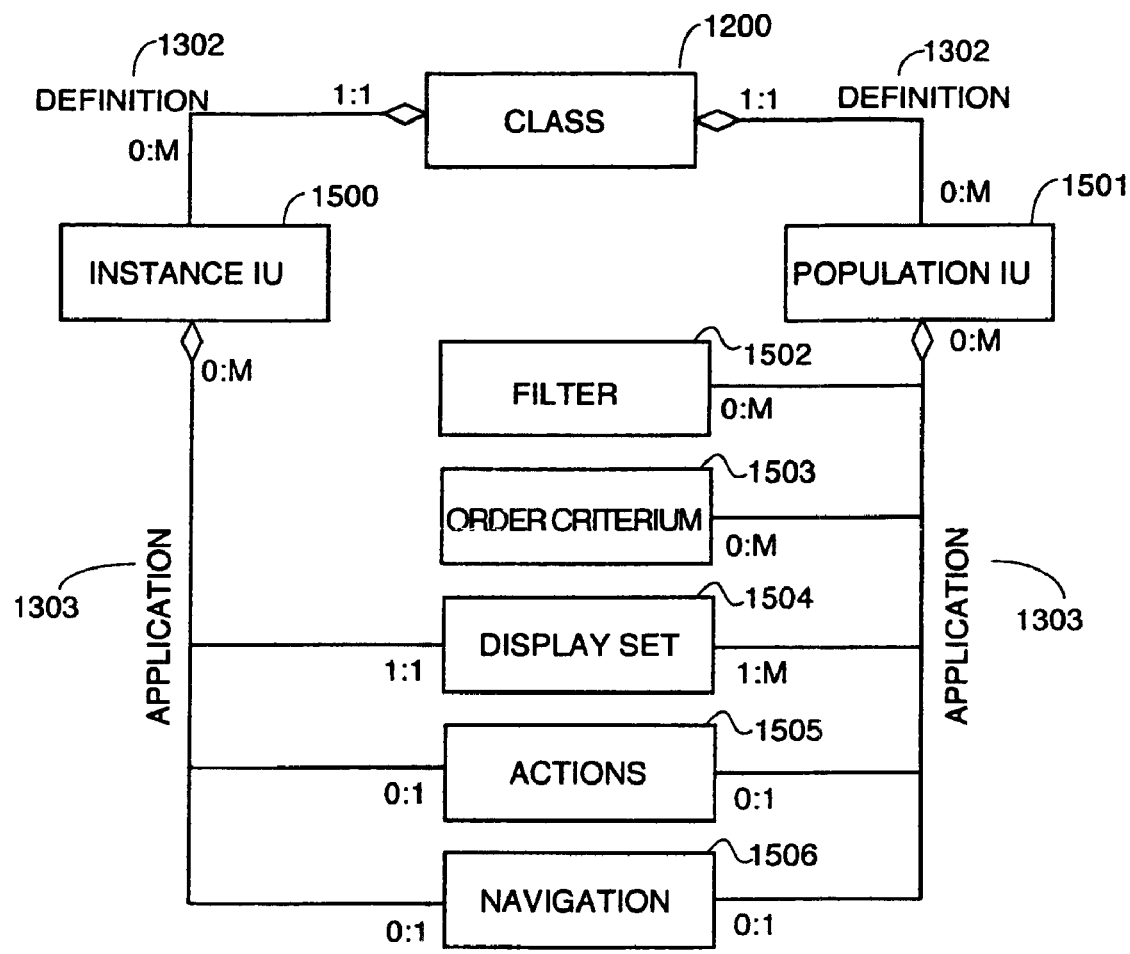
FIG. 15 is a class diagram describing the meta-model for Instance and Population Interaction Unit.

FIG. 15 describes the meta-model of Instance IU 1500. An Instance IU 1500 is defined 1302 over a Class 1200. The more elementary patterns that can be applied 1301 to articulate and refine an Instance IU are Display Set 1504 (only one), Actions 1505 (optional) and Navigation 1506 (optional).

B.3 Meta-Model for Population Interaction Unit

The meta-model of Population IU 1501 is also described in FIG. 15. A Population IU is defined 1302 over a Class 1200 (the concept). The elemental patterns that can be applied 1301 to articulate and refine a Population IU 1501 are Filters 1502 (zero or more), Order Criteria (zero or more) 1503, Display Set 1504 (one or more), Actions 1505 (optional) and Navigation 1506 (optional).

B.4 Meta-Model for Master/Detail Interaction Unit

Figure 16:
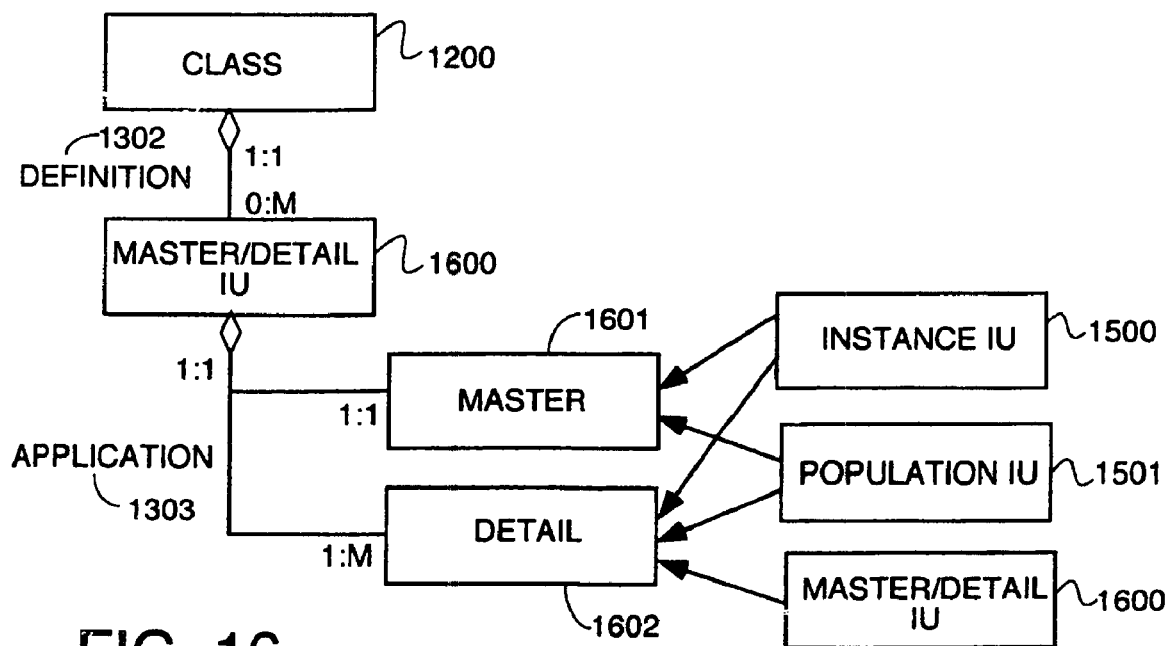
FIG. 16 is a class diagram describing the meta-model for Master/Detail Interaction Unit.

FIG. 16 describes the meta-model of Master/Detail IU 1600. A Master/Detail IU 1600 is defined 1302 over a concept comprising Class 1200. A Master/Detail IU contains two components IU: a master IU and one or more detail IUs. The elemental patterns that can be applied 1301 to a Master/Detail IU to articulate and refine it can play two different roles: Master 1601 or Detail 1602. In the Master component 1601, only Instance 1500 and Population 1501 IUs can be used. However, a detail can contain pointers to an Instance IU 1500, a Population IU 1501 as well as another Master/Detail IU 1600 (recursively). From the picture, the cardinalities (the lines between the box 1600 and the boxes 1601 and 1602) show that a Master/Detail IU 1600 has only one Master 1601 and one or more Details 1602.

C. XML DTD Persistence Model.

As a complement of the meta-model introduced, the XML persistence format is used in the preferred embodiment as a serializer/deserializer tool that allows to store the Formal Specification of the Presentation Model (and all the others models in the Conceptual Model of the application program that the analyst built using the SOSY modeler) in an XML file or to transmit it as plain text.

The corresponding DTD (document type definition) for XML is provided, but in alternative embodiments, any data structure, file structure, database, etc. that contains the necessary information can be used to record the formal language specification of the User Interface Model (Presentation Model) as well as the other models in the Conceptual Model of the program to be automatically coded.

A DTD is a data structure composed of elements and attributes. Elements can contain other elements and attributes. For example:

```
<!ELEMENT Class (Attribute*, Service*, Class.DefinedPatterns?,
    Class.AppliedPatterns?)>
<!ATTLIST Class
    Name CDATA #REQUIRED
    Alias CDATA #IMPLIED
>
```

In a DTD this means: The element Class is composed of a sequence (a comma list means sequence): one or more Attributes (* means one or more), one or more Services, zero or one Class.DefinedPatterns (? means zero or one), zero or one Class.AppliedPatterns (? means zero or one). DTD Operators are: (*) zero or more, (+) one or more, (?) zero or one, (nothing) exactly one, (A1, A2) sequence, (A1|A2) choice, and (( )) parenthesis for grouping.

Attributes can be #Required (mandatory) or #Implicit (optional).

For a detailed description of XML and DTDs please refer to the reference "Extensible Markup Language (XML) 1.0 (Second Edition)" Word Wide Web Consortium.

```
<?xml version="1.0" encoding="UTF-8"?>
<!-- Just-UI DTD Meta-model v. 1.0 05.12.2002 ================ -->
<!-- (c) Pedro J. Molina Moreno, 2002. ======================= -->
<!-- ======================================= -->
<!-- Minimal OO Core-Kernel: Class, Attribute, Service (Method),
Argument -->
<!-- ================================================= -->
<!ELEMENT JustUISpec (Class*, Introduction*,
DefinedSelection*, View*)>
<!ATTLIST JustUISpec
    Name CDATA #REQUIRED
    Version CDATA #REQUIRED
>
```

The formal specification of the Conceptual Model in a formal language as defined herein (hereafter just called the Specification) starts with the root element JustUISpec containing all the specification. A Specification contains a list of classes, Introduction and Defined Selection Patterns (both defined at the Specification level to make easier their later reuse) and Views. The attributes name and version of the JustUISpec element refers to the name and version of the Specification.

```
<!ELEMENT Class (Attribute*, Service*, Class.DefinedPatterns?,
Class.AppliedPatterns?)>
<!ATTLIST Class
    Name CDATA #REQUIRED
    Alias CDATA #IMPLIED
>
```

These fields define a class. There will be a set of these fields for every class defined in the Conceptual Model. A class contains a list of attributes, services, and optionally defined patterns and class applied patterns. Classes have two relevant properties: name and alias. Class names must be unique in the specification. However, aliases are visual labels or shortened nicknames (hereafter referred to as visual labels) used to represent the class in the visual displays of the user interface to the users. Aliases can be localized depending on the language of the final user of the application.

```
<!ELEMENT Attribute (Attribute.AppliedPatterns?)>
<!ATTLIST Attribute
    Name CDATA #REQUIRED
    Domain CDATA #REQUIRED
    Alias CDATA #IMPLIED
>
```

These fields define one attribute. There will be a set of these fields for every attribute of every class. Each attribute contains (optionally) applied patterns. Relevant properties are the name of the attribute (must be unique within the class scope), domain (data type) and alias (visual label for users).

```
<!ELEMENT Service (Argument*, Service.DefinedPatterns?)>
<!ATTLIST Service
    Name CDATA #REQUIRED
    Alias CDATA #IMPLIED
>
```

These fields define a service of a class. There will be a set of these fields which define every service of every class. A service contains a list of arguments and optionally a Service defined patterns. Relevant properties are name of the service (must be unique in class scope) and alias (visual label for users).

```
<!ELEMENT Argument (Argument.AppliedPatterns?)>
<!ATTLIST Argument
    Name CDATA #REQUIRED
    Domain CDATA #REQUIRED
    Alias CDATA #IMPLIED
>
```

These fields define an argument of a service. There will be a set of these fields for every argument of every service of every class. An argument contains (optionally) applied patterns (patterns that constrain the behaviour of an argument). Relevant properties are name of the argument (must be unique in service scope), domain (data type), and alias (visual label for users).

```
<!-- Auxiliary Formula Element ============== -->
<!ELEMENT Formula (#PCDATA)>
```

Element Formula it is used to store the well-formed formulas in the specification. Well-formed formulas are formulas for mathematical or logical manipulation of data written correctly according to the syntax of the formal language in which said specification is being written.

```
<!-- ===================================================== -->
<!-- L3.1 Introduction Pattern ============================ -->
<!ELEMENT Introduction EMPTY>
<!ATTLIST Introduction
    Name CDATA #REQUIRED
    EditMask CDATA #IMPLIED
    DefaultValue CDATA #IMPLIED
    LowerBound CDATA #IMPLIED
    UpperBound CDATA #IMPLIED
    MaxChars CDATA #IMPLIED
    AllowsNulls CDATA #IMPLIED
    ErrorMsg CDATA #IMPLIED
    HelpMsg CDATA #IMPLIED
>
```

Patterns are the templates or building blocks from the meta-model that are used to define a user interface in a shorthand sort of way. Patterns are used in two phases: first a pattern is created, later a pattern is applied to solve a specific problem.

When created, a pattern is defined in somewhere in the specification. For example: a filter is created for a given class. In this case, a filter is created and a relationship with its defining class is established. The second phase "application" occurs when the analysts reuses the patterns in the specification to solve similar problems in several parts of the specification. Different "applications" of the same pattern provides reuse of patterns and provides homogeneity. To create a pattern means to fill in required data to define its behavior or the content of what will be displayed in the user interface that results. Interaction Units like Population IU are patterns, but they have to have other mandatory or optional elemental patterns applied to them like filter conditions and the other patterns in FIG. 3 at the most detailed level of the HAT tree. An Introduction Pattern serves the "constraint on argument" function for Service IUs and is described elsewhere herein.

The above set of fields represent application of the constraints of an elemental Introduction Pattern, and there will be a set of such fields for every Service IU which is constrained by an Introduction Pattern.

An Introduction Pattern is specified providing the following properties: name, edit mask (a mask used to constrain editing), a default value, a range of variation (lower bound & upper bound), the number of maximum characters allowed (maxchars), if the argument allows null or not, an error message and a help message.

```
<!-- L3.2 Defined Selection Pattern ======================= -->
<!ELEMENT DefinedSelection (DefSelItem*)>
<!ATTLIST DefinedSelection
    Name CDATA #REQUIRED
    DefaultValue CDATA #IMPLIED
    MinSelectable CDATA #IMPLIED
    MaxSelectable CDATA #IMPLIED
    AllowsNulls CDATA #IMPLIED
    ErrorMsg CDATA #IMPLIED
    HelpMsg CDATA #IMPLIED
>
<!ELEMENT DefSelItem EMPTY>
<!ATTLIST DefSelItem
    Code CDATA #REQUIRED
    Alias CDATA #IMPLIED
>
```

The above set of fields represent the definition of a Defined Selection pattern to a Service IU. The function of a Defined Selection pattern is to provide a list of available selections for an argument from which a user can choose to prevent errors in entering arguments for a service. There will be a set of these fields for every Defined Selection pattern in the model. A Defined Selection pattern is specified providing a list of Defined Selection Items and the following properties: name, a default value, a range of variation of selectable items (minSelectable & maxSelectable), if the argument allows null or not, an error message and a help message.

A Defined Selection Item contains a unique code (for the machine) and an alias (visual label for the user).

```
<!-- L3.3 OID Feedback ======================= -->
<!ELEMENT OIDFeedback EMPTY>
<!ATTLIST OIDFeedback
    Class CDATA #REQUIRED
    DisplaySet CDATA #REQUIRED
>
```

These fields represent application of any OIDFeedback elements in the specification. The OIDFeedback element contains the information for the Supplementary Information Pattern. It is specified providing the name of a class and a Display Set defined in such class. This Display Set will be used be show to the user as feedback the values of the fields listed in the display set.

```
<!-- L3.4 Dependency Pattern ======================= -->
<!ELEMENT Dependency (ECARule+)>
<!ELEMENT ECARule (Formula)>
```

These fields represent the definition & application of any Dependency Patterns in the specification. A Dependency pattern consists on a list of one or more ECA rules. Each ECA (event Condition Action) rule is expressed as a formula.

```
<!-- L3.5 Status Recovery ======================= -->
<!-- Implicit behauvour. Not specified. -->
```

This comment refers to the implicit Status Recovery Pattern that do not need any specification.

```
<!-- L3.6 Argument Grouping ======================= -->
<!ELEMENT ArgumentGrouping (ArgGroup.Node*)>
<!ELEMENT ArgGroup.Node (ArgGroup.Node*)>
<!ATTLIST ArgGroup.Node
    Alias CDATA #IMPLIED
    Argument.Name CDATA #IMPLIED
>
```

These fields represent the definition & application of any argument grouping elemental pattern used in the specification of a service IU. A set of these fields will be present for each argument grouping pattern used. ArgumentGrouping element refers to the Argument Grouping Pattern. It contains a list of child sub-groupings. Each sub-grouping can contain another list of sub-grouping or an alias and a pointer to an argument being grouped (Argument.Name).

```
<!-- L3.7 Filter ======================= -->
<!ELEMENT Filter (Formula, FilterVariable*)>
<!ATTLIST Filter
    Name CDATA #REQUIRED
    Alias CDATA #IMPLIED
    HelpMsg CDATA #IMPLIED
>
```

These fields represent the application of a filter pattern with the filter condition set by data expressing a formula and a list of filter variables. There will be a set of these fields for every filter defined. A Filter contains a Formula and a list of filter variables. The properties for a filter are the name of the filter, the alias (visual label) and a help message for the final user to be shown in run time.

```
<!ELEMENT FilterVariable (FilterVar.AppliedPatterns?)>
<!ATTLIST FilterVariable
    Name CDATA #REQUIRED
    Domain CDATA #REQUIRED
    Alias CDATA #IMPLIED
    HelpMsg CDATA #IMPLIED
>
```

These fields represent the definition of a filter variable elemental pattern for a filter pattern, and there will be a set of these fields for every filter variable used. Each filter variable contains (optionally) patterns applied. As properties, a filter variable has a name, a domain (data type) an alias (visual label) and a help message to be shown in the generated application.

```
<!-- 3.8 Order Criterium =========================== -->
<!ELEMENT OrderCriterium (OrderCriteriumItem+)>
<!ATTLIST OrderCriterium
    Name CDATA #REQUIRED
    Alias CDATA #IMPLIED
    HelpMsg CDATA #IMPLIED
>
<!ELEMENT OrderCriteriumItem (Formula)>
<!ATTLIST OrderCriteriumItem
    Direction (ASC | DES) #REQUIRED
>
```

These fields represent the definition of an Order Criterion pattern. A set of these fields will exist for every Order Criterion in the formal specification of the user interface. An Order Criterion contains an ordered list of one or more Order Criterion Items. Each Order Criterion has a name, an alias (visual label) and a help message. Order Criterion Items contains a formula (pointing to an existing attribute) and a sort order (ascending or descending).

```
<!-- L3.9 Display Set =========================== -->
<!ELEMENT DisplaySet (DisplaySetItem+)>
<!ATTLIST DisplaySet
    Name CDATA #REQUIRED
    Alias CDATA #IMPLIED
>
<!ELEMENT DisplaySetItem (Formula)>
<!ATTLIST DisplaySetItem
    Alias CDATA #IMPLIED
>
```

These fields represent the definition of a Display Set elemental pattern. There will be a set of these fields for every Display Set defined in the formal specification of the User Interface Model (Presentation Model). A Display set contains an ordered list of Display Set Items. As properties it has a name (unique in the class scope) and an alias (visual label). Each Display Set Item has a formula (pointing to an existing attribute) and an alias (visual label).

```
<!-- L3.10 Actions =========================== -->
<!ELEMENT Actions (ActionItem+)>
<!ATTLIST Actions
    Name CDATA #REQUIRED
    Alias CDATA #IMPLIED
>
<!ELEMENT ActionItem EMPTY>
<!ATTLIST ActionItem
    TargetIU CDATA #REQUIRED
    Alias CDATA #IMPLIED
>
```

These fields represent the definition of an Action Pattern. There will be a set of these fields for every applied Action Pattern. Actions Pattern contains an ordered list of Action Items. As properties it has a name (unique in the class scope) and an alias (visual label). Each Action Item has a target interaction unit and an alias (visual label).

```
<!-- L3.11 Navigation =========================== -->
<!ELEMENT Navigation (NavigationItem+)>
<!ATTLIST Navigation
    Name CDATA #REQUIRED
    Alias CDATA #IMPLIED
>
<!ELEMENT NavigationItem (Formula)>
<!ATTLIST NavigationItem
    TargetIU CDATA #REQUIRED
    Alias CDATA #IMPLIED
>
```

These fields represent the definition of an elemental Navigation Pattern. Navigation Pattern contains an ordered list of Navigation Items. As properties it has a name (unique in the class scope) and an alias (visual label). Each Navigation Item has a target interaction unit and an alias (visual label) and a formula specifying the aggregation relationships crossed to reach the target interaction unit.

```
<!-- L2.1 IU Service =========================== -->
<!ELEMENT IU.Service (ArgumentGrouping?)>
<!ATTLIST IU.Service
    Name CDATA #REQUIRED
    Alias CDATA #IMPLIED
    HelpMsg CDATA #IMPLIED
>
```

These fields represent the definition of an instance of a Service IU. There will be a set of these fields for every Service IU defined in the User Interface Model (Presentation Model) formal specification. An implicit pointer to the service associated with the Service IU exists when these fields are within the data structure of a service. An explicit pointer field could also be used. A Service Interaction Unit may have an Argument grouping (optional). As relevant properties it has a name, and alias (visual alias) and a help message.

```
<!-- L2.2 IU Instance =========================== -->
<!ELEMENT IU.Instance (Ref.DisplaySet, Ref.Actions?,
Ref.Navigation?)>
<!ATTLIST IU.Instance
    Name CDATA #REQUIRED
    Alias CDATA #IMPLIED
    HelpMsg CDATA #IMPLIED
>
```

These fields represent the definition of an instance of an Instance IU to define part of a user interface. There will be a set of these fields for each Instance IU defined in the model. An Instance Interaction Unit has a Display Set (compulsory), Actions (optional) and Navigation (optional). As relevant properties it has a name, and alias (visual alias) and a help message.

```
<!-- L2.3 IU Population =========================== -->
<!ELEMENT IU.Population (Ref.Filter*, Ref.OrderCriterium*,
Ref.DisplaySet+, Ref.Actions?, Ref.Navigation?)>
<!ATTLIST IU.Population
    Name CDATA #REQUIRED
    Alias CDATA #IMPLIED
    HelpMsg CDATA #IMPLIED
>
```

These fields represent the definition of an instance of a Population IU. There will be a set of these fields for every Population IU defined in the specification. A Population Interaction Unit has a list of Filters (optional) Order Criteria (optional) one or more Display Sets, Actions (optional) and Navigation (optional). As relevant properties it has a name, and alias (visual alias) and a help message.

```
<!-- L2.4 IU Master/Detail =========================== -->
<!ELEMENT IU.MasterDetail (DetailIU*)>
<!ATTLIST IU.MasterDetail
    Name CDATA #REQUIRED
    Alias CDATA #IMPLIED
    HelpMsg CDATA #IMPLIED
    MasterIU CDATA #REQUIRED
>
<!ELEMENT DetailIU (Formula)>
<!ATTLIST IU.MasterDetail
    Alias CDATA #IMPLIED
    DetailTargetIU CDATA #REQUIRED
>
```

These fields represent the definition of an instance of a Master/Detail IU including a or pointers to Detail IUs expressed as a formula. These fields control what code for the user interface will be automatically generated from this Formal Specification and therefore control what will be displayed in the display of the user interface caused by this Master/Detail IU, and the same statement applies to every field in the data structure of the Formal Specification of the user interface. A Master/Detail Interaction Unit has a list of one or more Details (compulsory). As relevant properties it has a name, and alias (visual alias), a help message, and the name of an Interaction Unit acting as the Master. Each detail contains a formula expressing the aggregation path crossed to reach the detail from the master, an alias (visual label) and a target Interaction Unit playing the role of detail.

```
<!-- Auxiliar components -->
<!ELEMENT Ref.Introduction (#PCDATA)>
<!ELEMENT Ref.DefinedSelection (#PCDATA)>
<!ELEMENT Ref.Filter (#PCDATA)>
<!ELEMENT Ref.OrderCriterium (#PCDATA)>
<!ELEMENT Ref.DisplaySet (#PCDATA)>
<!ELEMENT Ref.Actions (#PCDATA)>
<!ELEMENT Ref.Navigation (#PCDATA)>
```

Ref.* elements refers to pointers to existing Introduction, Defined Selection, Filter, Order Criterion, Display Set, Actions, an Navigation patterns, respectively specified in other fields of the data structure. These pointers indicate the application of the pattern in other contexts. Whenever a pattern is reused in some other location of the Formal Specification a pointer of this type will be used to refer to the pattern.

```
<!-- L1. Hierarchical Action Tree ============== -->
<!ELEMENT HAT (HAT.Node)>
<!ATTLIST HAT
    Name CDATA #REQUIRED
    Alias CDATA #IMPLIED
>
<!ELEMENT HAT.Node (HAT.Node*)>
<!ATTLIST HAT.Node
    Alias CDATA #IMPLIED
    TargetIU CDATA #IMPLIED
>
```

These fields define the HAT element. A view can have applied a HAT. The HAT element is used to specify the Hierarchical Action Pattern. Each HAT contains a list of child nodes and a name and alias. Each node contains, recursively, child nodes or an alias and a target interaction unit.

```
<!-- Defined patterns for Classes ============== -->
<!ELEMENT Class.DefinedPatterns (IU.Instance*, IU.Population*,
IU.MasterDetail*, Filter*, OrderCriterium*, DisplaySet*, Actions*,
Navigation*)>
```

These fields define the allowable patterns that can be defined in a class. The Class.DefinedPattern fields describe the patterns that can be defined in a Class. A class contains a list of Service IUs, Instance IUs, Population IUs, Master/Detail IUs, Filters, Order Criteria, Display Sets, Actions, and Navigation.

```
<!-- Applied patterns for Classes ============== -->
<!ELEMENT Class.AppliedPatterns (OIDFeedback?,
Default.IU.Instance?, Default.IU.Population?)>
<!ELEMENT Default.IU.Instance (#PCDATA)>
<!ELEMENT Default.IU.Population (#PCDATA)>
```

These fields define the Applied Patterns data for a class. The Class.Applied Patterns fields describe the patterns that can be applied for a Class. It contains an optional Supplementary Information pattern (OIDFeedback element), a default Instance and Population IUs (these are the default scenarios used when there is a need to search for objects or show data for objects in the given class).

```
<!-- Applied patterns for Attributes ============== -->
<!ELEMENT Attribute.AppliedPatterns (Ref.Introduction |
Ref.DefinedSelection?)>
```

These fields are references to Introduction and DefinedSelection elemental patterns that have been applied to constrain the end user, of the interface. The Attribute.Applied Patterns describes the elemental patterns that can be applied to constrain end user entry of data for an attribute. It contains an optional Introduction or Defined Selection Pattern which are two types of pattern constraints on entry of data to define an attribute.

```
<!-- Defined patterns for Services ============== -->
<!ELEMENT Service.DefinedPatterns (IU.Service*)>
```

This is an auxiliary element to show that Service IUs can be defined in the scope of a Service. The Service.Defined Patterns describes the patterns that can be defined in a Service. Service IUs can be defined here.

```
<!-- Applied patterns for Arguments ============== -->
<!ELEMENT Argument.AppliedPatterns (((Ref.Introduction |
Ref.DefinedSelection?) | (OIDFeedback?, OIDSelection?)),
Dependency?)>
```

These fields are pointers to applied patterns that constrain the data a user can enter to supply arguments for a Service IU. The Argument.AppliedPatterns describes the patterns that can be applied for an argument to constrain its behavior. If the domain (data-type) of the argument is a simple-type, the Introduction and Defined Selection Patterns are applicable (optionally). However, if the domain is a object-valued-type the Supplementary Information and OIDSelection are applicable. In both cases, the Dependency Pattern is applicable.

```
<!-- Applied patterns for Filter Variables ============== -->
<!ELEMENT FilterVar.AppliedPatterns ((Ref.Introduction? |
Ref.DefinedSelection?) | (OIDFeedback?, OIDSelection?))>
```

These fields are pointers to elemental patterns that constrain filter variables. The FilterVar.AppliedPatterns describes the patterns that can be applied for a filter variable to constrain its behavior. If the domain (data-type) of the variable is a simple-type, the Introduction and Defined Selection Patterns are applicable (optionally). However, if the domain is a object-valued-type the Supplementary Information and OIDSelection are applicable.

```
<!-- OID Selection ============== -->
<!ELEMENT OIDSelection (#PCDATA)>
```

The OIDSelection element refers to a name of a Population Interaction Unit used for searching objects. It is an application of the Population IU in the context of an argument in order to provide functionality to select objects. It is used from arguments and filter variables of object-valuated type.

```
<!-- View (Subset of the model to derive a user interface)
============== -->
<!ELEMENT View (Interface*, HAT?)>
<!ATTLIST View
    Name CDATA #REQUIRED
    Alias CDATA #IMPLIED
>
```

A view is a subset of the full system to create smaller user interfaces to show only a part of the full system. A view is composed by a list of interfaces and optionally a HAT. As properties it has a name (unique in the specification scope) and an alias (visual label). Views are defined in the model.

```
<!-- Interface (for visiblity permisions) ============== -->
<!ELEMENT Interface (Visible Attribute*, VisibleService*,
VisibleRole*)>
<!ATTLIST Interface
    ServerClass CDATA #REQUIRED
    ClientClass CDATA #REQUIRED
>
```

Each Interface describes the permissions for one class (ClientClass) with respect to another class (ServerClass). The permissions include a list of attributes, a list of services, and a list of roles of the server class. The semantics are: these lists are the visible attributes, executable services, and navigable roles or the Client Class in the Server Class.

```
<!ELEMENT VisibleAttribute (#PCDATA)>
<!ELEMENT VisibleService (#PCDATA)>
<!ELEMENT VisibleRole (#PCDATA)>
```

Each Visible* element contains the name of an Attribute, Service or Role, respectively.

Required Data for IUS.

Definition of Service IU

Required Fields

A service IU data structure can be seen a data structure within the data structure that defines a service. Its encapsulated relationship acts as an implicit pointer to the service to which it is associated. As basic prerequisite for defining a Service IU, a service must exist which implies that a class for which the service is defined must also exists. A Service IU is defined for a given Service (see cardinalities 1:1 in the definition relationship 1302 at FIG. 14).

In order to define a Service IU a name must be provided. This name must be unique in the class scope the service belongs to.

Optional Fields

An alias (a visual label for the final user) for the Service IU, a help message, and an Argument Grouping Pattern (specifying how the arguments are grouped) can be optionally provided in the definition. Later, other elemental patterns will be used for constraining the service arguments related to the given service.

Definition of Instance IU

Required Fields

As basic prerequisite for defining an Instance IU, a class must exist. An Instance IU is defined for a given Class (see cardinalities 1:1 in the definition relationship 1302 for Instance IU 1500 at FIG. 15). The compulsory fields needed for the specification of an Instance IU are a Display Set (specifies what attributes will be presented in the scenario or displayed in the final user interface) and a name for the defined Instance IU. The name must be unique in the class scope.

Optional Fields

As optional fields, Actions and Navigation Patterns can be provided to indicate the available actions and navigation for the final user in the user interface. Alias and a Help message are also optional to provide a caption and additional explanations, respectively.

Definition of Population IU

Required Fields

As basic prerequisite for defining a Population IU, a class must exist. A Population IU is defined for a given Class (see cardinalities 1:1 in the definition relationship 1302 for Population IU 1501 at FIG. 15). The compulsory fields needed for the specification of a Population IU are at least one Display Set (specifies what attributes will be presented in the scenario) and a name for the defined Population IU pattern. The name must be unique in the class scope.

Optional Fields

As optional fields, Filters, Order Criteria, additional Display Sets, Actions, and Navigation Patterns can be provided to indicate the available searching methods, sort capabilities, alternative presentation of information, actions and navigation for the final user in the user interface, respectively. Alias and a Help message are also optional to provide a caption and additional explanations.

Master/Detail IU
Required Fields

As basic prerequisite for defining a Master/Detail IU, a class must exist. A Master/Detail IU is defined for a given Class (see cardinalities 1:1 in the definition relationship 1302 for Master/Detail IU 1601 at FIG. 16). The compulsory fields needed for the specification of a Master/Detail IU are a master IU (specifies the IU acting as a master component in the master detail) and at least one detail IU (specifies the IU acting as a detail). The name must be unique in the class scope.

Optional Fields

As optional fields, more that one Detail IU can be specified in order to define complex master/details. Alias and a Help messages are also optional to provide a caption and additional explanations for user interface in run time.

Required data for Classes.
Definition of a Class
Required Fields

There is no prerequisite to create a class. Classes can always be created in a specification. However, the name must be unique in the specification scope (in other words, no other class in this specification can have the same name). When defining a class the analyst must provide such a unique name.

Optional Fields

In a class as optional fields several properties can be defined like Filters, Order Criteria, Display Sets, Actions, Navigation Patterns, Instance Ws, Population IUs, and Master/Detail IUs. Classes can also have attributes (object properties), services (methods to change the value of the attributes of the objects), defined patterns (default Supplementary Information and default Population and Instance IUs), and an alias (a visible label for the final user in the user interface).

Required data for Services.
Definition of a Service
Required Fields

A prerequisite to create a service is to have a class for which the service is defined. Services must be defined in a class. The service name must be unique in the class scope (in other words, no other service defined in this class can have the same name). When defining a service the analyst must provide such a unique name.

Optional Fields

Optional fields for services are an alias (a visible label for the final user in the user interface), a list of arguments (the input/output parameters for the method) and a list of defined patterns. The patterns defined for a service consist of a list of Service IUs defined for the given service.

Required properties must be provided by the analyst when building the User Interface Model (Presentation Model) to maintain a complete specification. Therefore, data that is compulsory is presented at editing time of the formal specification by the editor as compulsory and no further progress will be allowed until the compulsory data is supplied by the analyst in the pattern creation time (editing the specification).

However, optional fields need not be provided during the pattern creation time (editing the specification). In any moment of the specification editing process, the analyst can change this optional data to complete it or to remove it.

The validation process checks that all compulsory data is present. Names (identifiers) are checked, among other things to make sure they are unique to ensure there is no ambiguity.

D. Specification Editor.

The specification editor is a computer program which executes on a computer in an automatic code generation system which is used by an analyst to build a specification in a formal language of the user interface and the rest of the program for which code is to be automatically generated. A formal language is a mathematical language which has semantics in which every term has one and only one meaning. It may also have rules of syntax which can be used to validate formal specifications written in the formal language.

The preferred embodiment of the editor tool will be described in this section.

Figure 24:
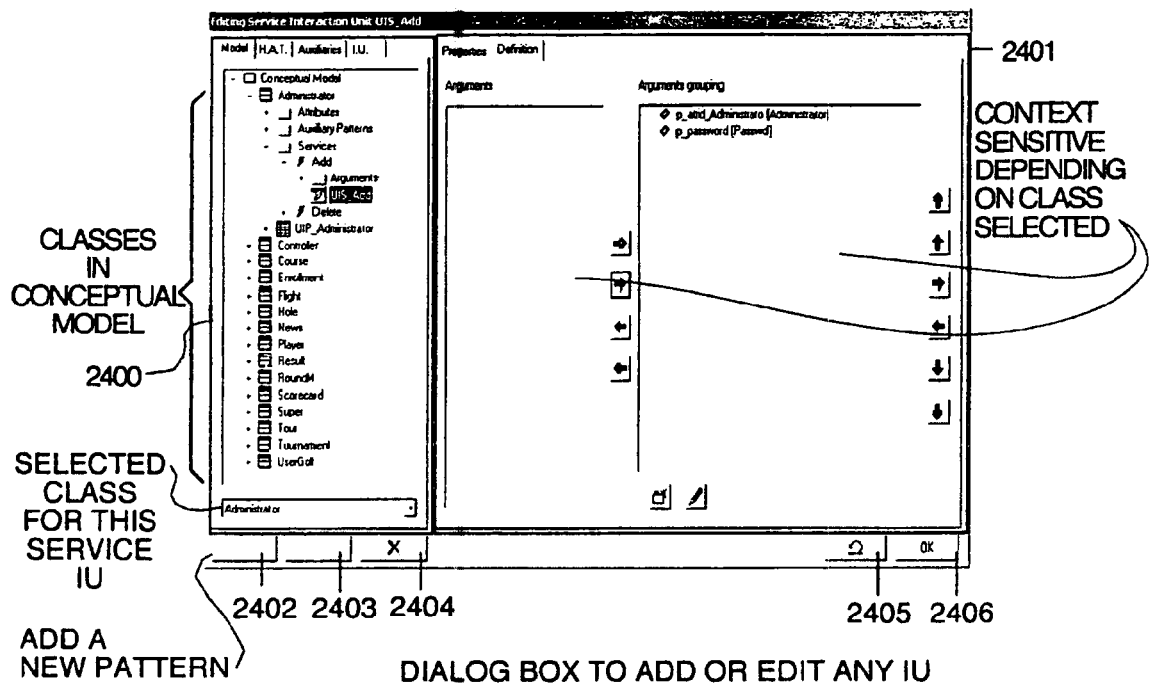
FIG. 24 is a view of main window in the user interface of the editor tool for building a User Interface Model, i.e., Presentation Model.

The User Interface Model (Presentation Model) Editor is embedded in an object oriented modeling tool. FIG. 24 shows the main window used for editing the User Interface Specification. This window can be accessed using the following ways:

1. Using the Main Menu >Project > User Interface Model.
2. Selecting a class and then choosing the Interface option in a popup menu.
3. Clicking the User Interface Model button in the main toolbar.

FIG. 24 shows an editor framework for editing the User Interface (Presentation) Model. On the left pane 2400 a tree control embedded in a tab control shows the defined elements in the Conceptual Model of the software to be built using a continence hierarchy. In this tree, views, classes, attributes, services, arguments, and patterns are displayed selectively by expanding the various levels of the tree. For example, the Administrator class is expanded to show it has attributes, auxiliary patterns and services levels. The services level is expanded to show it has a service called Add which has within it a level for Arguments of the service and a Service IU named UIS_Add. It also has a service called Delete.

Whenever an object in the left tree 2400 is selected, its properties appear on the right pane 2401 organized also in tabs. For example the Service ID UIS_Add is selected and it is seen in the right pane 2402 that this Service ID has been enriched with an Argument Grouping elemental pattern to group arguments for the service Add. The analyst can change the properties for a given pattern by making changes in the right pane.

The left pane 2400 contains four different tabs. Each tab contains a different form of organizing (indexing) the model data. Depending on the task, the analyst will select one or another of the tabs. Model tab shows classes and patterns defined for such classes. HAT tab shows the HAT patterns per view. Auxiliaries tab shows the Introduction and Defined Selection Pattern. Eventually, IU tab shows the Interaction Units classified by type and class.

Button 2402 is used for creating new patterns (instances from a given pattern). Button 2403 is used for cloning a pattern; in other words, create copy from a previous existing pattern. Button 2404 is used for deleting an existing pattern. Button 2405 is used for undoing the last action performed. Finally, button 2406 is used to close the User Interface Specification and save changes.

Figure 25:
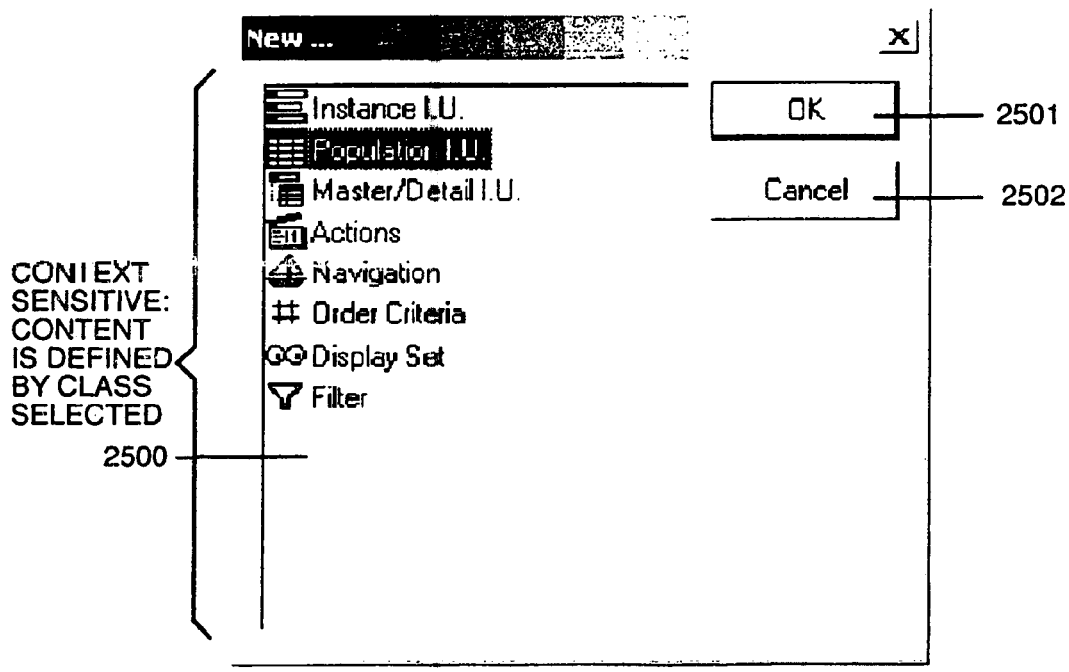
FIG. 25 is a view of the New Pattern window in the user interface of the editor tool.

Whenever the user clicks on the button 2402, a context-sensitive window appears showing the patterns that can be created in such a context. For example, FIG. 25 shows the patterns that can be created for a class when a class is selected in the left pane of FIG. 24 and button 2402 is selected. When the analyst selects a class in the tree 2400 and presses the button 2402, FIG. 25 will appear showing the patterns that can be defined in a class scope: Instance IU, Population IU, Master/Detail IU, Actions, Navigation, Order Criteria, Display Set, and Filter. Using the listbox 2500 the analyst can select a pattern type to be created and press OK button 2501 to confirm the operation or press the Cancel button 2502 to undo this action and close the window.

Referring to FIG. 24, the right pane 2401 is context sensitive and contains different tabs depending on the object currently selected. FIG. 26, FIG. 27, FIG. 28, and FIG. 29 are examples of tab pages displayed in this right pane 2401 when a Population IU (FIGS. 26 and 27), a Filter (FIG. 28) or a Dependency Pattern (FIG. 29) is selected.

Figure 26:
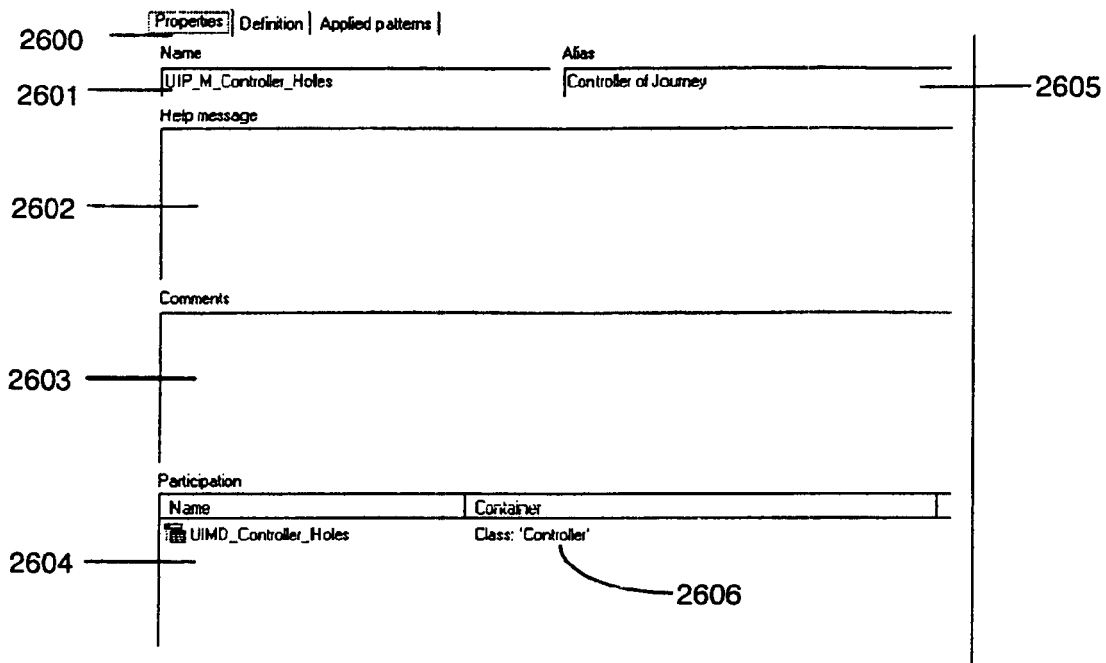
FIG. 26 is a view of the Properties Tab in the user interface of the editor tool.

FIG. 26 shows the dialog box which opens when the Properties tab 2600 is selected. When the analyst creates a pattern, this tab allows entry-fields to provide a name for the pattern 2601, an alias 2605, a help message 2602, and comments 2603. Additionally, the listview control 2604 shows the usage of the patterns in other parts of the model.

Figure 27:
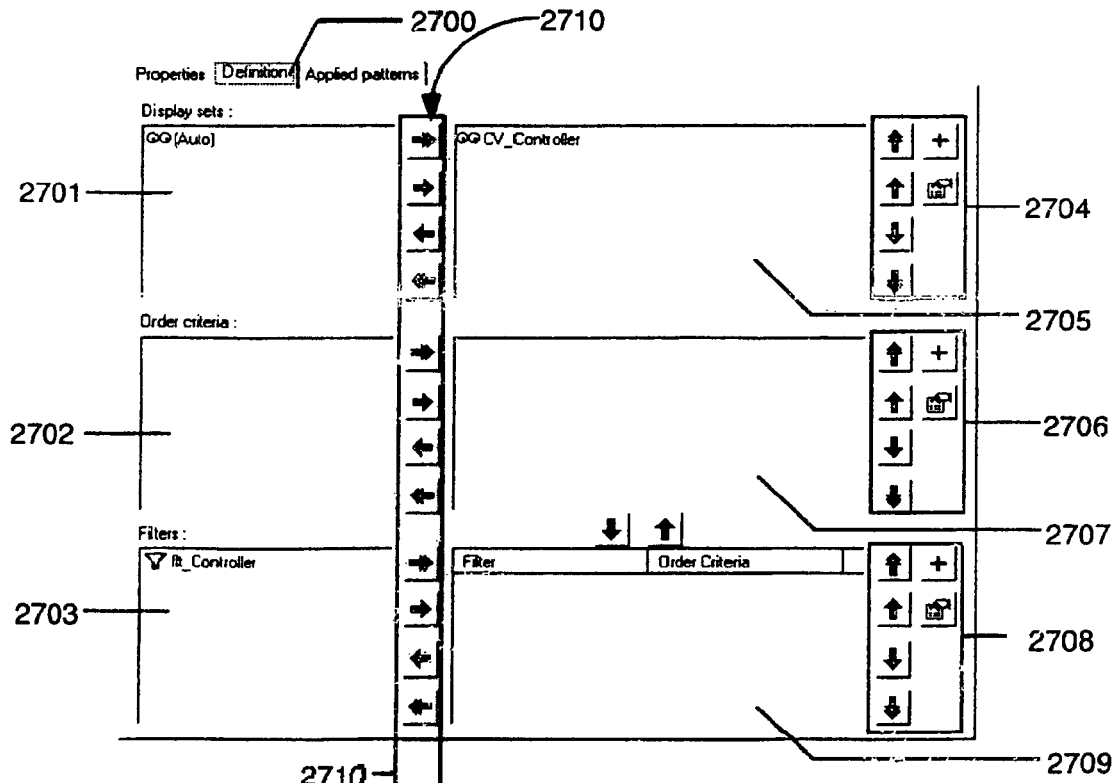
FIG. 27 is a view of the Definition Tab in the user interface of the editor tool.

FIG. 27 shows the dialog box that opens when the Definition tab 2700 is selected. This tab is used for defining a Population IU. Here the analyst has a list of available Display Sets 2701, Order Criteria 2702 and Filters 2703. Using the set of buttons 2710, the analyst can select (include) the item needed in the corresponding controls 2705, 2707, and 2709. These last referred controls 2705, 2707, and 2709 contain the items that define a Population IU pattern as supplied by the analyst.

Buttons 2710 are grouped in three vertical sets of buttons of four buttons per set. The semantic or function of each button per group described top-down is the following: the first button (double right arrow) moves all items from left to right (Select All behavior to select all items in the left pane and move them to the corresponding right pane), second button (right arrow) moves one item from left to right (Select One behavior), third button (left arrow) moves one item from right to left (Unselect One behavior) and finally the fourth button (double left arrow) moves all items from right to left (Unselect All behavior). The rest of the groups work in the same manner.

Groups of buttons 2704, 2706 and 2708 works in the same manner. The buttons described in a top-down left-right way perform the following: On the first column there are four buttons: the first button (double up arrow) moves the selected item in the left control (2705, or 2707, or 2709, respectively) to the top (Move First behavior), the second button (up arrow) moves the selected item in the left control one position up (Move Up behavior), the third button (down arrow) moves the selected item in the left control one position down (Move Down behavior), the fourth button (double down arrow) moves the selected item to the bottom (Move Last behavior). The second column contains two buttons: the first one button (plus sign) is used to create a new pattern, and the second button is used to edit the current selected pattern (in the left control).

Figure 28:
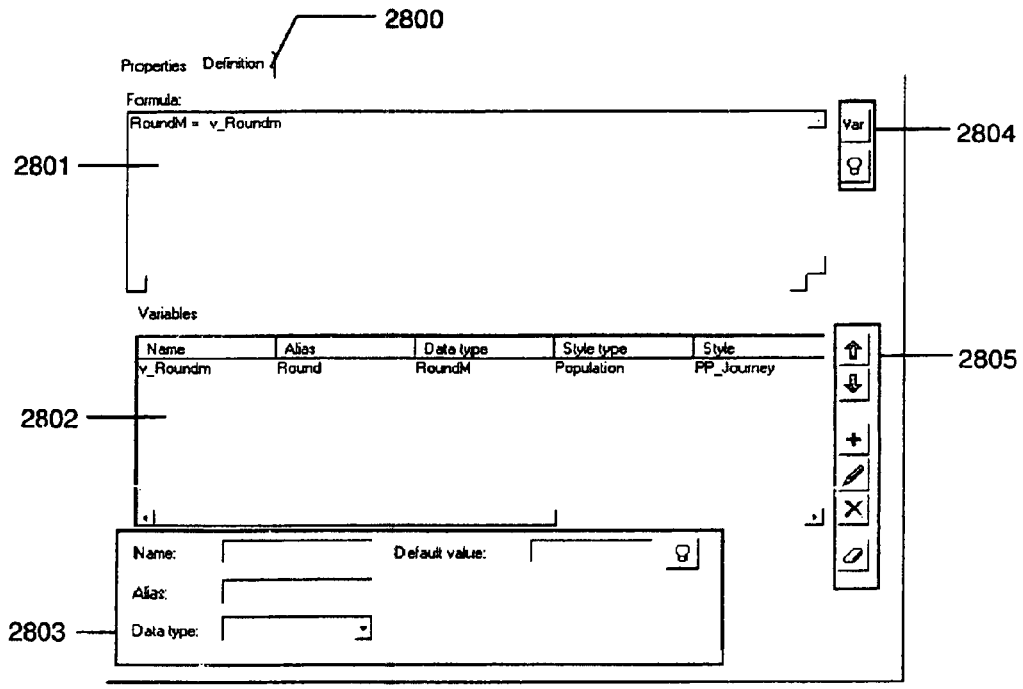
FIG. 28 is a view of the edit window for filters in the user interface of the editor tool.

Referring to FIG. 28, the Definition tab for filters is shown 2800. A filter is defined by expressing a formula. The field 2801 provides an input control that allows the analyst to write such a formula following the syntax used for filters (see Appendix Filter BNF Grammar). Control 2802 shows the defined filter variables for this filter. Using the set of controls 2803 the analyst can create new filter variables that will appear in listview control 2802.

Buttons in toolbar 2804 are used for (top-down): VAR is used to copy & paste the name of the selected filter variable in control 2802 to control 2801. The second button (lamp) is used to display a wizard that helps to build the filter formula.

Buttons in toolbar 2805 are used for (top-down): the first button moves one position up the current selected filter variable in 2802, the second button moves one position down the current selected filter variable in 2802, the third button add a filter variable, the fourth button edits the current selected filter variable, the fifth button deletes current selected filter variable and finally, the sixth button cleans all the fields in 2803.

Figure 29:
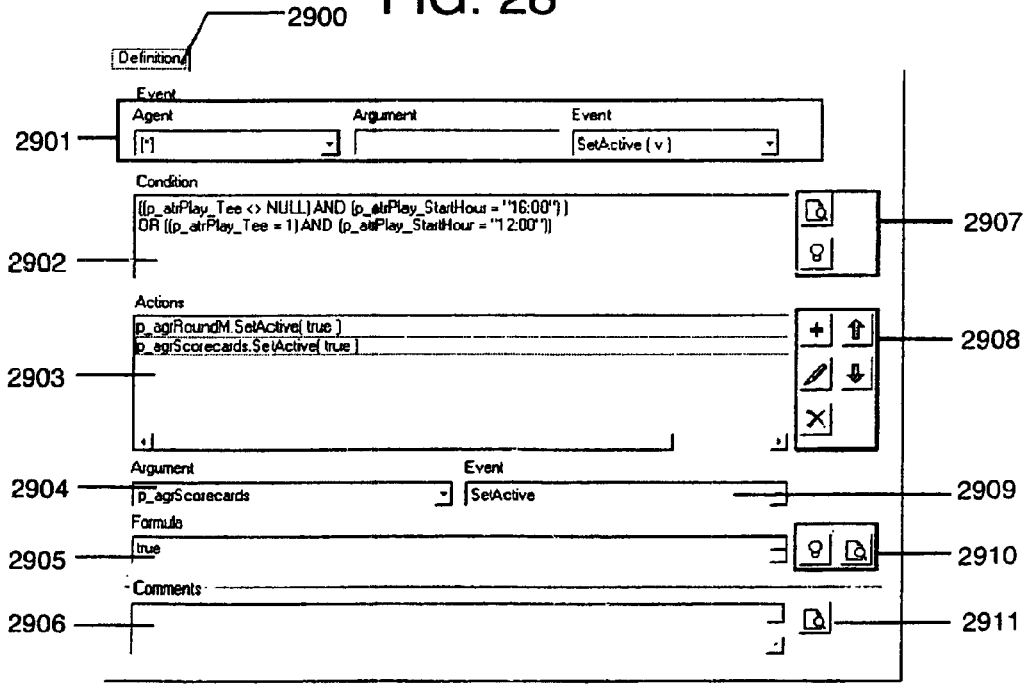
FIG. 29 is a view of the edit window for dependency rules in the user interface of the editor tool.

Referring to FIG. 29, a dialog box which the editor displays when the analyst selects a Definition tab for a selected Dependency Pattern is shown at 2900. A Dependency Pattern is composed of a set of ECA rules (Event-Condition-Actions). The syntax of such as formulas is defined in the Appendix Dependency BNF Grammar.

The Event part of a rule can be defined using the controls 2901: selecting the agent (all '*', 'user' or 'internal'), the argument and the event: (SetActive(v) or SetValue(v)).

The Condition part of the rule can be specified by the analyst in field 2902. Buttons in 2907 toolbars helps in these tasks providing a bigger edit window (top button) or providing a context-sensitive wizard to help build the formula (lower button).

The Actions part of a rule is defined in control 2903. A list of ordered, already existing actions 2903 are displayed for the current rule. Toolbar 2908 is used to (top-down, left-right order) create, edit, delete, move up and move down the actions, respectively.

Auxiliary controls 2904, 2905, and 2909 are used to define actions. In the same way as 2907, toolbar 2910 provides a bigger space for editing the formula and a context-sensitive wizard.

Finally, control 2906 allows the analyst to attach some comments to the rule. Button 2911 provides a bigger space for editing such comment.

E. Graphical Notation.

Graphical representations are more convenient and easy to work with for an analyst when developing big-sized systems than using textual representation. In this way, the tool implementing the method uses a graphical notation that makes easy the understanding of the concepts involved. This feature is important to improve the scalability of the method when it is applied to large systems.

The graphical notation used consists on a layered diagram using three types of diagram (one per patterns level). Each of them is a refinement from another one.

Figure 17:
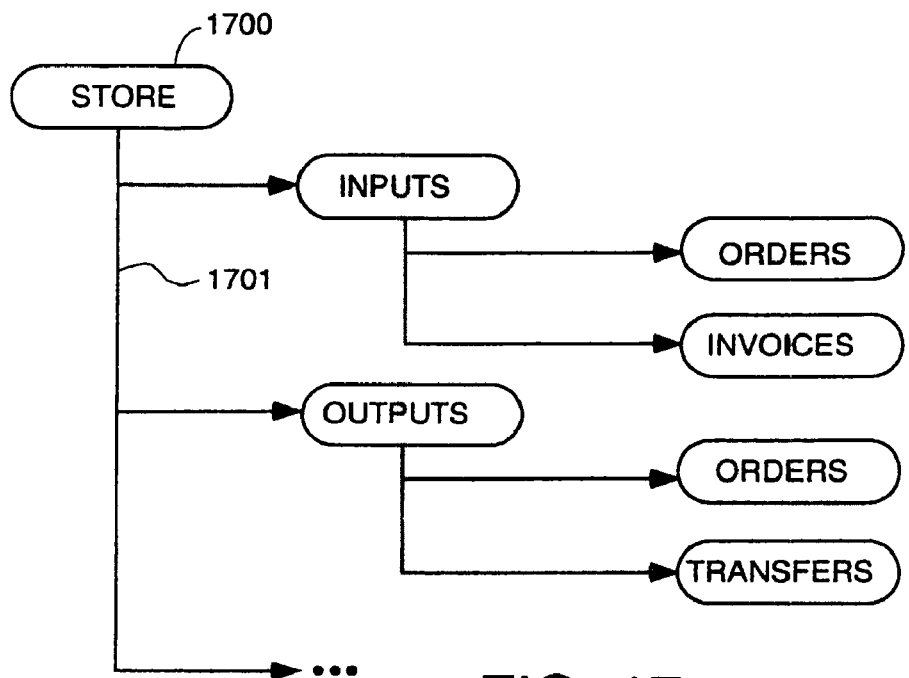
FIG. 17 is an example of the graphical notation of level 1.

GN1. An example of diagram for level 1 as shown in FIG. 17 is a tree expressing the structure of the Hierarchical Action Tree Pattern. Bubble 1700, represents the nodes in the tree, whereas arrows 1701 represents the child relationships in the tree and links with target Interaction Units.

GN2. The graphical notation for level 2 is a directional graph composed by interaction units acting as boxes and navigation links acting as arrows.

Figure 18:
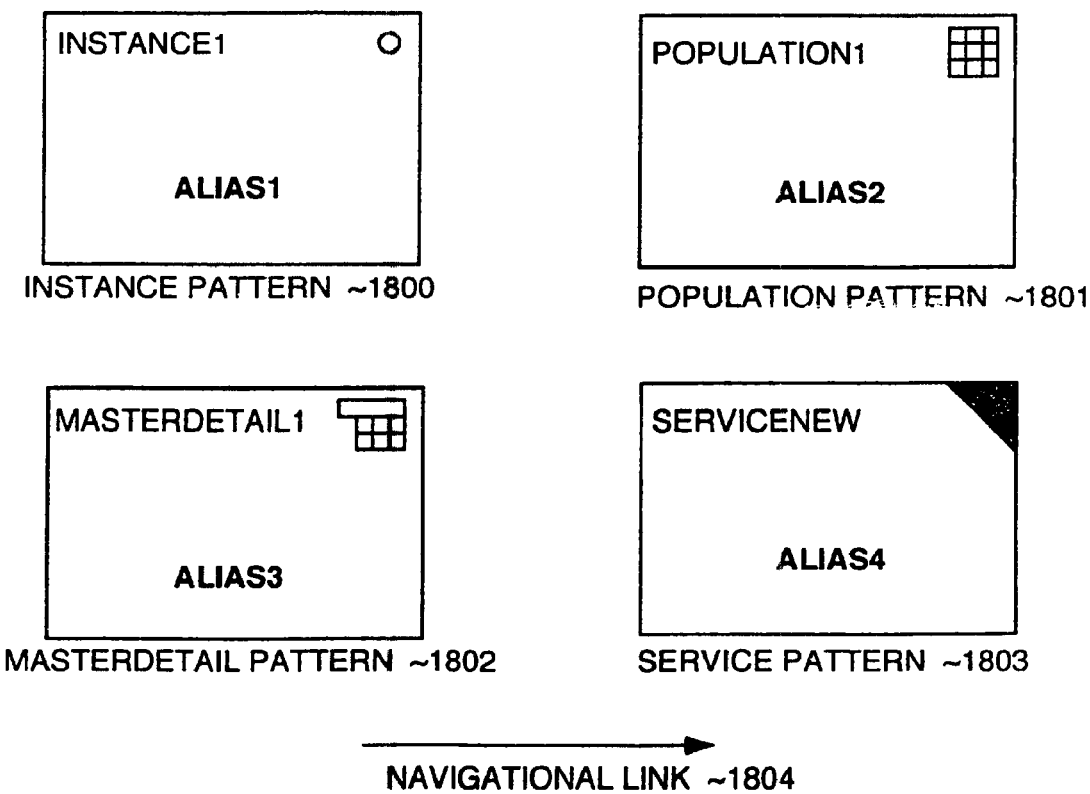
FIG. 18 shows the primitives for graphical notation of level 2.

The primitives of the graphical notation are shown in FIG. 18. Interaction Units are represented as boxes with a small glyph in the right-upper corner. The glyphs employed are a circle for Instance IU 1800, a grid for Population IU 1801, a rectangle and a grid for the Master/Detail IU 1802 and a black triangle for Service IU 1803. Arrows are used for navigational links 1804.

Figure 19:
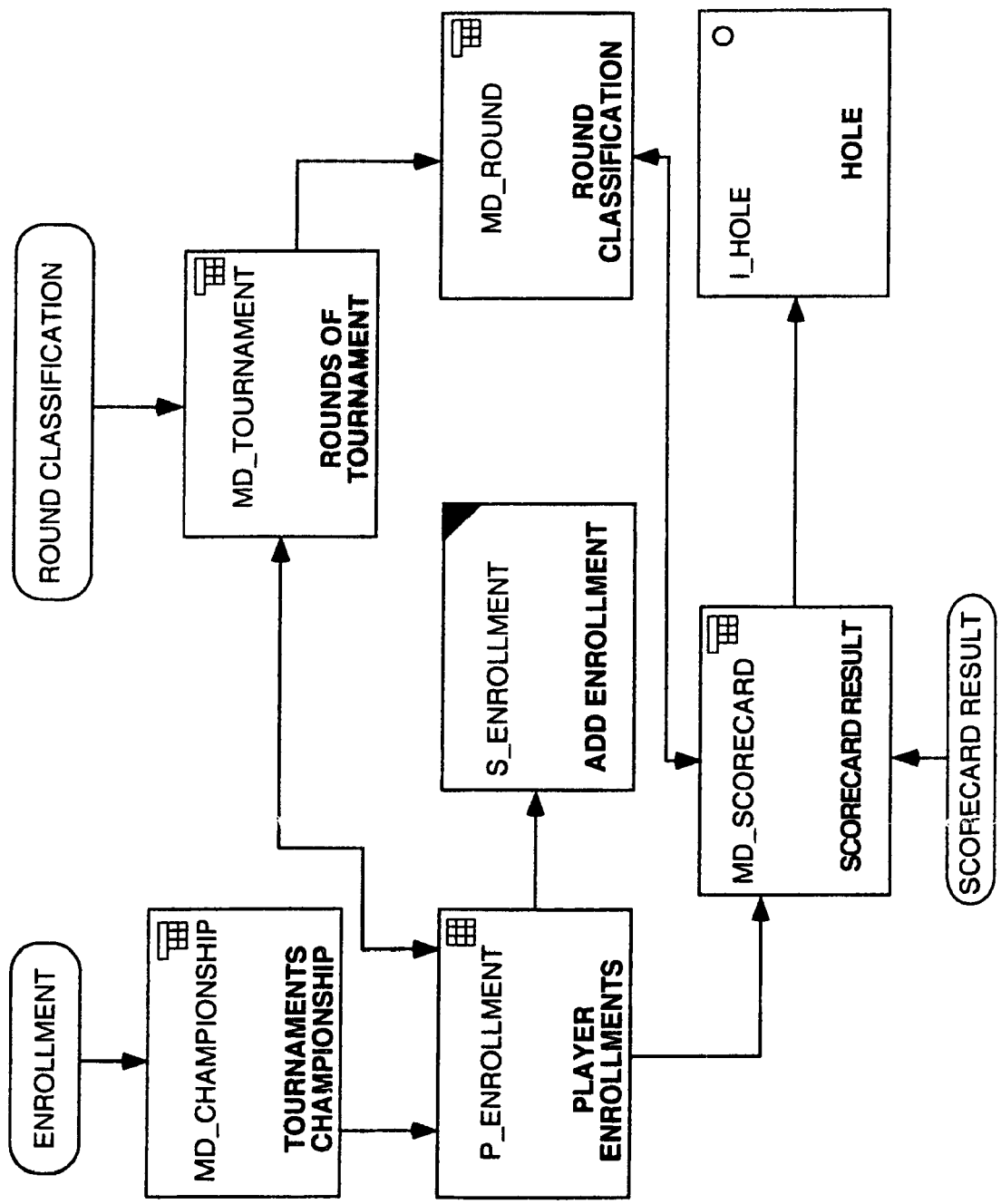
FIG. 19 is an example of the graphical notation of level 2.

An example of the Navigational Diagram showing how navigation between different IU patterns is implemented in for an example golf course tournament management program is shown in FIG. 19. The diagram shows the scenarios, i.e., Interaction Unit types that have been specified to be present in the User Interface and the navigational relationship among them.

GN3. The last diagram, FIG. 20, contains the graphical notations used to represent some primitives of the lower level. This type diagram is used to indicate the concepts used in the definition or articulation on a given IU. FIG. 20 shows the graphical representation for each primitive: the representation for Display Sets 2000, Filters 2001, Order criteria 2002, Navigation 2003 and Actions 2004 are shown.

Figure 21:
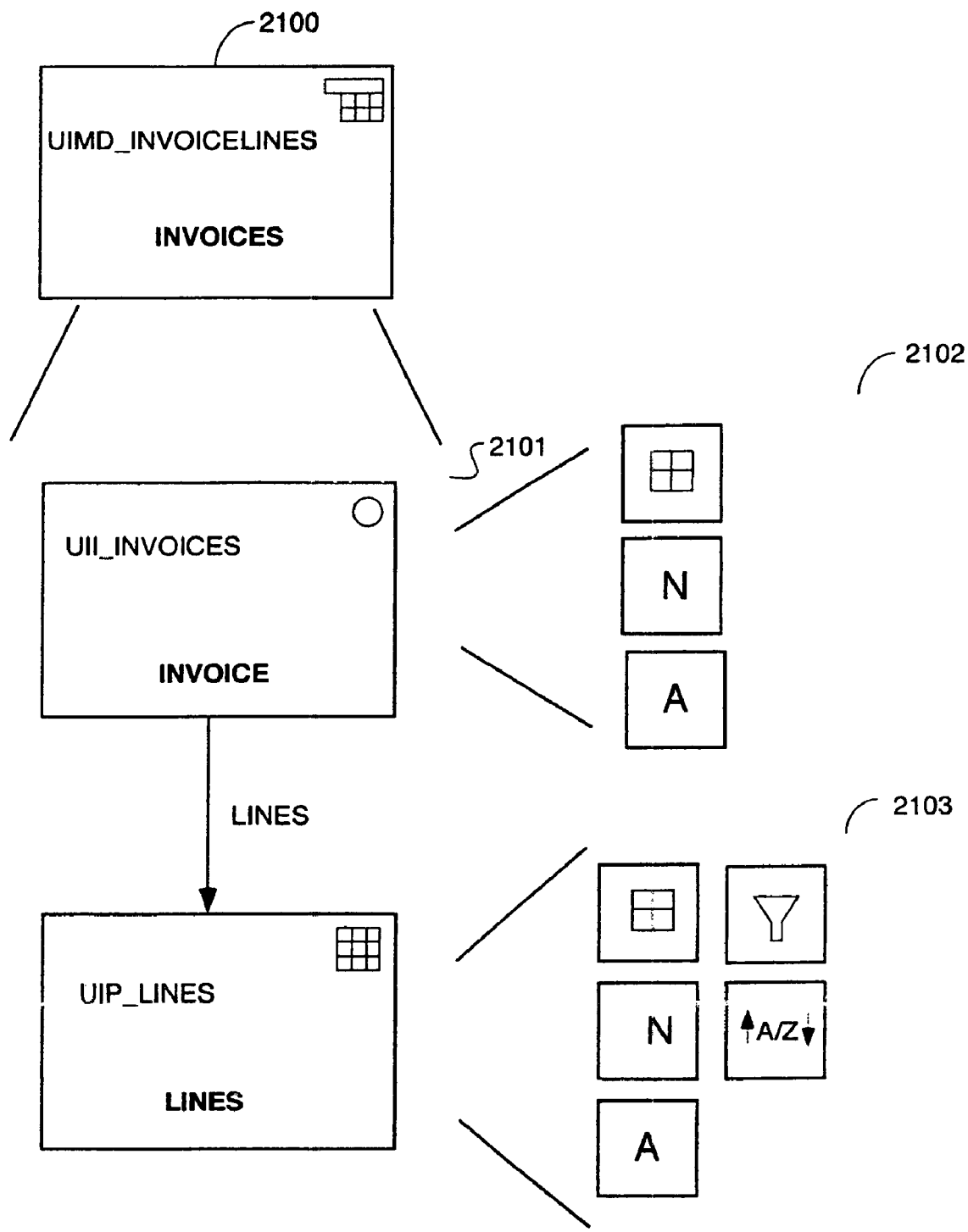
FIG. 21 is an example of decomposition of diagrams using the graphical notation.

FIG. 21 shows an example of decomposition of the diagrams from a general one to refined ones. 2100 is an example of diagram showing a Master/Detail IU. If the user needs to inspect IU, he can double click over the box and a second diagram will appear 2101 showing the components of the Master/Detail IU. Once again, clicking with the mouse over a box, the corresponding level three diagrams will appear 2102 or 2103.

F. Validation Rules.

The specification must be validated (FIG. 1, 116) before the code generation phase. This process ensures the specification in correct and complete enough as input for code generators.

The User Interface (Presentation Model) Specification is validated by checking a set of rules which are based upon the syntax and semantics of the formal language in which the User Interface (Presentation Model) Specification is written. Each rule can be satisfied or not. If not, there are two categories of fault values: errors and warnings. Errors are considered as fatal ones: the specification is not valid. On the contrary, warnings are minor errors that do not impede code generation. Nevertheless, both errors and warnings are shown to the user in order to inform him about the quality of the specification being produced and its consequences.

A subset of key rules follows:

R1. The Service IU name is unique in the Service Scope.
R2. The Population IU name is unique in the Class Scope.
R3. The Master/Detail IU name is unique in the Class Scope.
R4. A Filter name is unique in the Class Scope.
R5. An Order Criterion name is unique in the Class Scope.
R6. A Display Set name is unique in the Class Scope.
R7. A Navigation name is unique in the Class Scope.
R8. An Actions name is unique in the Class Scope.
R9. Check that all referenced objects exist.
R10. Every HAT has a root node.
R11. Every HAT node has a label and children nodes or has a reference to a target IU and zero children.
R12. The Instance IU name is unique in the Class Scope.
R13. The Instance IU contains a reference to an existing Display Set.
R14. The Population IU contains at least one reference to an existing Display Set.
R15. Every Master/Detail IU has a master component.
R16. Every Master/Detail IU has at least one detail component.
R17. The navigational formula expression in each Detail is valid.
R18. Every Filter has a formula.
R20. Every Display Set has at least one element.
R21. Every Order Criteria has at least one element.
R22. Every Navigation has at least one element.
R23. Every Actions pattern has at least one element.
R24. The navigational formula expression in each Navigation item is valid.

A class scope means: all filters defined for class A are in the A scope. Filters defined for A can not collide with their names. In other words, it is not possible to have two filters named F1 for class A.

However it is possible to have a filter F1 defined for class A and at the same time a filter F1 defined for class B. In this last case, the names are unique using the class name (A.F1) & (B.F1).

G. Generation Process.

The Generation Process is implemented by a program which transforms a specification into a source code for a programming language to implement a user interface satisfying the requirements gathered in the specification.

Figure 22:
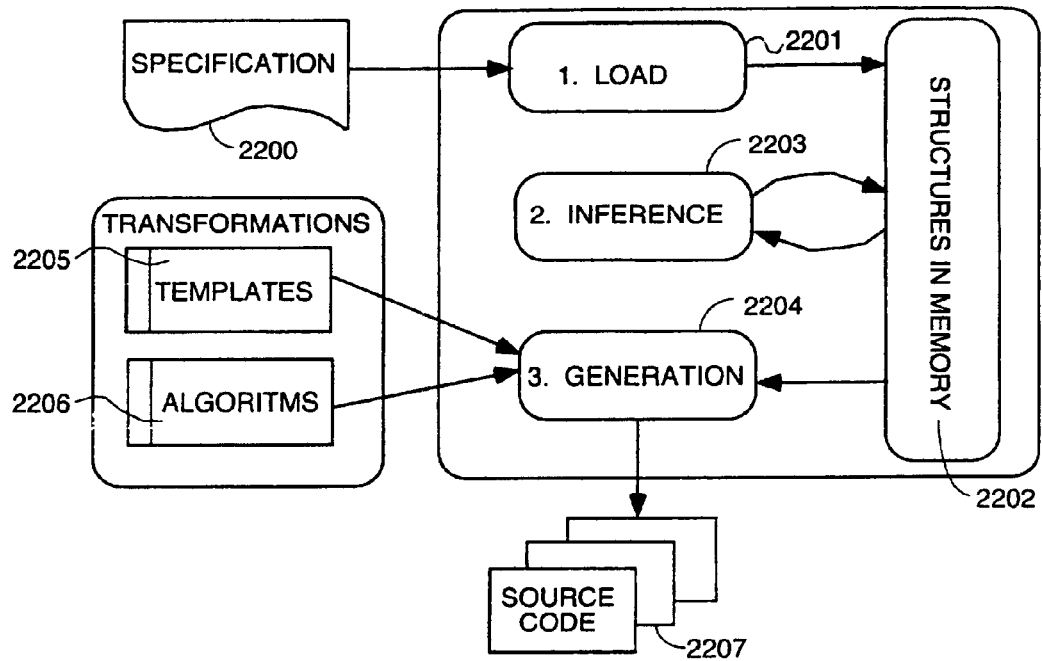
FIG. 22 is a block diagram showing the process of code generation from specifications.

FIG. 22 shows a flow chart of the generation process. The validated formal language specification 2200 is loaded in 2201 in a structure in the computer memory. Depending of the origin of the data (XML, database, repository, plain binary file, etc.) the loading code can vary 2201. However, the structure in memory 2202 does not vary. Therefore, the loader 2201 decouples the generator from the format and type of data in the formal specification data source.

The memory structures 2202 are a set of classes and structures coded in C++ (or any other programming language) implementing the various building blocks of the meta-model. In other words the structures in memory 2202 are complex data types in C++ or any other target computer code of various building blocks in the meta-model which serve as templates or starting points and which are filled in accordance with the specifics of the actual model built by the analyst. The goal of the translation process is to fill these structures with the information of a given model created by the analyst using a loader 2201 that reads the specification using a reading API (Application Programmer Interface) and populates the appropriate parts of the memory structures 2202 with the read information.

Once the specification is loaded in memory, the inference process 2203 starts. The inference process checks the structures in memory detecting missing information and completing it with derived information and making some preliminary calculations. The inference process will be described later.

Once the loading and inference process having been completed, the generation process 2204 starts. The generation process uses a set of transformations consisting of templates 2205 and algorithms 2206. The algorithms 2006 review the memory structures and for each elemental found, a template of computer code that can implement that type of element is selected and instantiated for the specific articulation of the element using the formal specification data for that element. Once a template has been instantiated, the resulting document is dumped to disk as output file of compilable source code in the target language.

Figure 23:
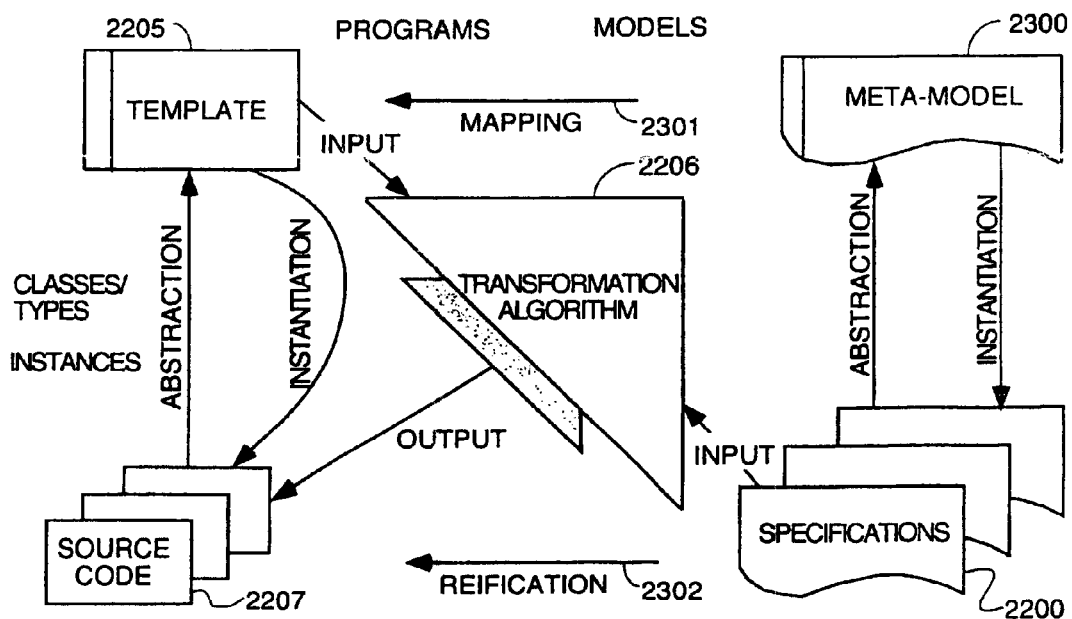
FIG. 23 is a block diagram showing a detail of the code generation using specifications and templates to produce code.

FIG. 23 shows a detailed view of the generation process based on templates. The meta-model 2300 is the genus of all the specifications 2200 in the sense that every building block of the model built by the analyst of the desired program is a building block in the meta-model and that includes all the patterns which are used to specify in the formal specification the type of user interface and articulate it for each class. In the same way, a template 2205 is the genus of all the documents (source code) that it can produce 2207. In other words, the templates are source code patterns that can do various things and are the elements or building blocks from which the final code in source code output file 2207 is built after instantiation using model-specific information from the formal specification. The Transformation Algorithm 2206 uses the specification data to instantiate a given template with data from the specification. As a result, a compilable source code file that implements the desired program is produced.

When the generation process finishes applying the transformation algorithms, the set of source files produced as output constitutes the application source code 2207.

G.1. Mappings

Templates are created from mappings 2301. A mapping establishes a correspondence between meta-model elements or building blocks and their implementation in a given high level computer language such as C++.

A complete set of mappings has to be established in order to generate a user interface for a given language. We have successfully developed such mappings and implemented the corresponding code generators for Visual Basic, Java (desktop environments) JSP, Cold Fusion, and ASP (web environments). Furthermore, a study for Pocket PC devices shows that it is feasible to have a complete mapping for pervasive devices or phone cells.

As examples, the mappings for Visual Basic and Cold Fusion languages are going to be presented.

The following table shows a list of mappings for the Visual Basic language:

| Model's Concept or Behavior | Visual Basic (VB) Component |
| --- | --- |
| View | MDI Parent Form/VB Application |
| Hierarchical Action Tree | Application Menu |
| Interaction Unit | MDI Child Form |
| Service IU | MDI Child Form with input fields |
| Instance IU | Generic User Control Instance |
| Population IU | Generic User Control Population |
| Master/Detail IU | Implementation by composition of Instance and Population User Control Components |
| Argument (simple type) | Generic User Control Input Field |
| Argument (object type) | Generic User Control OIDSelector |
| Filter | Generic User Control Filter |
| Filter Variable | Generic User Control Input Field |
| Actions | Toolbar & Popup menu |
| Action Item | Button & Popup item |
| Navigation | Toolbar & Popup menu |
| Navigation Item | Button & Popup item |
| Display Set | Grid & label sequence |
| Introduction | VB code for data validation |
| Defined Selection | Drop Combo-box or radio button |
| Service Confirmation | Button labelled as 'OK' & VB code for data validation and service invocation |
| Service Cancellation | Button labelled as 'Cancel' & VB code for form unload |
| Service Invocation | VB code for communications with business layer for service invocation |
| Query | VB code for communications with business layer for query request |
| Data presentation | VB code for data recovery and formatting |

This set of mappings is implemented in the VB translator. Correspondingly, the mappings for the Cold Fusion language are presented.

| Model's Concept or Behavior | Cold Fusion Component |
| --- | --- |
| View | Frame web page/Web Application |
| Hierarchical Action Tree | Javascript tree or menu-like Flash component |
| Interaction Unit | Web page |
| Service IU | Web page containing a HTML form <Form> |
| Instance IU | Web page with labels showing data values from an object |
| Population IU | Web page showing filters, order criteria, a table with data, actions and navigations |
| Master/Detail IU | Composed web page from Instance and Population pages |
| Argument (simple type) | HTML <InputBox> tag & javascript code for validation |
| Argument (object type) | Composition of text, HTML <InputBox> tag & javascript code for validation |
| Filter | Filter HTML template |
| Filter Variable | HTML <InputBox> tag & javascript code for validation |
| Actions | Set of links |
| Action Item | <A HREF="..."> HTML tag |
| Navigation | Set of links |
| Navigation Item | <A HREF="..."> HTML tag |
| Display Set | <Table> HTML tag or text sequence |
| Introduction | <InputBox> with Javascript code for data validation or similar Java or Flash component |
| Defined Selection | <SELECT> HTML tag or similar Java or Flash component |
| Service Confirmation | <InputBox type="Submit"> labelled as 'OK' with Javascript code for data validation and service invocation |
| Service Cancellation | <InputBox type="Button"> labelled as 'Cancel' with Javascript code for closing the web page and redirection to another page |
| Service Invocation | Javascript communication code with ColdFusion Server intermediate layer and CFScript code for communication with business logic layer for service request |
| Query | Javascript communication code with ColdFusion Server intermediate layer and CFScript code for communication with business logic layer for query request |
| Data presentation | CFScript code for data recovering and formatting |

In the same way, this set of mappings is implemented in the Cold Fusion translator.

H. Inference Process.

The inference process (FIG. 22, 2203) completes missing information in a model and carries out preliminary calculations to facilitate the generation process 2004.

Information like missing aliases is completed deriving such aliases from other elements in the specification.

The rules for deriving aliases are:

I1. If a Class has not got an alias, use its name.
I2. If an Argument has not got an alias, use the alias of its related Attribute, if not applicable, use its name.
I3. If an Attribute has not got an alias, use its name.
I4. If a Service has not got an alias, use its name.
I5. If a Service IU has not got an alias, use its Service alias.
I6. If a Instance IU has not got an alias, use its Class alias.
I7. If a Population IU has not got an alias, use its Class alias.
I8. If a Master/Detail IU has not got an alias, use its Class alias.
I9. If a Filter has not got an alias, use its name.
I10. If an Order Criterion has not got an alias, use its name.
I11. If an Action Element has not got an alias, use the alias of the target IU.
I12. If a Navigation Element has not got an alias, use the alias of the target IU.
I13. If a Detail has not got an alias, use the alias of the target IU.
I14. If a child HAT node has not got an alias, use the alias of the target IU.

Some information is converted from an implicit form to an explicit one. In the specification there are conventions for indicating that all the services available are offered in an action pattern, all aggregation relationships are part of a navigation pattern, or all attributes in a class are shown in a Display Set. During the inference process this information is expanded and pre-calculated. The meaning of "all" when selected by the analyst using the editor when articulating an IU (implicit) is translated to an enumerated list containing all the items available (explicit) to be used later in the generation phase. In other words, when "all" is selected to define action patterns, all available services of the class appear in the control window. The same is true for "all" when defining display sets or navigation patterns.

If the HAT is missing in the specification, a HAT is inferred in this point. A tree is created containing a node per class. A node is created per services and interaction units are connected as child nodes below the class node. In this way, the user interface produced will be able to test all the functionality and Interactions Units of the system.

Specifications of the Parent Case and the Grandfather Case

The following material comes from the substitute specification filed in the prosecution of U.S. Pat. No. 7,278,130, Ser. No. 09/872,413, filed Jun. 1, 2001, attorney docket CHG-001.1P (the Parent case). The case at bar, Ser. No. 11/977,218 is a continuation-in-part of the Parent case and claims priority of its filing date of Jun. 1, 2001. The following material includes the specification of what will be referred to as the Grandfather case, Ser. No. 09/543,085, filed Apr. 4, 2000, attorney docket CHG-001 RCE (now U.S. Pat. No. 6,681,383). Both the Parent case and the Grandfather case were formerly incorporated by reference into this case Ser. No. 11/977,218.

Computer Program Listing Appendix

The assembly code computer program listing having file name TOTAL.ASM size 39,107,073 bytes, created on May 23, 2001 which was submitted in duplicate with this patent application on a single CD-ROM is hereby incorporated by reference. The file is in TXT format on a disc compatible with IBM-PCs and the Windows 98 operating system, and can be opened by any word processor.

Hardware Overview

Figure 30:
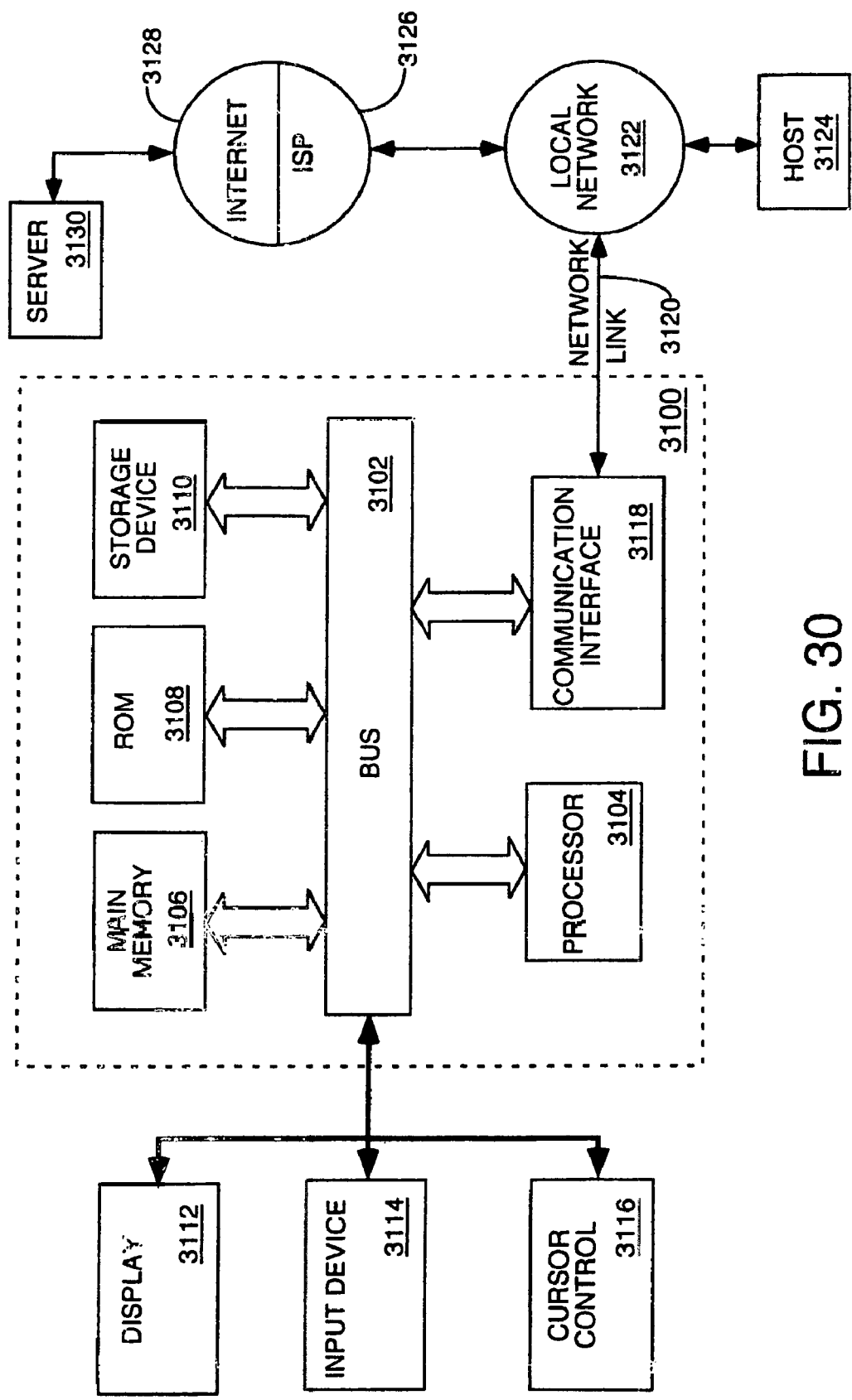
FIG. 30 depicts a computer system that can be used to implement an embodiment of the present invention.

FIG. 30 is a block diagram that illustrates a computer system 3100 upon which an embodiment of the invention may be implemented. Computer system 3100 includes a bus 3102 or other communication mechanism for communicating information, and a processor 3104 coupled with bus 3102 for processing information. Computer system 3100 also includes a main memory 3106, such as a random access memory (RAM) or other dynamic storage device, coupled to bus 3102 for storing information and instructions to be executed by processor 3104. Main memory 3106 also may be used for storing temporary variables or other intermediate information during execution of instructions to be executed by processor 3104. Computer system 3100 further includes a read only memory (ROM) 3108 or other static storage device coupled to bus 102 for storing static information and instructions for processor 3104. A storage device 3110, such as a magnetic disk or optical disk, is provided and coupled to bus 3102 for storing information and instructions.

Computer system 3100 may be coupled via bus 3102 to a display 3112, such as a cathode ray tube (CRT), for displaying information to a computer user. An input device 3114, including alphanumeric and other keys, is coupled to bus 3102 for communicating information and command selections to processor 3104. Another type of user input device is cursor control 3116, such as a mouse, a trackball, or cursor direction keys for communicating direction information and command selections to processor 104 and for controlling cursor movement on display 3112. This input device typically has two degrees of freedom in two axes, a first axis (e.g., x) and a second axis (e.g., y), that allows the device to specify positions in a plane.

The invention is related to the use of computer system 3100 for automatic software production. According to one embodiment of the invention, automatic software production is provided by computer system 3100 in response to processor 3104 executing one or more sequences of one or more instructions contained in main memory 3106. Such instructions may be read into main memory 3106 from another computer-readable medium, such as storage device 3110. Execution of the sequences of instructions contained in main memory 3106 causes processor 3104 to perform the process steps described herein. One or more processors in a multi-processing arrangement may also be employed to execute the sequences of instructions contained in main memory 3106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 3104 for execution. Such a medium may take many forms, including but not limited to, non-volatile media, volatile media, and transmission media. Non-volatile media include, for example, optical or magnetic disks, such as storage device 3110. Volatile media include dynamic memory, such as main memory 3106. Transmission media include coaxial cables, copper wire and fiber optics, including the wires that comprise bus 3102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 3104 for execution. For example, the instructions may initially be borne on a magnetic disk of a remote computer. The remote computer can load the instructions into its dynamic memory and send the instructions over a telephone line using a modem. A modem local to computer system 3100 can receive the data on the telephone line and use an infrared transmitter to convert the data to an infrared signal. An infrared detector coupled to bus 3102 can receive the data carried in the infrared signal and place the data on bus 3102. Bus 3102 carries the data to main memory 106, from which processor 104 retrieves and executes the instructions. The instructions received by main memory 106 may optionally be stored on storage device 3110 either before or after execution by processor 3104.

Computer system 3100 also includes a communication interface 3118 coupled to bus 3102. Communication interface 3118 provides a two-way data communication coupling to a network link 3120 that is connected to a local network 3122. For example, communication interface 3118 may be an integrated services digital network (ISDN) card or a modem to provide a data communication connection to a corresponding type of telephone line. As another example, communication interface 3118 may be a local area network (LAN) card to provide a data communication connection to a compatible LAN. Wireless links may also be implemented. In any such implementation, communication interface 3118 sends and receives electrical, electromagnetic or optical signals that carry digital data streams representing various types of information.

Network link 3120 typically provides data communication through one or more networks to other data devices. For example, network link 3120 may provide a connection through local network 3122 to a host computer 3124 or to data equipment operated by an Internet Service Provider (ISP) 126. ISP 126 in turn provides data communication services through the worldwide packet data communication network, now commonly referred to as the "Internet" 3128. Local network 3122 and Internet 3128 both use electrical, electromagnetic or optical signals that carry digital data streams. The signals through the various networks and the signals on network link 3120 and through communication interface 3118, which carry the digital data to and from computer system 3100, are exemplary forms of carrier waves transporting the information.

Computer system 3100 can send messages and receive data, including program code, through the network(s), network link 3120, and communication interface 3118. In the Internet example, a server 3130 might transmit a requested code for an application program through Internet 3128, ISP 126, local network 3122 and communication interface 3118. In accordance with the invention, one such downloaded application provides for automatic software production as described herein. The received code may be executed by processor 3104 as it is received, and/or stored in storage device 3110, or other non-volatile storage for later execution. In this manner, computer system 3100 may obtain application code in the form of a carrier wave.

Conceptual Overview

Figure 31:
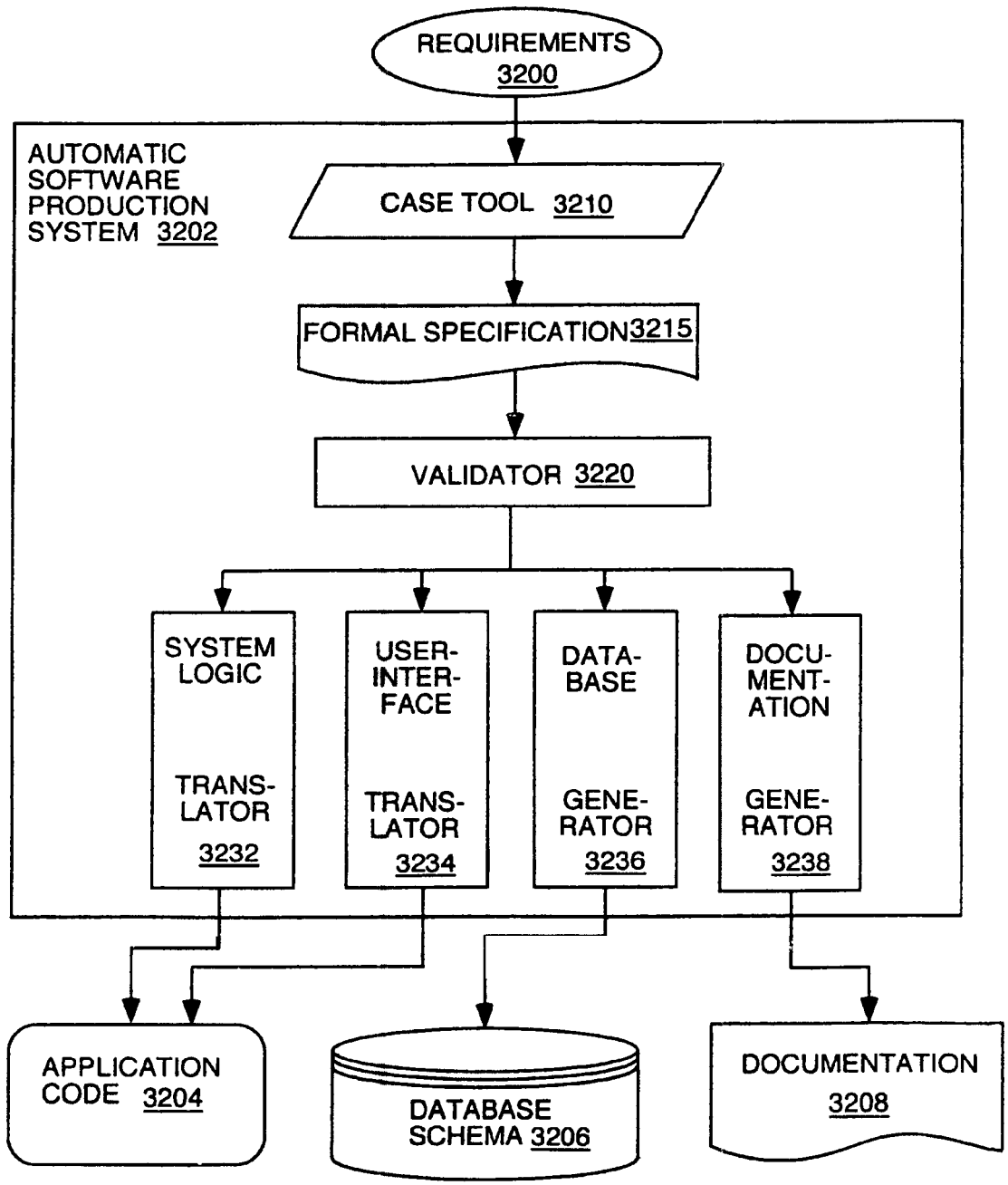
FIG. 31 is a schematic block diagram illustrating the high-level architecture and data flows of an automatic software production system in accordance with one embodiment of the present invention.

FIG. 31 is a schematic block diagram illustrating the high-level architecture and data flows of an automatic software production system 3202 in accordance with one embodiment of the present invention. The automatic software production system 3202 is configured to accept requirements 3200 as input, and produce a complete, robust application 3204 (including both system logic and user-interface code), a database schema 3206, and documentation 3208. In one implementation, the automatic software production system 3202 includes a Computer Aided Software Engineering (CASE) tool 3210 front end to allow a user to input the requirements, a validator 3220 for validating the input requirements 3200, and several translators to convert the validated input requirements 3200 into a complete, robust application 204. These translators may include a system logic translator 3232, a user-interface translator 3234, a database generator 3236, and a documentation generator 3238.

During operation of one embodiment, requirements 3200 specifying a Conceptual Model for the application are gathered using diagrams and textual interactive dialogs presented by the CASE tool 3210. Preferably, the CASE tool 3210 employs object-oriented modeling techniques to avoid the complexity typically associated with the use of purely textual formal methods. In one implementation, the Conceptual Model is subdivided into four complementary models: an object model, a dynamic model, a functional model, and a presentation model. These models are described in greater detail hereinafter. After gathering the requirements 3200, the CASE tool 3210 stores the input requirements as a formal specification 3215 in accordance with a formal specification language, for example, the OASIS language, which is an object-oriented language for information systems developed at developed at the Technical University of Valencia, Spain. Using extended grammar defined by the formal language, the validator 3220 syntactically and semantically validates the formal specification 3215 to be correct and complete. If the formal specification 3215 does not pass validation, no application is allowed to be generated; therefore, only correct and complete applications are allowed be generated.

If, on the other hand, the formal specification 3215 does indeed pass validation, automatic software production processes, some of the referred to as "translators" (system logic and user interface ones) are employed to implement a precise execution model that corresponds to the validated formal specification 3215. In particular, translators 3232 and 3234 produce application source code 3204 in a high-order language such as C++, Visual Basic or JAVA for the application's system-logic and user-interface, respectively. In one implementation, a database generator 236 also produces instructions in, for example, a Structure Query Language (SQL) scripting language to create the data model for the application in an industry-standard ANSI-92 SQL Relational Database Management System (RDBMS). However, in other embodiments, the database translator 3236 just outputs a file having a file structure that is known to the system logic created by the system logic translator 3232. Basically, the structure of the database or table or other data structure that database generator 3236 creates is defined by the objects and classes defined in the Conceptual Model. The only thing that is necessary is that translator 3236 provide at least a place to store the states of the objects in the system as defined by their attribute values and that the attribute values be stored in some format known to the system logic translator such that the values of attributes can be retrieved from whatever data structure is created by translator 3236. In other species, the database generator creates a data structure defined by the Conceptual Model as well as for storing other data from other sources or entered by remote client computers for use by the code created by the system logic translator 3232.

In addition, one implementation also employs a document generator 3238 to automatically generate serviceable system documentation from the information introduced in the Conceptual Model.

Case Modeler

As mentioned herein above, the CASE tool 3210 preferably employs object-oriented modeling techniques to avoid the complexity typically associated with the use of purely textual formal methods. Rather, four complementary models, that of the object model, the dynamic model, the functional model and the presentation model, are employed to allow a designer to specify the system requirements. In contrast with conventional techniques, however, the CASE tool 3210 actually captures a formal specification of the designer's system "on the fly" according to a formal specification language, while the designer is specifying the system with the CASE tool 3210.

This feature enables the introduction of well-defined expressions in the specification, which is often lacking in the conventional methodologies. In particular, the CASE tool 3210 enforces the restriction that only the information relevant for filling a class definition in the formal specification language can be introduced. The use of a formal specification, input by means of the CASE tool 3210, therefore provides the environment to validate and verify the system in the solution space, thereby obtaining a software product that is functionally equivalent to the specification as explained hereinafter. Nevertheless this is always done preserving this external view which is compliant with the most extended modeling techniques, as stated before. In this way, the arid formalism characteristic of many conventional approaches is hidden from the designer, who is made to feel comfortable using a graphical modelling notation.

With respect to the notation, conceptual modelling in one embodiment employs diagrams that are compliant with the Unified Modelling Language (UML); thus, system designers need not learn another graphical notation in order to model an information system. In accordance with the widely accepted object oriented conceptual modeling principles, the Conceptual Model is subdivided into an object model, a dynamic model, and a functional model. These three models, however, are insufficient by themselves to specific a complete application, because a complete application also requires a user interface. Therefore, the CASE tool 3210 also collects information about user-interface patterns, in a fourth model referred to as "Presentation Model", which will be translated into the code for the application. In one embodiment, the CASE tool 3210 collects information organized around projects which correspond to different applications. Each project built by the CASE tool 3210 can include information about classes, relationships between classes, global transactions, global functions, and views.

"Each class contains attributes, services, derivations, constraints, transaction formulas, triggers, display sets, filters, population selection patterns, a state transition diagram and formal interfaces. In addition to the information in these lists, a class can also store a name, alias and a default population selection interface pattern. Extra information is stored as remarks that the designer can input information about why a class does exist in a model.

Each attribute can have the following characteristics: name, formal data type (e.g. constant, variable, derived), data type (real, string, . . . ), default value, whether the attribute is an identifier for distinguishing the objects of the class, length, whether the attribute is required when the object is created, whether the attribute can be assigned a NULL value, and a field to introduce some remarks about why the attribute has been created. Each attribute can also include a list of valuations, which are formulas that declare how the object's state is changed by means of events. Valuation formulas are structured in the following parts: condition (that must be satisfied to apply the effect), event and effect of the event to the particular attribute. An attribute may also include user interface patterns belonging to the presentation model to be applied in the corresponding services arguments related to the attribute.

Services can be of two types: events and transactions. Events are atomic operations while transactions are composed of services which can be in turn events or transactions. Every service can have the following characteristics: name, type of service (event or transaction), service alias, remarks and a help message. Events can be of three types: new, destroy or none of them. Events can also be shared by several classes of the project. Shared events belong to all classes sharing them. Transactions have a formula that expresses the composing of services. In addition to this information, services store a list of arguments whose characteristics are: name, data type, whether nulls are allowed as a valid value, whether the argument represents a set of objects (collection), default value, alias and remarks. Additionally, for each argument user-interface patterns related to arguments are: introduction pattern, population selection pattern, defined selection pattern and dependency pattern. The class can also store a list of derivations, and constraints. Each derivation specifies a list of pairs condition-formula, specifying which formula will be applied under every condition. Each constraint is a well formed formula plus the error message that will be displayed when the constraint was violated. For the dynamic constraints, the formula will be internally translated into a graph which constitutes the guide for its evaluation.

A class can also store triggers. Each trigger may be composed of trigger target specified in terms of self, class or object, trigger condition, triggered action (service plus a list of possible agents) to be activated and a list of default values associated with the arguments of the related service. A class can also have display sets, filters and population selection patterns as user-interface patterns of the presentation model affecting the class. Each display set can store elements of visualization (attributes to be displayed to the user). Each filter is composed of a well formed formula and a list of auxiliary variables that are useful to define the formula. The population selection pattern is related to a display set and a filter.Classes also have a State Transition Diagram which is a set of states and transitions between them. Each state transition is related to an action (service plus list of possible agents) that can change the state of the object. Actions may have preconditions and the corresponding error message (to be displayed if the precondition does not hold). Preconditions are formulas that need to be satisfied in order to execute the corresponding action. In case of non-deterministic transitions, determinism is achieved by means of labelling each transition with a control condition. A control condition is a formula that specifies which state transition will take effect. Finally, a class can store a list of interfaces. Each interface stores the list of services that an actor can execute (agents) and the list of attributes that can be observed.

The model also maintains information on relationships between classes, which can be of two types: aggregation and inheritance. Each aggregation relationship captures the information about cardinalities, whether the aggregation is static or dynamic, whether the aggregation is inclusive or referential, whether the aggregation has an identification dependence, and a grouping clause when the aggregation is multi-valued. Each inheritance relationship stores the name of the parent class, the name of the child class and whether the specialization is temporary or permanent. Finally, if the specialization is permanent it stores a well formed formula on constant attributes as specialization condition. If the specialization is temporary it stores either condition or the list of events that activate/deactivate the child role.

Finally, the project can also capture a list of global transactions in which the relevant characteristics to be stored include the name of the global interaction, the formula, and the list of arguments. A list of global functions can also be captured, in which each function stores a name, a data type of the returned value, a set of arguments (similar to services), and comments about the function.

A project may have a set of views, that constitute the particular vision that a set of selected agent classes has of the system. That is, the set of formal interfaces (attributes and services) allowed per agent class. Each agent class has a list of interfaces.

Object Model

The object model is a graphical model that allows the system designer to specify the entities employed in the application in an object-oriented manner, in particular, by defining classes for the entities. Thus, the class definitions include, for example, attributes, services and class relationships (aggregation and inheritance). Additionally, agent relationships are specified to state which services that objects of a class are allowed to activate.

Figure 32:
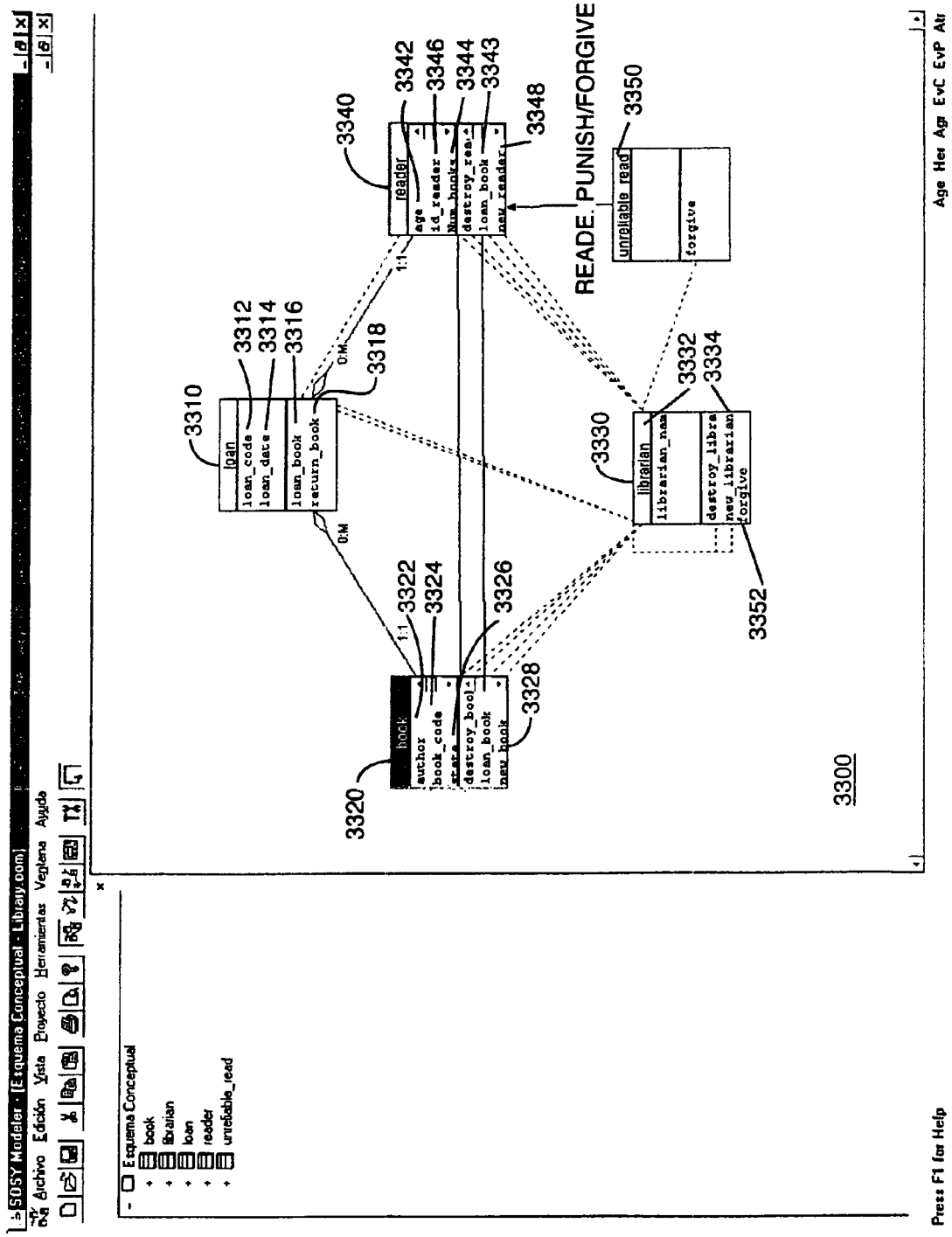
FIG. 32 illustrates an example of an object model for a library system with readers, books, and loans.

FIG. 32 illustrates an example of an object model diagram 3300 for the library system example with readers, books, and loans which shows the agent relationships between classes. An agent relationship between classes means one class can invoke the services of another class. FIG. 32 is included here to show that classes have attributes and services and they have relationships to other classes. Classes, in the object model 3300, are represented as rectangles with three areas: the class name, the attributes and the services. In the example, the object model 3300 includes a loan class 3310 with attributes to indicate a loan code 3312 and a loan date 3314 for when the loan was made. The loan class 3310 also includes two services (methods) including one for loaning a book 3316 and another for returning the book 3318.

The object model 3300 also includes a book class 3320 having attributes that specify the author 3322 of the book, a book code 3324, and a state 3326 (e.g. reserved, in circulation, checked out, etc.) and services such as new_book 3328 for creating a new book. Another class is a librarian class 3330, whose name 3332 is specified by an attribute and whose creation is done by a new_librarian service 3334.

Each reader belonging to the library is described with the reader class 3340, whose attributes include the age 3342, the number of books 3344 checked out by the reader, and the name 3346 of the reader. Readers may be created with a new_reader service 3348. An unreliable reader class 350 is also part of the object model to indicate for those readers 3340 who cannot be trusted (e.g. due to unpaid fees for overdue books). An unreliable reader 3350 may be forgiven 3352 by a librarian 3330.

In an object model 3300, inheritance relationships are represented by using arrows to link classes. For example, the unreliable reader class 3350 is connected to the reader class 3340 with an arrow; thus, the unreliable reader class 3350 is specified to inherit from, or in other terms is a subclass of, the reader class 3340. The arrow linking the subclass and the base class can be leveled with a specialization condition or an event that activates or cancels the child role. In the exemplary object model 3300, the arrow between the unreliable reader class 3350 and the reader class 3340 is labeled with a "reader.punish/forgive" service. Thus, if a reader 3340 is punished, that person becomes an unreliable reader 3350. Conversely, if an unreliable reader 3350 is forgiven 3352, that person becomes a normal reader 3340.

In an object model 3300, inheritance relationships are represented by using arrows to link classes. For example, the unreliable reader class 3350 is connected to the reader class 3340 with an arrow; thus, the unreliable reader class 3350 is specified to inherit from, or in other terms is a subclass of, the reader class 3340. The arrow linking the subclass and the base class can be leveled with a specialization condition or an event that activates or cancels the child role. In the exemplary object model 3300, the arrow between the unreliable reader class 3350 and the reader class 3340 is labeled with a "reader.punish/forgive" service. Thus, if a reader 3340 is punished, that person becomes an unreliable reader 3350. Conversely, if an unreliable reader 3350 is forgiven 352, that person becomes a normal reader 3340.

Aggregation relationships are represented in the object model 3300 by using a line with a diamond.

The class which has a diamond closest to it is called the composite class and the other class is the component class. The aggregation determines how many components can be attached to a given composite and vice versa (cardinality is the minimum and maximum numbers of components and composites that can participate in the relationship). In the example, a book 3320 and a reader 3340 are aggregated in a loan 3310, because a loan 3310 involves lending a book 3320 to a reader 3340 of the library. "The representation of aggregation also includes its cardinalities in both directions (i.e. minimum and maximum numbers), role names, and relationship name. In the example, the cardinality of the loan:book relationship from loan to book is 1:1 because exactly one book is the subject of a loan in this Conceptual Model, and from book to loan is 0:1 because a book can be lent or not in a certain moment."

"Furthermore, agent relationships are represented by using dotted lines that connect the associated client class and services of the server class."

In the example, a librarian 3330 is an agent of a forgive service 3352 of the unreliable reader class 3350; thus, there is a dotted line between the forgive service 3352 and the librarian class 3330. As another example, readers 3340 are agents of the loan book 3316 and return book 3318 services.

"Finally, shared events are represented by using solid lines that connect the associated events between two classes. In the example, the loan_book event is a shared event due to the solid line connecting said events in the book class 3320 and the reader class 3340."

Additional information in the object model is specified to complete the formal description of the class. Specifically, for every class in the object model, the following information is captured as shown in TABLE 1.

TABLE 1

| ITEM | DESCRIPTION |
| --- | --- |
| Attributes | All the aforementioned properties and/or characteristics |
| Services | All the aforementioned properties and/or characteristics |
| Derivations | derivation expressions for the derived attributes (those whose value is dependent on other attributes) |
| Constraints | well-formed formulas stating conditions that objects of a class must satisfy |

TABLE 1-continued

| ITEM | DESCRIPTION |
| --- | --- |
| Complex Relationships | specific information associated to aggregation and inheritance hierarchies |
| Agents | services that can be activated by this class |

Additional information associated with aggregation and inheritance is also collected. For aggregated classes, the additional information can specify if the aggregation is an association or a composition in accordance with the UML characterization, or if the aggregation is static or dynamic. For inheritance hierarchies, the additional information can specify if a specialization produced by the inheritance is permanent or temporal. If the specialization is permanent, then the corresponding conditions on the constant attributes must characterize the specialization relationship. On the other hand, if the specialization is temporary, then the condition based on variable attributes or the events that activate/deactivate the child role must be specified.

Some applications may require a large number of classes to fully specify. In this case, classes may be gathered into clusters. Clusters make it easier for the designer or system analyst to understand the application, one cluster at a time. Thus, clusters help reduce the complexity of the view of the object model.

Dynamic Model

The system class architecture is specified with the object model. Additional features, however, such as which object life cycles can be considered valid, and which inter-object communication can be established, also have to be input in the system specification. For this purpose, a dynamic model is provided.

The dynamic model specifies the behavior of an object in response to services, triggers and global transactions. In one embodiment, the dynamic model is represented by two diagrams, a state transition diagram and an object interaction diagram.

The state transition diagram (STD) is used to describe correct behavior by establishing valid object life cycles for every class. A valid life refers to an appropriate sequence of states that characterizes the correct behavior of the objects that belong to a specific class. Transitions represent valid changes of state. A transition has an action and, optionally, a control condition or guard. An action is composed of a service plus a subset of its valid agents defined in the Object Model. If all of them are marked, the transition is labeled with an asterisk (*). Control conditions are well formed formulas defined on object attributes and/or service arguments to avoid the possible non-determinism for a given action. Actions might have one precondition that must be satisfied in order to accept its execution. A blank circle represents the state previous to existence of the object. Transitions that have this state as source must be composed of creation actions. Similarly, a bull's eye represents the state after destruction of the object. Transitions having this state as destination must be composed of destruction actions. Intermediate states are represented by circles labeled with an state name.

Figure 33A:
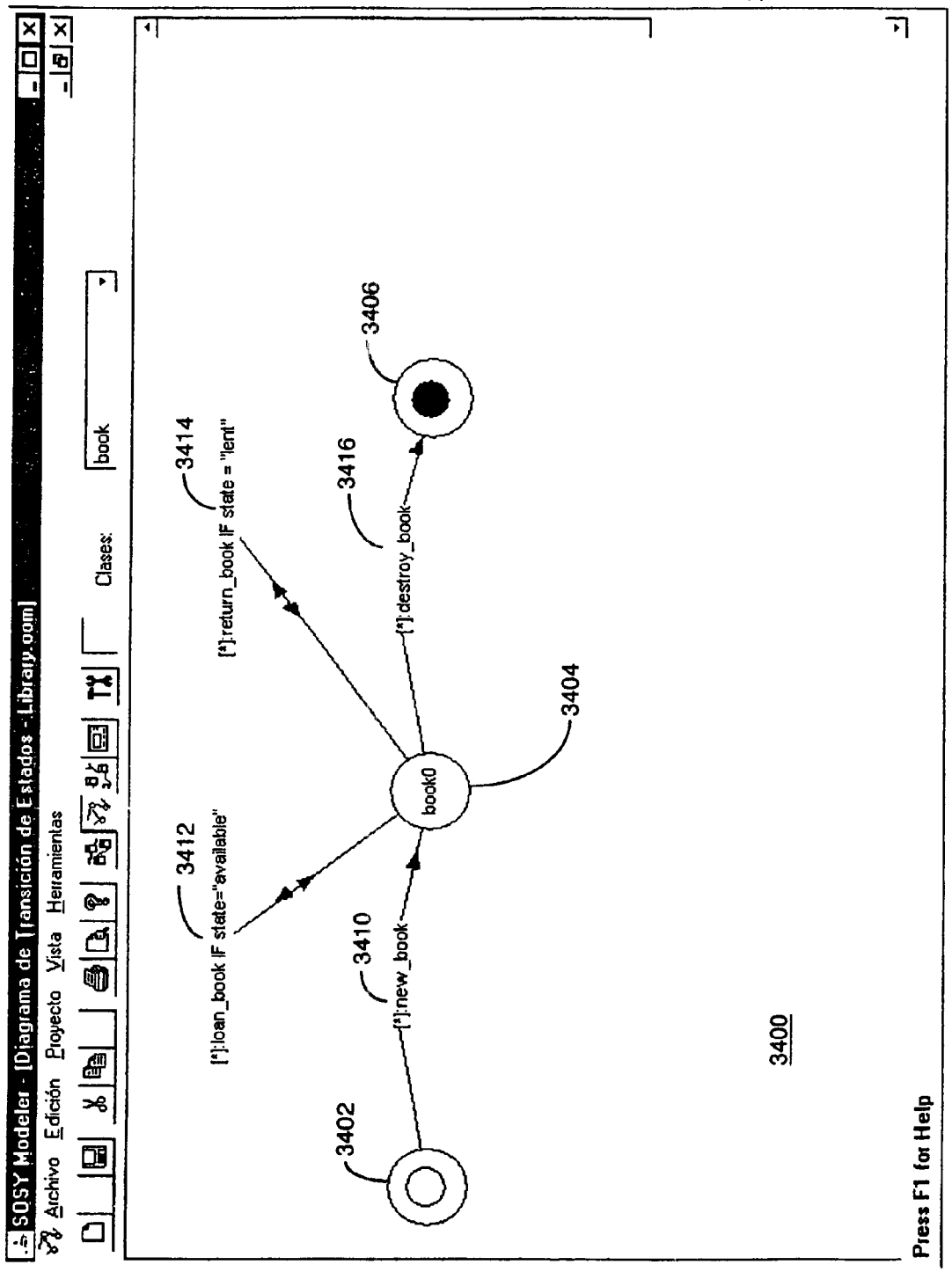
FIG. 33A illustrates an exemplary state transition diagram in accordance with one embodiment of the present invention.

Accordingly, the state transition diagram shows a graphical representation of the various states of an object and transitions between the states. FIG. 33A illustrates an exemplary state transition diagram 3400 in accordance with one embodiment of the present invention. States are depicted in the exemplary state transition diagram 3400 by means of a circle labeled with the state name. Referring to FIG. 33A, the "book0" state 3404 is indicated by a circle with the name "book0." Before an object comes into existence, a blank circle 3402 is used to represent this "state" of nonexistence, "which is the source of the initial transition 3410 labeled by a corresponding creation action. A bull's eye 3406 is used to represent the state after which an object has been destroyed, as by a transition 3416 occasioned by the [*]: destroy_book action."

Transitions are represented by solid arrows from a source state to a destination state. The middle of the transition arrow is labeled with a text displaying the action, precondition and guards (if proceedsany). In the example, transition 3412 is labeled with a loan_book action associated with the transition 412 and a precondition 'if state="available". Thus, the system will only accept the execution of the action if the state attribute of the book is "available." In other words, the Conceptual Model requires that a book can only be loaned if the book is available. "As another example, transition 3414 is labeled with a return_book action associated with the transition 3414" and a precondition 'if state="lent"'. In other words, the Conceptual Model requires that a book can only be returned if the book has been lent.

The object interaction diagram specifies interobject communication. Two basic interactions are defined: triggers, which are object services that are automatically activated when a pre-specified condition is satisfied, and global transactions, which are themselves services involving services of different objects and or other global transactions. There is one state transition diagram for every class, but only one object interaction diagram for the whole Conceptual Model, where the previous interactions will be graphically specified.

In one embodiment, boxes labeled with an underlined name represent class objects. Trigger specifications follow this syntax: destination::action if trigger-condition. The first component of the trigger is the destination, i.e., the object(s) to which the triggered service is addressed. The trigger destination can be the same object where the condition is satisfied (i.e. self), a specific object, or an entire class population if broadcasting the service. Finally, the triggered service and its corresponding triggering relationship are declared. Global Transactions are graphically specified by connecting the actions involved in the declared interaction. These actions are represented as solid lines linking the objects (boxes) that provide them.

Figure 33B:
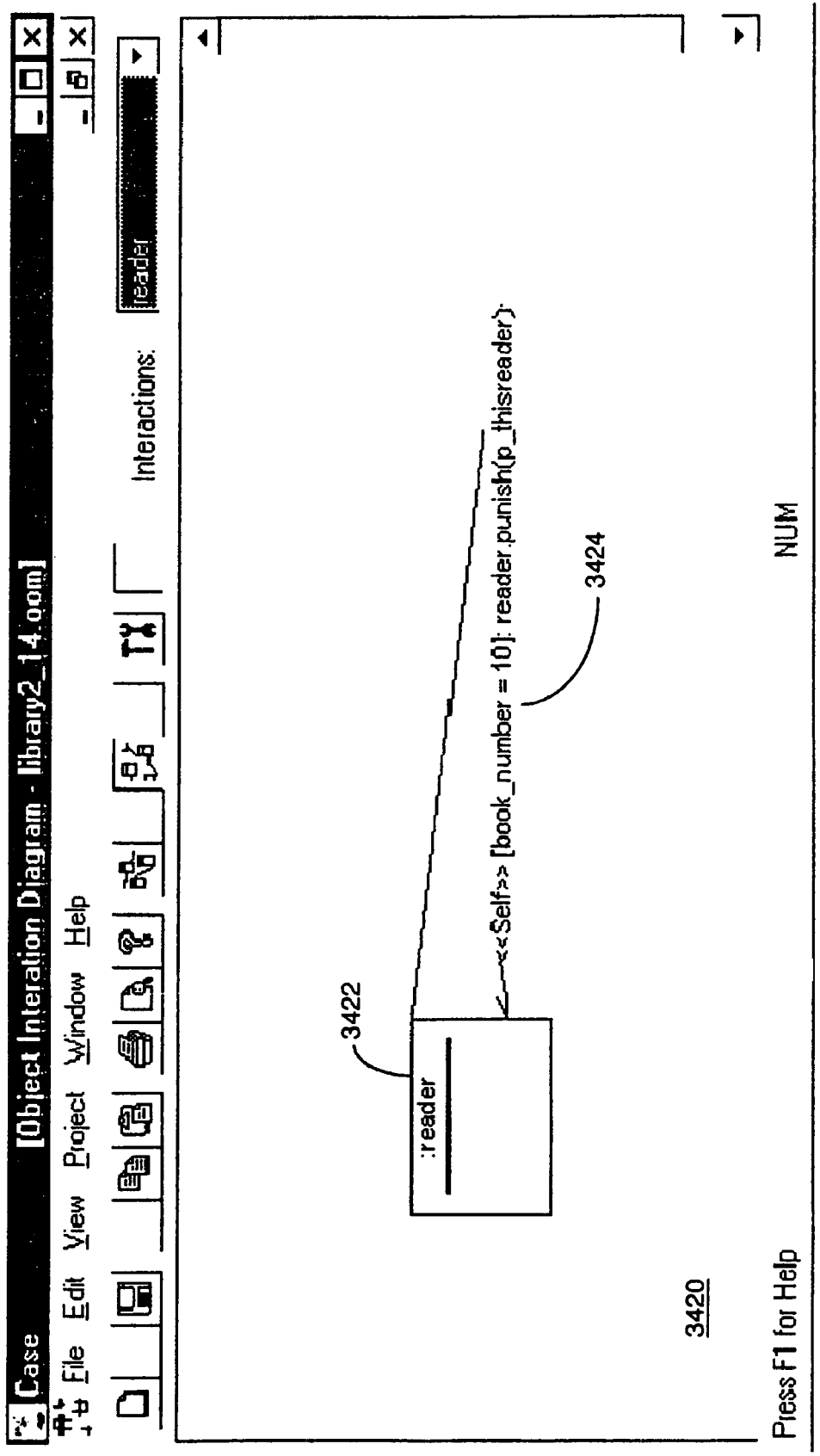
FIG. 33B illustrates an exemplary object interaction diagram in accordance with one embodiment of the present invention.

Accordingly, communication between objects and activity rules are described in the object interaction diagram, which presents graphical boxes, graphical triggers, and graphical interactions. FIG. 33B illustrates an exemplary object interaction diagram 3420 in accordance with one embodiment of the present invention.

In the object interaction diagram 3420, the graphical interactions are represented by lines for the components of a graphical interaction. Graphical boxes, such as reader box 3422, are declared, in this case, as special boxes that can reference objects (particular or generic) such as a reader. Graphical triggers are depicted using solid lines that have a text displaying the service to execute and the triggering condition. Components of graphical interactions also use solid lines. Each one has a text displaying a number of the interaction, and the action that will be executed. In the example, trigger 3424 indicates that the reader punish action is to be invoked when the number of books that a reader is currently borrowing reaches 10.

Functional Model

Many conventional systems take a shortcut when providing a functional model, which limits the correctness of a functional specification. Sometimes, the model used breaks the homogeneity of the object-oriented models, as happened with the initial versions of OMT, which proposed using the structured DFDs as a functional model. The use of DFD techniques in an object modeling context has been criticized for being imprecise, mainly because it offers a perspective of the system (the functional perspective), which differs from the other models (the object perspective). Other methods leave the free-specification of the system operations in the hands of the designer, which leads to inconsistencies.

One embodiment of the present system, however, employs a functional model that is quite different with respect to these conventional approaches. In this functional model, the semantics associated with any change of an object state is captured as a consequence of an event occurrence. Basically, the functional model allows a SOSY modeler to specify a class, an attribute of that class and an event of that class and then define a mathematical or logical formula that defines how the attribute's value will be changed when this event happens. An "event" as used in the claims means a single service and not a transaction which is defined as a composed or complex service (which means more than one service executes). In the preferred embodiment, condition-action pair is specified for each valuation. The condition is a single math or logic formula is specified which specifies a condition which results in a value or logical value which can be mapped to only one of two possible values: true or false. The action is a single math or logical formula which specifies how the value of the attribute is changed if the service is executed and the condition is true. In other embodiments, only a single formula that specifies the change to the attribute if the service is executed is required.

The functional model is built in the preferred embodiment by presenting a dialog box that allows the user to choose a class, an attribute of that class and a service of that class and then fill in one or more formula or logical expressions (condition-action or only action) which controls how the value of that attribute will be changed when the service is executed. The important thing about this is that the user be allowed to specify the mathematical or logical operation which will be performed to change the value of the attribute when the service is executed, and it is not critical how the user interface is implemented. Any means to allow a user to specify the class, the attribute of that class and the service of that class and then fill in a mathematical or logical expression which controls what happens to the specified attribute when the service is executed will suffice to practice the invention. Every one of these mathematical expressions is referred to as a valuation. Every valuation has to have a condition and action pair in the preferred embodiment, but in other species, only an action need be specified. The condition can be any well formed formula resulting in a Boolean value which can be mapped to only one of two possible conditions: true or false. The action specified in the pair is any other well-formed mathematical and/or logical formula resulting in a new value for the variable attribute, said new value being of the attribute's same data type (type of data of action must be compatible with the type of data of the attribute). This valuation formula can be only mathematical or only a Boolean logical expression or a combination of both mathematical operators and Boolean logical expressions.

Regardless of the user interface used to gather data from the user to define the valuations in the functional model, all species within the genus of the invention of generating functional models will generate a data structure having the following content: data defining the valuation formula which affects the value of each variable attribute (the data that defines the valuation formula identifies the service and the attribute affected and the mathematical and/or logical operations to be performed and any operands needed). This data structure can be any format, but it must contain at least the above identified content.

To define the functional model, the following information is declaratively specified by the SOSY modeler: how every event changes the object state depending on the arguments of the involved event, and the object's current state. This is called "valuation".

In particular, the functional model employs the concept of the categorization of valuations. Three types of valuations are defined: push-pop, state-independent and discrete-domain based. Each type fixes the pattern of information required to define its functionality.

Push-pop valuations are those whose relevant events increase or decrease the value of the attribute by a given quantity, or reset the attribute to a certain value.

State-independent valuations give a new value to the attribute involved independently of the previous attribute's value.

Discrete-domain valuations give a value to the attributes from a limited domain based on the attribute's previous value. The different values of this domain model the valid situations that are possible for the attribute.

To illustrate these features, TABLE 2 shows a functional model for a "book number" attribute 3344 of the reader class 3340, in a Conceptual Model representing a typical library.

TABLE 2

| CLASS: Reader ATTRIBUTE: book_number CATEGORY: push-pop | | |
|---|---|---|
| Event | Quantity | Effect |
| loan( ) | 1 | Increase |
| Return( ) | 1 | Decrease |

These valuations are categorized as a push-pop because their relevant events increase or decrease the value of the book_number attribute 3344 by a given quantity (1). In the example, its related event loan( ) has the increasing effect and return( ) has the decreasing effect.

Figure 34:
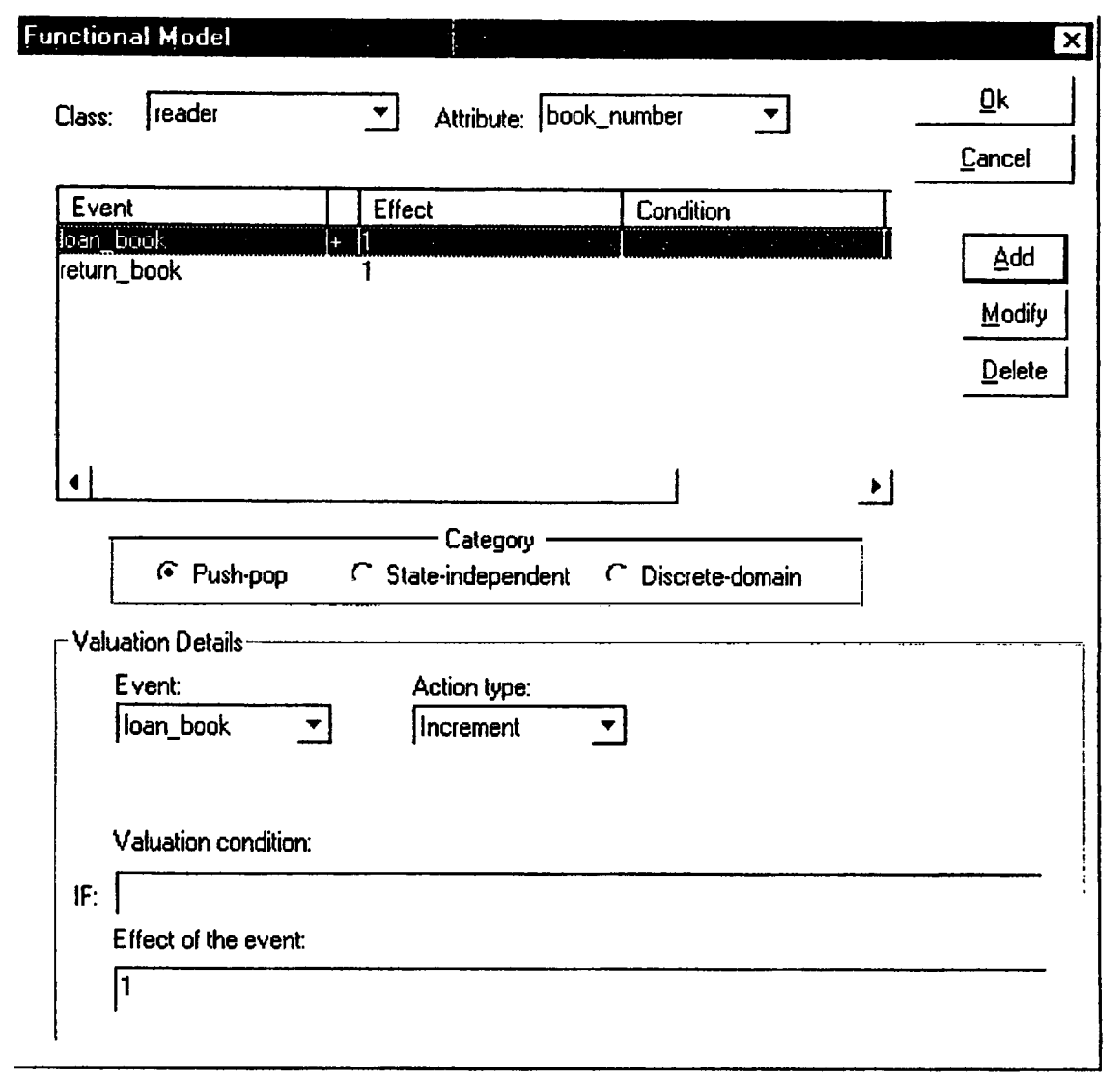

This categorization of the valuations is a contribution of one aspect of the present invention that allows a complete formal specification to be generated in an automated way, completely capturing a event's functionality Accordingly, the functional model is responsible for capturing the semantics of every change of state for the attributes of a class. It has no graphical diagram. Textual information is collected through an interactive dialog that fills the corresponding part of the Information Structures explained before. FIG. 34 illustrates an exemplary dialog for receiving input for the functional model.

Presentation Model

The presentation model is a set of pre-defined concepts that can be used to describe user interface requisites. These concepts arise from distilling and abstracting repetitive scenarios in developing the user interfaces. These abstractions of the repetitive scenarios are called patterns. A set of patterns is called a pattern language.

In this sense, the presentation model is a collection of patterns designed to reflect user interfaces requirements. A pattern is a clear description of a recurrent problem with a recurrent solution in a given restricted domain and giving an initial context. The documented patterns abstract the essence of the problem and the essence of the solution and therefore can be applied several times to resolve problems that match with the initial context and domain. The pattern language is composed of a plurality of patterns. The present invention is not limited to any particular list of patterns, but the following is a brief description of some user interface patterns that have been found to be useful: Service Presentation pattern, Instance Presentation pattern, class Class Population Presentation pattern, Master-Detail Presentation pattern and Action Selection Presentation pattern.

A Service Presentation pattern captures how a service will enquire data to obtain data from the final user. This patterns controls the filling out of service arguments and contains actions to launch the service or to exit performing no action. It is based on other lower level patterns that refer to more specific interface tasks like:

An Introduction Pattern that handles with restrictions to input data that must be provided to the system by the final user (i.e., the user who employs the final application). In particular, edit-masks and range-values are introduced, constraining the values that can validly be input in the interface. In this manner, the user-entry errors are reduced. This pattern can be applied to arguments in services or to attributes in classes to improve data input process through validating input arguments.

A Defined Selection pattern that specifies a set of valid pre-specified values for an argument. When the input data items are static, are a few, and are well known, the designer can declare by enumeration a set containing such valid values. This pattern is similar to those that define an enumerated type and an optional default value. Accordingly, the final user can only select an entry from the pre-specified set of valid values, thereby reducing error prone input. For example, one representation of this pattern could be a Combo-Box. This pattern can be applied to arguments in services or to attributes in classes to improve data input process.

A Population Selection pattern that handles the situation of observing and selecting objects in a multiple objects society. Specifically, this pattern contains a filter, a display set, and an order criterion, which respectively determine how objects are filtered (Filter Expression), what data is displayed (Display Set), and how objects are ordered (Order Criteria). This pattern may be thought of as a an SQL Select statement with columns, where ??? and order by clauses ???, and can be applied to object-valuated arguments in services whenever it is possible to select an object from a given population of living objects.

A Dependency Pattern, that is a set of Event-Condition-Action (ECA) rules allowing the specification of dependency rules between arguments in services. When arguments are dependent on others, these constraints use this kind of rules.

A Status Recovery pattern, that is an implicit pattern that recovers data from object attributes to initialize service arguments. This can be modeled as an implicit set of dependency patterns. For example, to change the data associated of a Customer object, a form to launch the change service appears. If the user provides the Customer OID (Object Identifier), the interfaces can use this OID to search the object and recover the data associated to the Customer, such as name, telephone, address, etc.

A Supplementary information Information pattern, that handles with feedback data that must be provided to final users in order to assure they choose or input the correct OID (object identified) for an existent object. For example, to select a Customer, an OID must be provided. If the name of the Customer is automatically displayed as an answer to an OID input, the user receives a valuable feedback data that assures him in selection or corrects the input data.

The supplementary information pattern is applicable to object-valuated arguments.

An Argument Grouping Presentation pattern, that captures how to group the requested service arguments according to the user wishes.

An Instance Presentation pattern captures how the properties of an object will be presented to the final user. In this context, the user will be able to launch services or to navigate to other related objects. The instance Instance presentation Presentation pattern is a detailed view of an instance.

A Class population Population Presentation pattern captures how the properties of multiple objects of one class will be presented to the final user. In this context, once an object is selected, the final user will be able to launch a service or to navigate to other related objects. The objects can also be filtered.

A Master-Detail Presentation pattern captures how to present a certain object of a class including other related objects that may complete the full detail of the object. To build this pattern the following patterns are used: Instance Presentation, Class Population presentation Presentation and, recursively, Master-Detail presentation. In this manner, multi-detail (multiples details) and multi-level master-detail (multiples levels recursively) can be modeled. For example, one scenario involves an invoice header followed by a set of invoice lines related to the invoice.

An Action Selection pattern captures how the services are going to be offered to final users following the principle of gradual approach. This pattern allows, for example, generating menus of application using a tree structure. The final tree structure will be obtained from the set of services specified in the classes of the Conceptual Model. The user could launch services or queries (observations) defined in the Conceptual Model.

A Filter Expression is a well-formed formula that evaluates to a Boolean type. This formula is interpreted as follows: the objects that satisfy the formula pass the filter; the ones that do not fulfill the condition do not pass the filter. Consequently, the filter acts like a sift that only allows objects that fulfill the formula to pass. These formulas can contain parameters that are resolved at execution time, providing values for the variables or asking them directly to the final user. A filter pattern may be thought of as an abstraction of a SQL where clause, and is applied in a population selection pattern.

A Display Set is an ordered set of attributes that is shown to reflect the status of an object. A Display Set may be thought of as an abstraction of the columns in a SQL clause, and is applied in a population Population selection Selection pattern.

The Order Criterion is an ordered set of tuples that contain: an attribute and an order (ascending/descending). This set of tuples fixes an order criterion over the filtered objects. An order criterion pattern may be thought of as an abstraction of an order by SQL clause, and is applied in a Population Selection pattern.

Formal Specification

The CASE tool 3210, after presenting a user interface for capturing system requirements 3200, converts the system requirements into a formal specification 3215 in a formal language having a syntax and semantics that are known to the validator 3220. Although the formal specification 3215 must be in a formal language, it need not be in a known formal language, and any formal language including newly invented formal languages will suffice. The only thing that is necessary to practice the invention is that the syntax and semantics of whatever formal language in which formal specification 3215 is written, the validator 3220 must know that syntax and semantics be known to the validator 3220 so that it may validate the formal specification for completeness, mathematical and semantic and syntactical correctness and lack of ambiguity. In particular the CASE tool 3210 builds upon the previously described models as a starting point and automatically generates a corresponding formal and object-oriented specification 3215, which acts as a high-level system repository. In a preferred embodiment, the formal language being employed is OASIS, in its version 2.2, published in October 1995 by the "Servicio de Publicaciones de la Universidad Politecnica de Valencia" (legal deposit number: V-1285-1995).

Conversion of captured system requirements 3200 into a formal language specification 3215 is a main feature of one aspect of the invention performed in the preferred embodiment: each piece of information introduced in the conceptual modeling step has a corresponding formal language counterpart, which is represented as formal language statements having syntax and semantics known to the validator. The graphical modeling environment associated with one embodiment of the invention may be thus viewed as an advanced graphical editor and composition tool to allow a SOSY modeler to graphically generate images and data structures through a graphical user interface which are then converted (on a real time basis) into a formal language specification which may be validated.

As an example of syntax and semantics of formal languages and how the validator 3220 can validate such a formal language specification, consider Table 3 below. Table 3 is a formal specification in the OASIS formal language of the reader class of the hypothetical library management application detailed above. TABLE 3 shows a formal specification 3215 for the reader class that was automatically obtained from the Conceptual Model:

TABLE 3

CONCEPTUAL SCHEMA library
domains nat,bool,int,date,string
class reader
identification
by_reader_code: (reader_code);
constant_attributes
age : String;
reader_code : String;
name : String;
variable_attributes
book_count : Int ;
private_events
new_reader( ) new;
destroy_reader( ) destroy;
punish( );
shared_events
loan( ) with book;
return( ) with book;
constraints
static book_count <10;
valuation
[loan( )] book_count = book_count + 1;
[return( )] book_count = book_count − 11;
preconditions
librarian:destroy_reader ( ) if
book_number = 0 ;
triggers
Self :: punish( ) if book_count = 10;
process
reader = librarian:new_reader( ) reader0;
reader0 = librarian:destroy_reader( ) +
loan ( ) reader1;

TABLE 3-continued reader1 = if book_count = 1return( ) reader0
+ (if book_count >1 return( )
+ if book_count <10 loan( )) reader1;
end_class
END CONCEPTUAL SCHEMA Consider the following statement from the high level repository formal specification of Table 3:

[loan( )] book_count=book_count+1;

The semantics of this formal language statement indicate by the 0 that loan is a service which performs the mathematical computation represented by the equation outside the square brackets. This mathematical formula means that the value of the attribute book_count will be incremented by 1 when this service is executed. The formula could be any other formula where one attribute is set equal to the value of another attribute plus the value of some other attribute or user input value. However, to be semantically correct, an integer or floating point number cannot be added to an alphanumeric string or any other type of attribute which has no meaning when attempting to add it to an integer or floating point number.

As another example of validation of the semantics of the formal language specification, when an integer is added to a floating point number, the result must be a floating point number and not an integer.

Another example of validation of the semantics involves verifying that for every attribute that has been defined as a variable, there is a service which changes the value of that attribute. Another example of semantic validation is verifying that for every constant attribute, there is no service which attempts to change its value. Another example of semantic validation is if a service "destroy" erases or eliminates an attribute, it makes no sense to modify the attribute after it no longer exists. The validator would flag as an error any formal specification statement which attempted to do so.

One of the functions of the validator is to check the semantics of every statement to make sure that no mathematical formulas attempt to combine entities that are not mathematically combinable, that combining different types of numbers results in the correct type of output number, that nothing gets divided by zero, and that other operations that are mathematically undefined are not required by the formal specification. Stated another way, one function of the validator is to make sure that every formula is well formed, complete and consistent.

The validator has a number of rules stored in it that are dependent upon the semantics and syntax of the formal language in use. These rules are used to accomplish the purpose of the validator 3220. That purpose is to semantically and syntactically validate every statement of every class definition in the formal specification as well as verifying that the interclass actions between any of the classes are semantically meaningful and syntactically correct. Any process which checks all the formal language statements in the formal specification against at least the pertinent rules to accomplish the above stated purpose will suffice. This can be accomplished after iterative passes or all on one pass. As long as this purpose is accomplished, the details of how it is accomplished are not critical.

The meaning of the different sections that integrate the formal description of the exemplary reader class specification is as follows. A class in OASIS is made up of a class name "reader", an identification function for instances (objects) of the class, and a type or template that all the instances share.

The identification function by_reader_code, characterizes the naming mechanism used by objects and yields a set of surrogates belonging to a predefined sort or to a sort defined by the user (the so-called domains in OASIS). These domains are imported in the class definition. The most usual are predefined as int, nat, real, bool, char, string and date. They represent numbers, boolean values, characters, strings and dates in a particular format. New domains can be introduced in a specification by defining the corresponding abstract data type.

A type is the template that collects all the properties (structure and behavior) which are shared by all the potential objects of the class being considered. Syntactically, the type can be formalized as a signature, which contains sorts, functions, attributes and events to be used, a set of axioms, which are formulas in a dynamic logic, a process query as a set of equations with variables of a sort process that are solved in a given process algebra. When these variables are instantiated, we have the ground terms that represent possible lives of instances (objects).

A class signature contains a set of sorts with a partial order relation. Among this set of sorts is the sort of interest (the class name) associated with the class being defined. A class signature also contains a set of functions including those functions included in the definition of the (predefined) sorts and the identification function whose sort is the ADT (Abstract Data Type) for identities implicitly provided with a class specification. The identification function provides values of a given sort to identify objects in order to assure that any object of a given class has a unique identity. For specification purposes, an identification is an introduced mechanism comprising a declaration of one or more key maps used as aliases for identifying objects. The key maps are similar to the candidate key notion of the relational model. From a given key value, these maps return an associated object identity. Key maps will be declared as (tuples of) constant attributes.

A class signature also contains a set of (constant, variable, and derived) attributes, see constant_attributes and variable_attributes sections in TABLE 3. These attributes all have the sort of the class as domain, and the given sort associated to the attribute being considered as codomain.

A set of events is also contained in the class signature (see private events and shared events in TABLE 3), with the sort of the class as the domain, plus any additional sort representing event information, and with the sort of the class (sort of interest) as the codomain. This so-called sort of interest can be seen as a subsort of a general sort process when objects are viewed as processes.

Each event occurrence is labeled by the agent that is allowed to activate it. When dealing with this actor notion, if the agent x initiates event a is written x:a and called an action; x could be the environment or any object of a system class. In one embodiment, an event always is associated with an agent. When defining an event, the designer is therefore forced to state which agent will be able to activate it. Consequently, a set A of actions may be defined and obtained from and attached to the initial set of events.

In this way, the notion of the set of object services can be represented as an interface that allows other objects to access the state. The object services can be events (server view) or actions (client view) depending on whether these services are offered or requested. Actions become services requested by an object, by which the object can consult or modify states of other objects (or its own state).

In OASIS, there are the following kinds of dynamic formulas (set of class axioms):start here Evaluations are formulas of the form $\Box$ [a] $\Box'$ whose semantics is given by defining a $\Box$ function that, from a ground action [a] returns a function between possible worlds. In other words, being a possible world for an object any valid state, the $\Box$ function determines which transitions between object states are valid after the execution of an action [a]. In the example, there are the following evaluations:

[loan( )] book_count=book_count+1;
[return( )] book_count=book_count−1;

Within this dynamic logic environment, the formula $\Box$ is evaluated in s $\Box$W, and $\Box'$ is evaluated in $\Box$(a), with $\Box$(a) being the world represented by the object state after the execution in s of the action considered.

Derivations are formulas of the type $\Box \rightarrow \Box'$. Theythat define derived attributes $\Box'$ in terms of the given derivation condition (stated in $\Box$). Derivations basically differ from the evaluation formulas in that this derived evaluation is done in a unique state.

Integrity constraints are formulas that must be satisfied in every world. Static and dynamic integrity constraints may be distinguished. Static integrity constraints are those defined for every possible world. They must always hold. On the other hand, dynamic integrity constraints are those that relate different worlds. They require the use of a temporal logic, with the corresponding temporal logic operators.

Preconditions are formulas with the template $\Box\Box$[a]false, where $\Box$ is awhere the formula is one that must hold in the world previous to the execution of action [a]. Only in the worlds where $\Box$ the precondition holds, is [a] allowed to occur. If the precondition$\Box\Box$ holds, the occurrence of [a] gives no state as successor. We have the following precondition in the reader specification:

book_number=0 [librarian:destroy_reader( )] false;

or, in a more convenient way for specification purposes, we can write librarian:destroy_reader( ) if book_number=0

Triggers are formulas of the form $\beta$[−a]false, where [−a] false is the action negation. This formula means that [a] does not occur, and what does occur is not specified. If $\beta$ holds and an action other than [a] occurs, then there is no successor state. This forces [a] to occur or the system remains in a blocked state. For instance, using the appropriate dynamic formula where we include in the triggered service information about the destination (according to the trigger expressiveness presented when the object interaction diagram 3420 was introduced), we will declare:

book_count=10 [Self::punish( )] false

This trigger may be written in an equivalent but more conventional way for specification purposes as:

Self::punish( ) if book_count=10;

Thus, triggers are actions activated when the condition stated in $\Box$ holds. The main difference between preconditions and triggers comes from the fact that in triggers there is an obligation to activate an action as soon as the given condition is satisfied. In this way triggers allow us to introduce internal activity in the Object Society that is being modeled.

In any of these dynamic formulas, $\Box$, $\Box'$ are well-formed formulas in a first order logic that usually refer to a given system state characterized by the set of values attached to attributes of objects in the state or world considered.

In OASIS, an object is defined as an observable process. The process specification in a class allows us to specify object dynamics and determines the access relationship between the states of instances. Processes are constructed by using events as atomic actions. However, the designer also has the choice of grouping events in execution units, which are called transactions.

The molecular units that are the transactions have two main properties. First, they follow an all-or-nothing policy with respect to the execution of the involved events: when a failure happens during a transaction execution, the resultant state will be the initial one. Second, they exhibit the non-observability of intermediate states.

We will finish this section introducing the process specification of the reader class in TABLE 4:

TABLE 4

```
reader =        librarian:new_reader( ) □reader_0;
reader_0 = librarian:destroy_reader( ) + loan( )
          □reader_1;
reader_1 = if book_count = 1 return( ) □ reader_0
          + (if book_count >1 return( )
          + if book_count <10 loan( )) □reader_1;
```

The execution of processes are represented by terms in a well-defined algebra of processes. Thus, possible object lives can be declared as terms whose elements are transactions and events. Every process can be rewritten to a term in a basic process algebra BPA_□□, with the □ (sequence) and + (alternative) process operations. This provides an implementation of concurrence based on arbitrary interleaving.

After having presented the Conceptual Model and the OASIS formal concepts associated with them in accordance with one embodiment of the present invention, the mappings will now be discussed that generate a textual system representation 3215 (that is a specification in OASIS) taking as input the graphical information introduced in the Conceptual Model. This formal specification 3215 has in fact been obtained using CASE tool 3210, and constitutes a solid system documentation to obtain a final software product which is compliant with the initial requirements, as represented in the source Conceptual Model.

According to the class template introduced in the previous section, the set of conceptual patterns and their corresponding OASIS representation.

The system classes are obtained from the object model. For each class, there are a set of constant, variable or derived attributes; a set of services, including private and shared events and local transactions; integrity constraints specified for the class; and derivation expressions corresponding to the derived attributes. For a complex class (those defined by using the provided aggregation and inheritance class operators), the object model also provides the particular characteristics specified for the corresponding complex aggregated or specialized class.

The information given by the object model basically specifies the system class framework, where the class signature is precisely declared. The dynamic model uses two kind of diagrams, the state transition diagram and the object interaction diagram. From the state transition diagram, the following are obtained: event preconditions, which are those formulas labeling the event transitions; the process definition of a class, where the template for valid object lives is fixed. From the object interaction diagram, two other features of an OASIS class specification are completed: trigger relationships and global transactions, which are those involving different objects.

Finally, the functional model yields the dynamic formulas related to evaluations, where the effect of events on attributes is specified. Having thus clearly defined the set of relevant information that can be introduced in a Conceptual Model in accordance with an embodiment of the present invention, the formal specification 215 corresponding to the requirements 200 provides a precise system repository where the system description is completely captured, according to the OASIS object-oriented model. This enables the implementation process (execution model) to be undertaken from a well-defined starting point, where the pieces of information involved are meaningful because they come from a finite catalogue of conceptual modeling patterns, which, furthermore, have a formal counterpart in OASIS.

Model Validation

Automatic software production of a complete, robust application from a Conceptual Model to an implementation language (such as a third generation languages like C, C++, or Java) requires the Conceptual Model to be both correct and complete. In this section, the terms "correct" and "complete" have the following meanings dependent on the specific needs for the automated software production process system as:

A Conceptual Model is "complete" when there is no missing information in the requirements specification. In other words, all the required properties of the Conceptual Model are defined and have a value. This means that every concept introduced during the modeling process will be fully specified in all its properties or the validator will reject it.

A Conceptual Model is "correct" when the information introduced in the Conceptual Model is syntactically and semantically consistent and not ambiguous. In other words, all the properties defined in the Conceptual Model have a value and that value is valid.

There is a partial validation process each time an element is added, modified or deleted to the Conceptual Model and is converted to a portion of the formal specification. During the partial validations that occur as elements are added, modified and deleted, no error messages are generated (because that would driver the modeler crazy), but portions of the Formal Specification are marked as rendered invalid by changes that have been made. When the Conceptual Model is completed, the SOSY modeler requests full validation. At this point, every statement and formula in the Formal Specification is revalidated, and error messages and warnings are generated for any element which is syntactically or semantically incomplete or incorrect or ambiguous.

Referring back to FIG. 31, the validator 220 receives as input the formal specification 3215 of the Conceptual Model using an Object-Oriented Formal Specification Language (such as OASIS) as high level data repository. From a formal point of view, a validated OASIS specification 3215 is correct and complete because the specification 3215 is formally equivalent to a dynamic logic theory, using a well-defined declarative and operational semantics.

Formal specification languages benefit from the ability of formal environments to ensure that formal specifications 3215 are valid or can be checked to be valid. Formal languages define a grammar that rules language expressiveness.

Two procedures are used for Conceptual Model validation. For completeness, validation rules are implemented by directly checking the gathered data for the Conceptual Model, e.g., a class must have name, one attribute being its identifier and one service. Completeness of the formal language specification of the Conceptual model, as checked by the validation process, means that: 1) there is no missing information in the formal specification detailing the requirements the code must meet; 2) stated in another way, all the required properties of the Conceptual Model encoded in the formal language specification are defined and they have a value. Correctness of the formal language specification of the Conceptual model, as checked by the validation process, means that: 1) when the statements in the formal language specification of the Conceptual model are both syntactically and semantically consistent and not ambiguous; 2) stated in another way, all the properties introduced in the conceptual model have a valid value. For correctness, an extended formal specification language grammar (syntax plus semantics) is implemented in order to validate the syntax and meaning of all the formulas in the Conceptual Model.

Correctness

More specifically, for completeness, the validtor validator functions to ensure that all the elements in a formal specification language have a set of properties that both exist and have a valid value. Most of the properties are strictly implemented to have a full definition and valid values. However, the CASE tool 3210 allows, for easy of use during a model inputting, to leave some properties incomplete or with invalid values. These properties will be checked by the validator 3220 to be complete (and correct) prior to any automatic software production process.

The elements which are used to validate a Conceptual Model are described next. For each element it is stated if validation will be strict (e.g. when all his properties have to exist and must have a valid value at creation time) or flexible (e.g. validation will be accomplished at a later time). Some properties are optional, (e.g. that may not exist) but if they are defined, they must be validated. These elements are given in TABLE 5:

TABLE 5

| Class | |
|---|---|
| Name. | Strict |
| ID function | Flexible |
| Attributes (at least one) | Flexible |
| Services (at least Create service). | Flexible |
| Static and Dynamic Integrity Constraints (optional) | |
| Their formula | Strict |
| Attribute | |
| Name. | Strict |
| Type (Constant, Variable, Derived). | Strict |
| Data-type (Real, integer, etc). | Strict |
| Default Value. | Strict |
| Size (if proceeds) | Strict |
| Request in Creation service. | Strict |
| Null value allowed . | Strict |
| Evaluations (variable attributes). | Flexible |
| Derivation formula (derived attributes). | Flexible |
| Evaluation | |
| One variable attribute of a class | Strict |
| One service of the same class | Strict |
| Condition (optional). | Strict |
| Formula of evaluation. | Strict |
| Derivation | |
| Formula. | |
| Condition (optional). | |
| Service | |
| Name. | Strict |
| Arguments. | |
| argument's name | Strict |
| data-type | Strict |
| default value (optional) | Strict |
| null value | Strict |
| size (if proceeds) | Strict |
| For a transaction, its formula. | Flexible |
| Preconditions of an action | |
| Formula. | Strict |
| Agents affected by condition | Strict |
| Relationship: Aggregation | |
| Related classes (component & composite) | Strict |
| Relationship name. | Strict |
| Both directions Role names. | Strict |
| Cardinality. | Strict |
| Inclusive or referential. | Strict |
| Dynamic. | Strict |
| Clause "Group By" (Optional). | Strict |
| Insertion and deletion events (if proceed) | Strict |

TABLE 5-continued

| Relationship: Inheritance | |
|---|---|
| Related classes (parent & child) | Strict |
| Temporal (versus permanent) | Strict |
| Specialization condition or events | Strict |
| Relationship: Agent | |
| Agent class and service allowed to activate. | Strict |
| State Transition Diagram (STD) | |
| All states of class (3 at least). | Flexible |
| State in STD | |
| Name. | Strict |
| Transition in STD | |
| Estate of origin. | Strict |
| Estate of destination. | Strict |
| Service of class. | Strict |
| Control condition (optional). | Strict |
| Trigger | |
| Condition. | Strict |
| Class or instance of destination. | Strict |
| Target (self, object, class) | Strict |
| Activated service. | Strict |
| Service arguments' initialization (Optional) | |
| Arguments' values | Strict |
| Global Interactions | |
| Name. | Strict |
| Formula. | Strict |
| User exit functions | |
| Name. | Strict |
| Return data-type | Strict |
| Arguments, (Optional) | |
| Argument's name | Strict |
| Argument's data-type | Strict |

Completeness

Some properties of components in formal specification languages are "well formed formulas" that follow a well defined syntax. It is therefore, a requirement to ensure that all introduced formulas in the Conceptual Model were both syntactical and semantically correct.

Not all formulas used in the Conceptual Model have the same purpose. Therefore, there will be several types of formulas. Depending of formula's type, the use of certain operators and terms (operands, like: constants, class attributes, user-functions, etc.) are allowed. A process and a set of rules in grammar to validate every type of formula in the Conceptual Model also exists.

More specifically, the Conceptual Model includes formulas of the following types as shown in TABLE 6:

TABLE 6

Default Value Calculation of
    Class Attributes (Constant and Variable)
    Service and Transaction Arguments
Inheritance: Specialization condition
Static and Dynamic Integrity Constraints
Derivations and Valuations:
    Calculation formula (Derived or Variable attributes respectively)
    Conditions (optional)
Preconditions for actions (Services or Transactions)
Control Conditions for transitions in State Transitions Diagram
Triggering conditions
Local and Global Transactions formulas These formulas are validated at the time they are introduced, by preventing the designer from leaving an interactive textual dialog if formula is not syntactically and semantically correct.

In general, every formula must be syntactically correct; every class must have an identification function; every class must have a creation event; every triggering formula must be semantically correct (e.g. self triggers to an unrelated class are forbidden); and every name of an aggregation must be unique in the conceptual schema. If these conditions are not satisfied, then an error is raised.

A warning may be raised, on the other hand, if any of the following do not hold: every class should have a destroy event; every derived attribute should have at least a derivation formula; every service should have an agent declared to execute it; and every argument declared in a service should be used.

Validation process will also be invoked every time the designer performs a change into the model that may invalidate one or more formulas. As mentioned earlier, for ease of use, certain type of formulas are allowed to be incorrect, which the designer will have to review at a later time. The automatic software production process in accordance with one embodiment of the present invention, however, will not continue to code generation, if not all the formulas are correct. Each time the designer introduces a modification in the Conceptual Model specification, all affected formulas will be checked. As a result, the following cases may happen:

1. If any of the affected formulas makes reference to a "Strict" property, the change will be rejected. An error will be raised to inform the designer.

2. If none of the affected formulas references a "Strict" property, modification to Conceptual Model will be accepted. An action-confirmation dialog is showed before any action is taken.

3. If there is no affected formula, modification is performed straightaway. In order to validate the user interface information, the validator 3220 checks the following for errors: the patterns defined must be well constructed with no essential information lacking; the attributes used in filters must be visible from the definition class; the attributes used in order criteria must be visible from the definition class; the formula in a filter must be a well-formed formula using the terms defined in the model; the action selection pattern must use as final actions objects defined in the Conceptual Model; and the set of dependency patterns must be terminal and have confluence. Warnings may be generated under the following conditions: if a pattern is defined but not used (applied), if an instance pattern is duplicated.

Automatic software production from Conceptual Models requires these Conceptual Models to be correct and complete. Applying the characteristics and properties of formal specification languages makes it possible to effectively validate a Conceptual Model. The validation process is based on the grammar defined by the formal specification language, and partial validation is to be invoked any time the designer introduces modifications to the Conceptual Model specification. Prior to any automatic software production process, Conceptual Model will be validated in a full validation as a prerequisite.

Working Example of how to Use the Invention to Create a Conceptual Model for a Software Program to Manage Expense Reporting by Employees, Expense Report Approvals and Payments Requirements: the Problem to be Managed by the Computer Program to be Automatically Generated The system will manage the expense reporting of employees, expense approvals and payments.

Expenses will reflect both: pattern currency and its equivalent to other currency. Expense line for user input of an expense will only allow input in the pattern currency.

Employees may present an expense report when they have supported expenses on behalf of the company. Typically, the expenses are associated to a certain project or specific task.

At presenting the expense report, supporting tickets and receipts will be attached and prior expense advances will be reflected. Advances must be discounted out from the expense report balance.

The expense report, once presented, must be authorized by a manager responsible for payment of expenses. The authorization process will allow rejection of the expenses if there is the appearance of impropriety.

Once authorized, the expense report will be approved for payment by a person in accounting responsible for writing checks. Once paid, it will be marked as so.

The Procedure will be as follows:

Prior to any expense, the employee may request money in advance. This will not be reflected in the Expenses Management System program to be written.

The employee will provide receipts for all expenses and advances to the system operator (may be himself). It will include explanations for expenses when required.

Once all the expenses are entered, the employee will issue the expense report thereby closing the expenses report. Then the expense report will be in a status of pending approval.

A person responsible for expenses will authorise the expense report if the expenses appear legitimate, and the expense report will transition to a state pending payment. If the report is not approved, it will be rejected with a comment indicating why it has been rejected. The expenses report will be then put back in an open status to be modified.

Accounts payable will approve the payment. Once approved, the expense report will be marked as paid and locked. Only accounts payable will be able to unlock the expense reports in case of error.

Once the payment has been done, the Expenses Report is marked as paid indicating date and payment media. If balance was debit, i.e., advances were bigger that than expenses, a warning message will require confirmation of payment.

Detailed Information to be Captured

Expense:

Header and footer: general information of the expense.
    Employee: Code and Name.
    Trip cause, visit to or general expense cause.
    Project to charge expenses to.
    Total advanced amount. Both currencies
    Total expenses. Both currencies
    Balance. Both currencies
    Date of Expenses Report issuing.
    Expenses approval date.
    Payment date and media.
    Payment comments, if paid.
    Rejection cause, if rejected.

Expense Line:

Each line details a certain expense.

Including:
    Expense date.
    Expense Type: (Car usage in Km, allowance, etc.) Some expense types will have a fixed price, some will perform a calculation, other will let operator to include the amount from figures on ticket or receipt.
    Units. The meaning will depend on expense type. Some types will not allow operator to use this.
    Prize to apply. Prize per unit in pattern currency. Depends on expense type.
    Expense description.
    Expense Line total. Both currencies Employee:
  Employee code. This must be unique in the system.
  Name and First name
  Site, phone numbers, email.
Querying and Reporting Facilities:
  The results of any search in the application may be considered as a report so it must be possible to be printed as well as exported to Office tools like Word, Excel. It would be desirable to be ordered by any column while it is in the screen and exported or printed in that order.
  The Expense Reports will be selected under any of the following criteria or a combination of them: by project, employee, issuing date, authorization date and payment date. Dates searching facilities will be better introduced as a period.
The Expense Report will show the following information:
  Project
  Employee name
  Status
  Approval Date
  Paid
  Payment Date
  Total expenses
  Balance
  The Expense Report will be printed under specific format including the Expense lines.
  Employees will allow to be searched by a combination of any data contained in Employee definition.
Modelling with SOSY Modeller
Phase 1: Classes identification. The process of class identification is a process of finding relevant entities that will hold the System information. These will be obtained from Requirements definition above defining what the program to be written must be able to do.
The following chart has class identifications underscored:
  The system will manage the expense reporting of employees, expense approvals and payments.
  Expenses will reflect both: pattern currency and its equivalent to other currency. Expense line will only allow input in pattern currency.
  Employees may present an expense report when they have supported expenses on behalf of the company. Typically, the expenses are associated to a certain project or specific task.
  At presenting the expense report, associated tickets or receipts will be attached and advances will be reflected. Advances must be discounted out from the expense report balance.
  The expense report, once presented, must be authorized by a person responsible for the expenses. The authorization process will allow rejection of the expenses if necessary.
  Once authorized, the expense report will be approved for payment by a person responsible for accounting. Once paid, it will be marked as paid.
  The Procedure will be as follows:
  Prior to any expense, the employee may request money in advance. This will not be reflected in the Expenses Management System program.
  The employee will provide all expenses and advances tickets to the system operator (may be himself). It will include explanations for expenses when required.
  After entering expenses in the system, the employee will issue the expense report closing the expenses report. Then it will be pending approval status.
  A responsible of expenses (employee's manager) will authorise the expense report if the expenses appear legitimate, and it will thereafter be in a pending payment status. If no approval is granted, the expense report will be rejected with a comment indicating why it has been rejected. The expenses report will then be set back to an open status to be modified.
  Payments responsible (an accounts payable person) will approve the payment. Once approved, the expense report will be marked as paid and locked. Only payments the person responsible for payments will be able to unlock the expenses reports in case of error.
  Once the payment has been done, the Expenses Report is marked as paid indicating date and payment media. If balance was debit, advances were bigger that expenses, a warning message will require confirmation of payment.
Detailed Information to be Captured
Expense:
Header and footer: General information of the Expense.
Employee: Code and Name.
Trip cause, visit to or general expense cause.
Project to charge expenses to.
Total advanced amount. Both currencies
Total expenses. Both currencies
Balance. Both currencies
Date of Expenses Report issuing.
Expenses approval date.
Payment date and media.
Payment comments, if proceeds.
Rejection cause, if proceeds.
Expense Line:
Each line details a certain expense.
Including:
Expense date.
Expense Type: (Car usage in Km, allowance, etc.) Some expense types will have a fixed price, some will perform a calculation, other will let operator to include the amount as figures in ticket.
Units. The meaning will depend on expense type. Some types will not allow operator to use this.
Prize to apply. Prize per unit in pattern currency. Depends on expense type.
Expense description.
Expense Line total. Both currencies
Employee:
Employee code. This must be unique in the system.
Name and First name
Site, phone numbers, email.
Querying and Reporting facilities:
  The results of any search in the application may be considered as a report so it must be possible to be printed as well as exported to Office tools like Word, Excel. It would be desirable to be ordered by any column while it is in the screen and exported or printed in that order.
  The Expense Reports will be selected under the following criteria or a combination of them: by project, employee, issuing date, authorization date and payment date. Dates searching facilities will be better introduced as a period.
The Expense Report will show the following information:
Project
Employee name
Status
Approval Date
Paid
Payment Date
Total expenses
Balance
  The Expense Report will be printed under specific format including the Expense lines.
  Employees will allow to be searched by a combination of any data contained in Employee definition.

Figure 38A:
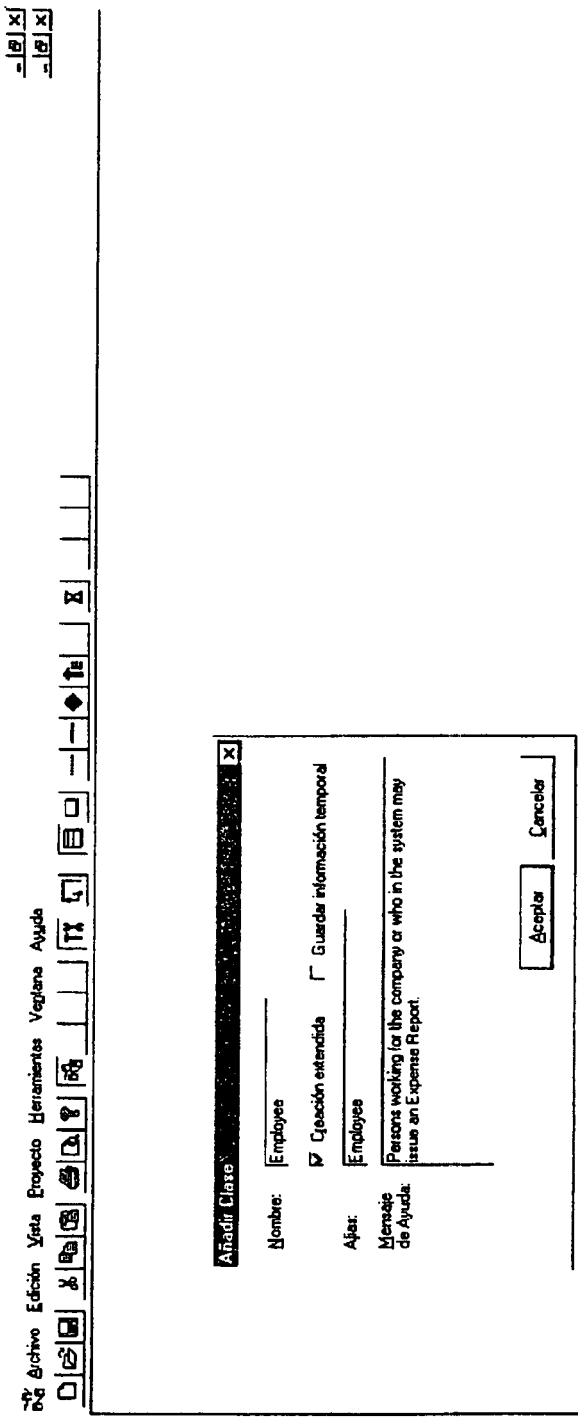
FIG. 38A is a screenshot of the dialog box to create the class which simply involves giving it a name.

FIG. 38A is a screenshot of the dialog box to create the class which simply involves giving it a name.

Figure 38B:
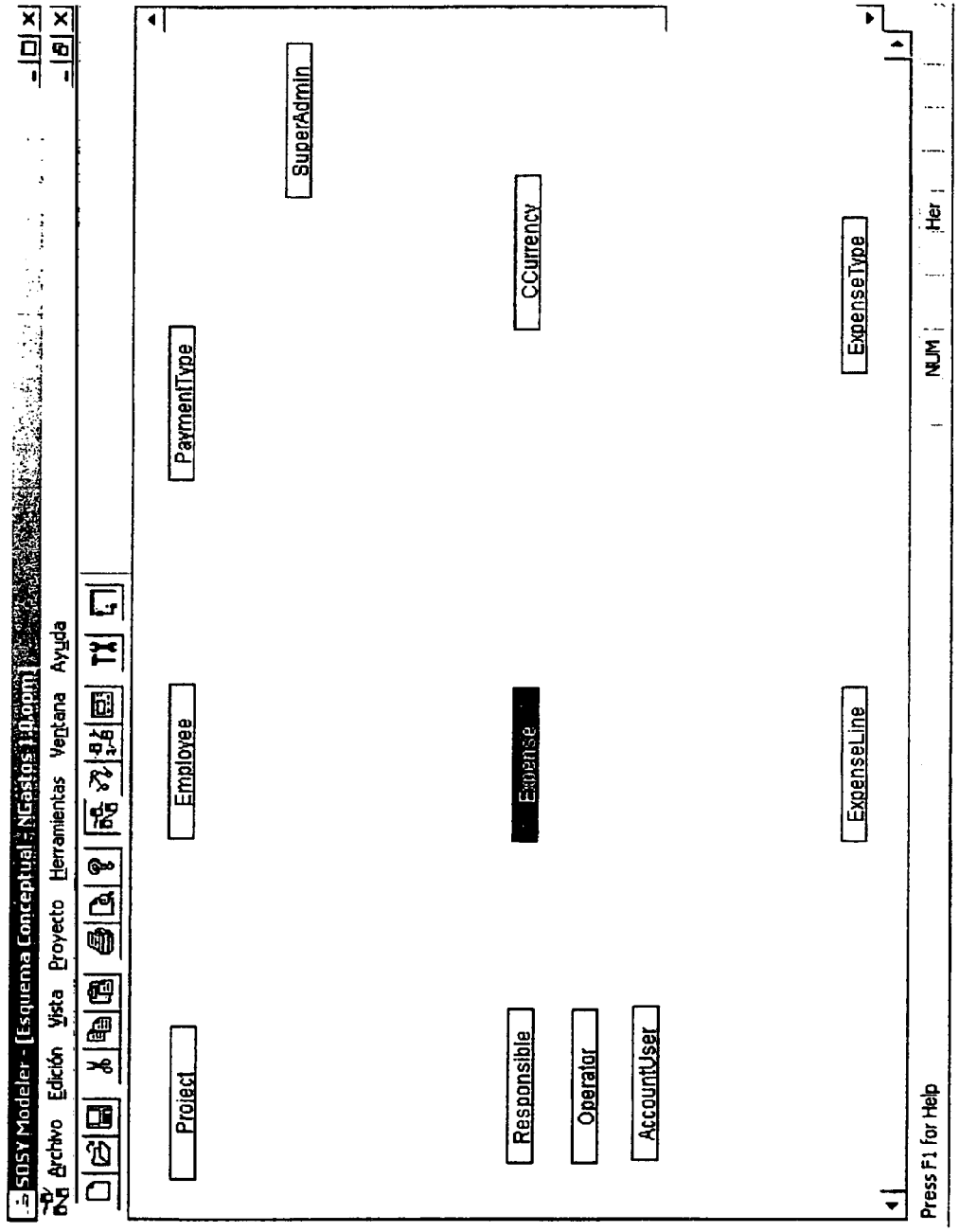
FIG. 38B is screenshot of a graphic interface box showing the classes that have been defined to store the pertinent information and provide the pertinent services to implement a computer program that meets the above defined requirements. Defining these classes starts the process of building the Formal Specification in the high level repository.

FIG. 38B is screenshot of a graphic interface box showing the classes that have been defined to store the pertinent information and provide the pertinent services to implement a computer program that meets the above defined requirements. Defining these classes starts the process of building the Formal Specification in the high level repository.

Figure 38C:
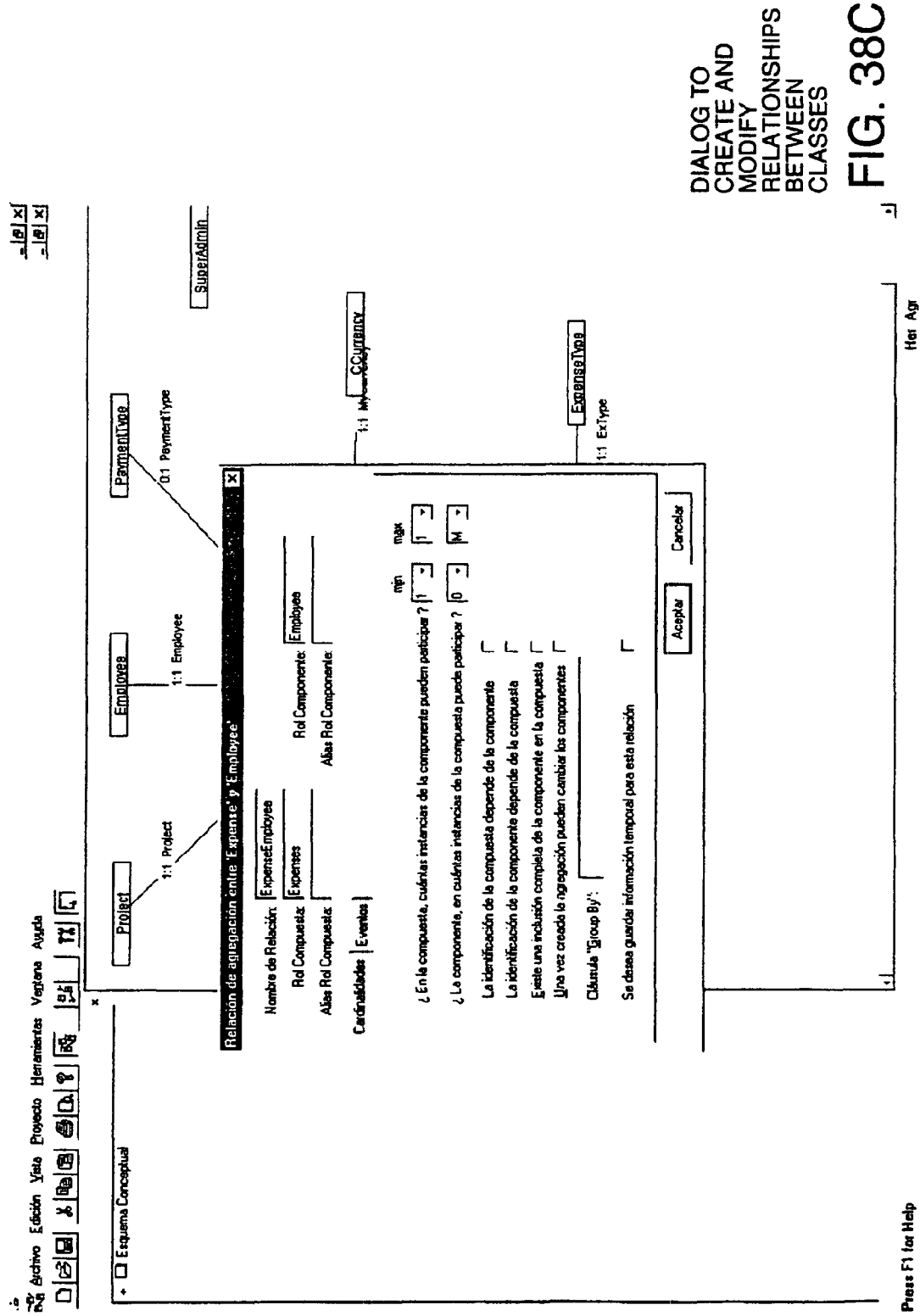
FIG. 38C is a screenshot of the dialog box to modify the properties of an aggregation relationship between any two classes specified in the dialog box.

FIG. 38C is a screenshot of the dialog box to modify the properties of an aggregation relationship between any two classes specified in the dialog box. Both inheritance and aggregation relationships have to have been previously created using a dialog box similar to FIG. 38A.

Phase 2: Relationships between classes. This process involves finding Aggregations and Inheritances including their properties.

The following chart will underscore these relationships:
- The system will manage the expense reporting of employees, expense approvals and payments.
- Expenses will reflect both: pattern currency and its equivalent to other currency. Expense line will only allow input in pattern currency.
- Employees may present an expense report when they have supported expenses on behalf of the company. Typically, the expenses are associated to a certain project or specific task.
- At presenting the expense report, associated tickets or receipts will be attached and advances will be reflected. Advances must be discounted out from the expense report balance.
- The expense report, once presented, must be authorized by a person responsible for payment of the expenses (employees manager typically). The authorization process will allow rejection of the expenses if necessary.
- Once authorized, the expense report will be approved for payment by a person responsible of for accounting, Once paid, it will be marked as paid.
- The Procedure will be as follows:
- Prior to any expense, the employee may request money in advance. This will not be reflected in the Expenses Management System.
- The employee will provide all expenses and advances tickets to the system operator (may be himself). It will include explanations for expenses when required.
- Once introduced the information has been introduced into in the system, the employee will issue it closing the expenses report. Then it will be in a status of pending to be approved.
- A person responsible for payment of expenses will authorise the expenses if proceeds and the expenses appear legitimate, and the expense report will be have its status changed from pending to be payment approved. If the expenses are not approved, it the expense report will be put in rejected status with a comment indicating why it has been rejected. The expenses report will be then be put back into an open to be modified status.
- Payments The person responsible for payment will approve the payment. Once approved, it will lock to the expense report in a status be marked as paid. Only the person responsible for payments responsible will be able to unlock the expenses reports back to an open to be modified status in case of error.
- Once the payment has been done, the Expenses Report is marked as paid indicating date and payment media. If balance was debit, advances were bigger that expenses, a warning message will require confirmation of payment.

Detailed Information to be Captured
Expense:
Header and footer: General information of the Expense.
Employee: Code and Name.
Trip cause, visit to or general expense cause.
Project to charge expenses to.
Total advanced amount. Both currencies
Total expenses. Both currencies
Balance. Both currencies
Date of Expenses Report issuing.
Expenses approval date.
Payment date and media.
Payment comments, if proceeds.
Rejection cause, if proceeds.
Expense Line:
Each line details a certain expense.
Including:
Expense date.
Expense Type: (Car usage in Km, allowance, etc.) Some expense types will have a fixed price, some will perform a calculation, others will let operator to include the amount on the receipt as figures in ticket.
Units. The meaning will depend on expense type. Some types will not allow the operator to use this.
Prize to apply. Prize per unit in pattern currency. Depends on expense type.
Expense description.
Expense Line total. Both currencies
Employee:
Employee code. This must be unique in the system.
Name and First name
Site, phone numbers, email.
Querying and Reporting facilities:
The results of any search in the application may be considered as a report so it must be possible to be printed the report as well as exported export it to Office tools like Word or Excel. It would be desirable to allow the report to be ordered by any column while it is in the screen and exported or printed in that order.
The Expense Reports will be selected under the following criteria or a combination of them: by project, employee, issuing date, authorization date and payment date. Dates searching facilities will be better introduced as a period.
The Expense Report will show the following information:
Project
Employee name
Status
Approval Date
Paid
Payment Date
Total expenses
Balance
The Expense Report will be printed under specific format including the Expense lines.
Employees will allow to be searched by a combination of any data contained in Employee definition.
No inheritance relationship used in this model.

FIG. 39 is a dialog box to create the relationships between specified classes and which graphically shows the relationships so created and all the properties of those relationships.

Phase 3: Filling in all classes' details. This process involves identifying attributes, services and integrity constraints for each class. We will focus in Expense class, mark attributes by underscore and mark services in italics.

The system will manage the expense reporting of employees, expense approvals and payments.

Expenses will reflect both: pattern currency and its equivalent to other currency. Expense line will only allow input in pattern currency.

Employees may present an expense report when they have supported expenses on behalf of the company. Typically, the expenses are associated to a certain project or specific task.

At presenting the expense report, associated tickets will be attached and advances will be reflected. Advances must be discounted out from the expense report balance.

The expense report, once presented, must be authorized by a person responsible for payment of the expenses. The authorization process will allow reject rejection of the expenses if necessary.

Once authorized, the expense report will be approved for payment by a person responsible for payment of accounting expenses. Once paid, it will be marked as paid.

The Procedure will be as follows:

Prior to any expense, the employee may request money in advance. This will not be reflected in the Expenses Management System.

The employee will provide all expenses and advances tickets to the system operator (may be himself). It will include explanations for expenses when required.

Once introduced the information in the system, the employee will issue it thereby closing the expense report. Then it will be pending to be approved.

A person responsible of for payment of expenses will authorize the expenses if proceeds they appear to be legitimate and it the expense report will be pending to be payment approved. If not, it will be rejected with a comment indicating why it has been rejected. The expenses report will be then be moved back to an open to be modified status.

Payments The person responsible to make payment will then approve the payment. Once approved, it will lock to be marked as paid. Only the person responsible to make payments responsible manager will be able to unlock the expenses reports in case of error.

Once the payment has been done, the Expenses Report is marked as paid indicating date and payment media. If balance was debit, advances were bigger that expenses, a warning message will require confirmation of payment.

Detailed Information to be Captured

Expense:

Header and footer: General information of the Expense.

Employee: Code and Name.

Trip cause, visit to or general expense cause.

Project to charge expenses to.

Total advanced amount. Both currencies

Total expenses. Both currencies

Balance. Both currencies

Date of expenses report issuing.

Expenses approval date.

Payment date and media.

Payment comments, if comments are present.

Rejection cause, if payment was rejected.

Expense Line:

Each line details a certain expense.

Including:

Expense date.

Expense Type: (Car usage in Km, allowance, etc.) Some expense types will have a fixed price, some will perform a calculation, other will let operator to include the amount as figures in ticket.

Units. The meaning will depend on expense type. Some types will not allow operator to use this. Prize to apply. Prize per unit in pattern currency. Depends on expense type.

Expense description.

Expense Line total. Both currencies

Employee:

Employee code. This must be unique in the system.

Name and First name

Site, phone numbers, email.

Querying and Reporting Facilities:

The results of any search in the application may be considered as a report so it must be possible to be printed as well as exported to Office tools like Word, or Excel. It would be desirable to be ordered by any column while it is in the screen and exported or printed in that order.

The Expense Reports will be selected under the following criteria or a combination of them: by project, employee, issuing date, authorization date and payment date. Dates searching facilities will be better introduced as a period.

The Expense Report will show the following information:

Project

Employee name

Status

Approval Date

Paid

Payment Date

Total expenses

Balance

The Expense Report will be printed under a specific format including the Expense lines.

Employees will allow to be searched by a combination of any data contained in Employee definition.

Figure 40A:
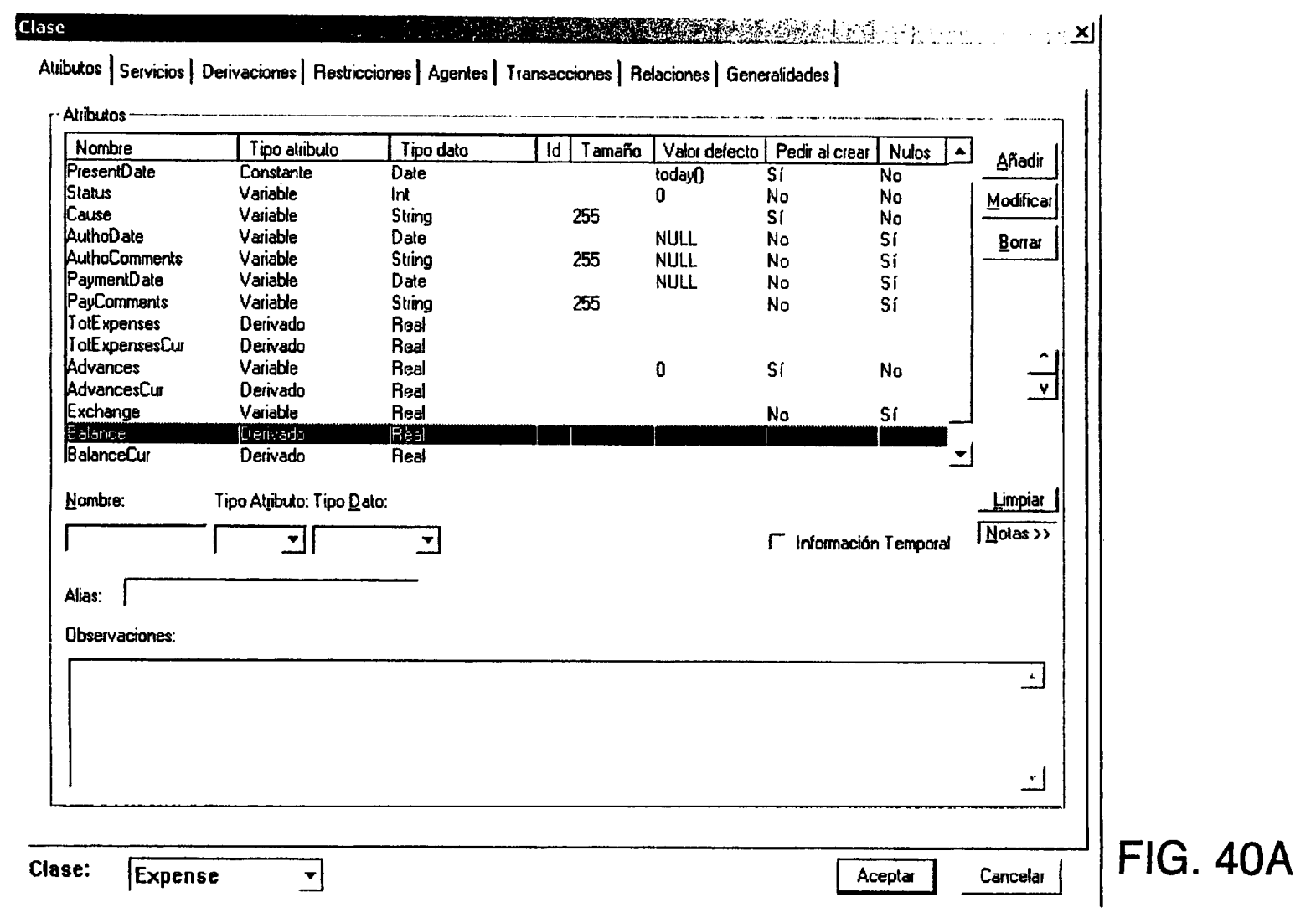

FIG. 40 is comprised of FIG. 40A and FIG. 40B. FIG. 40A shows the dialog box used to define the attributes for the Expense class with their properties. This dialog box is used to define whether each attribute is constant, variable or derived, the type of data it contains and other things. FIG. 40B is the dialog box used to fill in the formulas used for derivation of the values of attributes of classes from the values of other attributes. The difference between the derivation formulas and the formulas defined in the functional model dialog box is that the formulas defined using the functional model dialog box change the values of attributes when services are performed while derivation formulas change the value of attributes only when the values of the other attributes used in the derivation formula change. That is, the formulas defined using the functional model relate services to the values of attributes they operate upon. Formulas defined by the derivation dialog box relate the value of one or more attributes to the values of other attributes.

Note that some services force the existence of an attribute. Note also that items above that seem to the reader to be attributes probably are attributes but not for the expense class and therefore were not marked.

The value of some attributes depends on the value of other attributes of the class Expense. These attributes are called Derived. For example the attribute Balance is derived from the attributes Total Expenses and Total Advances and has the formula: Balance=Total expenses−Total Advances, as illustrated in FIG. 40B which is a dialog box in which the formula to derive this attribute is defined by the modeller.

We will model the status of a an expense report according to the marked situations with one attribute called "Status" which has arbitrarily decided possible values of: 0=Open (modifying the expense report), 1=Closed (pending to be authorized), 2=Authorized (pending to be approved), 3=Rejected (not authorized), 4=Payment pending (payment approved but not paid), 5=Payment Rejected (not allowed to be paid) and 6=Paid (the expense has been paid)

Figure 41:
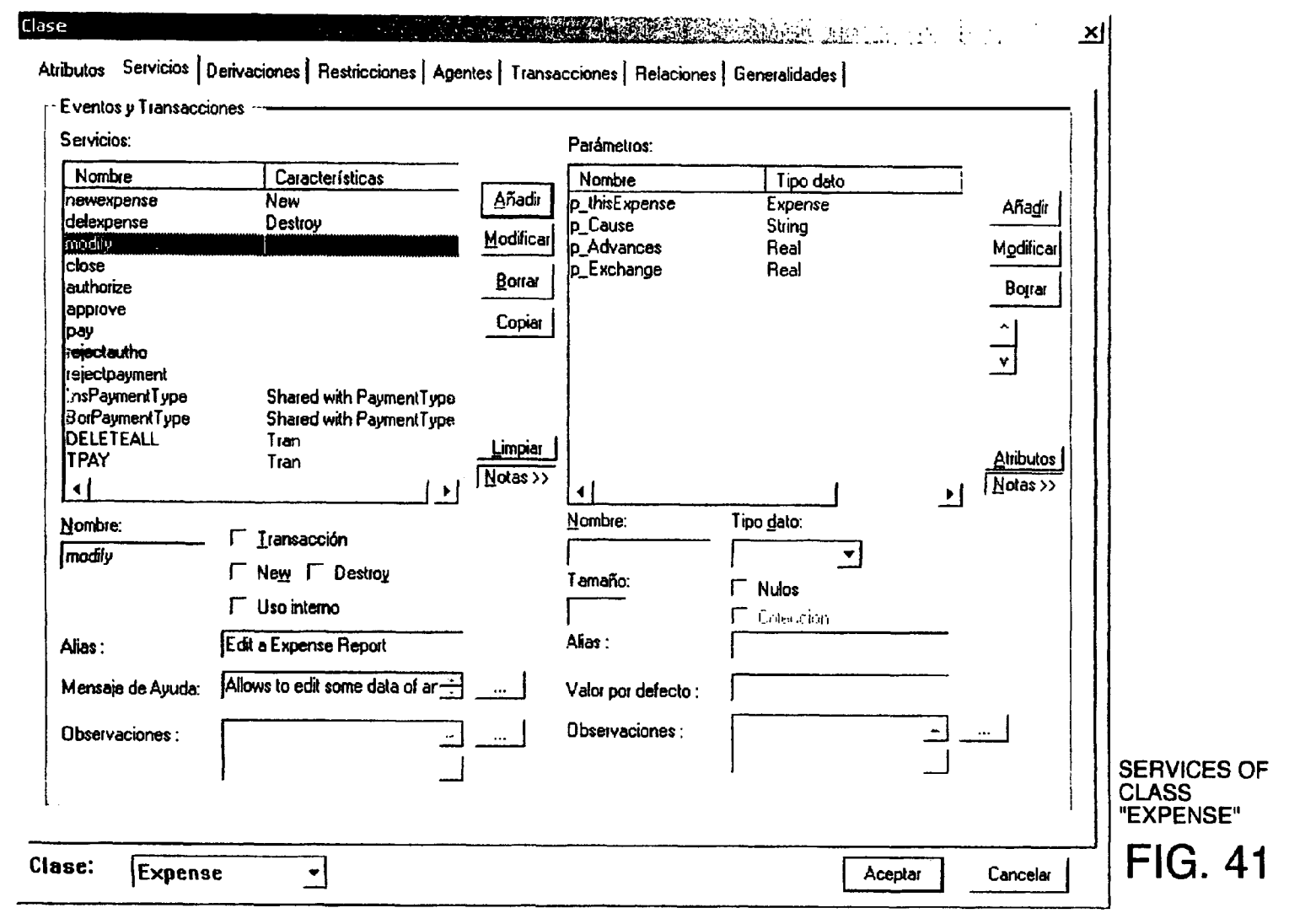

FIG. 41 shows a dialog box which a SOSY modeler uses to define the services of the Expense class with their arguments.

Single services detectedneeded for this example, known as events:

newexpense: Allows to create a new Expense Report. It's a special service marked as "New" event.

delexpense: Allows to delete an existing Expense Report. It's a special service marked as "Destroy" event.

modify Allows to change some data of an existing Expense Report. It will change the value of the attributes Cause, Advances and Exchange.

eclose: Mark an existing Expense Report as ready to authorize.

authorize: Mark an existing Expense Report as authorized and ready to be approved.

approve: Mark an existing Expense Report as approved for payment.

pay: Mark an existing Expense Report as paid indicating the date and optional comments.

rejectautho: Reject the authorization for an existing Expense Report marking it as "Rejected" with optional comments.

rejectpayment: Reject the payment for an existing Expense Report with optional comments cancelapprove: Unlocks the expenses report Complex services detected needed for this example, marked as local transactions:

TNEW: Creates a new Expense Report. It will use the "newexpense" event, that will be marked as internal (the interface will not offer the service marked as "internal"). This service has not been expressed in the system Requirements requirements but it's necessary according to the aggregation relationship with the "PaymentType" class. The properties of this relationship allows to the "New" event to set the relationship with "PaymentType", since it has no sense until it has been paid. Encapsulating the "New" event we can set the value of this relationship to Null.

DELETEALL: Delete an existing Expense Report and all its lines. It will use the "deleteexpense" event, that will be marked as internal (the interface will not offer the service marked as "internal"). This service has not been expressed in the Requirements system requirements, but it's necessary according to the aggregation relationship with the "ExpenseLine" class. The properties of this relationship express that an existing Expense Report can not be deleted while having lines.

TPAY: According to the system requirement "Once the payment has been done, the Expenses Report is marked as paid indicating date and payment media". To implement this requirement, we need to encapsulated several services in a transaction.

Figure 42:
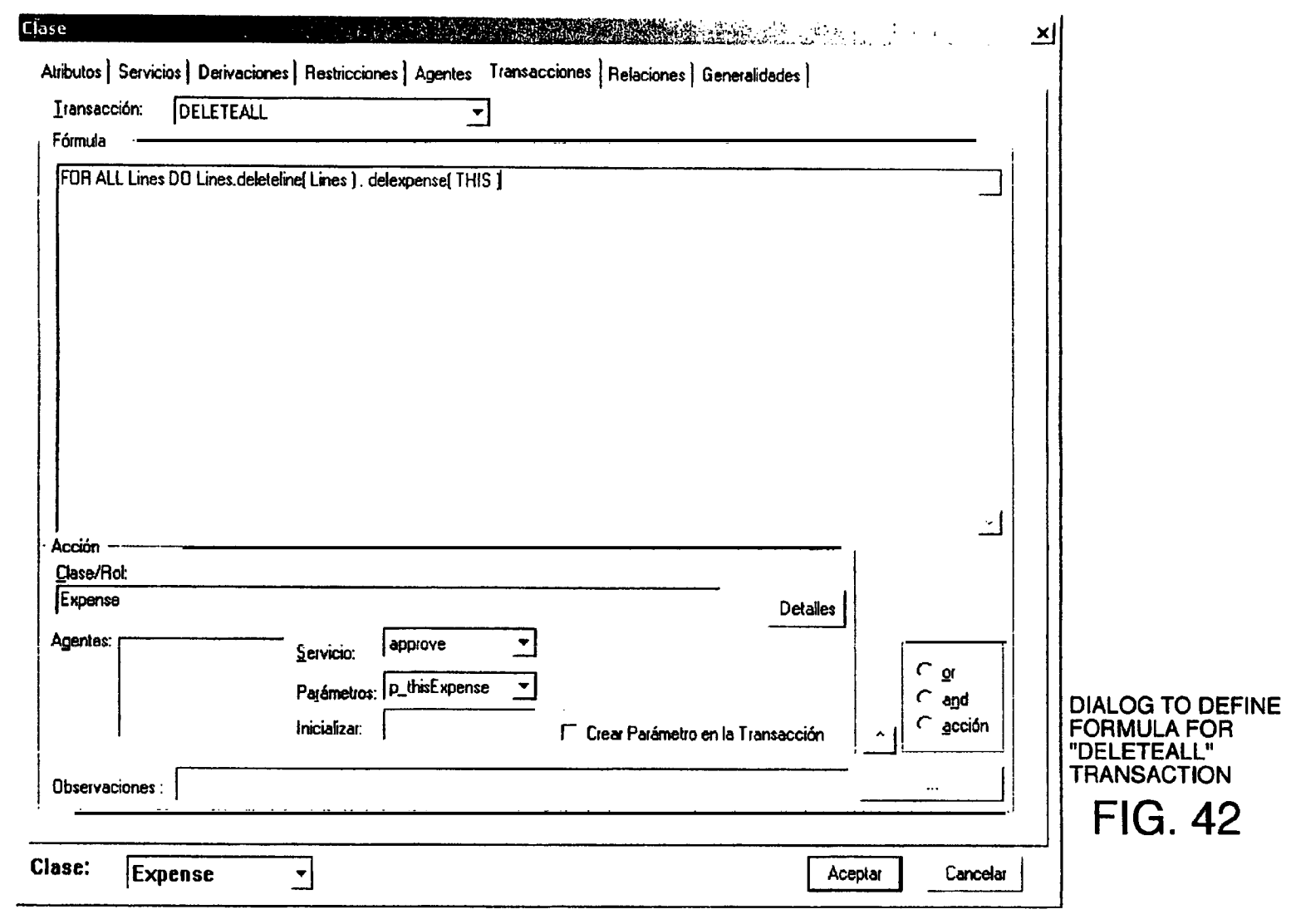

FIG. 42 is a screenshot of the dialog box used to create one formula in a local transaction carried out by a composed service (single services are called events, and composed services are called local transactions).

Figure 43:
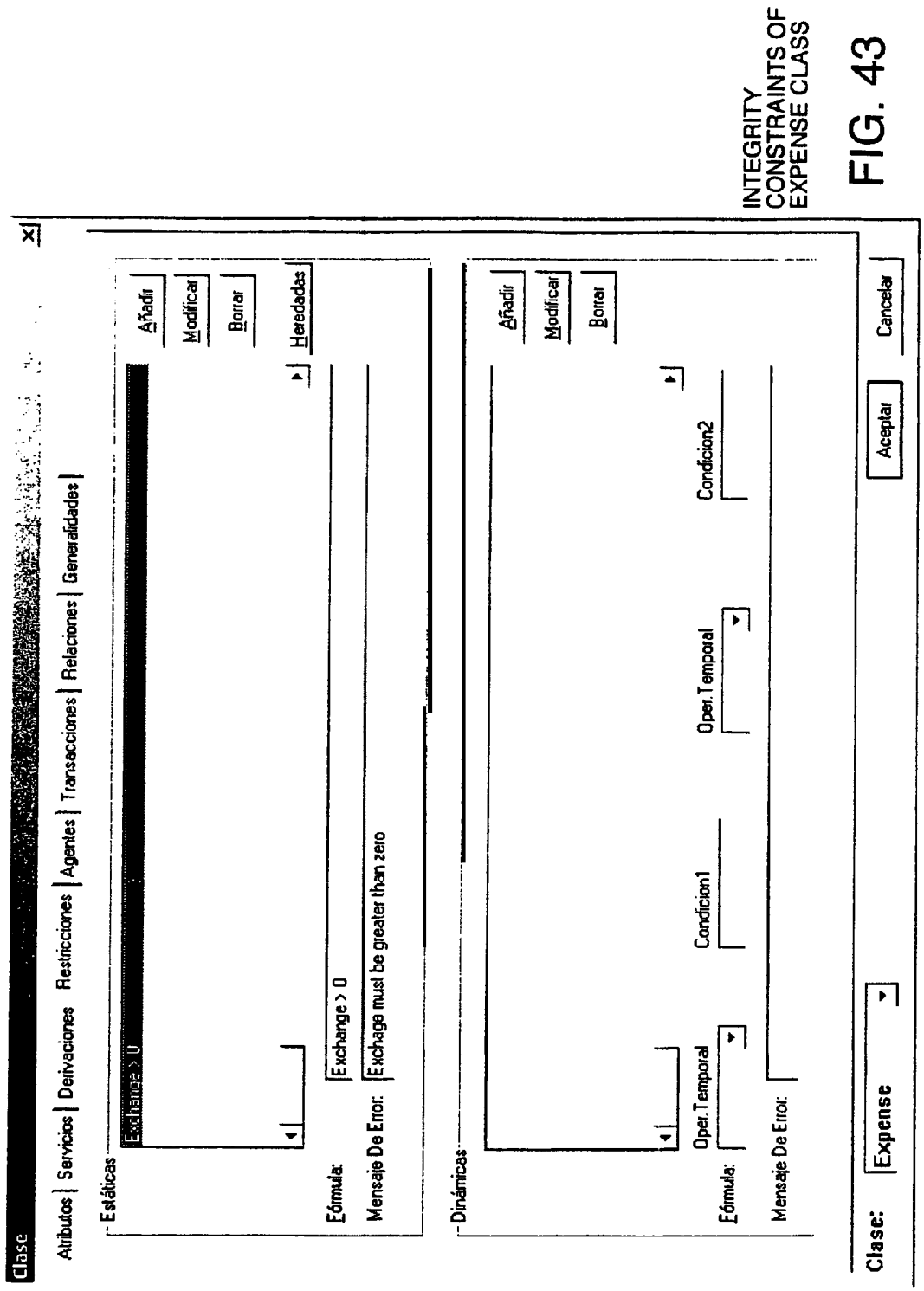
FIG. 43 is a dialog box used by the modeler to enter the integrity constraint formula and error message text of "Expense" class.

FIG. 43 a dialog box used by the modeler to enter the integrity constraint formula and error message text of "Expense" class.

It's obvious, the value of the attribute "Exchange" always must be greater than zero.

FIG. 43 is a screenshot of the dialog box the SOSY modeler uses to define the formula that encodes the integrity constraint and the corresponding error message.

Phase 4: Express evaluations. During this phase, one or more dialog boxes are presented to the SOSY modeler wherein he or she expresses evaluations of what will be the effect of all events for each variable attributes of each class.

This is the process of building the functional model portion of the Conceptual Model. The value change of an attribute when an event happens is known as "evaluation".

FIG. 44 is a dialog box to enter the functional model formulas that define evaluation of the attribute "cause" with the "modify" event (an event is a single service). The functional model relates services mathematically through well-formed formulas to the values of attributes these services act upon. Note that at box 3724, the SOSY modeler has not filled in an evaluation formula that could be encoded in the final code to do a calculation to change the value of "cause" when the modify event occurs. Instead, as seen from box 3726, the value of "cause" will be changed to whatever the value of the argument "p_cause" of the event "modify" when "modify" is executed.

Figure 45:
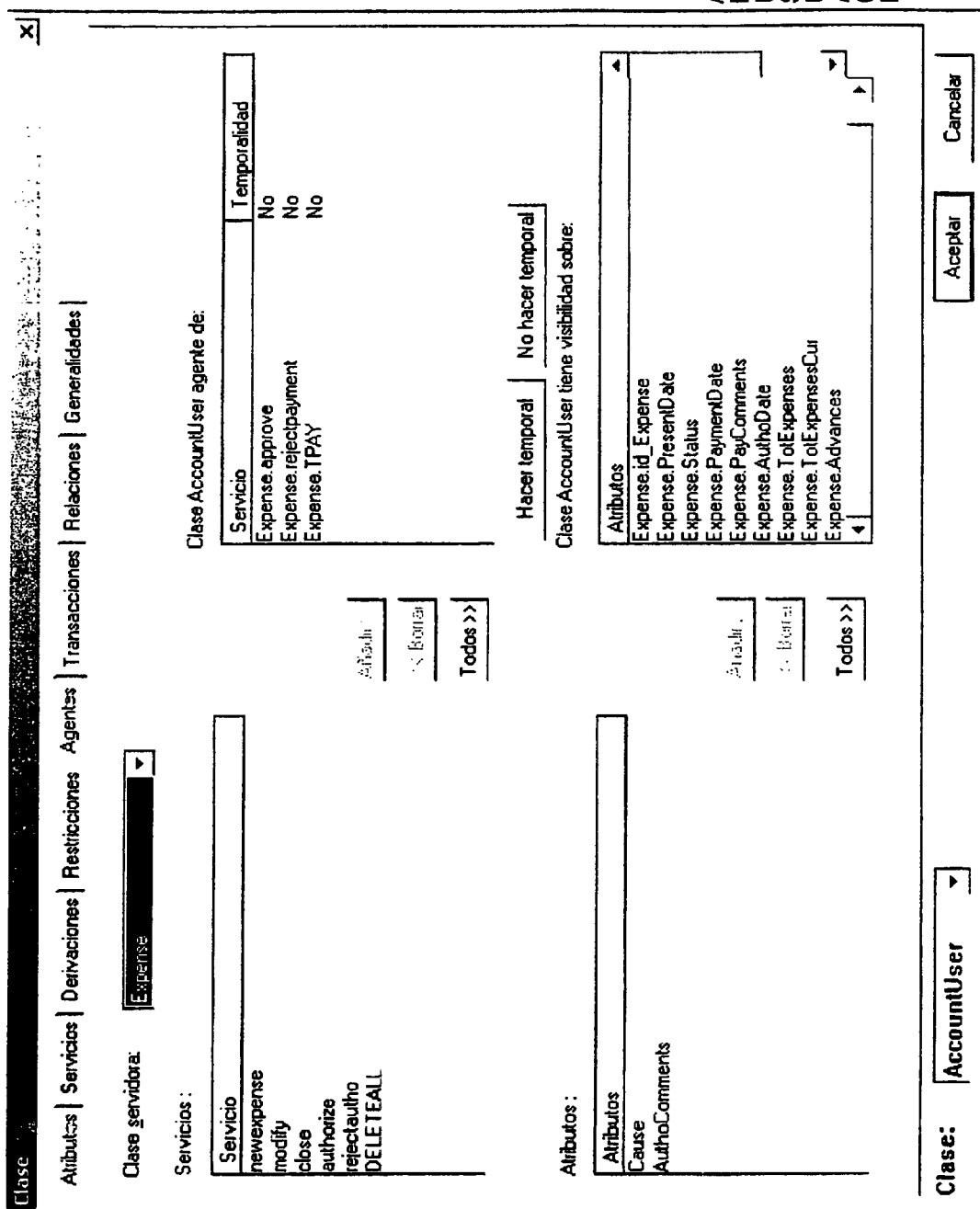
FIG. 45 is a dialog box which can be used by the SOSY modeller to establish the services the user "accountuser" can access and the visibility of class attributes for this user on the user interface.

Phase 5: Agent relationships. A big benefit of our Modeler is that the users of the system are part of it. Users are active objects (request services of other classes) and the different "profiles", i.e., users, are represented as agent classes. We must express which services of any class can be executed by every "profile". Also, we must express the visibility of class attributes for every "profile" so that the object system view can be presented properly by the user interface when the user logs in FIG. 45 is a dialog box which can be used by the SOSY modeller to establish the services the user "accountuser" can access and the visibility of class attributes for this user on the user interface.

Phase 6: State transition diagram. It's required for proper construction of the Conceptual Model to express the correct life cycle for every class of the model, indicating the correct order of execution for all the class services. Also, we can express conditions that must be satisfied in order to allow the execution of a service, which are called "preconditions".

FIG. 46 is one of the two graphical user interface diagrams of the dynamic model on which the SOSY modeler has drawn a graphic illustrating the state transitions for the "expense" class. Each state in the state transition diagram represents a valid state for the object and represents one of the "valid lives" and really is one of the unseen attributes of the expense class. An object can only enter one of the displayed states if the corresponding service has been thrown to transition to it from a previous state.

Figure 47:
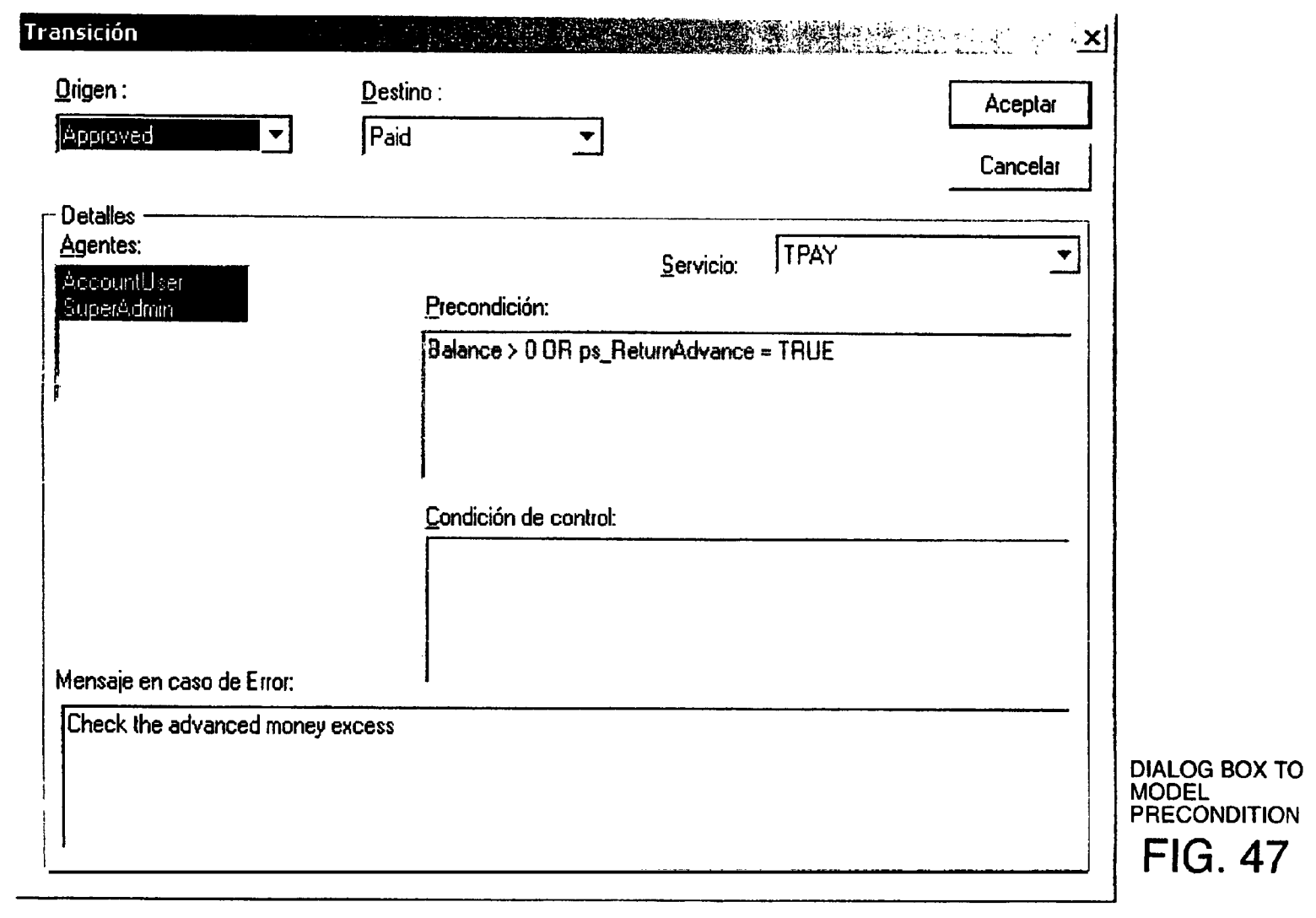

According to last paragraph of the Procedure in the system requirements for the expense report example, if the Advances are greater than total expenses, the system must force request the confirmation of the payment of expenses. account user. It is expressed as a precondition in the "TPAY" transaction. FIG. 47 is a dialog box used by the SOSY modeler to establish this precondition.

Phase 7: Presentation Model. Finally, we can complete the Conceptual Model with the user interface requirements. We focus on Expense class. The following chart will mark by underscore the set of attributes to be displayed and will mark the searching criteria by setting them off in italics The system will manage the expense reporting of employees, expense approvals and payments.

Expenses will reflect both: pattern currency and its equivalent to other currency. Expense line will only allow input in pattern currency.

Employees may present an expense report when they have supported expenses on behalf of the company. Typically, the expenses are associated to a certain project or specific task.

At presenting the expense report, associated tickets will be attached and advances will be reflected. Advances must be discounted out from the expense report balance.

The expense report, once presented, must be authorized by a person responsible of for payment of the expenses. The authorization process will allow rejection of the expenses if they do not appear justified.

Once authorized, the expense report will be approved for payment by a person responsible of accounting, for paying such expenses. Once paid, it the expense report will be marked in paid status.

The Procedure will be as follows:

Prior to any expense, the employee may request money in advance. This will not be reflected in the Expenses Management System.

The employee will provide all expenses and advances tickets to the system operator (which may be himself). It will include explanations for expenses when required.

Once the information has been introduced the information in into the system, the employee will issue it the expense report thereby closing the expenses report. Then it will be put into status pending to be approved.

A person responsible for payment of expenses will authorise the expenses if proceeds they appear to be legitimate and it the expense report will be put in status pending to be payment approved. If not, it the expense report will be rejected with a comment indicating why it has been rejected. The expenses report will be then be put back to status open to be modified.

A person responsible for making expense payments responsible will then approve the payment. Once approved, it the expense report will be put in locked status, to be marked as paid. Only a person responsible to make expense report payments responsible will be able to unlock the expenses reports back in case of error.

Once the payment has been done, the Expenses Report is marked as paid indicating date and payment media. If the balance was debit, i.e., advances were bigger that expenses, a warning message will require confirmation of payment.

Detailed Information to be captured

Expense:

Header and footer: General information of the Expense.

Employee: Code and Name.

Trip cause, visit to or general expense cause.

Project to charge expenses to.

Total advanced amount. Both currencies

Total expenses. Both currencies

Balance. Both currencies

Date of Expenses Report issuing.

Expenses approval date.

Payment date and media.

Payment comments, if necessary.

Rejection cause, if necessary.

Expense Line:

Each line details a certain expense.

Including:

Expense date.

Expense Type: (Car usage in Km, allowance, etc.) Some expense types will have a fixed price, some will perform a calculation, other will let operator to include the amount as figures in ticket.

Units. The meaning will depend on expense type. Some types will not allow operator to use this.

Prize to apply. Prize per unit in pattern currency. Depends on expense type.

Expense description.

Expense Line total. Both currencies

Employee:

Employee code. This must be unique in the system.

Name and First name

Site, phone numbers, email.

Querying and Reporting Facilities:

The results of any search in the application may be considered as a report so it must be possible to be printed as well as exported to Office tools like Word, or Excel. It would be desirable to be ordered by any column while it is in the screen and exported or printed in that order.

The Expense Reports will be selected under the following criteria or a combination of them: by project, employee, issuing date, authorization date and payment date. Dates searching facilities will be better introduced as a period.

The Expense Report will show the following information:

Project

Employee Name

Status

Approval Date

Paid

Payment Date

Total Expenses

Balance

The Expense Report will be printed under specific format including the Expense lines.

Employees will allow to be searched by a combination of any data contained in Employee definition.

Figure 48:
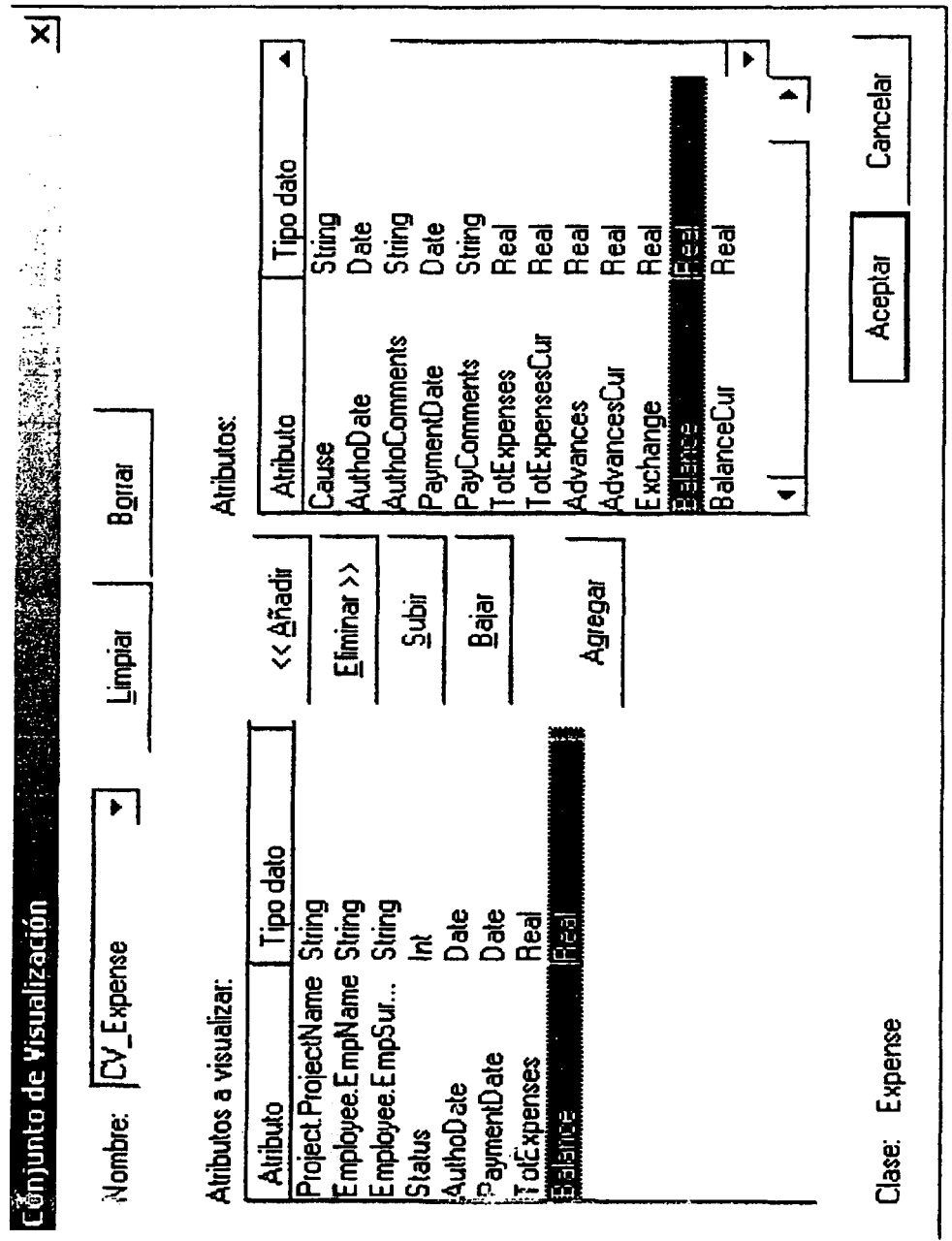
FIG. 48 is a dialog box used by the SOSY modeler to establish the set of attributes which will be displayed for the "expense" class.

FIG. 48 is a dialog box used by the SOSY modeler to establish the set of attributes which will be displayed for the "expense" class.

FIG. 49 shows the dialog box used by the SOSY modeler to establish the searching criteria for the expense class, and indicate the filter formula to use and which variables to request from the user.

Translation Overview

Figure 35:
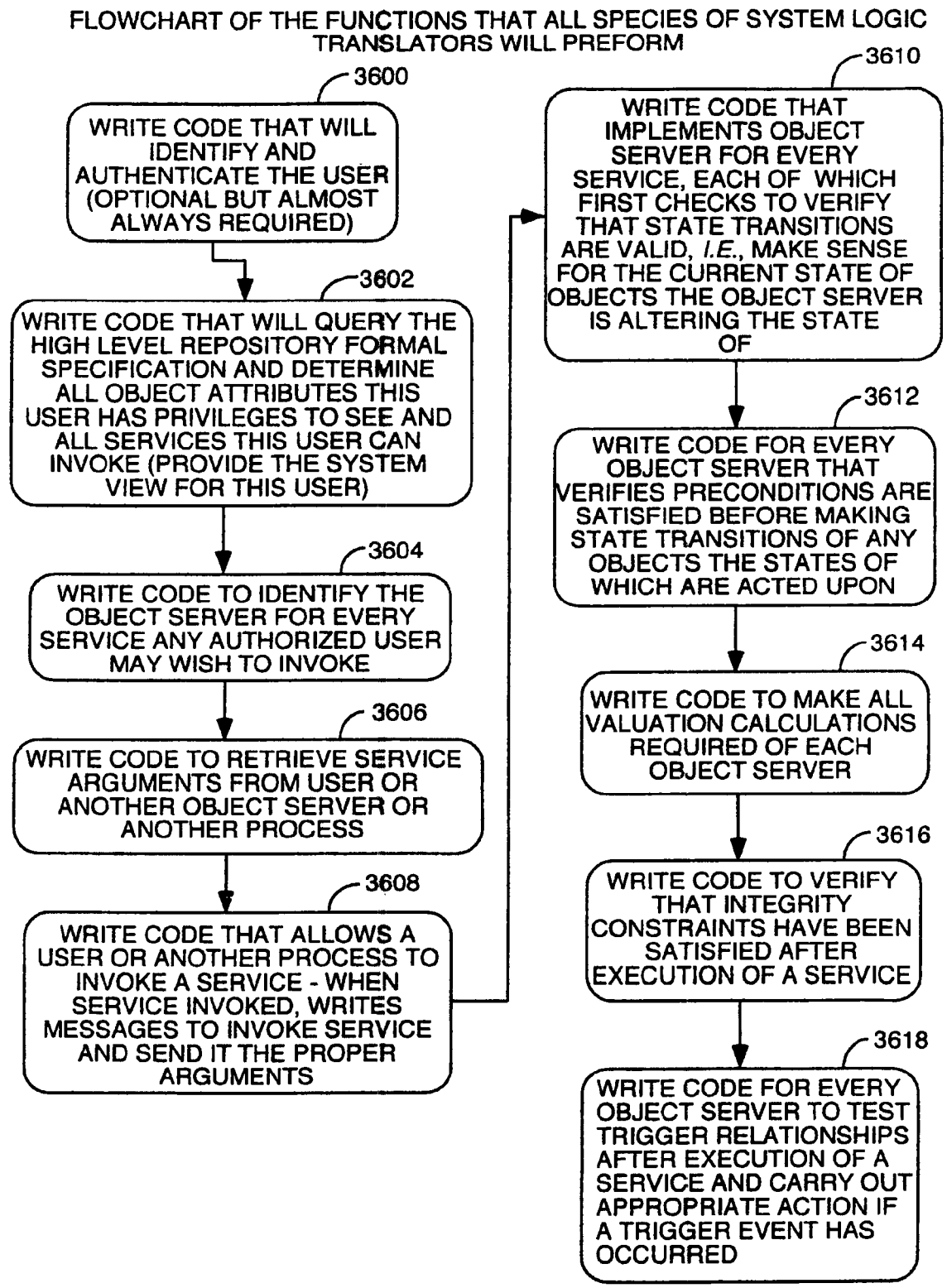
FIG. 35 is a flow diagram illustrating the high level view of the operation of translating a formal specification into a full application by following what it is referred to as "execution model".

The validated formal specification 3215 is the source for an execution model that handles the implementation-dependent features associated with a particular machine representation. To implement the specified system, the way in which users interact with system objects is predefined. FIG. 35 is a flow diagram illustrating the high level view of the operation of translating a formal specification into working system logic computer code to what it is referred to as "execution model" by the system logic translator 3232 in FIG. 31. FIG. 35 does not set out the details of any specific translator to translate the high level repository for any specific formal specification into any specific target language working computer. Instead, FIG. 35 defines the steps or functions that all species in the subgenus of system logic translators would carry out in one way or another, maybe not in the same exact sequence. But at least these functions must be performed. The applicants believe that the translators alone may be novel in generating error-free output files from a validated formal language specification. The invention novelty of this system logic translator subgenus is this collection of functions working together to create a working computer program and not the details of how the functions are actually performed for a particular source formal language and a particular target language source code output, although such details are believed to be separately patentable for every formal language and target source code combination.

System Logic Translator Genus Defined

The process starts by logging the user into the system and identifying the user (step 3600). Although this step might be optional in some embodiments, and thus should not be considered a defining characteristic of the subgenus, most applications require the user to be identified and authenticated so that privilege or access privileges can be implemented to code the system logic to block unauthorized users from performing certain functions.

An object system view is provided (step 3602), determined by the set of object attributes and services that the user can see or activate. In other words, step 3602 represents the process of writing code that will query the high level repository formal specification and determine all the objects and attributes thereof this user has privileges to see and all the services of those objects this user has privileges to invoke.

After the user is connected and has a clear object system view, he can then activate any available service in the user's worldview. Among these services, there will be observations (object queries), local services, or transactions served by other objects.

Any service activation requires two steps: build the message to send to the object server including the values for the arguments needed by the service, and then send the message to the appropriate object server. The object server is a piece of computer code that actually controls the computer to perform the service. In order to build the message, code must be written to identify the object server for every service any authorized user may wish to invoke (step 3604). Steps 3608 through 3618 actually write the code of the object servers that will execute each available service. The existence of the object server is an implicit condition for executing any service, except for the service new.

Services need arguments to execute. These arguments may come from the data structure stored attribute values. Also, the user may need to introduces service arguments for the service being activated. In the library loan example, the service loan needs the arguments as to the identity of the borrower, the title of the book loaned, and the date of the loan. So to build the service activation message, step 606 writes code to retrieve the appropriate service arguments from the requestor (which may be the user or another service) for each service. Thus, the arguments will be supplied from another object server, another program or will be from the user, typically via a interprocess data transfer path from the user interface code written by the user interface translator. Note, in some embodiments, the system logic translator might be combined with the user interface translator, so step 3606 represents the process of writing code to gather the arguments from the user directly or from another process. Step 3606 also writes code to write the service invocation messages that are directed to the proper object server and which contain the proper arguments such that each service may be properly invoked when a request to do so is received.

Step 3608 represents the process of writing code that allows a user or another process to invoke a service, and when the service is invoked, writes a message with the proper arguments needed by the service and sends it to the object server that carries out the service. Once the message is sent, the service execution is characterized by the occurrence of the following sequence of actions in the server object which are the actions that the code written by steps 3610 through 3618 must control the computer to perform in implementing the object server. In other words, steps 3610 through 3618 write object servers that have the following behaviors. First, the state transitions of every object which the object server can alter are checked so as to verify that a valid transition exists for the current object state in the formal specification for the selected. In other words, step 3610 represents the step of writing object server code for every service which verifies state transitions can be validly made (make sense) for the current state of every object the object server is altering the state of before actually altering the state of the object.

Second, step 3612 writes code for every object server which checks preconditions to ensure their satisfaction before acting upon an object to making a state transition thereof. In other words, the code written by step 3612 makes sure the precondition associated with each service are satisfied before the service can be invoked. If either of these events is true (a state transition does not make sense, or a precondition has not been satisfied), the code written by steps 3610 and 3612 ignores the service invocation message, and the service will not be executed.

Next, step 3614 writes codes that computes all the valuation calculations required of each object server. To ensure that the service execution leads the object to a valid state, the integrity constraints (step 3616) are verified in the final state. In other words, step 3616 writes code for every object server which verifies that any integrity constraints on results are satisfied, and takes some appropriate action if they are not such as flagging an error, etc. If the constraint does not hold, an exception will arise in the code written, and the code written will control the computer such that the previous change of state is ignored.

Step 3618 writes code for each object server that will test for the occurrence of trigger events after an object's state has been changed and take appropriate action if a trigger event has occurred. In other words, the code written by step 3618 will have the following behavior. After a valid change of state occurs, the set of condition-action rules (triggers) that represents the internal system activity are verified. If any of them hold (a trigger event is satisfied), the specified service in the condition-action rules will be triggered.

Accordingly, the steps illustrated in FIG. 35 guide the implementation of any program to assure the functional equivalence between the object system specification collected in the Conceptual Model and its implementation in an actual programming environment.

In one embodiment of the present invention, several translators may be used to complement the CASE tool 3210 to constitute an automatic software production system. In one implementation, for example, the translators produce an application in accordance with a three-tiered architecture. Particularly, three different translators arise, corresponding to each tier: a system logic translator 3232, a user-interface translator 3234, and a database generator 3236. In addition, a fourth translator is used, documentation generator 3238. These different translators are characterized by the output produced and, though potentially having the same input, each translator focuses on a particular subset of information in the above mentioned high level repository 3215.

System Logic Translation: the Details

The system logic translator 3232 automatically generates code for a third generation programming language from information in the high level repository. The output of the system logic translator 3232 corresponds with the middle-tier in a three-tiered architecture.

In one embodiment, the system logic translator 3232 produces source code that covers the following: (1) communications subsystem, (2) access to and communication with the persistence layer (the database or other file structure in which the values of all attributes of all objects are stored), (3) standard query services for reading the persistence layer contents, and (4) error handling produced by the persistence layer and client communications.

The communications subsystem is configured to: for receivingreceive requests from a client, invoking invoke internal methods, return and returning replies to requestors, that verify the requestor's existence and authorization to perform the requested service; verify the existence and validity of the requested server instance; create a copy of the requested server instance in memory accessing the persistence layer for persistent attributes or calculating calculate the value of derived ones; validate any state transition for the requested service as specified in the state transition diagram 3400 in the Conceptual Model; verify that the requested service's preconditions hold; perform all valuations related to the requested service as specified in the functional model; verify constraints for the new state achieved by the requested server instance; check trigger conditions to execute the corresponding actions; and make changes in the requested server instance persistent, i.e. state in the data structure stored in a memory.

In addition, code is generated for access to and communication with the persistence layer, service standard queries to read persistence layer contents, and handle errors produced by the persistence layer and communications communicate with the client.

In one embodiment, the first phase of code generation is the retrieval of information from the Conceptual Model 3215 and storage of this information in code generation structures in memory. Three kinds of elements guide the retrieval of information: classes, global transactions, and global functions. Relevant information to be obtained from classes in the Conceptual Model include: name, constant attributes (name, type, requested upon creation, and initialization value formula), variable attributes (name, type, requested upon creation, initialization value formula, and null values admittance), derived attributes (name, type, and derivation formula), identification function, events (name, arguments: name and type, and precondition formula), transactions (name, type, arguments: name and type, precondition formula, and transaction formula), valuation formulae, state transitions (initial state, final state, service name, valid agents, and transition condition formula), static constraints formulae, dynamic constraints formulae, trigger conditions formulae, ancestor class (name), specialized classes (name, specialization condition formula, precondition i, and valuation redefinitions), aggregation relationships (related class, cardinalities, static or dynamic, and role names), and population selection patterns (filter: name and filter variables, order criteria).

Relevant information to be obtained from global interactions in the Conceptual Model include: name, arguments (name and type), and global interaction formula. Relevant information to be obtained from global functions in the Conceptual Model: include: name, return type, and arguments (name and type).

Generated code follows a component-based structure, based on the main unit of information that is found in the Conceptual Model, that is: the class. Each class in the Conceptual Model yields, in a first approach, several of software components. For example, one component, referred to as a "server component" has an interface comprising a method for each service present in the signature of the corresponding class. Another component, whose interface comprises the methods necessary to query the population of the corresponding class, is called a "query component." A particular kind of executive component is the component relating to global interactions defined in the Conceptual Model, whose interface consists of a method per global interaction.

These components constitute the two access points the second or middle tier offered to the first or presentation tier. Server components receive requests from the presentation tier that relate to the execution of services, and query components receive requests from the presentation tier that relate with querying the persistence tier. Nevertheless these are not the only components generated.

Another generated component directly related to a class of the Conceptual Model is the one called the "Executive Component". This entity and is responsible for resolving or executing each of the services in the signature of the corresponding class. This component receives requests from its corresponding server component or from other executive components.

Since a main purpose of the executive component is to resolve the services offered in the class signature, the interface presented by the executive component to the other components comprises of a method per service. Each of these methods is structured according to the execution model in accordance with an embodiment of the invention.

In other words, the executive component is responsible for the following operations: verify the existence and validity for the requested server instance; create a copy of the requested server instance in memory accessing the persistence layer (by means of the above mentioned corresponding query component) to retrieve the values of constant and variable attributes; validate the state transition for the requested service and the present state of the requested server instance as specified in the corresponding state transition diagram in the Conceptual Model; verify the satisfaction of the requested service preconditions; modify the value of the instance variable attributes by performing all valuations affected by the service as specified in the functional model of the Conceptual Model, thus changing the state of the requested server instance; validate the new state achieved by the requested server instance by verifying its static and dynamic restrictions; check trigger conditions to determine which actions should be triggered if needed; communicate with the persistence layer for all persistent attributes of the requested server instance. Additionally, if the class is an agent of any service, another method is added to the interface whose purpose is that of validating the requestor's existence.

Another kind of executive component is a component related to global interactions defined in the Conceptual Model, whose interface consists of a method per global interaction.

If the class belongs to an inheritance hierarchy, all executive components of the same hierarchy are grouped into a single, special executive component. Nevertheless there would still be one server component per class in the hierarchy.

Another component to which a class in the Conceptual Model gives rise is a component called the "T component". This component is used to store a copy of the constant and variable attributes of an instance of the corresponding class, as well as the methods to calculate the value of its derived attributes. The corresponding query component implements a collection whose items are T components.

Another component to which a class in the Conceptual Model may give rise is a component called "P component". This component is used to store in memory the values needed to initialize the constant and variable attributes of the corresponding class when creating an instance of it, or just the values of the attributes that constitute the class identification mechanism. Such a component appears whenever the corresponding class is a multi-valued component of an aggregation relationship.

Another component to which a class in the Conceptual Model may give rise is a component called "PL component". This component implements a collection whose items are P components, as well as the methods needed to add and get items from the collection, and get the number of items in the collection. Such a component appears whenever the corresponding class is a multi-valued component of an aggregation relationship.

Another component to which a class in the Conceptual Model may give rise is a component called "C Components". This component is used to store in memory the values needed to initialize the constant and variable attributes of the corresponding class when creating an instance of it. Such a component appears whenever the corresponding class is a temporal or permanent, condition-based, specialization.

Additional components includes a CC component, an error component, a trigger component, a trigger list component, an instance list component, and condition, disjunction, and conjunction components.

The CC component appears whenever there is, at least one temporal or permanent, condition-based, specialization in the Conceptual Model. The CC component implements a collection whose items are C components, a pair of methods to add and get items to the collection (one pair per C component generated), and a method to get the number of items in the collection.

The error component always appears and is used to store information about the success or failure of a service execution. The trigger component stores information about a satisfied trigger condition so that the corresponding action can be later executed. The trigger list component implements a collection whose items are trigger components, as well as the methods to add an item to the collection, get any item from the collection, get the first item and get the number of items in the collection.

The instance list component implements a collection whose items are executive components playing in the execution of a given service. In addition to methods used to add an item to the collection, get an item, and get the number of items in the collection, this component implements a method to empty the collection and another one to look for an instance by its identification function.

The condition, disjunction and conjunction Components are always generated and support the construction of complex boolean expressions, used to query the persistence layer, structured as a conjunction of disjunctions. The condition component stores information about a simple boolean condition, that is: two operands and an operator (+, −, *, , /, =, < >, <, <=, >=, > . . . ). The disjunction component implements a collection whose items are condition components (that is, a disjunction of conditions), as well as methods to add and get a condition from the collection and a method to get the number of conditions in the collection. The conjunction component implements a collection whose items are disjunction components (that is, a conjunction of disjunctions), as well as methods to add and get a disjunction from the collection and a method to get the number of disjunctions in the collection.

In addition, two modules are also generated: a global module for grouping attributes and methods shared through the generated code, and a global functions module that groups the code of all global functions defined in the Conceptual Model.

Translation Strategy and Architecture

In accordance with one embodiment, code generation is driven by the information retrieved from the high level repository 3215. The translation process can be divided into four phases: validation of the Conceptual Model (performed by validator 3220), translation of the corresponding data model into a relational database management system (performed by database generator 3236), retrieval of information from the Conceptual Model and storage of this information in memory structures and finally, generation of files from the information stored in memory (e.g. reading the information in memory structures to generate code in the target programming language).

Validation of the Conceptual Model is mandatory in the preferred embodiment, while data model translation is optional, but both can be considered as prerequisites to the other two phases which are the ones strictly related to code generation. Translation structures are designed to store input information from the Conceptual Model and all have a method that uses this information to generate source code in the target programming language.

These translation structures include: a class to store information needed to generate server components (server class), a class to store information needed to generate server components for global interactions (global interactions server class), a class to store information needed to generate executive components (analysis class), a class to store information needed to generate executive components for global interactions (global interactions analysis class), a class to store information needed to generate executive components for inheritance hierarchies (inheritance hierarchy analysis class), a class to store information needed to generate query components (query class), a class to store information needed to generate T components (T class), a class to store information needed to generate C components (C class), a class to store information needed to generate CC component (CC class), a class to store information needed to generate P components (P class), a class to store information needed to generate PL components (PL class), a class to store information on the arguments for every service of every class in the Conceptual Model (arguments list class), a class to store information on the identification function of every class in the Conceptual Model (analysis class list class), classes to generate the methods needed to resolve a service in executive components (event class, shared event class, transaction class, interaction class), classes to generate the auxiliary methods needed to resolve a service in both executive components and executive components for inheritance hierarchies (precondition class, static constraints class, dynamic constraints class, . . . etc.). classes to generate methods needed in query and T components (T & Q method classes), a class to generate inheritance-specific methods (inheritance method class), and a class to monitor the generation process (code generation class).

The code generation class is responsible for retrieving all the information needed to generate code and for doing so in the appropriate order, for writing to files the generated code and organizing it into files properly according to the component-based structure. The code generation class maintains lists of the above mentioned generation structures in memory in which information retrieved from the Conceptual Model is to be stored and it later loops through these lists to write the appropriate files.

The information retrieval process basically comprises a series of loops through the classes in the Conceptual Model to gather all information needed, a loop trough global interactions and a loop through global functions in the Conceptual Model.

The last phase in the code generation process covers writing to files according to the component-based structure presented herein. This process comprises: looping through the lists of instances above described that maintain the information needed to generate components and their attributes and methods, and call each element's code generation method; generating global interactions executive component; generating global interactions server component; generating global functions module; and generating standard components.

For each global function in the Conceptual Model, a method is generated in this module that: has a global function name, has an argument. For each argument in that global function with the same name and whose type is translated into the corresponding one in the target programming language, and its return type is translated too.

User-Interface Translation

The user-interface translator 3234 automatically generates source code for a third generation programming language from information in the high level repository. Its output corresponds with the presentation tier in a three-tiered architecture. Thus, the user-interface translator 3234 provides as output the source code of a component that implements the user interface functionality. This component is automatically generated without human intervention. The user-interface translator 3234 uses as input data a validated Conceptual Model 3215 and offers as output data, source code in a third generation language that implements an equivalent functional prototype related to the Conceptual Model the component is derived from.

In one embodiment of the present invention, the user-interface translator 3234 produces source code to perform the following: a communications subsystem able to send requests to a business component, and receive replies; a logon to system for user authentication; and a menu of available services for specific authenticated user. For each available service, frame, screen or data collection dialog of all service arguments, the user-interface translator 3234 generates code that sets initial values for arguments, validates introduced data (type, range, object existence, etc.), and calling to server activation. In addition, the user-interface translator 3234 generates code for standard query services that list all instances status in a class and error handling.

Additionally, code is generated for a wider and flexible user-interface operation. In a query service frame, form or screen, the following functionality will be available when a certain instance has been selected: navigation through relationships with related selected object. This navigation is used to browse among related data items following its related links. Additional functionality includes services activation for selected object; advanced query services including: filters (population selection), views (status selection), and sorting criteria; and context keeping for filling-in known services arguments. Context keeping is a user-facility. Context is data associated to the working user environment. This data is useful to provide default values for service arguments.

For its input, the user-interface translator 3234 reads specification 3215 of a Conceptual Model and stores this kind of information in intermediate structures in memory. The user-interface translator 3234 is independent of the input medium in which the Conceptual Model is provided. In this way, the intermediate structures can be loaded from different data sources. The model is iterated in several passes to extract the relevant information in each phase of the translation process from the formal specification, including information about classes, aggregation relationships, inheritance relationships, agent relationships, global interactions, user defined functions, and interface patterns.

Translated applications are composed by forms that contain the user-interface offered to the final user. A form, in abstract sense, is the interaction unit with the final user. Forms are translated depending on capabilities of the target environment to match the requirements: e.g. windows dialogues for Windows environments, HTML pages in Web platforms, applets in Java, etc.

Figure 36:
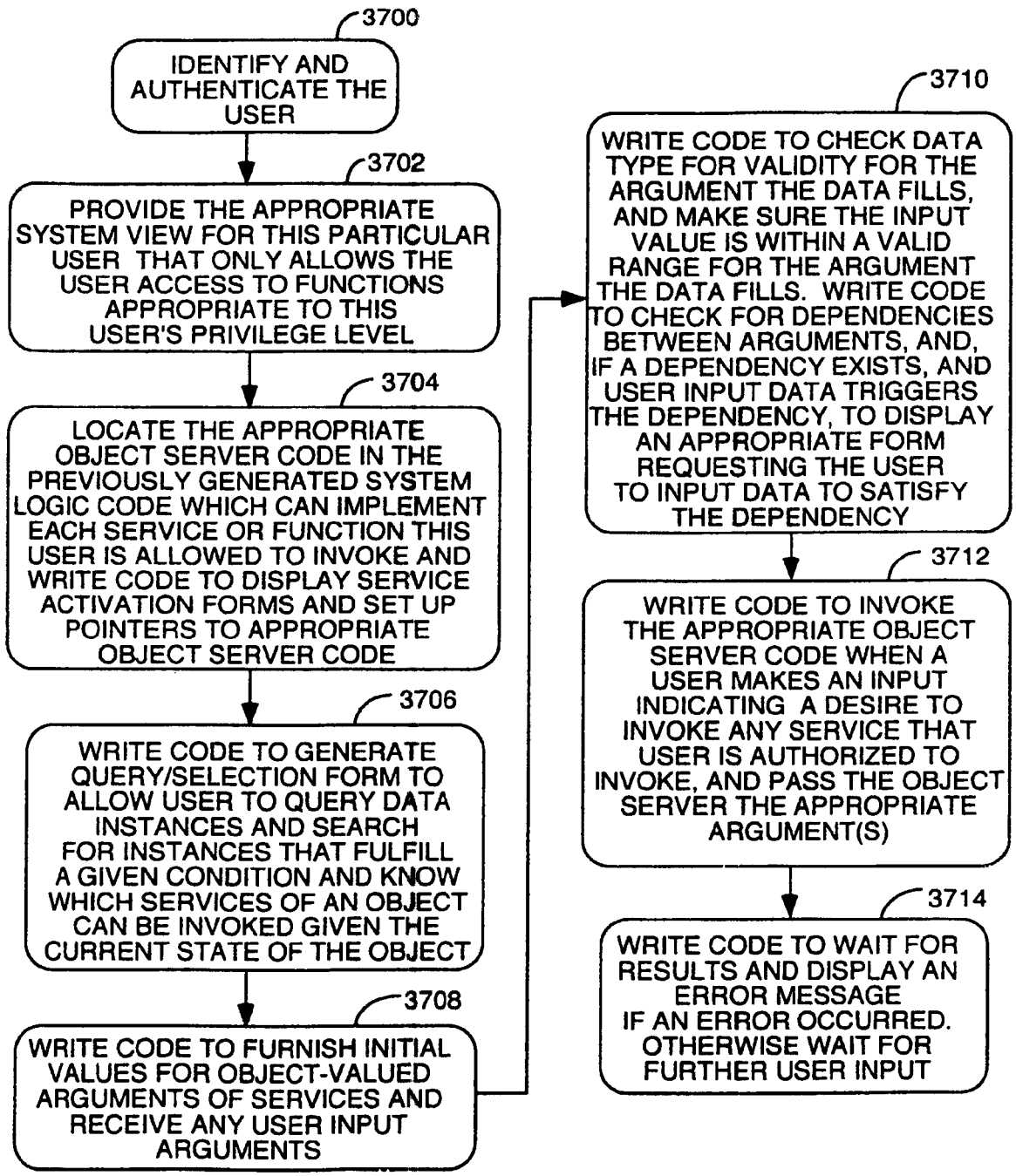
FIG. 36 is a flow diagram representing the sequence of functions that all translators in the subgenus of user interface translators will perform.

FIG. 36 is a flow diagram representing the sequence of functions that all translators in the subgenus of user interface translators will perform. The details of how each function is performed will vary from one target source code type to the next, but all species will share the characteristics of performing the functions of FIG. 36, possibly not in the same order.

Translated applications supply the user connection to the system. The user connection is resolved using an access form to identify and authenticate the user, block 3700. In addition, the translated application provides a system user view, block 3702. A user must be able to access services the user can launch, but should be presented with a system view that is appropriate to the user's privilege level. Block 3702 represents the process of looking up the user's privilege level and determining which objects the user can have access and presenting a system view to the user which only allows the user to invoke functions that are appropriate to the user's privilege level. The main form is designed to accomplish this task.

For each service that can be executed by a user, the translated application locates the appropriate object server code in the system logic code previously generated, and generates an activation service form which points to the appropriate object server for each service the user can invoke, block 3704.

For each class, the translated application generates a query/selection form. This form allows users to query data instances, search instances that fulfill a given condition, observe related instances and know which services can be launched for a given object in its current state, block 3706. For each service, the translated application furnishes initialization values for object-valued arguments. Initial data is provided too by managing information obtained from the browse made by the user, and any user input arguments for services are checked to make sure they are valid data types for the arguments the data is intended to supply, and within valid ranges for the arguments the user input data is intended to fill. Blocks 3708 and 3710. The process represented by block 3710 also represents the process of writing code to check for dependencies between arguments. If this code finds that a dependency exists, and a user input triggers a dependency, it displays an appropriate form requesting the user to input data to satisfy the dependency and check that data for valid data type and within an acceptable range.

Block 3712 represents the process of writing code to invoke the appropriate object server code when a user makes and an input indicating a desire to invoke any service that the user is authorized to invoke, and to pass to that object server the appropriate arguments. Block 3714 represents the process of writing code to wait for results and display an error message if an error occurred. If no error occurred, the code waits for further user input.

The user encounters different scenarios interacting with the application. These scenarios lead to defining different types of forms. In the next section, each kind of form will be described.

In the Conceptual Model 3215, some classes are defined as agents of services classes (called agent classes). That is, if an object is a service agent it is allowed to request the service. Each agent object must be validated, i.e., authenticated before trying to request services. The Access Form requests authenticates by requesting selection of an agent class (selected from a list of valid agents classes), requesting an object identifier and requesting a password. The data collected is used to verify if there exists a valid agent object that is allowed to access the system. This is how users of the target program (each user is an agent class) are authenticated.

The Application Main Form contains a menu, where user can view the services he is allowed to execute. The source code required to implement each action requested by user is automatically generated.

For each accessible service for at least one agent, a Service Form is generated. These forms have an introduction field for each argument the user must provide. This argument's fields have attached code to validate data-types, sizes, value-ranges, nulls, etc. (block 3710 process). Object-valued fields provide facilities to search the object browsing information and filter it. Code is generated to accomplish this task.

Each service argument can take its initial value in three different ways:

1. By Initial values. In the Conceptual Model, the designer can provide default values for attributes and arguments. If such value exists, code must be generated to supply the value (block 3708).

2. By Context. Context information (for example, a list of recently observed objects) is useful to suggest values to object-valued arguments that have the same type as collected ones. A function is generated to search appropriate values in the recently visited objects list.

3. By Dependency Pattern. In the Conceptual Model, the system designer can define Dependency Patterns. The Status Recovery pattern is an implicit set of dependency patterns too. In both cases, the change on an argument, can affect values in other arguments. So, the processing of block 3710 is performed.

Data Validation (block 3710) can occur just after data input, interactively warning the user and just before sending data to system-logic. Object-valued arguments validation requires checking object existence. To support validation, a function is generated for each service argument. The function is invoked before sending a request to system-logic.

The code written by one species of the user interface translator works in the following way. When the user requests service execution, the service arguments are validated by the code written by block 3710. If the service arguments are valid, system logic is invoked to accomplish the service by code written by the process of block 3712.

The message built to invoke the system-logic uses the formal order to sort the arguments.

After executing the service, the user is informed whether the service succeeded or not (block 3714). Accordingly, code to validate arguments and Code code to invoke the system-logic with necessary arguments in the formal order are generated. Furthermore, possible errors are returned to inform the user.

The Query/Selection Form permits the querying of objects (that can be restrained by filters) and the selection of an object. When an object is selected, the user can browse to other data items related to the object. In the same way, the user can launch a service of the selected object.

These query/selection forms include graphic items representing filters. A visual component is used to filter the population of a class. Filters may contain variables. In such cases, fields for the variables are requested to users in order to form the condition of the filter. For example: Find cars by color, by type and model.

These query/selection forms also include a visual component to show objects. Inside this component objects that fulfill the filter condition (or every class population if filters are not defined) appear. The attributes displayed in the component are fixed by a Display Set.

These query/selection forms also include a visual component to launch services. For example: given a car, the user can launch services in order to rent the car, return, or sell it. This task is achieved by a function that determines which service to launch of what object. The corresponding Service Form is invoked for each exposed service. These query/selection forms also include a component to initiate browsing. For example: given a car, the user can view the driver, the driver's sons, etc. When the user navigates (follows a link from an object) a new query/selection form is displayed. In the same way that the previous component, there exists code to invoke the next form to display when user browses objects. When a query/selection form is reached by navigation, the form receives information about the previous object in order to display only the data related to that initial object.

In the applications, visited objects and navigation paths followed by users are stored in some embodiments. This information is named Context Information. When the user browses data between query/selection forms, the path followed is stored. Finally, when the user tries to invoke a service and a service form is needed, the application can provide, as an extra input to the service form, this contextual information. Then, the Service Form uses this data to provide initial values for object-valuated arguments.

User-Interface Translator Architecture

Using the Conceptual Model 3215 used as input, the user-interface translator 3234 can retrieve information from memory structures, a relational database, using a query API or any other input source. An intermediate structure in memory is filled with the Conceptual Model data relevant for translating the user-interface component. Intermediate structure follows an architecture to the one defined in the Conceptual Model schema in which can be queried for classes, services, and attributes for a specific Conceptual Model.

When data is loaded in the intermediate structure, the real translation phase begins. Inside the source code files of the generated application, two types of files can be distinguished. One type of file is a set of files having fixed contents. These files correspond to structures or auxiliary functions widely used that are always produced in the same way. These files are generated by dumping byte streams directly from the translator to final files in order to create them. Other files strongly depend from the Conceptual Model that is being processed. Therefore, although these files have a well-defined structure (detailed in the previous section), they have variable parts depending on the processed model. The user-interface translator 3234 iterates the Conceptual Model to extract the relevant data to generate these variable parts.

The translation process for the user-interface translator 3234 has the following tasks for the preferred species as part of the genus processing symbolized by FIG. 36:

1. Generate the fixed files, e.g. headers, definitions, constants, and auxiliary functions to its respective files.

2. Generate auxiliary widgets (controls or Java Beans) depending on the application 3. For each class, generate a query/selection form, an instance selection component, a specialization component (if class is specialized from other class and requires extra initialization). For each service class, also generate a service form.

4. Generate an access form (identification).

5. Generate a main form containing the menu application (block 3702).

6. Generate communication functions to reach system-logic server (block 3704). These functions encapsulate the invocation of services available in the prototypes.

The Access Form generated as by the code written by block 3700 is a little dialog box containing: a list of agent classes (from this list, the user chooses one), a field where the user provides OID for a valid object instance belonging to the previously selected class and a field for password. This form is mostly generated in a fixed way. The only varying section for each model is the mentioned agent classes list. By iterating over the model classes list and by checking which classes are agents such agent classes list can be obtained.

In order to provide access to the application's functionality (block 3704), the services are arranged in an access-hierarchy to be converted to menu bars (Visual Basic client), HTTP pages (Web client) or any other structure that allows browsing. By default, the hierarchy is built by iterating the classes and services in the Conceptual Model. The hierarchy can be seen as an access tree to the application. For each class, a tree item is built labeled with class alias. For each built-in item, this mode has the following items as descendents: an item labeled as 'Query' to access a query form; an item for each service defined in the current class labeled with the service alias; and, in the case of inheritance relationship with other classes, an item is built for each direct subclass labeled with subclass alias. Recursively, the same algorithm is applied until the inheritance tree is fully explored.

A Service Form requires the following input data extracted from the Conceptual Model: Service to generate, service class, arguments list, interface patterns linked to arguments. For each service, a form is generated that contains a graphic part and a functional part. The graphic part includes a widget attached to each argument that needs input from the user and a pair of widgets to accept or cancel the service launch. The functional part includes code to implement the event-drivers for the previous widgets, to initialize the properties of these widgets with default values, to validate introduced values, and to invoke the service in the system-logic component.

A detailed explanation of how to generate a Service Form follows. First, two argument lists are obtained. The first one corresponds to the arguments defined in the service declaration (FL, Formal List). In this list, the arguments are sorted by its formal declaration order. The second one contains the same arguments sorted by the presentation order (PL, Presentation List). Both orders are specified in the Conceptual Model.

Iterating through the formal Formal List and for each argument: create a widget for each argument that has to be obtained from the user (block 3708) and set relevant properties to arguments like: type, size, can be null, Introduction Pattern, Defined Selection Pattern or Population Selection Pattern Widgets are added for OK and Cancel commands, and graphic positions of widgets are arranged so they do not overlap. In one implementation, the form is divided in a logical grid of n columns by n rows and assign positions from left to right and from top to bottom to conveniently arrange the widgets. The logical positions are translated to physical position in the target language and rearrange action commands in the bottom-right corner of the form. Finally, the form is resized to adjust the size of data contained therein.

For output, the standard header of a form is dumped to a file. This step is dependent of the target language selected. Then, the graphic part of form is dumped to the file, including the definition of basic form properties, the definition of each widget, and the widgets' actions. Finally, the source code attached to this form is translated and dumped. This process includes translating generic functions to manage events in the form, such as open and close events and produce code to assign and free resources. Also, functions to handle the Status Recovery Pattern and dependencies between widgets are translated. Depending on the Status Recovery Pattern attached to the service, and possible Dependency Patterns defined in the service, code for changing argument values must be generated and the code that triggers such dependencies. The validation code is translated too. There are validation methods to check the values gathered in the widgets are right. Finally, a function to invoke the appropriate object server of the system-logic services is generated. The function built contains: a reference to system-logic object where the service is going to be executed; the invocation to a method that implements the service in the system-logic; and the arguments necessary to such function, constructed from values supplied from the user through widgets (block 3712).

In order to generate a query/selection form, the following Conceptual Model information is required: a class and its properties (alias), and the list of the Population Selection interface patterns defined for the class. Each pattern contains: a display set, a filter, and a sort criterion. In case there is no visualization set defined, the list of attributes belonging to the class is assumed. If a class lacks a population selectionPopulation Selection interface pattern, the following default values will be assumed: every attribute defined in the class is considered as part of the display set, and neither a filter (in this case the whole population of the class is returned) nor a sort criteria are attached.

Generating a query/selection form also requires information about the relationships of the class. For every class, a form is generated based on this information and contains a tabular representation of the display sets of the class, a set of grouped filters that allow to restrict search through the population, and a pop-up menu including navigability links to the classes related to the first one and available services to be launched over instances of the class.

The generated software component, which has been described before, provides the user-interface client functionality that includes all the required functionality for both validating and executing a prototype compliant to the Conceptual Model it has been derived from. The applications of the component are: prototyping, to validate the Conceptual Model before the user for capturing new requirements; testing to validate the Conceptual Model by the analysts to verify that the model faithfully reflects the requirements; and ultimate application production, once the process of requirements capture is completed, the generated component can be considered as a final version implementing a functionally complete and ergonomic user interface. The component can be edited to customize the application to users desires with very little effort.

Data Model Translation

In the preferred species, the database generator 3236 automatically defines a data model in a Relational Database Management System (RDBMS) according to the validated specification in the high level repository 3215. In other species, any data structure that at least stored the values of all object attributes in a manner that allows at least the system logic code and, preferably, the user interface code to retrieve them at will may be coded. The output of the database generator 3236 corresponds with the persistence tier (database or shared data structure) in a multi-tiered architecture. In one embodiment this may be true, but it is not mandatory that the persistence tier in a multi-tiered architecture corresponds with a Relational Database Management System.

Figure 37:
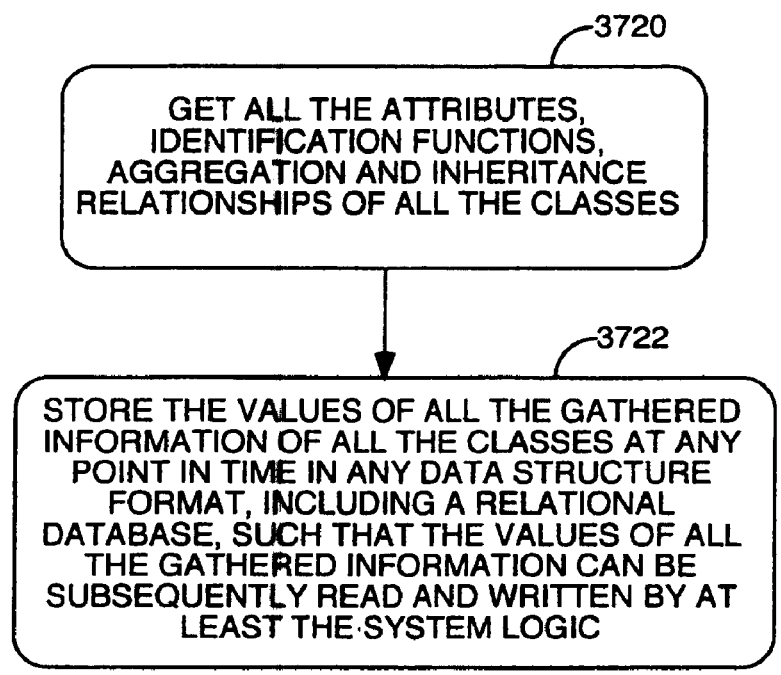
FIG. 37 is a flowchart of the functions that all species of the subgenus database translator 236 must perform.

Referring to FIG. 37, there is shown a flowchart of the functions that all species of the subgenus database translator 3236 must perform. The details regarding how each function is performed will depend upon the formal language of the high level repository, the source code type of the system logic, the operating system in use and the data structure being created, but all species will perform the two basic functions of FIG. 8. Block 3720 represents the process of getting the values of all the attributes of all the classes at the initial time. Block 3722 represents storing the values of the attributes so obtained in any data structure format, which could include a relational database. The only thing that is important is that a data structure be created that stores the entire initial state of all attributes in a structure which can be used by the system logic to subsequently read and write the values of these attributes.

From the information in the high level repository about a given Conceptual Model, scripts are generated in order to create and delete tables, constraints (primary and foreign keys) and indexes. Scripts can optionally be executed in a Relational Database Management System to effectively create said data model.

From the point of view of relational databases, data is stored in tables with relationships between them. However, from the object oriented programming point of view, data is stored in object hierarchies.

Although the automatic software production system in accordance with one embodiment of the present invention is based on an object oriented methodology, it is necessary to find a physical data storage system to permanently store data managed by generated applications. Relational databases are preferred, because they are the industry-standard way to store data and, consequently, use of tables instead of objects would be desirable. Nevertheless, many object-oriented applications, like those produced in accordance with an embodiment of the present invention, can be compatible with the Relational Model, since the static aspects of objects can be stored in tables following a translation process.

The generated data model comprises a set of tables and the corresponding relationships, as well as constraints on primary and foreign keys and indexes. The generated data model reflects system data with the attributes defined in the classes specification and other class instances properties like their state, and role if they are agents.

Information, gathered from the high level repository 3215 and needed to produce the corresponding data model, focuses on classes and include the name, constant attributes (either emergent or inherited); variable Attributes attributes (either emergent or inherited); identification function; inherited identification function; aggregation relationships (either emergent or inherited); and agent information.

Preferably, the generated scripts follow a standard: ANSI SQL 92. This fact means that the generated data model can fit any database management system based on ANSI SQL 92, particularly most well known relational database management systems.

The process to obtain the data model follows these steps: For each elemental class of the Conceptual Model, a table in the selected relational database is created. For each constant or variable attribute in the class specification, a field in the table corresponding to the class is created. The field data type depends on Conceptual Model attribute data type translated into the target relational database. Derived attributes are not stored in the database since their value will be calculated upon request by special methods in the server code generated.

Primary keys are determined by attributes marked in the Conceptual Model as being identification attributes. Thus table fields corresponding to this attributes will constitute the primary key of the table. As a particular case, tables corresponding to specialized classes, in addition to fields representing emergent attributes, have fields that correspond to attributes that constitute the primary key of the table representing their ancestor class. If a specialized class does not have an identification function of its own, these fields, copied from the ancestor class, constitute the specialized table primary key. At the same time, they constitute the foreign key to the parent class table. On the other hand, if a specialized class has its own identification function, these fields only constitute a foreign key to the parent class table.

Aggregation case is more complicated, because aggregation has more dimensions. The aggregation relationship dimensions determine its cardinalities which in turn determine representation in the database: If the relationship is multivalued (maximum cardinality set to M) in both senses a new table is added in order to represent this aggregation relationship. This table has a field for each one that constitutes the primary key of related tables. The set of all these fields constitutes the primary key and, individually, fields coming from each related table's primary key, constitute foreign keys to each related table.

If the relationship is univalued (maximum cardinality set to 1) in one sense, the class related with only one instance of the other one copies the fields of the primary of the other one. These fields constitute a foreign key to the related class table.

If the relationship is univalued in both senses, any of the tables could have the foreign key to the other. The adopted option in this case is that the aggregate class has the reference to the component class. With respect to minimum cardinalities, if minimum cardinality is 0 then the corresponding field will take null values. Otherwise it will not. If identification dependence exists between two classes then fields of the primary key of the non-dependent class are copied to the table corresponding to the dependent class. They will be part of its primary key, and be a foreign key to the table of the non-depending class.

Indexes may be generated to optimize searches and reduce response time. For each foreign key, an index will be generated so foreign keys will also be search indexes.

So far the static aspects of an object have been covered, but some dynamic aspects need also be discussed. The occurrence of services characterize the evolution in an object's life for an object's state changes whenever a service happens since the value of its attributes characterize its state. The state transition diagram determines valid lives for an object. In order to monitor state transition, a new field will be added to each table corresponding to a class, to store the name of the state in the state transition diagram in which an object is at a given instant.

Generated applications must perform user authentication by requesting identification and password to agents logging on to the system. A new field will be added to tables corresponding to classes that are agents of any service in the system, to store the password of said agent.

Documentation Translation

The CASE tool 3210 allows for additional information to be introduced at analysis time, which can be used to generate system's documentation. Accordingly, the documentation generator 238 automatically produces a set of documents including the formal specification, full Conceptual Model details documentation, user's help, and others, from information in the high level repository 3215.

Figure 50:
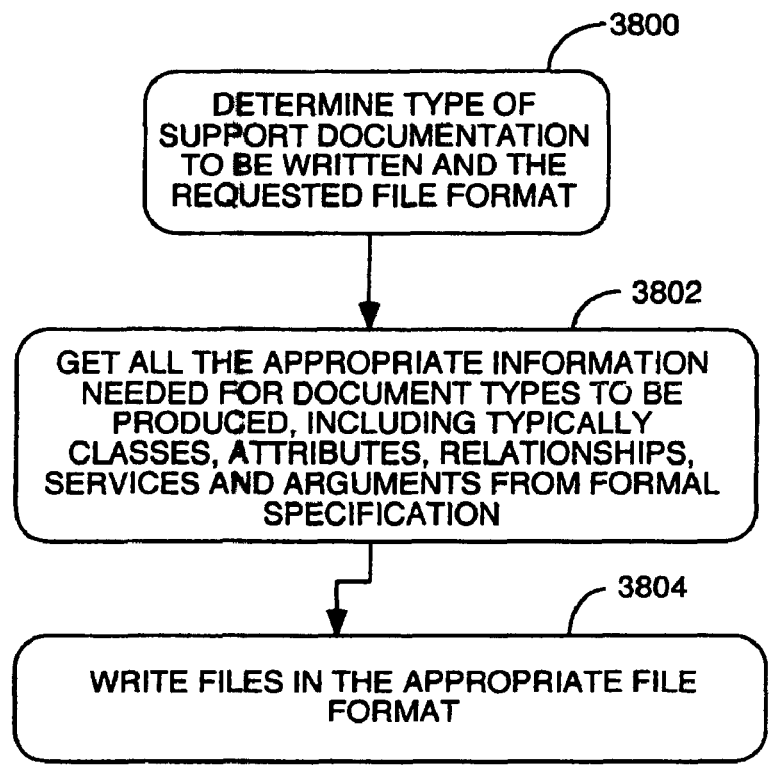
FIG. 50 is a flow diagram defining the characteristics that all species in the genus of user documentation translators will share.

FIG. 50 is a flowchart of the processing steps that every species in the subgenus documentation translators will have to perform. Step 3800 represents the process of determining from configuration data or other user input which types of support documents are going to be generated. Step 3802 represents the process of getting from the Formal Specification all the appropriate information needed for the requested documents. Typically the information gathered is classes, attributes, relationships, services, arguments, etc. Step 3804 represents the process of writing the support documentation in files of the appropriate format.

Due to their different nature, there is a specific generation process for the formal system specification. The rest of produced documents are based in a generic data process. This process allows to obtain the same documents in different formats and define any new type of document.

CASE tools must provide multiple documents that can be automatically generated from Conceptual Models previously gathered. The documentation generator 3238 answers the need for information requests and queries performed on a Conceptual Model. The documentation generator 3238 allows generation of queries, specific manuscripts or well-formed documents in order to document properly a project.

In a preferred embodiment, complete generation of Conceptual Model is generated in an ASCII format with OASIS syntax. OASIS is a formal specification in an object-oriented language. The OASIS specification comprises the part of the Conceptual Model related to analysis of the problem. Other parts, like interface patterns, are not included in the OASIS specifications.

Document generator provides, by default, general documents, services documents, and help documents. The general documents include a natural language specification description. The services documents include a detailed description of classes and services. The help documents contain an on-line help for generated prototypes.

The Documentation Generator uses as target languages some recognized standard formats for documentation: ASCII, plain text, navigational HTML with multiple documents, navigational HTML with one document, LaTeX, and Rich Text Format (RTF).

This Documentation System is scalable and can be extended to add a new kind of document or target language. Adding a new target language allows all defined documents to be generated with this new language. In the same way, adding a new document type will be generated to any supported target language.

In order to produce an OASIS specification, a process iterates over the information structures and writes to a file the corresponding text strings in the OASIS language. In the inner process, the iteration over the structures can be detailed as: (1) write specification headers; (2) For all class selected to be described: write its OASIS template (attributes, events, derivations, restrictions, preconditions, triggers and process); (3) for all global transaction, write its declaration and OASIS definition; and (4) write the end spec.

A document is generated in an intermediate block language (IBL). In such language the document is a block of document type and contains n child blocks. Recursively, by continence relation and having fixed a block taxonomy, documents can be defined based on block's structures. A block is a structure that contains the following properties: name, category, block type, block text, and list of contained blocks.

The generation is supported by an algorithm that implements loops iterating over the Conceptual Model following the order fixed by the document. In these iterations, the document is built creating and linking the blocks that constitute the document.

When the block structure is built, the resultant structure, a tree of blocks, is processed by a translator to convert it to a document in the selected target language. This algorithm using recursive descent analysis is capable to convert the blocks to tags in the target language depending on the information stored in the block and contained blocks.

As example, a block of type MM_SECCION1 and containing the text "Title" will be translated to the next string HTML equivalent: <H1>Title</H1>

Generating Full Applications

Accordingly, an automatic software production tool is described that captures information requirements, also referred to as "business processes" from a triple perspective: static, dynamic and functional. This allows system designers and analysts to fully capture every aspect of the reality they model.

System Logic Translator is then responsible for gathering all this information, which would have been previously validated to assure correctness and completeness, and automatically produce code that implements every aspect of the modeled reality. This system logic code has the following features:

The system logic code is complete and correct. Since information gathered by the System Logic Translator has been previously validated, produced code can be assured to be both complete and correct thanks to the set of translation recipes provided. The set of translation recipes cover every aspect that can be modeled by an analyst, so everything that can be expressed and captured in a Conceptual Model can be translated into source code. Every translation recipe assures for correct translation thus resulting in error-free source code.

The system logic code is for a full application, not just a prototype. Generated code can be compiled (with the appropriate compiler depending on the target programming language) and executed "as-is" because it is fully translated from the Conceptual Model information input. Generated code is not a mere collection of method skeletons but complete methods. Furthermore, no useless code is produced and no line of code is generated more than once. In addition to this, even being the generated code well structured and readable, comments can be automatically generated as a means of internal code documentation thus improving readability.

The system logic code is robust and includes error checking and handling. Correctness and completeness allow for the production of robust code. According to the information in the Conceptual Model, errors fall into two categories: model or internal errors and external errors. Internal errors correspond to properties that must hold at a given instant according to the Conceptual Model (e.g.: a precondition that does not hold, an integrity constraint, violation of a maximum cardinality of an aggregation relationship, etc.) External errors correspond to causes alien to the Conceptual Model (e.g.: a system failure, a database failure, . . . etc.).

The generated code handles errors according to this classification as follows: For internal errors, the system logic translator identifies every point where an internal error might occur then produces error checking and handling code to notify the client about such an error's occurrence. Again, internal errors can be categorized and given a specifically defined treatment, such as customizable error messages and error codes. For external errors, the system logic translator identifies every point where an external error might occur then produces error checking and handling code to notify the client about such an error's occurrence. Since external errors cannot be categorized, they are treated in the same standard way.

Therefore, the automatic production of error checking and handling code for every possible situation can assure any translation of a Conceptual Model to be robust.

The system logic code handles transactional behavior. The generated code presents transactional behavior in the sense that the code provides clients a well-defined interface, which allows them to request services from the system. Those services are executed in a transactional way: every input argument of the service must be provided by the client, then system logic performs the corresponding operations and replies to the client. Services in a Conceptual Model can be in turn decomposed into actions. The generated code assures for all actions composing a service be successfully accomplished or none of them. In addition, changes to objects affected by the actions a service is divided into do not effectively take place until all these actions have successfully terminated. Transactional behavior also enhances integration with legacy systems.

The system logic code is independent from the user interface. The generated code provides a well-defined interface allowing for clients to request services. But this interface does not depend on the clients interacting with it. This allows for a heterogeneous set of clients interacting with the same system logic. Thus, clients for a specific system logic need only know the interface it will present to them. This feature also enhances integration with legacy systems and decomposition of huge information systems or Conceptual Models into smaller ones, which, thanks to their well-defined interfaces, can interact with each other.

The system logic code is independent from the persistence layer. The generated code is responsible for interacting with the persistence layer implementing what is regarded as "persistence services". These services are responsible for: adding, retrieving, updating, and deleting information in the persistence layer. These services are necessary for the system logic to perform its tasks but, in addition to this, system logic hides the persistence layer to clients by providing services to perform queries on the persistence layer. This implies that clients need not know the physical location of the persistence layer; need not know the structure of the persistence layer, because they are provided with services to perform queries on the persistence layer; need not be authorized users of the persistence layer because access to the persistence layer is entirely managed by the system logic; and need not even know that there is a persistence layer.

To sum up, the code automatically produced by the automatic software production system of one embodiment of the present invention corresponds to that of a true final software application, instead of that of just a prototype. To maintain this distinction, some of the differences between the generated system logic code from that of a prototype are explained.

(1) Completeness: A prototype does not fully cover functionality of an information system, nor is it intended for every possible flow of execution, while our automatically generated code, being a final application, totally covers the functionality captured in the corresponding Conceptual Model, as well as every possible flow of execution.

(2) Correctness: A prototype aims to verify user's needs and requirements and verify correctness of execution. The automatically generated code in accordance with an embodiment of the present invention, on the other hand, aims to verify user's needs and requirements, for it is correctly generated.

(3) Robustness: A prototype is not robust, because the prototype is not produced with error checking and handling code. Rather, this code is not produced, typically by hand, until the very last step of codification, where user's needs and requisites have proven to be satisfied and a final application can then be produced. A final application, such is the case of our automatically generated code, must come with all the code necessary to assure robustness. Since this is usually codified by hand, programmers often forget to add such code in many places where needed. This leads to high costs of maintenance and disrupts the balance between system logic code and error checking and handling code. The system logic translators described herein provides all the necessary (and just than the necessary) code to deal with error checking and handling.

(4) Scalability: Prototypes are not scalable because they tend to be discarded during the process of validating user's needs and requisites. Final applications can be designed to be scalable because they aim to last much longer than a prototype. Nevertheless scalability implies following certain guidelines during design phase. With embodiments of the invention, system analysts need not worry about scalability because such a task falls under the System Logic Translator 232 responsibilities. So, analysts focus on analysis matters knowing that the resulting code will be scalable. Furthermore, different Conceptual Models translated by the System Logic Translator can interact with each other through their well-defined interfaces.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A process for automatically generating the source code of a computer program user interface for said computer program from a formal specification of a User Interface Model for the user interface of a computer program to be automatically written, said formal specification of said User Interface Model being written in a formal language having rules of syntax and semantics which have been used to validate said formal specification, comprising the steps:

A) storing requirements data about the desired structure and operation of a user interface of said computer program the computer code of which is to be automatically written, said requirements data being from said Formal Specification of said Presentation Model, said requirements data taken from said Formal Specification being stored in appropriate places in translation structures which are classes stored in a memory of a computer so as to generate articulated translation structures which are translation structure classes which have had requirements data stored in the appropriate attribute fields, each of said templates or translation structures being a building block from a meta-model and each corresponding to a conceptual pattern for use in building said Presentation Model and each serving to store requirements data from said Presentation Model and having a method that uses said requirements data stored therein to generate a source code component for said computer program to be automatically written, said building blocks or templates including the traditional conceptual patterns from an OO-Method meta-model of:
Class,
Attribute,
Service, and
Argument
and their usual relationships, to with, a Class has Attributes; a Class has Services, and Services have Arguments and classes can have inheritance and aggregation relationships,
and wherein said building blocks include new elements in the form of new building blocks extending the traditional concepts of said OO-Method meta-model, said new building blocks each having a template or translation structure in memory and comprising user interface patterns defining a pattern language, said pattern language including patterns at three levels, a Hierarchical Action Tree pattern being a tree structure pattern at a first level of said pattern language which provides user access in said user interface of said computer program to be automatically written to exposed functionality of said program, Interaction Units being patterns at a second level of said pattern language which provide user interface scenarios including the ability to present information to a user and accept user input in some patterns, and elemental patterns on a third level of said pattern language and used to define and articulate said Interaction Unit patterns, said new building blocks including the relationships between said elemental patterns and said Interaction Unit patterns and the relationships between said Interaction Unit patterns and said Hierarchical Action Tree and the relationships between said Interaction Unit patterns and said traditional concept building blocks Classes, Attributees, Inheritance, Aggregation relationships, Services and Arguments
and wherein said relationships between said new building block patterns and said traditional concept building blocks comprise:
  a definition relationship wherein a traditional concept building block can have defined for it simultaneously one or more Interaction Unit patterns,
  an application relationship wherein a pattern is applied to a traditional concept building block in the template or memory structure thereof, said one or more Interaction Unit patterns and the Elemental patterns that define and articulate said Interaction Unit patterns defining and articulating the desired user interface in said User Interface Model for said traditional concept building block
and wherein said Interaction Unit patterns and said Elemental patterns used to articulate and define said Interaction Unit patterns include:
  Service Interaction Unit and its supporting Elemental patterns Introduction, Defined Selection, Supplementary Information, Dependency, Status Recovery and Argument Grouping;
  Population Interaction Unit and its supporting Elemental patterns including Filter, Order Criterion, Display Set, Actions and Navigation;
  Instance Interaction Unit and its supporting Elemental patterns Display Set, Actions and Navigation; and
  Master/Detail Interaction Unit and its auxiliary or supporting Elemental patterns Master Interaction Unit and Detail Interaction Unit;
  performing an inference process on said customized templates to ensure that missing aliases are supplied by inference using a predetermined set of inference rules, and making some conversions from implicit form to explicit form by performing the following acts:

when the term "all" has been entered in the formal specification of said User Interface Model for an Action Pattern defining or articulating part of a Population and/or Instance Interaction Unit of a class, determining all the services of said class which can be invoked by a user of a user interface for said computer program to be automatically written defined in said User Interface Model and storing information regarding said services from said User Interface Model in the appropriate memory structures or templates for said Population and/or Instance Interaction Units;

when the term "all" has been entered in the formal specification of said User Interface Model for a Display Set of a Population Interaction Unit and/or Instance Interaction Unit defined for a class, determining all the attributes of said class for display in the user interface for said program to be automatically written defined in said User Interface Model and storing information regarding said attributes of said class in the appropriate memory structures or templates for said Population and/or Instance Interaction Units;

when the term "all" has been entered in the formal specification of said User Interface model for a Navigation Pattern defining or articulating a Population Interaction Unit and/or Instance Interaction Unit defined for a class, determining all the inheritance and aggregation relationships which relate the objects of said class to other objects in other related classes so that the other objects which can be displayed in said user interface when a navigation link is activated is determined, and recording that information in the appropriate memory structure(s) or template(s) pertaining to said Population Interaction Unit and/or Instance Interaction Unit of said class;

examining said filled-in templates or translation structures stored in said memory so as to find filled-in translation structures or templates or elements for which source code components or templates exist which can implement the type of element located, said source code components or templates being building blocks from which the final source code which can implement the user interface of said computer program to be built modeled in said User Interface Model including components of source code that can perform the following tasks: generate fixed files and auxiliary widgets, generate a query/selection form, an instance selection component, a specialization component if the class is specialized, and generate a service form for each service class, said components further including components of source code which can generate an access form to identify the user of said computer program and a main form displaying the menu for said computer program, and further including components of source code to carry out communication functions to reach system logic servers, and instantiating each said source code component or template by extracting necessary information from said filled-in translation structure or template so as to generate final source code which implements the concepts of said User Interface (Presentation) Model which said filled-in translation structures or templates represent, the collection of instantiated source code components being written to source code files which can be compiled into said computer program which implements the user interface portions of said computer program.

2. A process for automatically generating a computer program from a validated Formal Specification written in a formal language, comprising:

starting with a validated Formal Specification that defines the desired structure and behavior and user interface of a computer program to be automatically generated, said validated Formal Specification being automatically generated from and containing requirements data from a Conceptual Model of said computer program, said Conceptual Model being created by an analyst by entering requirements data defining the desired structure and behavior and user interface of said computer program, automatic generation of the source code of said computer program being accomplished by carrying out the following process steps using a computer having a memory:

A) articulating instances of translation structure classes stored in said memory by receiving and storing therein requirements data extracted from said validated Formal Specification so as to create translation structure class instances which store requirements data to create a plurality of translation structure instances that, collectively, contain all requirements data encoded in formal language elements of said Formal Specification, said elements being meta-model building blocks, and wherein each said translation structure instance is an instance of a class in any object-oriented programming language at least some of said translation structure instances storing requirements data extracted from said Formal Specification and at least some of said translation structure instances including one or more code generation methods which, when executed, function to generate one or more source code components needed for said computer program in a target programming language desired for said computer program, at least some of said source code components having been articulated with requirements data stored in said translation structure instances, and wherein said translation structure instances include a code generation class instance containing one or more methods to keep a list of translation structure instances which have been created and capable of calling into execution code generation methods of said translation structure instances needed to generate source code of said computer program, and capable of doing so in an order needed to write source code of said computer program, and capable of writing the generated source code to files and organizing said files, and wherein said components of source code which can be generated by said code generation methods of said translation structure instances including source code which implements the structure and behavior and user interface of said computer program defined in said validated Formal Specification;

B) executing said one or more methods in said code generation class instance so as to loop through said list of instances of translation structure instances and call into execution the code generation methods of said translation structure instances in an order needed to generate source code components which are articulated with said requirements data stored in said translation structure instances, and generating a global interactions executive component, and generating a global interactions server component, and generating a global functions component, and generating standard components, and writing generated source code components to files and organizing said files so as to create said computer program said computer program capable of controlling a computer to implement the computer program defined in said validated Formal Specification.

3. The process of claim 2 wherein said step of executing said one or more methods of said code generation class comprises executing said code generation methods of said instances of translation structures in an order needed to write source code which, when compiled and executed by a computer, cause said computer to perform the following functions in accordance with an execution model:

A1) providing a dialog by which a user can log in and identify himself or herself;

A2) providing an object system view to the user who logged in which displays only the set of object attributes the logged in user can see and only the services the user who logged in can see or activate;

A3) providing a dialog by which the user who logged in can provide information to identify an object server which is to carry out a service and introduce service arguments of the service being activated and to build a service activation message containing said arguments and send said service activation message to said object server which is to execute said service;

A4) controlling said object server to check any state transition which will be caused by execution of said service is a valid state transition as defined in said Formal Specification;

A5) controlling said object server to check for satisfaction of any preconditions specified in said Formal Specification, and if either a precondition is not satisfied or the state transition which would be caused by execution of said service is not valid, ignore said service activation message and provide feedback to the user in the form of an error message;

A6) controlling said object server to carry out the service identified in step A3 above if the state transition said object server will cause in every object which will be affected by said service is valid and preconditions of said service are satisfied, and if said state transitions are all valid and all preconditions are met, carrying out said service by making all valuation calculations required by said service and changing the values of attributes in accordance with formulas of said valuations and arguments of said service to change the state of the system implemented by said computer program;

A7) controlling said object server to check integrity constraints of each object the state of which is changed by said service to ensure said change of state does not violate an integrity constraint, and, if an integrity constraint is violated, to change the state of said system back to what it was before execution of said service and provide feedback to the user in the form of an error message;

A8) controlling said object server to check condition-action rules specifying triggers to determine if any trigger conditions have been satisfied by valid changes of state of any object affected by execution of said service, and, if a trigger condition has occurred, causing the service specified in said condition-action rule to be executed.

4. The process of claim 3 wherein said code generation class instance creates and stores a list of translation structure instances created during step A as requirements data is extracted from the objects of the classes defined in said validated Formal Specification and stored in said translation structure instances, and wherein step B comprises the following steps:

looping through said list of instances of translation structures created by said code generation class, said translation structure instances storing the requirements data needed to fill in customizable data of source code templates generated by the code generation methods of each translation structure instance so as to generate final source code which is specific to the structure and behavior and user interface of said computer program defined in said validated Formal Specification, and calling each translation structure instance's code generation method in the proper order so as to generate all the customized source code templates needed for said computer program defined in said validated Formal Specification;

generating a global interaction executive source code component;

generating a global interactions server source code component;

generating a global functions source code module; and generating standard source code components.

5. The process of claim 4 wherein step B comprises generating several source code files using said code generation methods of said translation structure instances created from each class defined in said validated Formal Specification and wherein said code generation methods of the various instances of translation structure specifically recited below which are created using the requirements data that defines each said class are called into execution to generate source code files by performing the following steps:

each server class instance's code generation method uses requirements data stored in said server class instance to generate a server source code executive component that comprises a method which is capable of controlling a computer to implement each service present in the signature of said class;

each global interaction server class instance's code generation method uses requirements data stored in said global interaction server class instance to generate an executive source code component that is capable of controlling a computer to implement global interactions defined in said validated Formal Specification with an interface that comprises a method which is capable of controlling a computer to implement each global interaction defined in said Formal Specification;

each analysis class instance's code generation method uses requirements data stored in said analysis class instance to generate a source code file that implements an executive component for the class whose requirements data was used to create said analysis class instance, said executive component of source code comprising a method which is capable of controlling a computer to implement each service of the signature of said class whose requirements data was used to create said analysis class instance, each said method in said executive component being structured to carry out said service according to an execution model;

each global interactions analysis class instance's code generation method uses information stored in said global interactions analysis class instance to generate a source code file that implements an executive component that is capable of controlling a computer to implements a method to implement each global interactions;

and wherein each inheritance hierarchy of classes has a plurality of analysis class instances in the group of translation structures, each corresponding to one class defined in said validated Formal Specification, and wherein each analysis class instance's code generation method uses requirements data stored in said hierarchy analysis class instance to generate an executive component which has a method which is capable of controlling a computer to implement a service of the signature of said class, and wherein each said executive component so generated by said analysis class instances in the inheritance hierarchy is part of a group of executive components grouped into a single, special executive component for the inheritance hierarchy;

each query class instance's code generation method uses requirements data stored in said query class instance to generate a source code file that implements query components which are capable of controlling a computer to enable a user of said computer program to query the population of a class;

each T class instance's code generation method uses requirements data stored in said T class instance regarding the constant and variable attributes of said class which gave rise to said instance of said T class and the methods to calculate the values of derived attributes to generate source code of a T component which is capable of controlling a computer to provide query access to values of constant and variable attributes and calculates the values of derived attributes of said class;

each C class instance's code generation method uses requirements data stored in said C class, if any, regarding the initialization values of constant and variable attributes of said class to generate source code of a C component which is capable of controlling a computer to populate attributes of said class with said initialization values when creating an instance of said class if said class is a temporal or permanent, condition-based specialization class;

each CC class instance's code generation method uses requirements data stored in said CC class, if any, regarding a temporal or permanent, condition-based specialization defined in said validated Formal Specification to generate source code which is capable of controlling a computer to implement CC components which implement a collection of C components and which provides a pair of methods per C component to add to and get items from the collection and a method to get the number of items in the collection;

each P class instance's code generation method uses requirements data stored in said P class regarding values needed to initialize constant and variable attributes of said class which gave rise to said P class translation structure instances to generate source code which is capable of controlling a computer to implement a P component which functions to store in memory the initialization values of constant and variable attributes of said class when creating an instance of said class;

each PL class instance's code generation method uses requirements data stored in said PL class instance, if any, regarding a collection of P components to generate the source code of a PL component which is capable of controlling a computer to implement a collection of P components and provides methods which are capable of controlling a computer to add to or get items from said collection and get the number of items in said collection whenever said class which gave rise to said PL class translation structure instance is a multi-valued component of an aggregation relationship;

each arguments list class instance's code generation method uses requirements data stored in said arguments list class instance on the arguments of every service of said class to generate source code which is capable of controlling a computer to implement an arguments list component;

each analysis class list class instance's code generation method uses requirements data stored in said analysis class list class instance on the identification function of said class to generate source code of a component is capable of controlling a computer to implement to supply said identification function information to characterize the naming mechanism for instances of said class as they are created;

each of said one or more events class instances' code generation methods uses requirements data stored in said events class instances to generate source code components which is capable of controlling a computer to resolve services in an executive component to implement events, shared events, transactions and object interactions;

each of said one or more auxiliary methods class instances' code generation methods generates a source code component which is capable of controlling a computer to implement one or more auxiliary methods needed to resolve a service in both executive components and executive components for inheritance hierarchies so as to implement at least precondition class instances, static constraint class instances, dynamic constraint class instances if preconditions, static constraints and dynamic constraints are present in said validated Formal Specification;

each T&Q class instance's code generation method uses requirements data stored in said T&Q class instance to generate source code files that implement queries and T components; and each inheritance method class instance code generation method generates source code components which are capable of controlling a computer to implement methods specific to inheritance relationships specified for said class in said validated Formal Specification.

6. The process of claim 5 wherein each said step of calling a code generation method of a translation structure instance to generate source code of an executive component which includes a method to carry out a service includes steps to generate source code which controls a computer to implement the following steps:

verify the existence and validity for the requested server instance;

create a copy of the requested server instance in memory accessing the persistence layer (by means of a corresponding query component) to retrieve the values of constant and variable attributes;

validate state transition for the requested service and the present state of the requested server instance as specified in the corresponding state transition diagram in the Conceptual Model;

verify the satisfaction of the requested service preconditions and blocking execution of said service if a precondition is not satisfied;

modify the value of the instance variable attributes by performing all valuations affected by the service as specified by a formula in said validated Formal Specification, thus changing the state of the requested server instance;

validate the new state achieved by the requested server instance by verifying its static and dynamic constraints and carrying out predetermined actions if a constraint is violated;

check trigger conditions to determine which actions should be carried out if a trigger condition is satisfied and carrying out said triggered actions;

communicate with a persistence layer for all persistent attributes of the requested server instance.

7. The process of claim 3 further comprising the steps:

controlling a computer to display diagrams and textual interactive dialogs and process and store data entered using said diagrams and textual interactive dialogs so as to perform the functions recited herein, said diagrams and textual interactive dialogs being tools which a designer of said computer program uses to enter requirements data that defines the desired structure and behavior and user interface of said computer program using object-oriented modeling techniques to avoid the complexity of purely textual formal methods;

automatically converting said requirements data entered using said diagrams and textual interactive dialogs into formal language elements as each piece of requirements data is entered and storing said formal language elements as said Formal Specification written in an object-oriented formal specification language having rules of syntax and semantics that define a grammar for said formal language;

controlling a computer to use said rules of syntax and semantics to validate said Formal Specification to generate said validated Formal Specification.

8. The process of claim 7 wherein said diagrams and textual interactive dialogs receive and process requirements data entered by said designer defining an Object Model, a Dynamic Model, a Functional Model and a Presentation Model including requirements data which, if entered, defines classes, relationships between classes, global interactions, global functions and views, and wherein said diagrams and textual interactive dialogs receive and process requirements data which, if entered, defines:

attributes;
services;
derivations;
constraints;
transaction formulas;
triggers;
display sets;
filters;
population selection patterns;
a state transition diagram;
a name;
an alias; and
a default population selection interface pattern for use among the population selection patterns specified in said requirements data.

9. The process of claim 8 wherein said diagrams and textual interactive dialogs receive and process requirements data which defines said attributes by entry of requirements data defining for each attribute:

a name;
a formal attribute type selected from the group comprising: constant, variable or derived;
a data type;
a default value;
whether said attribute is an identifier for distinguishing objects of the class to which it belongs;
a length;
whether the attribute is required when the object is created;
whether the attribute can be assigned a null value;
information about valuations that define as a formula how the value of the attribute is changed by the occurrence of an event; and
optional information about user interface patterns to be applied in corresponding service arguments related to the attribute.

10. The process of claim 9 wherein said diagrams and textual interactive dialogs receive and process requirements data which defines said services by entry of requirements data defining for each service:
- whether the service is an event or transaction;
- a name;
- service alias;
- whether the event is shared if the service is an event;
- a transaction formula that expresses the composition of services if the service is a transaction;
- a list of arguments and, for each argument: its name, data type, whether nulls are allowed as a valid value, whether the argument represents a set of objects in a collection, a default value, an alias, user interface patterns related to arguments including: introduction pattern, population selection pattern, defined selection pattern and dependency pattern.

11. The process of claim 7 wherein said diagrams and textual interactive dialogs receive and process requirements data which, if entered, further defines each class by defining derivations, constraints, triggers, display sets, filters and population selection user interface patterns, wherein said requirements data entered by said designer defines each derivation as a list of condition-formula pairs and specifies which formula will be applied under every condition, and wherein said requirements data entered by said designer further defines each constraint as a formula plus an error message the designer specifies which will be displayed when said constraint specified by said designer is violated, and wherein said requirements data defines each trigger as composed of a trigger target specified as self, class or object, a trigger condition and a triggered action comprised of a service and a list of possible agents to be activate said service and a list of default values associated with the arguments of the related service, and wherein said requirements data entered by said designer defines each display set by defining which attributes of said class will be visible to the user, and wherein said requirements data defines each filter as comprised of a formula and a list of auxiliary variables that are useful to define said formula, and wherein said requirements data defines said population selection user interface pattern by defining a display set and a filter,
and wherein said diagrams and textual interactive dialogs receive and process requirements data defining a state transition diagram for each class which is a set of states and transitions between them where each transition occurs upon occurrence of an action that can change the state of an object in said class, and wherein said requirements data can be entered which defines said actions as having preconditions which are entered by said designer as formulas that need to be satisfied before an action can be executed.

12. The process of claim 11 wherein said diagrams and textual interactive dialogs receives and processes requirements data entered by said designer which specifies relationships between classes which can be either aggregation or inheritance, wherein each aggregation relationship is indicated by requirements data which specifies the composition of objects in the aggregation relationship and which specifies cardinalities and whether the aggregation is static or dynamic and whether the aggregation is inclusive or referential and whether the aggregation has an identification dependence and a grouping clause when the aggregation is multi-valued, and wherein each inheritance relationship is defined by requirements data entered by the designer which specifies specialization of objects and stores the name of the parent class, the name of the child class and whether the specialization is temporary or permanent, and if the specialization is permanent, stores a formula on constant attributes as a specialization condition, and, if the specialization is temporary, said requirements data indicates the condition or the list of events that activate or deactivate the child class,
and wherein said diagrams and textual interactive receive and process requirements data that specifies a list of global interactions including the name of the global interaction, the formula and a list of arguments and allows said designer to enter a list of global functions including the name, a data type of a returned value and a set of arguments.

13. The process of claim 2 wherein said step of articulating instances of translation structures comprise the steps of creating the following translation structure class instances and storing requirements data therein and storing the created translation structure class instances in memory of said computer:
- a server class instance storing requirements data needed to generate server components;
- a global interactions server class instance storing requirements data needed to generate server components for global interactions;
- an analysis class instance storing requirements data needed to generate executive components;
- a global interactions analysis class instance storing requirements data needed to generate executive components for global interactions in the form of names of global interactions, global interactions formulas and a list of arguments;
- an inheritance hierarchy analysis class instance storing requirements data needed to generate executive components for inheritance hierarchies;
- a query class instance storing requirements data needed to generate query components;
- a T class instance storing requirements data needed to generate T components;
- a C class instance storing requirements data needed to generate C components;
- a CC class instance storing requirements data needed to generate CC component;
- a P class instance storing requirements data needed to generate P components;
- a PL class instance storing requirements data needed to generate PL components;
- an arguments list class instance storing requirements data on the arguments for every service of every class in said Conceptual Model;
- an analysis class list class instance storing requirements data on the identification function of every class in the Conceptual Model;
- one or more event class instances having a code generation method to generate the methods needed to resolve a service in executive components to implement events, shared events, transactions and object interactions;
- one or more auxiliary method class instances having a code generation method to generate the auxiliary methods needed to resolve a service in both executive components and executive components for inheritance hierarchies to implement at least precondition classes, static constraint classes, dynamic constraint classes if preconditions, static constraints and dynamic constraints are present in said Conceptual Model;
- T & Q method class instances having a code generation method to generate methods needed in query and T components;

an inheritance method class instance having a code generation method to generate inheritance-specific methods.

14. The process of claim 13 wherein the step of retrieving requirements data from classes further comprises the steps of retrieving the following requirements data from each class defined in said Formal Specification and using said retrieved requirements data to populate data fields in one or more translation structure class instances:
name;
constant attributes;
variable attributes;
derived attributes;
identification function;
events including the name, arguments for said event including name and type, and precondition formulae;
transactions including, for each said transaction, the name, type, precondition formulae, and transaction formula and arguments including, for each argument, the name and type;
valuation formulae;
state transitions including an initial state, final state, service name, valid agents, and transition condition formula;
static constraints formulae;
dynamic constraints formulae;
trigger conditions formulae;
ancestor class name;
specialized classes including the name, specialization condition formula, precondition redefinitions, and valuation redefinitions;
aggregation relationships including related class, cardinalities, static or dynamic, and role names; and
population selection patterns including any filter including any name and filter variables, and/or order criteria specified for said filter;
and wherein said step of retrieving requirements data from global interactions defined in said validated Formal Specification further comprises the steps of retrieving the following requirements data from each global interaction defined in said Formal Specification:
name;
arguments including the name and type of each argument; and
global interaction formula;
and wherein said step of retrieving requirements data from global functions defined in said validated Formal Specification further comprises the steps of retrieving the following requirements data from each global function defined in said Formal Specification:
name,
return type, and
arguments including name and type for each argument.

15. The process of claim 3 further comprising the steps:
C) controlling a computer to display diagrams and textual interactive dialogs and process and store requirements data entered using said diagrams and textual interactive dialogs so as to perform the functions recited herein, said diagrams and textual interactive dialogs being tools which a designer of said computer program uses to enter requirements data that define the meta-model building blocks or elements which comprise an Object Model, a Dynamic Model, a Functional Model and a Presentation Model which together comprise the Conceptual Model which fully specifies the desired structure, behavior and user interface of said computer program, said Conceptual Model being the entity from which said validated Formal Specification is generated;
D) storing in said memory of said computer said requirements data entered using said diagrams and textual interactive dialogs and using said computer to automatically convert said requirements data, as it is entered, into elements of a formal specification language and storing all said elements automatically created from items of requirements data as said Formal Specification, said Formal Specification being written in a formal specification language having rules of syntax and semantics that define a grammar;
E) controlling a computer to use said rules of syntax and semantics to validate said Formal Specification to ensure it is correct and complete so as to generate said validated Formal Specification.

16. The process of claim 15 wherein said diagrams and textual interactive dialogs receive and process requirements data entered by said designer defining an Object Model, a Dynamic Model, a Functional Model and a Presentation Model which can include definitions of classes, relationships between classes, global interactions, global functions and views, and wherein said diagrams and textual interactive dialogs receive and process requirements data as part of said Object Model, Dynamic Model, Functional Model and Presentation Model, said diagrams and textual interactive dialogs enabling entry of requirements data defining:
attributes;
services;
derivations;
constraints;
transaction formulas;
triggers;
display sets;
filters;
population selection patterns;
a state transition diagram;
formal interfaces;
a name.

17. The process of claim 16 wherein said diagrams and textual interactive dialogs receive and process requirements data from said designer which, if entered, articulate said attributes by defining for each attribute:
a name;
a formal attribute type of constant, variable or derived;
a data type;
a default value;
whether the attribute is an identifier for distinguishing objects of the class to which it belongs;
a length;
whether the attribute is required when the object is created;
whether the attribute can be assigned a null value;
information about valuations that define as a formula how the value of the attribute is changed by the occurrence of an event; and
optional information about user interface patterns to be applied in corresponding service arguments related to the attribute.

18. The process of claim 16 wherein said diagrams and textual interactive dialogs receive and process requirements data entered by said designer which, if entered, defines said services by defining for each service:

whether the service is an event or transaction;
a name;
service alias;
whether the event is shared if the service is an event;
a transaction formula that expresses the composition of services if the service is a transaction;
a list of arguments and, for each argument: its name, data type, whether nulls are allowed as a valid value, whether the argument represents a set of objects in a collection, a default value, an alias, user interface patterns related to arguments including: introduction pattern, population selection pattern, defined selection pattern and dependency pattern.

19. The process of claim 16 wherein said diagrams and textual interactive dialogs receive and process requirements data entered by said designer which, if entered, can further define each class by entering requirements data defining further defining each said derivation by specifying a list of condition-formula pairs and by specifying which formula will be applied under every condition; and by further defining each constraint as a formula plus an error message the designer specifies which will be displayed when said constraint specified by said designer is violated; and by further defining each trigger as composed of a trigger target specified as self, class or object, and by further defining a trigger condition and a triggered action comprised of a service and a list of possible agents to activate said service and a list of values associated with the arguments of the related service; and wherein said diagrams and textual interactive dialogs receive and process requirements data which further defines each said display set by defining which attributes of said class will be visible to the user; and which further defines each said filter as comprised of a formula and a list of auxiliary variables that are useful to define said formula; and wherein said requirements data further defines said population selection user interface pattern as defined by a display set and a filter;

and wherein said diagrams and textual interactive dialogs receive and process requirements data which allows said designer to enter a state transition diagram for each class which is a set of states and transitions between them, where each transition occurs upon occurrence of an action that can change the state of an object in said class, and wherein said actions can have preconditions which are entered by said designer by entering requirements data which defines formulas that need to be satisfied before an action can be executed.

20. The process of claim 16 wherein said diagrams and textual interactive dialogs receive and process requirements data, which, if entered by said designer, further defines said relationships between classes by defining whether said relationship between classes is a relationship of aggregation or of inheritance, wherein each aggregation relationship is indicated by entry of requirements data which specifies the composition of objects in the aggregation relationship and which specifies cardinalities and whether said aggregation is static or dynamic and whether said aggregation is inclusive or referential and whether said aggregation has an identification dependence and a grouping clause when said aggregation is multi-valued, and wherein each inheritance relationship is specified by entry of requirements data by said designer which specifies specialization of objects and which specifies the name of a parent class, the name of a child class and whether said specialization is temporary or permanent, and if said specialization is permanent, said requirements data specifies a formula on constant attributes as a specialization condition, and, if said specialization is temporary, said requirements data indicates a condition or a list of events that activate or deactivate said child class, and wherein said diagrams and textual interactive dialogues receive and process requirements data which, if entered, defines a list of global interactions including the name of a global interaction, a formula and a list of arguments and receive and process requirements data which, if entered, defines a list of global functions including a name, a data type of a returned value and a set of arguments.

21. The process of claim 15 wherein each said element of said validated Formal Specification corresponds to a conceptual pattern of a Conceptual Model of said computer program to be automatically written built by said designer by entering requirements data to articulate each said conceptual pattern for application to a problem to be solved by said computer program, said process further comprising the process step of:

performing an inference process to supply missing aliases according to a predetermined set of rules and convert the term "all" when used by said designer while using an editor program to create said Conceptual Model when articulating Interaction Units or display sets or navigation patterns while specifying said Presentation Model into an enumerated list of all the items in said validated Formal Specification that correspond to said "all" specification so as to create a fully articulated translation structure instance corresponding to said element;

and wherein said Object Model specifies a class architecture for said computer program, and wherein said meta-model building blocks for each class from which said Object Model of said Conceptual Model is built comprise at least:
a name;
an identification function that characterizes the naming mechanism used by objects in said class;
an alias;
constant, variable and derived attributes;
a set of services including private and shared events and local transactions;
integrity constraints;
derivation expressions that define the values of derived attributes;
aggregation and inheritance class operators; and
agents, meaning the classes that can invoke services defined in said class or query the attributes defined in said class;

and wherein said Dynamic Mode) specifies the behavior of objects in said Object Model in response to services, triggers and global interactions, said meta-model building blocks used by said analyst to construct said Dynamic Model component of said Conceptual Model comprise at least:
a state transition diagram for every class defined in said object model which defines valid object life cycles for objects in said class, said state transition diagram specifying transitions in response to actions where an action is comprised of a service plus a subset of its valid agents defined in said Object Model;
action preconditions which are formulas defined on object attributes and/or service arguments which must be satisfied before a transition can occur;
an object interaction diagram which specifies interobject communications, said interobject communications being comprised of:
trigger relationships which are object services which are automatically activated when a predetermined condition is satisfied;
global interactions which are services involving services of different objects and/or other global interactions;

and wherein building block elements from said meta-model used by said designer to construct said Functional Model comprise valuation formulas which specify how events, that is, the execution of events affect the values of attributes if said event is executed;
and wherein building block elements from said meta-model are user interface patterns which define a pattern language, said user interface patterns being used by said designer to build said Presentation Model to define the desired user interface of said computer program, wherein said user interface patterns of said pattern language comprise:
  a hierarchical action tree pattern;
  a service interaction unit pattern having elemental patterns that articulate it comprising elemental patterns of:
    introduction which constrain the values a user of said computer program can provide for an argument;
    defined selection which declare a list of all possible values that can be taken by an argument;
    supplementary information which displays humanly recognizable information about an object identification said designer has selected;
    dependency which is a list of event-condition-action rules which operate to model the dynamic behavior of the user interface provided by said service interaction unit such that whenever a user changes a value in a field in a service interaction unit of said computer program, said rules of said dependency elemental pattern are checked, and if the event matches with the event of one or more of said rules, a rule condition is checked, and, if fulfilled, the actions of said event-condition-action rule is carried out such that the state of other arguments in said service interaction unit can be altered, said dependency pattern providing a tool to model dependency between different arguments in said service interaction unit;
    status recovery to recover and display the existing state of an object which is about to be changed by arguments entered in said service interaction unit so as to provide a user of said computer program with a point of reference when said user is invoking a service which will change the state of said object;
    argument grouping which can be invoked to arrange large numbers of arguments of a service interaction unit in a logical and structured way;
  a population interaction unit pattern having elemental patterns used to articulate it comprising patterns for defining at least:
    a filter to control the displayed population of objects;
    order criterion to change the order of displayed population of objects;
    display set to control whether all attributes of objects in a class are displayed or just some subset thereof;
    actions that can be selected and which, if selected, redirect the user of said computer program to another interaction unit called a target interaction unit;
    navigation items, each of which has a target interaction unit and an expression in said formal language indicating whether an inheritance or aggregation relationship will be crossed from an origin interaction unit to a target interaction unit when said navigation item is selected, each navigation item, when selected by a user of said computer program causing the specified relationship to be crossed and information from said origin interaction unit to be displayed in said target interaction unit;
  an instance interaction unit having elemental patterns used to articulate it comprising patterns for defining:
    a display set to control whether all attributes of objects in a class are displayed or just some subset thereof;
    actions that can be selected and which, if selected, redirect the user of said computer program to another interaction unit called a target interaction unit;
    navigation items, each of which has a target interaction unit and an expression in said formal language indicating whether an inheritance or aggregation relationship will be crossed from an origin interaction unit to a target interaction unit when said navigation item is selected, each navigation item, when selected by a user of said computer program causing the specified relationship to be crossed and information from said origin interaction unit to be displayed in said target interaction unit;
  a master/detail interaction unit which captures how to present a certain object of a class including other related objects that provide additional detail, and having elemental patterns used to articulate said master/detail interaction unit, comprising:
    master interaction unit capable of showing objects in a class and selecting one for purposes of viewing more detail; and
    detail interaction units which displays more detail about the object selected in the master interaction unit.

22. An apparatus for automatically generating a computer program from a validated Formal Specification that defines the desired structure, user interface and behavior of said computer program, said validated Formal Specification derived from the Object Model, Dynamic Model, Functional Model and Presentation Model of a Conceptual Model that defines the structure, user interface and behavior of said computer program, said validated formal specification being written in a formal specification language, comprising:
  a computer having a memory; and
  one or more computer programs stored in said computer which, when executed, cause said computer to perform the following steps:
    articulating translation structure instances stored in said memory using requirements data extracted from said Formal Specification, and wherein a translation structure instance is an instance of a class in any object-oriented programming language at least some of said translation structure instances storing requirements data extracted from said validated Formal Specification, at least some of said translation structure instances including one or more code generation methods which, when executed, function to generate one or more source code components of said computer program in a target programming language desired for said computer program, at least some of said source code components being articulated with requirements data stored in said translation structure instances, and wherein said translation structure instances include a code generation class instance containing one or more methods to keep a list of the translation structure instances which have been created and capable of calling into execution all the code generation methods of said translation structure instances needed to generate source code needed for said computer program, and capable of doing so in an order needed to write said source code needed for said computer program, and capable of writing said source code to files and organizing said files; and executing said one or more methods of said code generation class instance to call into execution said code generation methods of said translation structure instances to write source code components instantiated with requirements data from said translation structure instances, and writing the resulting source code components into files and organizing said files, and further comprising the steps of generating global interaction executive source code components and global interaction server source code components, and generating global functions source code modules and generating standard source code components and combining all said components into a file which is said computer program.

23. The apparatus of claim 22 wherein said one or more computer programs includes an editor program to control said computer to display diagrams and textual interactive dialogs which said designer uses to enter requirements data in said Conceptual Model and convert each piece of said requirements data into its formal specification language counterpart in said Formal Specification, and controlling said computer with a validator program which uses rules of syntax and semantics of said formal specification language to validate said Formal Specification to ensure it is complete and correct so as to generate said validated Formal Specification.

24. The apparatus of claim 23 wherein said memory of said computer stores said translation structures instances as objects of classes, each of said translation structure instances, before it is articulated with requirements data, acting as a building block or template from a meta-model which is articulated by said designer by storing requirements data therein, said requirements data being data which is entered by a designer of said computer program while building said Conceptual Model, each piece of requirements data information entered in said Conceptual Model represents a conceptual pattern in said Conceptual Model and has a corresponding formal counterpart in said formal specification language in which said Formal Specification is written and represents a formal language concept, each piece of requirements data being stored in one of said translation structure instances, and wherein each said translation structure instance is a data structure structured according to a template for a first class which is comprised of several elemental building blocks each of said elemental building blocks being another data structure having a translation structure instance the structure of which is defined by an elemental building block-class which is unique to that particular elemental building block, and wherein said elemental building block class definitions for each of said elemental building blocks combine to define said template for said first class so as to provide a system of nested building blocks represented by a system of nested classes, said Formal Specification containing at least one instance of an articulated translation structure for each said class in said Conceptual Model, said meta-model building blocks for a class and the elemental building blocks which articulate the class together comprise said class building block and are used by said designer to construct said Object Model component of said Conceptual Model, said elemental building blocks that represent concepts in said Conceptual Model and which combine to define each class building block comprising:

a name;
an identification function that characterizes the naming mechanism used by objects in said class;
an alias;
constant, variable and derived attributes;
a set of services including private and shared events and local transactions;
integrity constraints;
derivation expressions that define the values of derived attributes;
aggregation and inheritance class operators;

and wherein building blocks from said meta-model used by said designer to construct a Dynamic Model component of said Conceptual Model comprise:
action preconditions;
the process definition of a class to specify valid object lives;
trigger relationships;
global interactions;

and wherein building blocks from said meta-model used by said analyst to construct a Functional Model component of said Conceptual Model comprising valuation dynamic formulas which specify the effect of events on the values of attributes;

and wherein building blocks from said meta-model which define a pattern language and which are used by said analyst to build said User Interface (Presentation) model defining the desired user interface of said computer program to be automatically written, comprise:
a hierarchical action tree pattern;
a service interaction unit pattern having elemental patterns that articulate it comprising patterns of:
introduction;
defined selection;
supplementary information;
dependency;
status recovery;
argument grouping;
a population interaction unit pattern having elemental patterns used to articulate it comprising patterns for defining:
a filter;
order criterion;
display set;
actions;
navigation;
an instance interaction unit having elemental patterns used to articulate it comprising patterns for defining:
a display set;
actions;
navigation;
a master/detail interaction unit having elemental patterns used to articulate it comprising:
master interaction unit; and
detail interaction units.

25. An apparatus comprising a software production system to facilitate design and automatic writing of a Formal Specification written in a formal specification language which fully defines the structure, behavior and user interface of a computer program the source code of which is to be automatically written (hereafter referred to as the application), comprising:
a computer having a memory, said memory storing translation structure instances in a high level repository, each translation structure instance comprising an object in a class of such objects and functioning to store requirements data needed to generate a source code component, and having a method to generate said source code component using said requirements data stored in said translation structure, said requirements data stored in said translation structure instances comprising requirements data retrieved from a Formal Specification defining the structure, behavior and user interface of said application which is derived from a Conceptual Model which defines the structure, behavior and user interface of said application and which was constructed by a designer by entering requirements data defining a plurality of elements of said Conceptual Model, said translation structure instances storing formal specification language counterparts of all pieces of requirements data entered to define said Conceptual Model including all requirements data entered to select and articulate meta-model building blocks that comprise an Object Model, a Dynamic Model, a Functional Model and a Presentation Model that comprise said Conceptual Model, and wherein said translation structure instances include a code generation class instance which includes one or more methods which, when executed by said computer, keeps lists of all translation structure instances that have been created and which store said requirements data and loops through these lists and invokes the code generation methods of translation structure instances on said lists to cause source code needed for said application to be generated in an order needed to create said application, and writes said source code so generated to files and organizes said files, and generating a global interactions executive component, a global interactions server component, a global functions module and standard components;

an editor program loaded on said computer which, when executed by said computer, controls said computer to display diagrams and textual interactive dialogs in an editor window which can be used by said designer of said application to enter said requirements data to build said Conceptual Model, said editor program structured to control said computer to receive and process requirements data entered by said designer using said displayed diagrams and textual interactive dialogs and convert each piece of information into its corresponding formal specification language counterpart as said requirements data is entered and store each said corresponding formal specification language counterpart in a translation structure instance; and a validation program, which, when executed by said computer, controls said computer to use rules of syntax and semantics of said formal specification language in which said Formal Specification is written to validate each said corresponding formal counterpart to ensure it is complete and correct.

26. The apparatus of claim 25 wherein said translation structure instances are data structures structured to store requirements data entered by said designer that define the following concepts in said Conceptual Model for said application:

Classes,
Services,
Arguments,
Attributes,
Class relationships,
Agent relationships between classes,
shared Events
Events
Valuations
Derivations
Static Constraints
Dynamic Constraints
Triggers
Trigger Conditions
Ancestor Class
Specialized Classes
Local Transactions
Global Interactions
Object Life Cycles
Transitions
Control Conditions
a Hierarchical Action Tree Pattern,
a Service Interaction Unit Pattern,
a Population Interaction Unit Pattern,
an Instance Interaction Unit Pattern, and
a Master/Detail Interaction Unit Pattern, and
elemental patterns for articulating said Service Interaction Unit Patterns comprising patterns for Introduction, Defined Selection, Supplementary Information, Dependency, Status Recovery, Argument Grouping, and
elemental patterns for articulation of said Population Interaction Unit comprising patterns for Filter, Order Criterion, Display Set, Actions and Navigation, and
elemental patterns for articulation of said Instance Interaction Unit comprising patterns for Display Set, Actions and Navigation, and
elemental patterns for articulation of said Master/Detail Interaction Unit comprising patterns for a Master Interaction Unit and a Detail Interaction Unit.

27. The apparatus of claim 26 wherein said editor program is structured to control said computer so as to speed up design of said Presentation Model portion of said Conceptual Model by displaying a dialog for designing user interfaces for classes which include shortcuts which allow a designer of said application to select a class and further articulate the user interface to be presented for said class by said application by adding to said Presentation Model an interaction unit user interface pattern and elemental patterns to articulate said interaction unit interface pattern further simply by selecting one or more icons or menu choices presented by said dialog, said icons or menu choices representing various interaction units and various elemental patterns from a pattern language, said patterns being building blocks in said meta-model, thereby allowing said designer to graphically define user interface patterns which said application will implement for display of data from classes in said application and interaction with a user of said application, and wherein said editor program is structured to respond to said selection of an icon representing a particular interaction unit pattern by displaying one or more dialog boxes or forms in which said designer can enter data articulating one or more elemental patterns which articulates said selected interaction unit, and using said entered requirements data to articulate said chosen interaction unit pattern by converting said requirements data entered by said designer into corresponding formal counterparts from said formal specification language and storing said corresponding formal counterparts in said translation structure instances in said high level repository.

28. The apparatus of claim 27 wherein said editor program is structured to control said computer to make said dialog for designing user interfaces for classes context sensitive such that it has a left pane in which the elements of said Conceptual Model are shown, and when said designer selects an element shown in said left pane, and selects an icon or menu choice to add a user interface pattern, only the user interface patterns that can be added to the selected element of said Conceptual Model are shown in another pane or a completely separate dialog referred to as a listbox, and wherein said editor program is structured to respond to selection of a pattern from said listbox and selection of a button displayed on said listbox indicating the desire of said designer to add said pattern by adding said pattern to said Presentation Model.

29. The apparatus of claim 28 wherein said editor program is structured to control said computer to display a definition tab on said dialog box for designing user interfaces for classes which, when selected, causes a new dialog to open which provides said designer lists of elemental patterns that can be selected by said designer and used to articulate an interaction unit pattern said designer has selected, and wherein said editor program is structured control said computer to display buttons said designer can use to add or delete elemental patterns said designer has selected from said displayed lists so as to articulate said selected interaction unit, and when an add button has been selected, the selected elemental pattern is shown in a pane which will be referred to as the selected pane and which is a different pane from the pane in which said elemental pattern was listed and selected from, and wherein said editor program is also structured to control said computer to display an edit button associated with said selected pane, which when selected opens a dialog which allows information to be entered to define attributes of said selected elemental pattern.

30. A process to control a computer to automatically generate from a validated Formal Specification written in an object-oriented formal specification language source code of a computer program which implements and is the functional equivalent of said validated Formal Specification, comprising the following steps:

using rules of syntax and semantics of a formal specification language in which a Formal Specification is written, said Formal Specification defining the structure and operation and user interface of a computer program to be automatically written, said rules of syntax and semantics being used to validate said Formal Specification to ensure it is complete and correct so as to generate a validated Formal Specification, said validated Formal Specification being comprised of formal counterparts of conceptual patterns in a Conceptual Model of said computer program, said formal counterparts referred to herein as elements and representing building blocks from a meta-model which have been articulated with requirements data entered by a designer of said application program while creating said Conceptual Model;

loading each element of said validated Formal Specification into appropriate fields of a DTD element of a Document Type Definition of an XML document where each element of said validated Formal Specification has a corresponding DTD element, the resulting XML DTD document comprising a high level repository of said Formal Specification;

loading information from said validated Formal Specification in said high level repository into translation structures in memory of a computer, each translation structure being a memory structure in the form of a class instance coded in C++ or any other programming language capable of storing data and having at least one code generation method each said translation structure instance being loaded with requirements data from said high level repository;

performing an inference process to detect any missing information in said translation structures and complete said translation structures by supplying the missing information;

performing a code generation process by executing said one or more code generation methods in each said translation structure so as to generate a template of source code instantiate said template of source code using requirements data from said high level repository which is stored in said translation structure so as to generate completed source code.

* * * * *